United States Patent [19]
Kawasaki et al.

[11] Patent Number: 5,991,545
[45] Date of Patent: Nov. 23, 1999

[54] MICROCOMPUTER HAVING VARIABLE BIT WIDTH AREA FOR DISPLACEMENT AND CIRCUIT FOR HANDLING IMMEDIATE DATA LARGER THAN INSTRUCTION WORD

[75] Inventors: Shumpei Kawasaki, Tokyo; Eiji Sakakibara, Kodaira; Kaoru Fukada, Koganei; Takanaga Yamazaki, Kodaira; Yasushi Akao; Shiro Baba, both of Kokubunji; Toshimasa Kihara, Tachikawa; Keiichi Kurakazu, Tokorozawa; Takashi Tsukamoto, Kodaira; Shigeki Masumura, Kodaira; Yasuhiro Tawara, Kodaira; Yugo Kashiwagi, Koganei; Shuya Fujita, Kodaira; Katsuhiko Ishida, Koganei; Noriko Sawa, Tama; Yoichi Asano, Tokyo; Hideaki Chaki, Tokorozawa; Tadahiko Sugawara, Kodaira; Masahiro Kainaga, Yokohama; Kouki Noguchi, Kokubunji; Mitsuru Watabe, Naka-gun, all of Japan

[73] Assignees: Hitachi, Ltd.; Hitachi VLSI Engineering Corp.; Hitachi Microcomputer System Ltd., all of Tokyo, Japan

[21] Appl. No.: 08/478,730

[22] Filed: Jun. 7, 1995

Related U.S. Application Data

[63] Continuation of application No. 07/897,457, Jun. 10, 1992, abandoned.

[30] Foreign Application Priority Data

Jun. 24, 1991 [JP] Japan ..................................... 3-178739
May 21, 1992 [JP] Japan ..................................... 4-154525

[51] Int. Cl.⁶ ................................. G06F 9/22; G06F 9/30
[52] U.S. Cl. ....................................... 395/800.33; 395/561
[58] Field of Search .................................... 395/375, 800, 395/800.1, 376, 820.33, 561

[56] References Cited

U.S. PATENT DOCUMENTS

| | | | |
|---|---|---|---|
| 4,858,105 | 8/1989 | Kuriyama et al. | 395/375 |
| 4,947,366 | 8/1990 | Johnson | 395/275 |
| 5,019,968 | 5/1991 | Wang et al. | 395/800 |
| 5,050,068 | 9/1991 | Dollas et al. | 395/375 |
| 5,050,668 | 9/1991 | Dallas et al. | 395/375 |
| 5,193,167 | 3/1993 | Sites et al. | 711/163 |
| 5,202,967 | 4/1993 | Matsuzaki et al. | 395/375 |
| 5,233,694 | 8/1993 | Hotta et al. | 395/375 |
| 5,241,633 | 8/1993 | Nishi | 395/375 |
| 5,317,740 | 5/1994 | Sites | 395/700 |
| 5,394,529 | 2/1995 | Brown, III et al. | 395/375 |

FOREIGN PATENT DOCUMENTS

| | | | |
|---|---|---|---|
| 0368332A2 | 5/1990 | European Pat. Off. | G06F 9/38 |
| 0427245A3 | 5/1991 | European Pat. Off. | G06F 9/38 |
| 0427025A2 | 2/1992 | European Pat. Off. | G06F 9/30 |

OTHER PUBLICATIONS

Kohn et al., Session 3: Floating Point Processors, WAM 3.6: A 1,000,000 Transistor Microprocessor, *ISSC 89*, Wednesday, Feb. 15, 1989, pp. 53–55.

(List continued on next page.)

*Primary Examiner*—Alyssa H. Bowler
*Assistant Examiner*—John Follansbee
*Attorney, Agent, or Firm*—Fay, Sharpe, Beall, Fagan, Minnich & McKee

[57] ABSTRACT

Herein disclosed is a microcomputer MCU adopting the general purpose register method. The microcomputer is enabled to have a small program capacity or a high program memory using efficiency and a low system cost, while enjoying the advantage of simplification of the instruction decoding as in the RISC machine having a fixed length instruction format of the prior art, by adopting a fixed length instruction format having a power of 2 but a smaller bit number than that of the maximum data word length fed to instruction execution means. And, the control of the coded division is executed by noting the code bits.

21 Claims, 87 Drawing Sheets

OTHER PUBLICATIONS

Osborn et al., *Osborne 16–Bit Microprocessor Handbook, Includes 2900 Chip Slice Family*, Osborne/McGraw–Hill, 1981, pp. 1–1 to 1–5; 1–24 to 1–33; 4–1 to 4–4; and 4–35 to 4–45.

Tabak, D., *RISC Systems*, 1990, pp. 49–71.

"I860 Microprocessor Internal Architecture" *Microprocessors and Microsystems*, vol. 14, No. 12, Mar. 1990, pp. 89–96.

"Cache Organization to Maximize Fetch Bandwidth," *IBM Technical Disclosure Bulletin*, vol. 32, No. 2, Jul. 1989, pp. 62–64.

*M68000, 16/32–Bit Microprocessor Programmer's Reference Manual*, 1984, pp. 72, 77 and 80.

Osborne, *16–bit Microprocessor Handbook*, 1981, pp. 7–30 to 7–38.

PIPE-LINE CONTROL TIMING AT REGISTER CONFLICT (LOAD EXECUTION)

PIPE LINE CONTROL TIMING AT MEMORY ACCESS CONFLICT

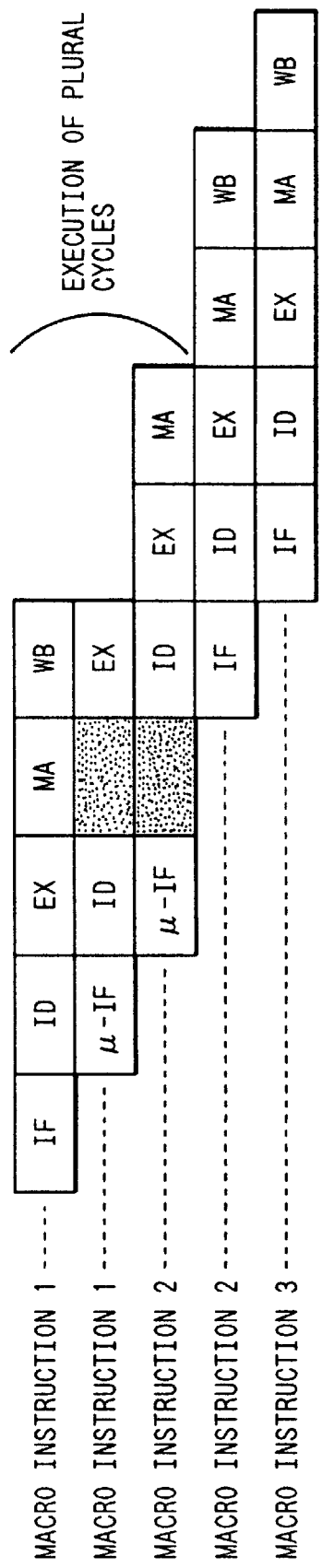

FIG. 13

INSTRUCTIONS (1) FOR DATA TRANSFER

| INSTRUCTION | CODE | OPERATION | EXECUTION STATE |
|---|---|---|---|
| MOV #imm, REG | 1101RRRRiiiiiiii | #imm → CODE EXTENSION → REG | 1 |
| MOV.W @(disp,PC), REG | 1001RRRRdddddddd | (disp+PC) → CODE EXTENSION → REG | 1 |
| MOV.L @(disp,PC), REG | 1011RRRRdddddddd | (disp+PC) → REG | 1 |
| MOV.L reg, @(disp,REG) | 0011RRRRrrrrdddd | reg → (disp+REG) | 1 |
| MOV.L @(disp,reg), REG | 0111RRRRrrrrdddd | (disp+reg) → REG | 1 |
| MOV.B R0, @(disp,GBR) | 10001101dddddddd | R0 → (disp+GBR) | 1 |
| MOV.W R0, @(disp,GBR) | 10001110dddddddd | R0 → (disp+GBR) | 1 |
| MOV.L R0, @(disp,GBR) | 10001111dddddddd | R0 → (disp+GBR) | 1 |
| MOV.B @(disp,GBR), R0 | 11001101dddddddd | (disp+GBR) → CODE EXTENSION → R0 | 1 |
| MOV.W @(disp,GBR), R0 | 11001110dddddddd | (disp+GBR) → CODE EXTENSION → R0 | 1 |
| MOV.L @(disp,GBR), R0 | 11001111dddddddd | (disp+GBR) → R0 | 1 |
| MOV reg, REG | 0110RRRRrrrr1000 | reg → REG | 1 |
| MOV.B reg, @REG | 0010RRRRrrrr1001 | reg → (REG) | 1 |
| MOV.W reg, @REG | 0010RRRRrrrr1010 | reg → (REG) | 1 |
| MOV.L reg, @REG | 0010RRRRrrrr1011 | reg → (REG) | 1 |
| MOV.B @reg, REG | 0110RRRRrrrr1001 | (reg) → CODE EXTENSION → REG | 1 |
| MOV.W @reg, REG | 0110RRRRrrrr1010 | (reg) → CODE EXTENSION → REG | 1 |
| MOV.L @reg, REG | 0110RRRRrrrr1011 | (reg) → REG | 1 |
| MOV.B reg, @-REG | 0010RRRRrrrr1101 | REG-1 → REG, reg → (REG) | 1 |
| MOV.W reg, @-REG | 0010RRRRrrrr1110 | REG-2 → REG, reg → (REG) | 1 |
| MOV.L reg, @-REG | 0010RRRRrrrr1111 | REG-4 → REG, reg → (REG) | 1 |
| MOV.B @reg+, REG | 0110RRRRrrrr1101 | (reg) → CODE EXTENSION → REG, reg+1 → reg | 1 |
| MOV.W @reg+, REG | 0110RRRRrrrr1110 | (reg) → CODE EXTENSION → REG, reg+2 → reg | 1 |

FIG. 14

INSTRUCTIONS (2) FOR DATA TRANSFER

| INSTRUCTION | CODE | OPERATION | EXECUTION STATE |
|---|---|---|---|
| MOV.L @reg+,REG | 0110RRRRrrrr1111 | (reg) → REG, reg+4 → reg | 1 |
| MOV.B R0,@(disp,R1) | 10000101dddddddd | R0 → (disp+R1) | 1 |
| MOV.W R0,@(disp,R1) | 10000110dddddddd | R0 → (disp+R1) | 1 |
| MOV.L R0,@(disp,R1) | 10000111dddddddd | R0 → (disp+R1) | 1 |
| MOV.B @(disp,R1),R0 | 11000101dddddddd | (disp+R1) → CODE EXTENSION → R0 | 1 |
| MOV.W @(disp,R1),R0 | 11000110dddddddd | (disp+R1) → CODE EXTENSION → R0 | 1 |
| MOV.L @(disp,R1),R0 | 11000111dddddddd | (disp+R1) → R0 | 1 |
| MOV.B @(reg,R1),REG | 0000RRRRrrrr0101 | (reg+R1) → CODE EXTENSION → REG | 1 |
| MOV.W @(reg,R1),REG | 0000RRRRrrrr0110 | (reg+R1) → CODE EXTENSION → REG | 1 |
| MOV.L @(reg,R1),REG | 0000RRRRrrrr0111 | (reg+R1) → REG | 1 |
| MOV.B reg,@(REG,R1) | 0000RRRRrrrr1101 | reg → (REG+R1) | 1 |
| MOV.W reg,@(REG,R1) | 0000RRRRrrrr1110 | reg → (REG+R1) | 1 |
| MOV.L reg,@(REG,R1) | 0000RRRRrrrr1111 | reg → (REG+R1) | 1 |
| MOVA @(disp,PC),R1 | 11001011dddddddd | disp+PC → R1 | 1 |
| SWAP.B reg,REG | 0110RRRRrrrr0100 | reg → INTERCHANGE OF LESS SIGNIFICANT 2 BYTES → REG | 1 |
| SWAP.W reg,REG | 0110RRRRrrrr0101 | reg → INTERCHANGE OF MORE & LESS SIGNIFICANT WORDS → REG | 1 |
| XTRCT reg,REG | 0010RRRRrrrr1000 | reg : CENTRAL 32 BITS OF REG → REG | 1 |

FIG. 15

INSTRUCTIONS FOR LOGIC OPERATION

| INSTRUCTION | CODE | OPERATION | EXECUTION STATE |
|---|---|---|---|
| AND reg, REG | 0001RRRRrrrr1001 | REG & reg → REG | 1 |
| AND #imm, R0 | 10001001iiiiiiii | R0 & imm → R0 | 1 |
| AND.B #imm, @R1 | 10000001iiiiiiii | (R1) & imm → (R1) | 3 |
| EOR reg, REG | 0001RRRRrrrr1010 | REG ^ reg → REG | 1 |
| EOR #imm, R0 | 10001010iiiiiiii | R0 ^ imm → R0 | 1 |
| EOR.B #imm, @R1 | 10000010iiiiiiii | (R1) ^ imm → (R1) | 3 |
| NOT reg, REG | 0110RRRRrrrr1100 | ~ reg → REG | 1 |
| OR reg, REG | 0001RRRRrrrr1011 | REG \| reg → REG | 1 |
| OR #imm, R0 | 10001011iiiiiiii | R0 \| imm → R0 | 1 |
| OR.B #imm, @R1 | 10000011iiiiiiii | (R1) \| imm → (R1) | 3 |
| TAS.B @REG | 0100RRRR00001000 | IF (REG) = 0, 1 → T, 1 → MSB OF (REG) | 4 |
| TEST reg, REG | 0001RRRRrrrr1000 | REG & reg, IF RESULT = 0, 1 → T | 1 |
| TEST #imm, R0 | 10001000iiiiiiii | R0 & imm, IF RESULT = 0, 1 → T | 1 |
| TEST.B #imm, @R1 | 10000000iiiiiiii | (R1) & imm, IF RESULT = 0, 1 → T | 3 |

FIG. 16

INSTRUCTIONS (1) FOR ARITHMETIC OPERATION

| INSTRUCTION | CODE | OPERATION | EXECUTION STATE |
|---|---|---|---|
| ADD reg,REG | 0010RRRRrrrr0000 | REG+reg → REG | 1 |
| ADD #imm,REG | 0101RRRRiiiiiiii | REG+imm → REG | 1 |
| ADDC reg,REG | 0010RRRRrrrr0010 | REG+reg+C → REG, CARRY → C | 1 |
| ADDS reg,REG | 0010RRRRrrrr0011 | REG+reg → SATURATION → REG, OVERFLOW → C | 1 |
| ADDV reg,REG | 0010RRRRrrrr0001 | REG+reg → REG, OVERFLOW → C | 1 |
| CMP/EQ reg,REG | 0001RRRRrrrr0000 | IF REG = reg, 1 → T | 1 |
| CMP/HS reg,REG | 0001RRRRrrrr0010 | IF REG ≧ reg WITHOUT CODES, 1 → T | 1 |
| CMP/GE reg,REG | 0001RRRRrrrr0011 | IF REG ≧ reg WITH CODES, 1 → T | 1 |
| CMP/HI reg,REG | 0001RRRRrrrr0110 | IF REG > reg WITHOUT CODES, 1 → T | 1 |
| CMP/GT reg,REG | 0001RRRRrrrr0111 | IF REG > reg WITH CODES, 1 → T | 1 |
| CMP/PZ REG | 0100RRRR00011001 | IF REG ≧ 0, 1 → T | 1 |
| CMP/PL REG | 0100RRRR00011101 | IF REG > 0, 1 → T | 1 |
| CMP/STR reg,REG | 0010RRRRrrrr1100 | IF ANY BYTE IS EQUAL, 1 → T | 1 |
| DIV1 reg,REG | 0001RRRRrrrr1100 | DIVIDE ON STEP (REG ÷ reg) | 1 |
| DIVOS reg,REG | 0001RRRRrrrr1101 | MSB OF REG → Q, MSB OF reg → M, M ^ Q → C | 1 |
| DIVOU | 0000000000101010 | 0 → M/Q/C | 1 |

FIG. 17

INSTRUCTIONS (2) FOR ARITHMETIC OPERATION

| INSTRUCTION | CODE | OPERATION | EXECUTION STATE |
|---|---|---|---|
| EXTS.B reg,REG | 0110RRRRrrrr0010 | CODE-EXTEND reg FROM BYTES → REG | 1 |
| EXTS.W reg,REG | 0110RRRRrrrr0011 | CODE-EXTEND reg FROM WORDS → REG | 1 |
| EXTU.B reg,REG | 0110RRRRrrrr0000 | ZERO-EXTEND reg FROM BYTES → REG | 1 |
| EXTU.W reg,REG | 0110RRRRrrrr0001 | ZERO-EXTEND reg FROM WORDS → REG | 1 |
| MULS reg,REG | 0001RRRRrrrr1111 | REG × reg → REG WITH CODES | 4 |
| MULU reg,REG | 0001RRRRrrrr1110 | REG × reg → REG WITHOUT CODES | 4 |
| NEG reg,REG | 0110RRRRrrrr0110 | 0-reg → REG | 1 |
| NEGC reg,REG | 0110RRRRrrrr0111 | 0-reg-C → REG, BORROW→ C | 1 |
| SUB reg,REG | 0010RRRRrrrr0100 | REG-reg → REG | 1 |
| SUBC reg,REG | 0010RRRRrrrr0110 | REG-reg-C → REG, BORROW→ C | 1 |
| SUBS reg,REG | 0010RRRRrrrr0111 | REG-reg → SATURATION → REG, UNDERFLOW → C | 1 |
| SUBV reg,REG | 0010RRRRrrrr0101 | REG-reg → REG, UNDERFLOW → C | 1 |

FIG. 18

SHIFT INSTRUCTIONS

| INSTRUCTION | CODE | OPERATION | EXECUTION STATE |
|---|---|---|---|
| ROTL    REG | 0100RRRR00101001 | C ← REG ← MSB | 1 |
| ROTR    REG | 0100RRRR00101000 | LSB → REG → C | 1 |
| ROTCL   REG | 0100RRRR00101011 | C ← REG ← C | 1 |
| ROTCR   REG | 0100RRRR00101010 | C → REG → C | 1 |
| SHAR    REG | 0100RRRR00011000 | MSB → REG → C | 1 |
| SHLL/SHAL REG | 0100RRRR00011011 | C ← REG ← 0 | 1 |
| SHLR    REG | 0100RRRR00011010 | 0 → REG → C | 1 |
| SL2     REG | 0100RRRR00001111 | REG<<2 → REG | 1 |
| SR2     REG | 0100RRRR00001110 | REG>>2 → REG | 1 |
| SL8     REG | 0100RRRR00011111 | REG<<8 → REG | 1 |
| SR8     REG | 0100RRRR00011110 | REG>>8 → REG | 1 |
| SL16    REG | 0100RRRR00101111 | REG<<16 → REG | 1 |
| SR16    REG | 0100RRRR00101110 | REG>>16 → REG | 1 |

FIG. 19

BRANCH INSTRUCTIONS

| INSTRUCTION | CODE | OPERATION | EXECUTION STATE |
|---|---|---|---|
| BC disp | 11001100dddddddd | disp+PC → PC IF C = 1 / nop IF C = 0 | 3/1 |
| BF disp | 11001010dddddddd | disp+PC → PC IF T = 0 / nop IF T = 1 | 3/1 |
| BT disp | 11001000dddddddd | disp+PC → PC IF T = 1 / nop IF T = 0 | 3/1 |
| BRA disp | 1010dddddddddddd | DELAY BRANCH, disp+PC → PC | 2 |
| BSR disp | 1110dddddddddddd | DELAY BRANCH, PC → PR, disp+PC → PC | 3 |
| JMP @REG | 0100RRRR00001010 | DELAY BRANCH, REG → PC | 2 |
| JSR @REG | 0100RRRR00001011 | DELAY BRANCH, PC → PR, REG → PC | 3 |
| RTS | 0000000000010001 | DELAY BRANCH, PR → PC | 2 |

FIG. 20

SYSTEM CONTROL INSTRUCTIONS (1)

| INSTRUCTION | CODE | OPERATION | EXECUTION STATE |
|---|---|---|---|
| BRK | 0000000000000000 | PC → BR, BREAK EXCEPTIONAL PROCESS | 6 |
| CLRC | 0000000000101001 | 0 → C | 1 |
| CLRT | 0000000000101000 | 0 → T | 1 |
| LDC REG, SR | 0100RRRR00000010 | REG → SR | 1 |
| LDC REG, PR | 0100RRRR00010010 | REG → PR | 1 |
| LDC REG, GBR | 0100RRRR00100010 | REG → GBR | 1 |
| LDC.L @REG+, SR | 0100RRRR00000001 | (REG) → SR, REG+4 → REG | 3 |
| LDC.L @REG+, PR | 0100RRRR00010001 | (REG) → PR, REG+4 → REG | 3 |
| LDC.L @REG+, GBR | 0100RRRR00100001 | (REG) → GBR, REG+4 → REG | 3 |
| LDBR | 0000000000100001 | R0 → BR | 2 |
| LDVR | 0000000000001011 | R0 → VBR | 2 |
| NOP | 0000000000000010 | | 1 |
| PASS #imm | 11001001iiiiiiii | DEBUG EXCEPTIONAL PROCESS IF D = 1 / nop IF D = 0 | 10 / 1 |
| RTB | 0000000000000001 | BR → PC | 2 |
| RTE | 0000000000010000 | DELAY BRANCH, STACK AREA → PC / SR | 4 |

FIG. 21

SYSTEM CONTROL INSTRUCTIONS (2)

| INSTRUCTION | CODE | OPERATION | EXECUTION STATE |
|---|---|---|---|
| SETC | 0000000000011001 | 1 → C | 1 |
| SETT | 0000000000011000 | 1 → T | 1 |
| SLP | 0000000000001000 | | 1 |
| STC SR, REG | 0000RRRR00000011 | SR → REG | 1 |
| STC PR, REG | 0000RRRR00010011 | PR → REG | 1 |
| STC GBR, REG | 0000RRRR00100011 | GBR → REG | 1 |
| STC.L SR, @-REG | 0100RRRR00000000 | REG-4 → REG, SR → (REG) | 3 |
| STC.L PR, @-REG | 0100RRRR00010000 | REG-4 → REG, PR → (REG) | 3 |
| STC.L GBR, @-REG | 0100RRRR00100000 | REG-4 → REG, GBR → (REG) | 3 |
| STBR | 0000000000100000 | BR → R0 | 2 |
| STVR | 0000000000001010 | VBR → R0 | 2 |
| TRAP #imm | 11000011iiiiiiii | DELAY BRANCH, PC / SR → STACK AREA, (imm) → PC | 6 |

FIG. 22

| INSTRUCTION | CODE | OPERATION | EXECUTION STATE |
|---|---|---|---|
| INDICATED MNEMONICALLY<br><br>OP. Sz SRC, DEST<br>→ DESTINATION<br>→ SOURCE<br>→ SIZE<br>→ OPERATION CODE<br><br>reg: SOURCE REGISTER<br>REG: DESTINATION REGISTER<br>imm: IMMEDIATE DATA<br>disp: DISPLACEMENT | INDICATED IN THE ORDER OF MSB → LSB<br><br>rrrr: SOURCE REGISTER<br>RRRR: DESTINATION REGISTER<br>iiii: IMMEDIATE DATA<br>dddd: DISPLACEMENT | INDICATED SCHEMATICALLY<br><br>↑, ↓ : DIRECTION OF TRANSFER<br>(xx) : MEMORY OPERAND | VALUE WITH NO WEIGHT |

FIG. 23

| ADDRESS MODE | |
|---|---|
| DESIGNATION | DESCRIPTION |
| Rn | CODE-EXTENDED TO VALIDATE 32-BIT DATA ALWAYS |
| @Rn | |
| @Rn+ | INCREMENTED BY 1 FOR BYTES, BY 2 FOR WORDS AND BY 4 FOR LONG WORDS |
| @-Rn | DECREMENTED BY 1 FOR BYTES, BY 2 FOR WORDS AND BY 4 FOR LONG WORDS |
| @(Rn,R1) | |
| @(disp:4,Rn) | disp IS CODE-EXTENDED ALWAYS FOR LEFTWARD SHIFT OF 2 BITS |
| @(disp:8,R1) | disp IS CODE-EXTENDED FOR LEFTWARD SHIFTS OF 0 FOR BYTES, 1 FOR WORDS AND 2 FOR LONG WORDS |
| @(disp:8,GBR) | disp IS CODE-EXTENDED FOR LEFTWARD SHIFTS OF 0 FOR BYTES, 1 FOR WORDS AND 2 FOR LONG WORDS |
| @(disp:8,PC) | disp IS CODE-EXTENDED FOR LEFTWARD SHIFTS OF 1 BIT FOR WORDS AND 2 BITS FOR LONG WORDS AND FOR LESS SIGNIFICANT 2 BIT MASK OF PC |
| disp:8 | disp OF CONDITIONAL BRANCH INSTRUCTION IS CODE-EXTENDED ALWAYS FOR LEFTWARD SHIFTS OF 1 BIT |
| disp:12 | disp OF UNCONDITIONAL BRANCH INSTRUCTION IS CODE-EXTENDED ALWAYS FOR LEFTWARD SHIFTS OF 1 BIT |
| #imm:8 | imm OF TEST,AND OR AND EOR INSTRUCTIONS ARE ZERO-EXTENDED ALWAYS FOR VALIDATING 32 BITS |
| #imm:8 | imm OF MOV AND ADD INSTRUCTIONS ARE CODE-EXTENDED ALWAYS FOR VALIDATING 32 BITS |
| #imm:8 | imm OF TRAP INSTRUCTION IS CODE-EXTENDED ALWAYS FOR LEFTWARD SHIFTS OF 2 BITS |

FIG. 28
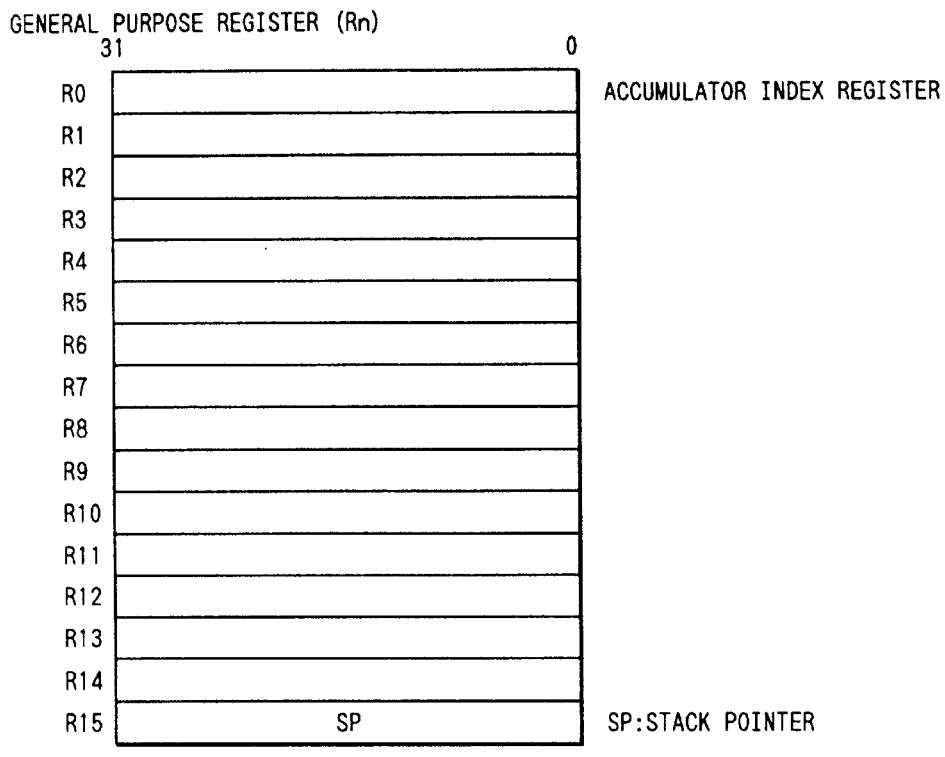
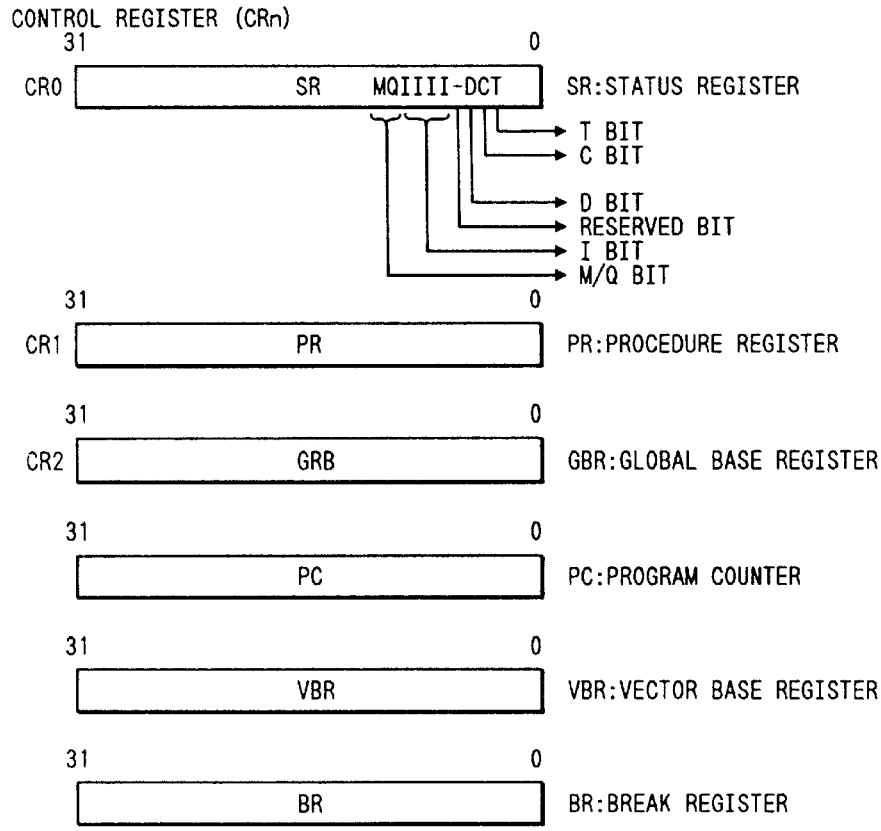

FIG. 30
DIVIDEND<0, DIVISOR<0 (NEGATIVE÷NEGATIVE) → -9÷-3=3 AND REMAINDER 0
1 IS SUBTRACTED FROM DIVIDEND
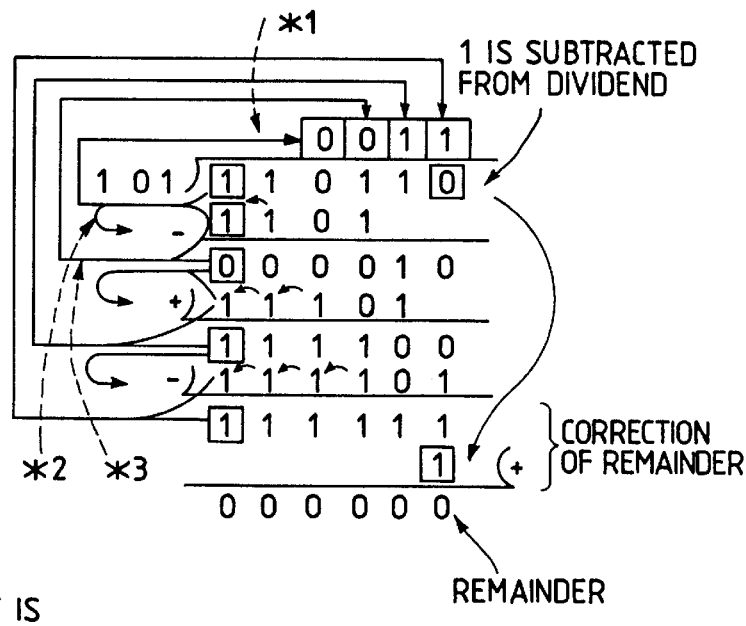
*1: EOR
*2: EOR=0→SUBTRACT
     EOR=1→ADD
*3: INVERT THE
     RESULT OF EOR
DIVIDEND IS LEFT AS IT IS
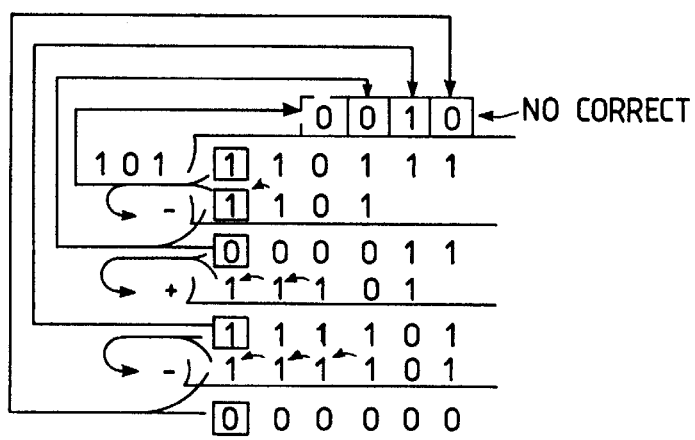

FIG. 31
DIVIDEND <0, DIVISOR >0 (NEGATIVE÷POSITIVE)→ -9÷3 = -3 AND REMAINDER 0
1 IS SUBTRACTED FROM DIVIDEND
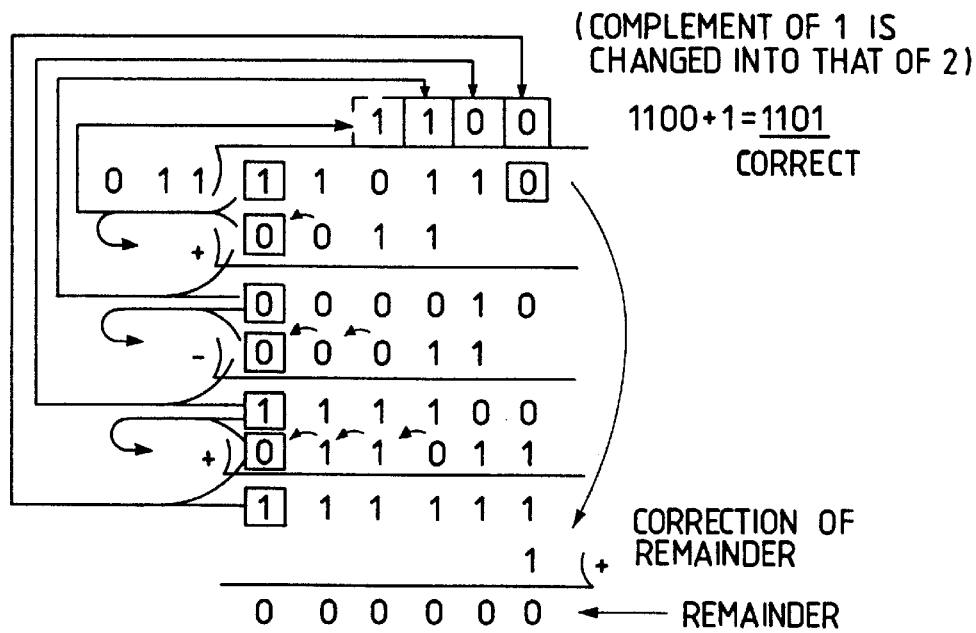
DIVIDEND IS LEFT AS IT IS
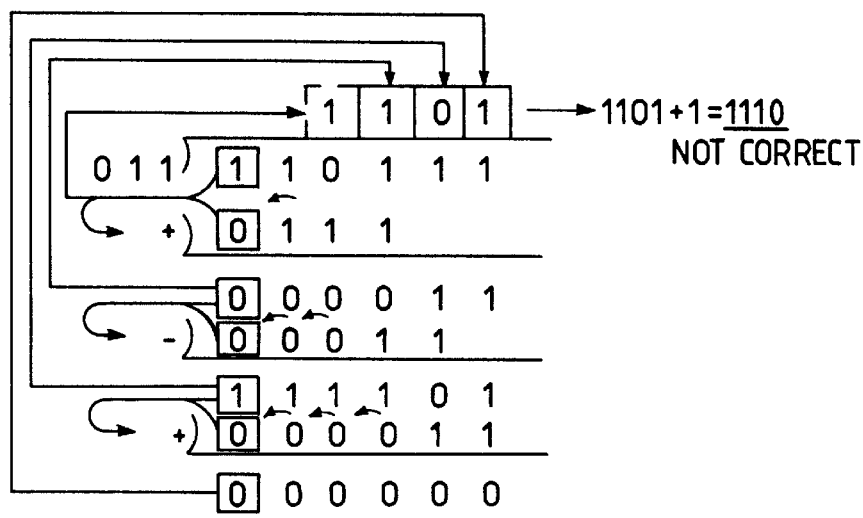

FIG. 32
DIVIDEND ≧ 0
DIVISOR > 0 (POSITIVE ÷ POSITIVE) → 11 ÷ 3 = 3 AND REMAINDER 2
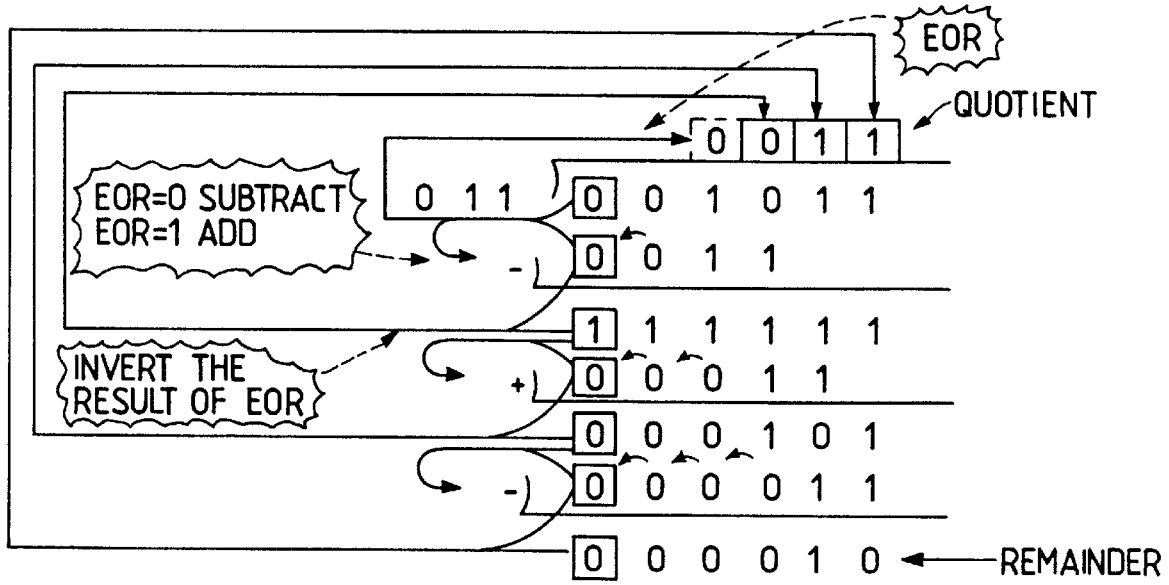
DIVIDEND < 0 (POSITIVE ÷ NEGATIVE) → 11 ÷ (-3) = -3 AND REMAINDER 2
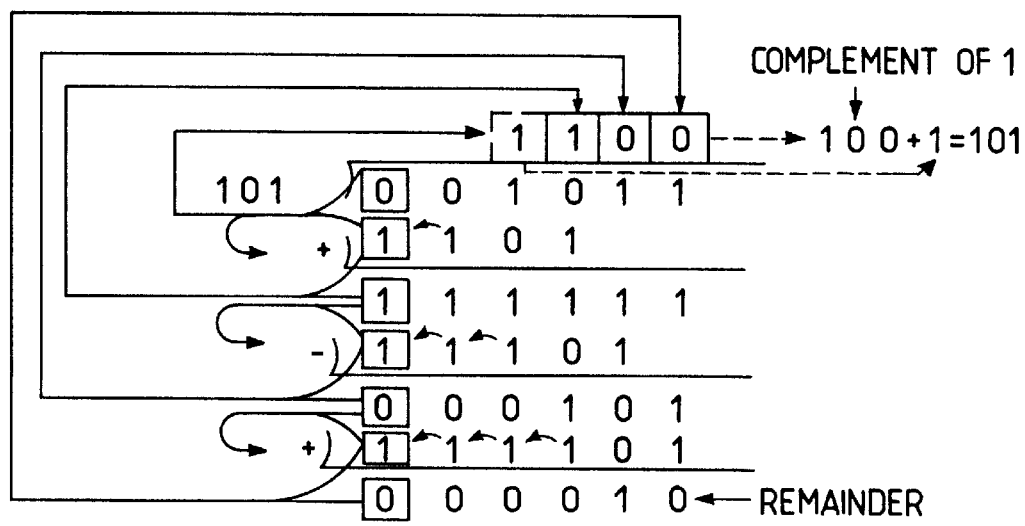

FIG. 33

① 1 IS SUBTRACTED FROM DIVIDEND IF NEGATIVE
(MSB OF DIVIDEND IS SUBTRACTED FROM DIVIDEND)

② CODE OF QUOTIENT IS DETERMINED FROM THOSE OF DIVIDEND AND DIVISOR

③ ADDITION AND SUBTRACTION OF DIVISOR TO AND FROM PARTIAL REMAINDER ARE DETERMINED FROM CODES OF DIVIDEND/PARTIAL REMAINDER AND DIVISOR AND ARE DIVIDED WITH CODES

④ RESULT OF ② AND DETERMINED QUOTIENT ARE ADDED AND SUBTRACTED

| CONSTRUCTION | CYCLE |
|---|---|
| X-MSB (X) → X<br>CODE OF X → Q<br>CODE OF Y → M<br>CODE OF QUOTIENT IS DETERMINED (S=Q^M) | |
| SHIFT BITS OF PARTIAL REMAINDER AND QUOTIENT LEFTWARD BY 1<br>Q IS THE CODE OF PARTIAL REMAINDER<br>SUBTRACT (PARTIAL REMAINDER - Y) FOR Q^M = 0  ADD (PARTIAL REMAINDER + Y) FOR Q^M = 1 - (Q^M) → QUOTIENT BIT | |
| QUOTIENT + S → QUOTIENT | |

FIG. 34(A)

PRE-CORRECTION OF DIVIDEND

| CODE BIT (COMPLEMENT OF 2) OF DIVIDEND | CORRECTION |
|---|---|
| 0 | NONE |
| 1 | A = A - 1 |

FIG. 34(B)

PREDICTION OF CODE OF QUOTIENT

| CODE BIT OF DIVIDEND | CODE BIT OF DIVISOR | CODE BIT OF QUOTIENT |
|---|---|---|
| 0 | 0 | 0 |
| 0 | 1 | 1 |
| 1 | 0 | 1 |
| 1 | 1 | 0 |

FIG. 35

PRE-CORRECTION OF NEGATIVE DIVIDEND

| NEGATIVE DIVIDEND X | INDICATION OF COMPLEMENT OF 2 $(X)_2$ | AFTER CHANGE OF SUBTRACTION OF 1 $(X-1)_2$ |
|---|---|---|
| -1 | 1 1 1 1 | 1 1 1 0 |
| -2 | 1 1 1 0 | 1 1 0 1 |
| -3 | 1 1 0 1 | 1 1 0 0 |
| -4 | 1 1 0 0 | 1 0 1 1 |
| -5 | 1 0 1 1 | 1 0 1 0 |
| -6 | 1 0 1 0 | 1 0 0 1 |
| -7 | 1 0 0 1 | 1 0 0 0 |
| -8 | 1 0 0 0 | 1 0 1 1 1 |
| ... | ... | ... |

FIG. 36

EXAMPLE OF EXPRESSION OF PARTIAL REMAINDER AFTER PRE-CORRECTION OF SUBTRACTION OF 1 FROM NEGATIVE DIVIDEND

| PARTIAL REMAINDER FOR NEGATIVE DIVIDEND | INDICATION OF COMPLEMENT OF 2 | | AFTER PRE-CORRECTION OF SUBTRACTION OF 1 | | REMARKS |
|---|---|---|---|---|---|
| | $(X)_2$ | MSB | $(X-1)_2$ | MSB | |
| ... | ... | ... | ... | ... | ... |
| 7 | 0 1 1 1 | 0 | 0 1 1 0 | 0 | SMALLER BY 1 THAN BINARY NUMBER |
| 6 | 0 1 1 0 | 0 | 0 1 0 1 | 0 | SMALLER BY 1 THAN BINARY NUMBER |
| 5 | 0 1 0 1 | 0 | 0 1 0 0 | 0 | SMALLER BY 1 THAN BINARY NUMBER |
| 4 | 0 1 0 0 | 0 | 0 0 1 1 | 0 | SMALLER BY 1 THAN BINARY NUMBER |
| 3 | 0 0 1 1 | 0 | 0 0 1 0 | 0 | SMALLER BY 1 THAN BINARY NUMBER |
| 2 | 0 0 1 0 | 0 | 0 0 0 1 | 0 | SMALLER BY 1 THAN BINARY NUMBER |
| 1 | 0 0 0 1 | 0 | 0 0 0 0 | 0 | SMALLER BY 1 THAN BINARY NUMBER |
| 0 | 0 0 0 0 | 0 | 1 1 1 1 | 1 | ACCEPTABLE AS EQUAL TO COMPLEMENT OF 1 |
| -1 | 1 1 1 1 | 1 | 1 1 1 0 | 1 | ACCEPTABLE AS EQUAL TO COMPLEMENT OF 1 |
| -2 | 1 1 1 0 | 1 | 1 1 0 1 | 1 | ACCEPTABLE AS EQUAL TO COMPLEMENT OF 1 |
| -3 | 1 1 0 1 | 1 | 1 1 0 0 | 1 | ACCEPTABLE AS EQUAL TO COMPLEMENT OF 1 |
| -4 | 1 1 0 0 | 1 | 1 0 1 1 | 1 | ACCEPTABLE AS EQUAL TO COMPLEMENT OF 1 |
| -5 | 1 0 1 1 | 1 | 1 0 1 0 | 1 | ACCEPTABLE AS EQUAL TO COMPLEMENT OF 1 |
| -6 | 1 0 1 0 | 1 | 1 0 0 1 | 1 | ACCEPTABLE AS EQUAL TO COMPLEMENT OF 1 |
| -7 | 1 0 0 1 | 1 | 1 0 0 0 | 1 | ACCEPTABLE AS EQUAL TO COMPLEMENT OF 1 |
| -8 | 1 0 0 0 | 1 | 1 0 1 1 1 | 1 | ACCEPTABLE AS EQUAL TO COMPLEMENT OF 1 |
| ... | ... | ... | ... | ... | ... |

FIG. 37(A)

COMMAND OF ADDITION & SUBTRACTION

| CODE BIT (COMPLEMENT OF 2 OR ZZ) OF DIVIDEND OR PARTIAL REMAINDER | CODE BIT (COMPLEMENT OF 2) OF DIVISOR | OPERATION |
|---|---|---|
| 0 | 0 | SUBTRACTION |
| 0 | 1 | ADDITION |
| 1 | 0 | ADDITION |
| 1 | 1 | SUBTRACTION |

FIG. 37(B)

HOW TO MAKE QUOTIENT BIT

| CODE BIT (COMPLEMENT OF 2 OR ZZ) OF PARTIAL REMAINDER | CODE BIT (COMPLEMENT OF 2) OF DIVISOR | QUOTIENT BIT |
|---|---|---|
| 0 | 0 | 1 |
| 0 | 1 | 0 |
| 1 | 0 | 0 |
| 1 | 1 | 1 |

FIG. 38

CORRECTION AFTER DIVISION

| CODE BIT (COMPLEMENT OF 2) OF DIVIDEND | CODE BIT (COMPLEMENT OF 2) OF DIVISOR (≠0) | QUOTIENT CORRECTION | CODE BIT (COMPLEMENT OF 2 OR ZZ) OF LAST PARTIAL REMAINDER | QUOTIENT CORRECTION (COMPLEMENT OF 2) OF LAST PARTIAL REMAINDER r |
|---|---|---|---|---|
| 0 | 0 | NONE | 0 | NONE |
|   |   |   | 1 | r + DIVISOR |
| 0 | 1 | QUOTIENT + 1 | 0 | NONE |
|   |   |   | 1 | r − DIVISOR |
| 1 | 0 | QUOTIENT + 1 | 0 | r − DIVISOR + 1 |
|   |   |   | 1 | r + 1 |
| 1 | 1 | NONE | 0 | r + DIVISOR + 1 |
|   |   |   | 1 | r + 1 |

```
MOV      R2, R4   ;   0 0000001   0  1 1010000 0000000 0000001 0000001
EXTS.W   R2, R2   ;   0 0000001   0  1 1010000 0000000 0000001 0000001
ROTCL    R2       ;   0 0000010   1  1 1010000 0000000 0000001 0000001
ADDC     R0, R2   ;   0 0000010   1  1 1010000 0000000 0000001 0000001
                            QUOTIENT

DIVOS    R0, R4   ;   0 0000010   0  1 1010000 0000000 0000001 0000001
MOVT     R0       ;   0 0000010   0  0 1010000 0000000 0000001 0000001
EOR      R3, R0   ;   0 0000010   0  0 1010000 0000001 0000001 0000001
ROTCR    R0       ;   0 0000010   1  0 1010000 0000000 0000001 0000001
BF       L1       ;   0 0000010   1  1 1010000 0000000 0000001 0000001
DIVOS    R1, R4   ;   0 0000010   1  1 1010000 0000000 0000001 0000001
ROTCR    R4       ;                                               1 0000001
DIV1     R1, R4   ;                                               1 1010000 ← +
     ; (Q:R4) =   ;   1 0000001                              :INTERNAL OPERATION
     ;+(M:R1) =   ;   1 1010000                              :INTERNAL OPERATION
     ; (Q:R4) =   ;   0 1010001                              :INTERNAL OPERATION
                                                             :INTERNAL OPERATION
                      0 0000010   0  1 1010000 0000000 0000001 0000001
                      0 0000010   0  0 1010000 0000000 0000001 0000001
                      0 0000010   0  0 1010000 0000000 0000001 0000001

L1:
SR3      R4       ;                                               1010001
ADD      R3, R4   ;                                               0001101      0001110
EXTS.W   R4, R4   ;                                               1111110
                                                                  REMAINDER
```

FIG. 41

NEGATIVE ÷ POSITIVE (CODED 6 BITS ÷ 3 BITS)

$-8 \div 3 = -2 \cdots -2$
R2   R1   R2
(1111000) ÷ (011) = (1110)···(110)

|  | | BINARY NUMBER OF 7 BITS | | | | BINARY NUMBER OF 7 BITS | | WORK REGISTER | CODE OF DIVIDEND | REMAINDER |
|---|---|---|---|---|---|---|---|---|---|---|
|  | | CODE DIVIDEND Q | | | T M | CODE DIVISOR R1 | | R0 | R3 | R4 |
| EOR | R0, R0 | x | 1111000 | | x x x | xxx011 | | xxxxxx | xxxxxxx | xxxxxxx |
| SL3 | R1 | x | 1111000 | | x x x | xxx011 | | 000000 | xxxxxxx | xxxxxxx |
| DIVOS | R0, R2 | x | 1111000 | | x x x | 011000 | | 000000 | xxxxxxx | xxxxxxx |
| MOVT | R3 | 1 | 1111000 | | 1 0 0 | 011000 | | 000000 | 0000001 | xxxxxxx |
| SUBC | R0, R2 | 1 | 1101111 | | 1 0 0 | 011000 | | 000000 | 0000001 | xxxxxxx |
| DIVOS | R1, R2 | 1 | 1101111 | | 1 0 0 | 011000 | | 000000 | 0000001 | xxxxxxx |
| ; .arepeat 3 | | | | | | | | | | |
| DIV1 | R1, R2 | 1 | 0011111 | + | | | | | | |
| ; (Q:R2) = | | 1 | 1011111 | | | | | | | |
| ; +(M:R1) = | | 0 | 0001111 | | | | | | | |
| ; (Q:R2) = | | 0 | 0001111 | − | 0 | 011000 | | 000000 | 0000001 | xxxxxx |
| DIV1 | R1, R2 | 0 | 0011111 | − | | | | | | |
| ; (Q:R2) = | | 0 | 0011111 | | | | | | | |
| ; −(M:R1) = | | 1 | 1101111 | | | | | | | |
| ; (Q:R2) = | | 1 | 1101110 | + | 0 | 011000 | | 000000 | 0000001 | xxxxxx |
| DIV1 | R1, R2 | 1 | 1011110 | + | | | | | | |
| ; (Q:R2) = | | 1 | 1011110 | | | | | | | |
| ; +(M:R1) = | | 0 | 0110 | | | | | | | |
| ; (Q:R2) = | | 0 | 0000110 | | 1 | 0 011000 | | 000000 | 0000001 | xxxxxx |
| ; .aendr | | | | | | | | | | |

FIG. 42

```
         MOV     R2, R4   ; 0  000110   0  0111000  0000000  0000001  000110
         EXTS.W  R2, R2   ; 0  111110   1  0111000  0000000  0000001  000110
         ROTCL   R2       ; 0  111101   1  0111000  0000000  0000001  000110
         ADDC    R0, R2   ; 0  111110   0  0111000  0000000  0000001  000110
                            QUOTIENT

DIVOS   R0, R4   ; 0  111110   1  0111000  0000000  0000001  000110
         MOVT    R0       ; 0  111110   1  0111000  0000000  0000001  000110
         EOR     R3, R0   ; 0  111110   0  0111000  0000001  0000001  000110
         ROTCR   R0       ; 0  111110  -1  0111000  0000000  0000001  000110
         BF      L1
         DIVOS   R1, R4   ; 0  111110   0  0111000  0000000  0000001  000110
         ROTCR   R4       ; 0  111110   0  0111000  0000000  0000001  000011
         DIV1    R1, R4   ; 1  101110   1  ─  :INTERNAL OPERATION
           -(Q:R4) =      ; 0  000110   ─  ─  :INTERNAL OPERATION
           -(M:R1) =      ; 0  011000   ─  ─  :INTERNAL OPERATION
           -(Q:R4) =      ; 1  101110   1  ─  :INTERNAL OPERATION

; 1  111110   1  0111000  0000000  0000001  101110

L1:
         SR3     R4       ; 1  111110   1  0111000  0000000  0000001  000101
         ADD     R3, R4   ; 1  111110   1  0111000  0000000  0000001  000110
         EXTS.W  R4, R4   ; 1  111110   1  0111000  0000000  0000001  111110
                                                                      REMAINDER
```

FIG. 43

NEGATIVE ÷ NEGATIVE (CODED 6 BITS ÷ 3 BITS)

$$-9 \div -3 = 3 \cdots 0$$
$$R2 \div R1 = R2$$
$$(1101111) \div (101) = (011) \cdots (000)$$

| | | BINARY NUMBER OF 7 BITS | | BINARY NUMBER OF 7 BITS | | | WORK REGISTER | CODE OF DIVIDEND | REMAINDER |
|---|---|---|---|---|---|---|---|---|---|
| | | CODE DIVIDEND Q R2 | | CODE DIVISOR T M R1 | | | R0 | R3 | R4 |
| EOR | R0, R0 | : x | xxxxxxx | x x | x x | xxx101 | xxxxxxx | xxxxxxx | xxxxxxx |
| SL3 | R1 | : x | xxxxxxx | x x | x x | xxx101 | 0000000 | xxxxxxx | xxxxxxx |
| DIVOS | R0, R2 | : 1 | 1101111 | 1 0 | 0 0 | 101000 | 0000000 | xxxxxxx | xxxxxxx |
| MOVT | R3 | : 1 | 1101111 | 0 0 | 0 1 | 101000 | 0000000 | 0000001 | xxxxxxx |
| SUBC | R0, R2 | : 1 | 1101110 | 0 0 | 0 1 | 101000 | 0000000 | 0000001 | xxxxxxx |
| DIVOS | R1, R2 | : 1 | 1101110 | 1 1 | 1 1 | 101000 | 0000000 | 0000001 | xxxxxxx |
| .arepeat 3 | | | | | | | | | |
| DIV1 | R1, R2 | : 1 | 1011100 | — | | 101000 | 0000000 | 0000001 | xxxxxxx |
| | (Q:R2) | = 1 | 0000100 | 0 | | 101000 | 0000000 | | |
| | −(M:R1) | = 1 | 101 | | | | | | |
| | (Q:R2) | = 0 | 0000100 | 0 | | 101000 | 0000000 | | |
| DIV1 | R1, R2 | : 0 | 0001000 | + | | 101000 | 0000000 | 0000001 | xxxxxxx |
| | (Q:R2) | = 0 | 0010000 | 0 | | 101000 | 0000000 | | |
| | +(M:R1) | = 1 | 101 | | | | | | |
| | (Q:R2) | = 1 | 1100000 | 1 | | 101000 | 0000000 | | |
| DIV1 | R1, R2 | : 1 | 1110000 | — | | 101000 | 0000000 | 0000001 | xxxxxxx |
| | (Q:R2) | = 1 | 1000001 | 1 | | 101000 | 0000000 | | |
| | −(M:R1) | = 1 | 101 | | | | | | |
| | (Q:R2) | = 1 | 1111001 | 1 | | 101000 | 0000000 | | |

:.aendr

FIG. 44

```
       MOV     R2, R4    : 1 1111001 1 1010000 00000001 11100 1
       EXTS.W  R2, R2    : 1 0000001 1 1010000 00000001 11100 1
       ROTCL   R2        : 1 0000011 1 1010000 00000001 11100 1
       ADDC    R0, R2    : 1 0000011 1 1010000 00000001 11100 1
                           QUOTIENT

DIVOS   R0, R4    : 1 0000011 1 1010000 00000001 11100 1
       MOVT    R0        : 1 0000011 0 1010000 00000001 11100 1
       EOR     R3, R0    : 1 0000011 0 1010000 00000001 11100 1
       ROTCR   R0        : 1 0000011 0 1010000 10000000 11100 1
       BF      L1           ; (Q:R4) =
       DIVOS   R1, R4       ; (M:R1) =
       ROTCR   R4
       DIVI    R1, R4       ; (Q:R4) =

L1:    SR3     R4        : 1 0000011 0 0 1010000 10000000 00000001 0001111
       ADD     R3, R4    : 1 0000011 0 0 1010000 10000000 00000001 0010000
       EXTS.W  R4, R4    : 1 0000011 0 0 1010000 10000000 00000001 00000000
                                                                REMAINDER
```

```
        MOV     R2,R4   ;  1  111110   0   0110000  0000000  0000001  1111110 0
        EXTS.W  R2,R2      1  111110   0   0110000  0000000  0000001  1111110 0
        ROTCL   R2         1  111100   1   0110000  0000000  0000001  1111110 0
        ADDC    R0,R2      1  111101   0   0110000  0000000  0000001  1111110 0
                              QUOTIENT

DIVOS   R0,R4   ;  1  111101   0   0110000  0000000  0000001  1111110 0
        MOVT    R0         1  111101   1   0110000  0000001  0000001  1111110 0
        EOR     R3,R0      1  111101   1   0110000  0000000  0000001  1111110 0
        ROTCR   R0         1  111101   0   0110000  1000000  0000001  1111110 0
        BF      L1
        DIVOS   R1,R4   ;  1  111101   0   0110000  0000000  0000001
        ROTCR   R4         1  111101   0   0110000  0000000  0000001
        DIV1    R1,R4      1  111101   0   0110000  0000000  0000001
                ;  (Q:R4) =
                ;  (M:R1) =
                ;  (Q:R4) =

L1:
        SR3     R4      ;  1  111101   0   0110000  1000000  0000001  0001111
        ADD     R3,R4      1  111101   0   0110000  1000000  0000001  0010000
        EXTS.W  R4,R4      1  111101   0   0110000  1000000  0000001  0000000
                                                                      REMAINDER
```

FIG. 47

POSITIVE ÷ POSITIVE (CODED 6 BITS ÷ 3 BITS)

$$8 \div 3 = 2 \cdots 2$$
$$R2 \div R1 = R2$$
$$(001000) \div (011) = (010) \cdots (010)$$

|  | BINARY NUMBER OF 7 BITS | | BINARY NUMBER OF 7 BITS | | WORK REGISTER | CODE OF DIVIDEND | REMAINDER |
|---|---|---|---|---|---|---|---|
|  | CODE DIVIDEND R2 | T M | CODE DIVISOR R1 | | R0 | R3 | R4 |
|  | Q | | | | | | |
| EOR   R0, R0 | x 001000 | x x | x xxx011 | | xxxxxx | xxxxxxx | xxxxxxx |
| SL3   R1 | x 001000 | x x | x xxx011 | | 000000 | xxxxxxx | xxxxxxx |
| DIVOS R0, R2 | x 001000 | x x | 0 011000 | | 000000 | xxxxxxx | xxxxxxx |
| MOVT  R3 | 0 001000 | 0 0 | 0 011000 | | 000000 | 0 000000 | xxxxxxx |
| SUBC  R0, R2 | 0 001000 | 0 0 | 0 011000 | | 000000 | 0 000000 | xxxxxxx |
| DIVOS R1, R2 | 0 001000 | 0 0 | 0 011000 | | 000000 | 000000 | xxxxxxx |
| .arepeat 3 | | | | | | | |
| DIV1  R1, R2 | 0 010000 | 0 0 | 0 011000 | | 000000 | 000000 | xxxxxxx |
|    (Q:R2) = | 0 010000 | | | :INTERNAL OPERATION | | | |
|  − (M:R1) = | 0 011 | | | :INTERNAL OPERATION | | | |
|    (Q:R2) = | 1 111000 | | | :INTERNAL OPERATION | | | |
|  | 1 111000 | 0 − | 0 011000 | | 000000 | 000000 | xxxxxxx |
| DIV1  R1, R2 | 1 110000 | 0 − | 0 011000 | | 000000 | 000000 | xxxxxxx |
|    (Q:R2) = | 1 110000 | | | :INTERNAL OPERATION | | | |
|  + (M:R1) = | 0 011 | | | :INTERNAL OPERATION | | | |
|    (Q:R2) = | 0 001000 | | | :INTERNAL OPERATION | | | |
|  | 0 001000 | 1 + | 0 011000 | | 000000 | 000000 | xxxxxxx |
| DIV1  R1, R2 | 0 010001 | 1 + | 0 011000 | | 000000 | 000000 | xxxxxxx |
|    (Q:R2) = | 0 010001 | | | :INTERNAL OPERATION | | | |
|  − (M:R1) = | 0 011 | | | :INTERNAL OPERATION | | | |
|    (Q:R2) = | 1 111001 | | | :INTERNAL OPERATION | | | |
|  | 1 111001 | 0 − | 0 011000 | | 000000 | 000000 | xxxxxxx |

;. aendr

FIG. 48

```
MOV     R2, R4    ; 1 1111001 0  0 0111000 0000000 0000000 1111001
EXTS.W  R2, R2    ; 1 0000001 0  0 0111000 0000000 0000000 1111001
ROTCL   R2        ; 1 0000010 0  0 0111000 0000000 0000000 1111001
ADDC    R0, R2    ; 1 0000010 0  0 0111000 0000000 0000000 1111001
                        QUOTIENT

DIVOS   R0, R4    ; 1 0000010 1  0 0111000 0000000 0000000 1111001
MOVT    R0        ; 1 0000010 1  0 0111000 0000001 0000000 1111001
EOR     R3, R0    ; 1 0000010 1  0 0111000 0000001 0000000 1111001
ROTCR   R0        ; 1 0000010 1  0 0111000 0000000 1000000 1111001
BF      L1
DIVOS   R1, R4    ; 1 0000010 1  0 0111000 0000000 1000000 1111001
ROTCR   R4        ; 1 0000010 1  0 0111000 0000000 1000000 1111100
DIV1    R1, R4    ; 1 1111001 1  0 0111000 0000000 1000000
       ±(Q:R4) =  ; 0 0011000 0  + :INTERNAL OPERATION
       ±(M:R1) =  ; 0 0010001 1  + :INTERNAL OPERATION
                  ;              :INTERNAL OPERATION
        (Q:R4) =  ; 0 0000010 1  0 0111000 1000000 0000000 0100001
                                                              :INTERNAL OPERATION

L1:
SR3     R4        ; 0 0000010 1  0 0111000 1000000 0000000 0000010
ADD     R3, R4    ; 0 0000010 1  0 0111000 1000000 0000000 0000010
EXTS.W  R4, R4    ; 0 0000010 1  0 0111000 1000000 0000000 0000010
                                                                    REMAINDER
```

FIG. 49

POSITIVE ÷ NEGATIVE (CODED 6 BITS ÷ 3 BITS)

$$8 \div -3 = -2 \cdots 2$$
$$R2 \quad R1 \quad R2$$
$$(001000) \div (101) = (110) \cdots (010)$$

| | | BINARY NUMBER OF 7 BITS | | | BINARY NUMBER OF 7 BITS | | WORK REGISTER | CODE OF DIVIDEND | REMAINDER |
|---|---|---|---|---|---|---|---|---|---|
| | | CODE DIVIDEND R2 | | CODE DIVISOR | T M | R1 | R0 | R3 | R4 |
| EOR | R0, R0 | : x 0010000 | | x x x x | x x | xxx x101 | xxxxxxx | xxxxxxx | xxxxxxx |
| SL3 | R1 | : x 0010000 | | x x x x | x x | xxx x101 | xxxxxxx | xxxxxxx | xxxxxxx |
| DIVOS | R0, R2 | : 0 0010000 | | 0 0 0 0 | 0 1 | 1 0 1 000 | 000000 0 | xxxxxxx | xxxxxxx |
| MOVT | R3 | : 0 0010000 | | 0 0 0 0 | 0 0 | 101000 | 000000 | 000000 | xxxxxxx |
| SUBC | R0, R2 | : 0 0010000 | | 0 0 0 0 | 0 1 | 101000 | 000000 | 000000 | xxxxxxx |
| DIVOS | R1, R2 | : 0 0010000 | | 0 0 0 0 | 1 1 | 101000 | 000000 | 000000 | xxxxxxx |
| ;.arepeat 3 | | | | | | | | | |
| DIVI | R1, R2 | : 0 010001 | + | | 1 | 101000 | 000000 | 000000 | xxxxxxx |
| | (Q:R2) | = 1 1111001 | | | | | | | |
| | +(M:R1) | = 1 1100001 | − | | | | | | |
| | (Q:R2) | = 1 1100011 | | | | | | | |
| DIVI | R1, R2 | : 1 1001 | − | | 1 | 101000 | 000000 | 000000 | xxxxxxx |
| | (Q:R2) | = 1 1100011 | | | | | | | |
| | −(M:R1) | = 0 0010110 | = | | | | | | |
| | (Q:R2) | = 0 0010111 | | | | | | | |
| DIVI | R1, R2 | : 0 0101101 | + | | 1 | 101000 | 000000 | 000000 | xxxxxxx |
| | (Q:R2) | = 1 1111101 | + | | | | | | |
| | +(M:R1) | = 1 1111110 | | | | | | | |
| ;.aendr | | | | | | | | | |

FIG. 50

```
MOV    R2, R4    : 1 1111110 1 1010000 0000000 0000000 1111110
EXTS.W R2, R2    : 1 1111110 1 1010000 0000000 0000000 1111110
ROTCL  R2        : 1 1111101 1 1010000 0000000 0000000 1111110
ADDC   R0, R2    : 1 1111100 1 1010000 0000000 0000000 1111110
                           QUOTIENT

DIVOS  R0, R4    : 1 1111110 1 1010000 0000000 0000000 1111110
MOVT   R0        : 1 1111110 0 1010000 0000001 0000000 1111110
EOR    R3, R0    : 1 1111110 0 1010000 0000001 0000000 1111110
ROTCR  R0        : 1 1111110 0 1010000 1000000 0000000 1111110
BF     L1

DIVOS  R1, R4    : 1 1111110 0 1010000 1000000 0000000 1111110
ROTCR  R4        : 1 1111110 1 1010000 1000000 0000000 0111111
DIV1   R1, R4    :┌ 0 1111110 1    — :INTERNAL OPERATION
 :(Q:R4)  =      │ 1 101000        — :INTERNAL OPERATION
 :-(M:R1) =      │ 1 010110        — :INTERNAL OPERATION
 :(Q:R4)  =      └ 1 1111110 1 1010000 1000000 0000000 0101110 :INTERNAL OPERATION

L1:
SR3    R4        : 1 1111110 1 1010000 1000000 0000000 0101110
ADD    R3, R4    : 1 1111110 1 1010000 1000000 0000000 0000010
EXTS.W R4, R4    : 1 1111110 1 1010000 1000000 0000000 0000010
                                                       REMAINDER
```

FIG. 52(A)
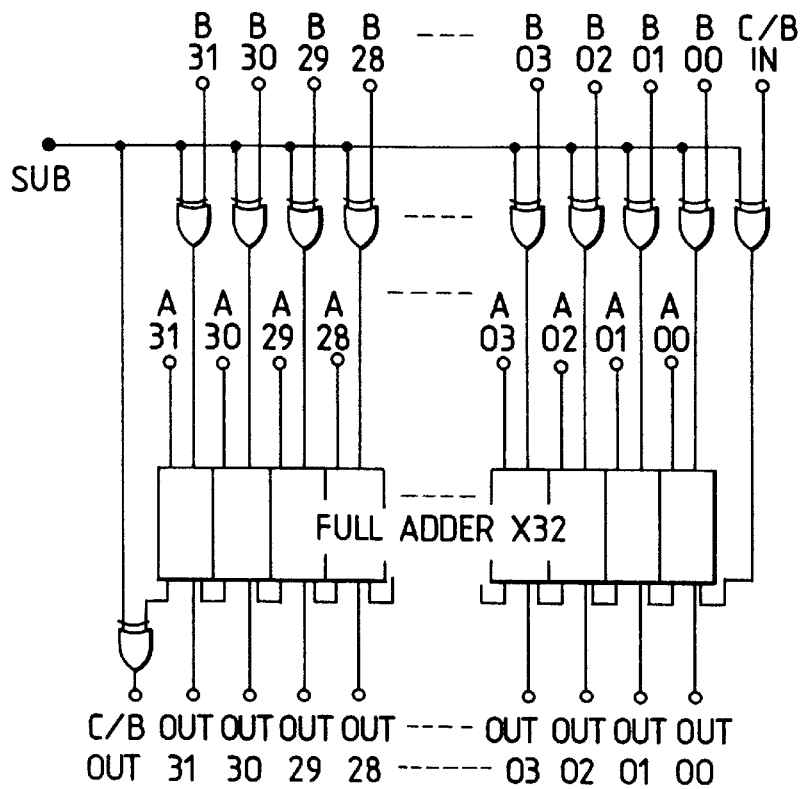
(a) ARITHMETIC LOGIC OPERATION CIRCUIT
FIG. 52(B)  FIG. 52(C)  FIG. 52(D)
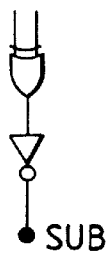  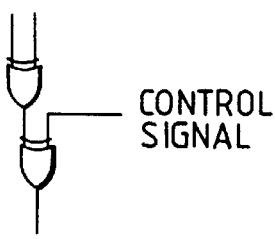
(b) ARITHMETIC CONTROL CIRCUIT   (c) ARITHMETIC CIRCUIT   (d) ARITHMETIC CIRCUIT

FIG. 53

```
DIVIDEND  : R2(CODED 32 BITS)
DIVISOR   : R1(CODED 16 BITS)
QUOTIENT  : R2
REMAINDER : R4

R2 ÷ R1 = R2 ··· R4

EOR       R0, R0
    SL16      R1
    DIVOS     R0, R2
    MOVT      R3
    SUBC      R0, R2
    DIVOS     R1, R2
  · arepeat   16
    DIV1      R1, R2
  · aendr
    MOV       R2, R4
    EXTS.W    R2, R2
    ROTCL     R2
    ADDC      R0, R2
    DIVOS     R0, R4
    MOVT      R0
    EOR       R3, R0
    ROTCR     R0
    BF        L1
    DIVOS     R1, R4
    ROTCR     R4
    DIV1      R1, R4
    ADD       R2, R4
L1:
    SR16      R4
    EXTS.W    R4, R4
```

(5) SUBC R0,R2

FIG. 75A
(A) EOR R0, R0
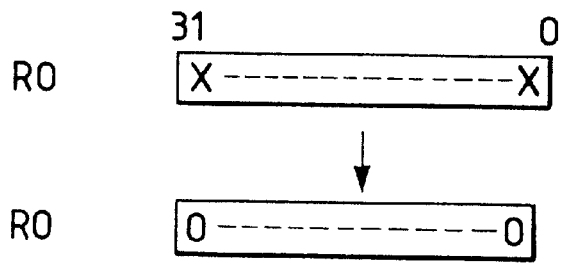
FIG. 75B
(B) SIL16 R1
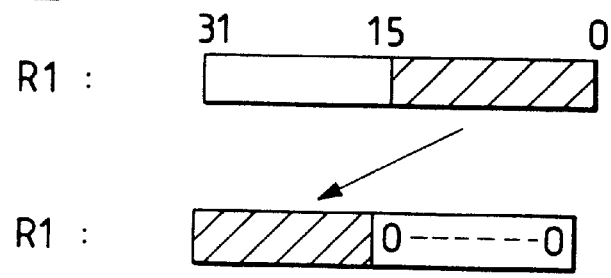
FIG. 75C
(C) DIVOS R0, R2
FIG. 75D
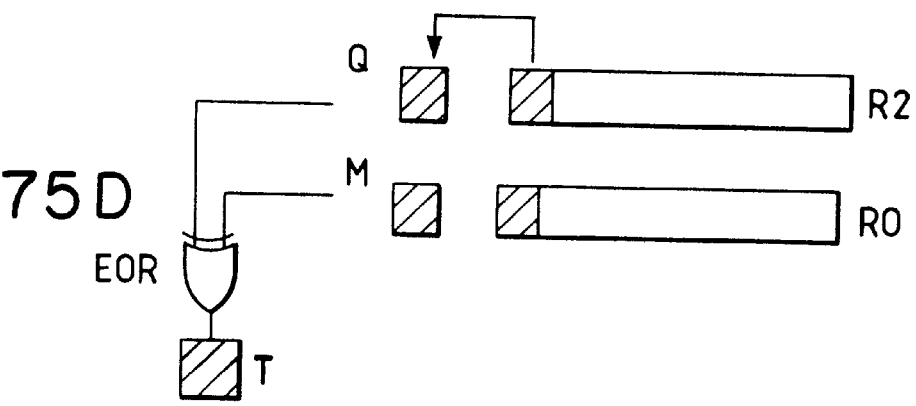

(D) MOVT R3

(E) SUBC R0, R2

(F) DIVOS R1, R2

(G) DIV1 R1, R2

(H) EXTS.W R2, R2

(I) RO TCL R2

CODE OF QUOTIENT

LAST QUOTIENT BIT (J) ADDC R0,R2

(K) DIVOS R0,R4

(L) MOVT R0

(M) EOR R3, R0

(N) ROTCR R0

FIG. 80A
(O) DIVOS R1, R4
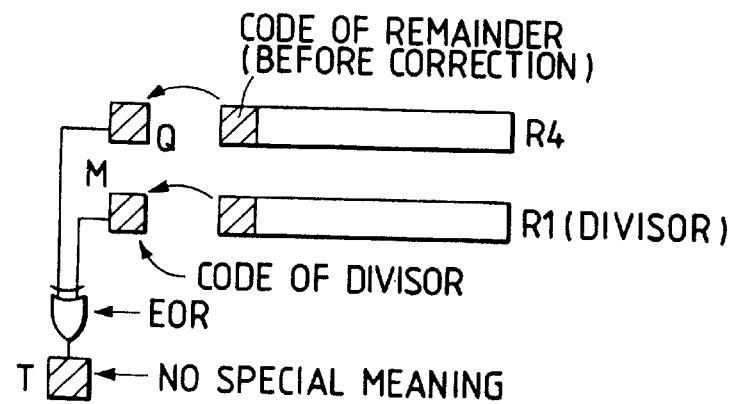
FIG. 80B
(P) ROTCR R4
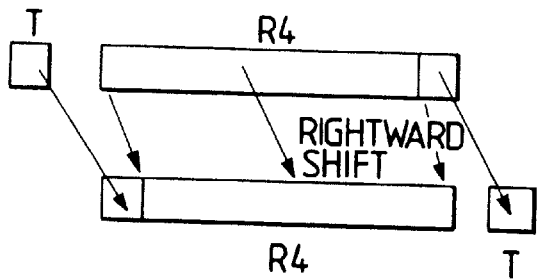
FIG. 80C
(Q) DIV1 R1, R4
(i) $Q \wedge M = \begin{cases} 1 & \text{COMMAND OF ADDITION} \\ 0 & \text{COMMAND OF SUBTRACTION} \end{cases}$
(EOR OF Q & M)
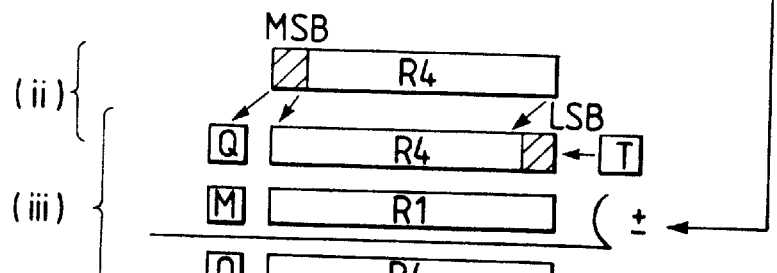
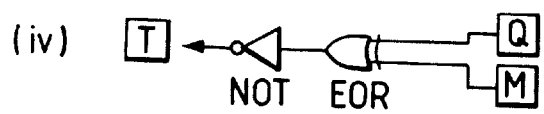

(R) SR16 R4

(S) ADD R3, R4

(T) EXTS.W R4, R4

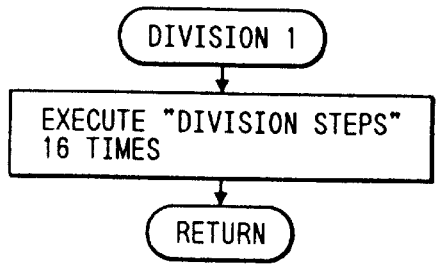
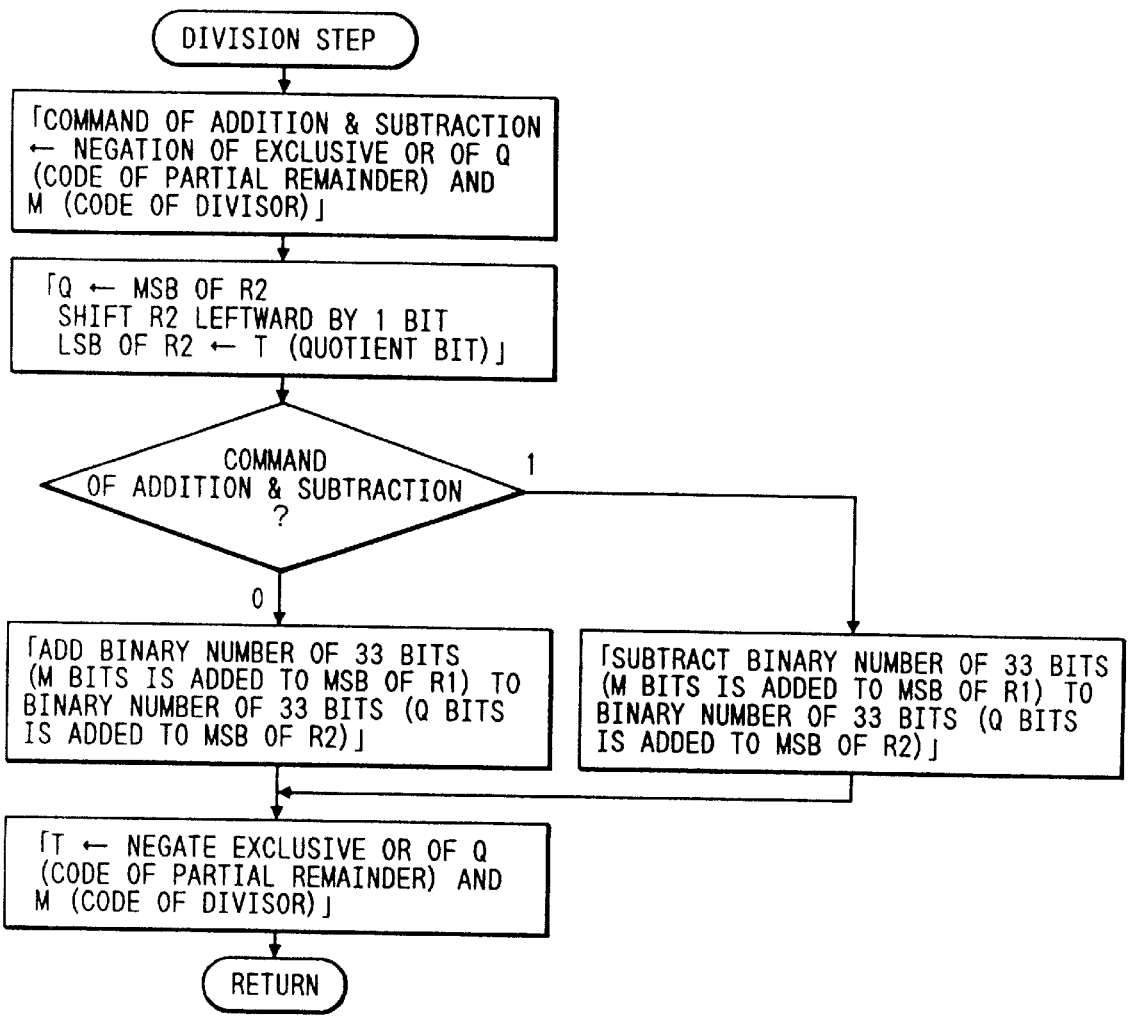

FIG. 86
{
DIVIDEND : R2(CODED 8 BITS)
DIVISOR  : R1(CODED 8 BITS)

R2 ÷ R1 = R2

```
    EOR       R0, R0
    EXTS.B    R2, R2
    DIVOS     R0, R2
    SUBC      R0, R2
    SL16      R1
    SL16      R2
    SL8       R1
    DIVOS     R1, R2
·   arepeat   8
    DIV1      R1, R2
·   aendr
    EXTS.B    R2, R2
    ROTCL     R2
    ADDC      R0, R2
```
}

FIG. 87
{
DIVIDEND : R2(CODED 64 BITS)
DIVISOR  : R1(CODED 32 BITS)

R3R2 ÷ R1 = R2

```
    EOR       R0, R0
    DIVOS     R0, R2
    SUBC      R0, R2
    SUBC      R0, R3
    DIVOS     R1, R3
·   arepeat   32
    ROTCL     R2
    DIV1      R1, R3
·   aendr
    ROTCL     R2
    ADDC      R0, R2
```
}

FIG. 88

```
DIVIDEND : R2(CODED 32 BITS)
DIVISOR  : R1(CODED 32 BITS)

R3R2 ÷ R1 = R2

EOR       R0, R0
    DIVOS     R0, R2
    SUBC      R3, R3
    SUBC      R0, R2
    DIVOS     R1, R3
  · arepeat   32
    ROTCL     R2
    DIV1      R1, R3
  · aendr
    ROTCL     R2
    ADDC      R0, R2
```

FIG. 89

```
DIVIDEND : R2(CODED 16 BITS)
DIVISOR  : R1(CODED 16 BITS)

R2 ÷ R1 = R2

EOR       R0, R0
    SL16      R1
    EXTS.W    R2, R2
    DIVOS     R0, R2
    SUBC      R0, R2
    DIVOS     R1, R2
  · arepeat   16
    DIV1      R1, R2
  · aendr
    EXTS.W    R2, R2
    ROTCL     R2
    ADDC      R0, R2
```

FIG. 90
{
DIVIDEND : R2(CODED 16 BITS)
DIVISOR  : R1(CODED 8 BITS)

R2 ÷ R1 = R2

EOR      R0, R0
    EXTS.W   R2, R2
    DIVOS    R0, R2
    SUBC     R0, R2
    SL16     R1
    SL16     R2
    SL8      R1
    DIVOS    R1, R2
· arepeat   8
    DIV1     R1, R2
· aendr
    EXTS.B   R2, R2
    ROTCL    R2
    ADDC     R0, R2
}

FIG. 91
{
DIVIDEND : R2(CODED 32 BITS)
DIVISOR  : R1(CODED 16 BITS)

R2 ÷ R1 = R2

EOR      R0, R0
    SL16     R1
    DIVOS    R0, R2
    SUBC     R0, R2
    DIVOS    R1, R2
· arepeat  16
    DIV1     R1, R2
· aendr
    EXTS.W   R2, R2
    ROTCL    R2
    ADDC     R0, R2
}

MICROCOMPUTER HAVING VARIABLE BIT WIDTH AREA FOR DISPLACEMENT AND CIRCUIT FOR HANDLING IMMEDIATE DATA LARGER THAN INSTRUCTION WORD

This application is a continuation application of U.S. Ser. No. 07/897,457, filed Jun. 10, 1992 now abandoned.

BACKGROUND OF THE INVENTION

The present invention relates to an architecture of a microcomputer, particularly a RISC (Reduced Instruction Set Computer) type microcomputer and, more particularly, to a technology effective if applied to a microcomputer to be packaged in a device for controlling It.

Moreover, the present invention relates to a circuit for coded division such as a dividing circuit for a coded binary number of arbitrary length and multiprecision and, more particularly, to a technology effective if applied to a step division of the RISC type microcomputer.

The rest serious bottleneck for reducing the number of machine cycles necessary for executing one instruction is known to be the decoding of the instruction. In order to speed up this decoding, it is now effective to adopt an instruction format of fixed length so that where the boundary of the instruction resides may be informed before a preceding instruction has been interpreted. In the so-called "RISC type computer", most instructions are executed for one cycle by adopting the instruction format of fixed length and a pipe line of multiple steps. The conventional RISC computer has used a 32-bit instruction format without exception. This 32-bit fixed length instruction format is advantageous in that what register is to be read can be determined without decoding the operation code by fixing fields in the instruction formats of a source register and a destination register, and in that no alignment is required when an immediate value is decoded. On the contrary, the 32-bit fixed length instruction format requires 32 bits even when only a simple content of an instruction might be described. As a result, the number of bytes occupied by the instruction code is increased to raise a problem that the ratio of the memory area to be occupied by a program is accordingly increased. If the memory area occupied by the program is increased, a memory having a larger capacity has to be packaged to raise the cost of the microcomputer system, thus making it difficult to construct a system having an excellent performance ratio to the cost. Since the RISC processor is given an architecture for speeding up the executions of instructions by reducing the number of instructions, there arises a tendency that the undefined operation codes grow more for the instruction set. The multiplicity of the undefined operation codes deteriorates the code efficiency of the object program and degrades the memory using efficiency the worse.

As a dividing technology to be executed in the microcomputer or the like, on the other hand, there is well known a division method, in which the codes of the quotient and the remainder are determined from the code of a dividend and the code of a divisor to execute the division with the absolute value of the dividend by a recovering method or a recovered method until the codes of the quotient and the remainder are finally corrected. In recent years, there are disclosed in the coded division several circuits and methods for executing the divisions in the coded state without taking the absolute values of the dividend and the divisor. In case the division is to be executed with the coded dividend and divisor, either method basically adopts the following procedures. Specifically, in case the code of the dividend or partial remainder and the code of the divisor are equal, the result of subtraction of the divisor from the dividend or partial remainder is used as a new partial remainder. In case, on the other hand, the code of the dividend or partial remainder and the code of the divisor are different, the result of an addition of the divisor to the dividend or partial remainder is used as a new partial remainder. Thus, the quotient is determined by repeating the subtractions or additions sequentially. At this time, in case the dividend is positive or in case the dividend is not contained by the divisor, a correct answer can be achieved by executing some quotient or remainder corrections on the basis of those procedures. In case, however, the dividend is negative and in case the dividend is contained by the divisor, the quotient thus determined is smaller than the correct quotient by the value "1" having an LSB weight toward the smaller absolute value. This error is caused by deeming the code of the partial remainder as correct in case the negative dividend or the partial remainder is subjected to the aforementioned addition or subtraction so that the partial remainder takes a zero.

In order to eliminate this error, there have been devised several dividing circuits which are equipped with means for detecting that the partial remainder is zero to correct the quotient. In Japanese Patent Laid-Open No. 165326/1990, for example, there is disclosed a technique, in which the irrecoverable dividing means is equipped with a register, which is set when the arithmetic result (i.e., the partial remainder) on each line is zero and reset when the value 1 enters the least significant bit on each line of the dividend, so that the quotient and remainder are corrected by using the result of the register. According to this disclosure, a correct coded division is realized by detecting and correcting the case, in which the partial remainder is zero, by using the aforementioned set and reset register. In Japanese Patent Laid-Open No. 171828/1990, on the other hand, there is disclosed another technique for preventing an erroneous quotient bit from being outputted in case the dividend is negative, by detecting whether or not the partial remainder is zero at each step of determining the quotient bit. In Japanese Patent Laid-Open No. 160235/1984, moreover, there is disclosed a technique which is equipped with a hardware for detecting the case, in which the partial remainder is zero, so that the most significant bit of the partial remainder may be deemed as 1 if the dividend is negative and if the partial remainder becomes zero in the course of the division.

Thus, in the prior art for the division with the coded dividend and divisor, the quotient bit is corrected by detecting that the partial remainder is zero. According to this technique, whether or not the partial remainder is zero has to be decided each time it is determined, and these decisions have to be accomplished n-times if the divisor has n bits. Moreover, whether or not the partial remainder is zero is not determined until all bits are examined. Therefore, the necessity for a special purpose hardware is anticipated if one decision is to be speeded up.

SUMMARY OF THE INVENTION

An object of the present invention is to solve the various problems accompanying the adoption of a fixed length instruction format having a smaller bit number than that of a data word length. A more specific object of the present invention is to provide a microcomputer which can achieve one or plural items selected from: that neither the use of immediate data nor the assignment of an absolute address is restricted even if the bit number of the fixed length instruction format is less than that of the data word length; that a description such as a necessary displacement can be executed in the fixed length instruction format having a limited bit number; that a contribution is made to the prevention of a misalignment of the program arrangement on a memory; and that the code efficiency or memory using efficiency is improved better from the standpoint of the content of a supporting instruction.

Another object of the present invention is to provide a division circuit which can determine a correct quotient easily without detecting whether or not a partial remainder is 0 at each dividing step of determining a quotient bit even in case a dividend is negative. Still another object of the present invention is to provide a division circuit which can develop a division program without considering whether the dividend is positive or negative. A further object of the present invention is to provide a division circuit which can improve the dividing efficiency with a simple circuit structure.

The foregoing and other objects and novel features of the present invention will become apparent from the following description to be made with reference to the accompanying drawings.

The representatives of the invention to be disclosed herein will be briefly summarized in the following.

(1) In a microcomputer adopting the general purpose register method, there is adopted a fixed length instruction format which has a smaller bit number than that of the maximum data word length fed to instruction execution means.

(2) In order that the bit number set in the fixed length instruction format may prevent a misalignment of a program on a memory, the fixed length instruction format and the maximum data word length may be set to a bit number of a power of 2. If the maximum data word length is 32 bits, for example, the instruction format is fixed to 16 bits.

(3) In case the aforementioned relation holds between the maximum word length of data and the bit number of the instructions format, a plurality of instruction may be prefetched in a common cycle so as to fetch the instructions efficiently by making use of an internal bus of a bit number equal to that of the maximum data word length or to reduce the bus access number for the instruction fetch.

(4) In case the internal bus is shared between the data transfer and the instruction fetch, the pipe control may be executed to prefer the data fetch thereby to delay the whole instruction execution schedule including an instruction fetch conflicting with that data fetch, so as to simplify either a processing when the data fetch and the instruction fetch conflict or a post-processing caused by the former.

(5) In order to simply cope with the state, in which the uses of the general purpose registers in response to the instructions before and after the pipe-line execution, the pipe-line control may be executed, because the general purpose register method is adopted, by detecting the state, in which the uses of the general purpose registers in response to the plurality of instructions to be executed in the pipe-line manner conflict, on the basis of the information of a register assigned area contained in the instruction format, thereby to delay the execution of an instruction after the register conflicting state on the basis of the register conflicting state detected and the execution cycle number of the instruction to be preferentially executed.

(6) In order that the restriction on the bit number of the fixed length instruction format may not limit the use of immediate data, it is advisable to support the instruction containing a description for assigning the immediate data in a data relation for offsetting the value of a displacement relative to the value of a predetermined register.

(7) Even in the fixed length instruction format having a restricted bit number, the displacement necessary for the data processing or the bit number of the immediate data may be maximized to support an instruction for implicitly assigning a predetermined general purpose register which is fixed as an operand despite no register assigning field in the instruction.

(8) Even in the fixed length instruction format having a restricted bit number, likewise, the displacement necessary for the processing or the bit number of the immediate data may be maximized to support an instruction containing a description for reflecting the truth or false of the arithmetic result for a specified condition upon a predetermined status flag.

(9) A proper branch destination assigning displacement length is fixedly assigned in accordance with the kinds of branching instructions. For a 16 bit fixed length instruction format, the displacement of a condition branching instruction is fixed at 8 bits, and the displacements of a subroutine branching instruction and an unconditional branching instruction are fixed to 12 bits.

(10) In case a dividend is negative in a coded division, a preliminary processing is executed by subtracting the value "1" having a weight of the LSB of the dividend from the dividend. This dividend is an Integer if its LSB weight is 1. In case the dividend is a number having a fixed point, no substantial influence will arise even if the division is executed by assuming it to be an integer. This is because the point may be later adjusted. Hence, there arises no actual harm even if the intermediate calculations are executed while deeming the dividend as an integer by assuming the weight of the LSB of the dividend to be 1. In the following description, the dividend will be deemed as an integer unless otherwise especially specified so.

(11) Noting that the code bit is 1 for a negative dividend and 0 for a positive or zero dividend, the subtraction of a code bit (i.e., the MSB) is subtracted from the dividend is the subtraction of 1 from a negative dividend. This calculation can be deemed as a transformation from a negative integer in a complement expression of 2 to a complement expression of 1. In this way, the preliminary processing for the dividend can be executed without considering whether the dividend is positive or negative. FIG. 35 shows a transformation state, in which the number 1 is subtracted from a negative integer of 4 bits, for example. Since an extra 1 bit is necessary for transforming the minimum value of a complement of 2 of a finite bit number into a complement of 1, an extension of 1 bit is executed, if necessary. Since a partial remainder may be positive, the aforementioned transformation for a negative Integer is extended all over integers to introduce a new integer expression. For example, an expression shown in FIG. 36 is adopted within a range of coded integers of 4 bits. If an arbitrary integer is expressed by a number ZZ which is calculated by subtracting 1 from that integer, the expression of the ZZ, which has been transformed by subtracting 1 from an integer using a complement of 2, can be deemed equal to a complement of 1 in an integer no more than 0 and can be expressed in an integer no less than 0 by a number which is smaller by 1 than the intrinsic value. At this time, the code bit of 0 is 1 as for a negative number.

(12) In order to hold the quotient and the partial remainder (or rest) in the procedure of the coded division, the quotient (or quotient bit) and the rest (or partial remainder) may be latched in single storage means such as one register so that the number of processing steps for transferring the quotient bit or partial remainder to be calculated or used for the calculations to the register or the like may be reduced.

(1) According to the means described above, the adoption of a 16 bit fixed length instruction format for a 32 bit data word length makes it possible to grasp the decision of where an instruction boundary resides, before a preceding instruction is completed, like the RISC machine of the prior art having the 32 bit fixed length instruction format in the point that the instruction format has the fixed length, thereby to warrant an advantage such as a simplification of the instruction decoding.

(2) The program capacity is smaller than that of the case, in which the 32 bit fixed length instruction format is adopted. Specifically, in the RISC architecture for speeding up the executions of instructions by reducing the kinds of them, there is a tendency that many undefined operation codes are in the instruction set. If the instruction length is halved at this time from that of the prior art, the using efficiency of the program memory is improved.

(3) The various problems intrinsic to the adoption of a fixed length instruction format having a smaller bit number than that of a data word length are solved by the facts: that neither the use of immediate data nor the assignment of an absolute address is restricted even if the bit number of the fixed length instruction format is less than that of the data word length; that a description such as a necessary displacement can be executed in the fixed length instruction format having a limited bit number; that a contribution is made to the prevention of a misalignment of the program arrangement on a memory; and, that the code efficiency or memory using efficiency is improved better from the standpoint of the content of a supporting instruction.

(4) According to the means for the aforementioned coded division, the quotient is determined by: subtracting the value 1 having the weight of the LSB of a dividend from the dividend in case the dividend is negative; predicting the code of a quotient: adding and subtracting a divisor to and from the dividend or partial remainder while depending upon whether the exclusive OR between the code of the dividend or partial remainder and the code of the divisor is 0 or 1 to exemplify the quotient bit by the exclusive OR between the code of the partial remainder and the code of the divisor; and correcting the quotient of the complement of 1 into a complement of 2 in case the quotient is negative.

(5) In case the aforementioned dividend is negative, the subtraction of the value 1 having the weight of the LSB of the dividend from the dividend is equivalent to the preliminary processing for expressing the value 0 such that all the bits and the code bits are expressed by 1. This preliminary processing makes it unnecessary to detect that the partial remainder is 0 in case the dividend is negative. As a result, the divisions including the overflow check or the correction of the remainder can be controlled on the basis of information such as the code bit of the first dividend, the code bit of the partial remainder, the code bit of the divisor and the code bit of the quotient. This can simplify the hardware and software of the divisions and can effect an application to the coded divisions of arbitrary length and arbitrary accuracy. In addition, the register for latching the partial remainder can be shifted to a more significant side by 1 bit, and the processing for applying means for shifting in the quotient bit can be speeded up.

BRIEF DESCRIPTION OF THE DRAWINGS

FIG. 12 is an operation timing chart showing one example when a plurality of cycle instructions are executed;

FIG. 13 is an explanatory diagram showing a table of one half of data transfer instructions to be executed in the microcomputer of the present embodiment;

FIG. 14 is an explanatory diagram showing a table of the remaining half of data transfer instructions to be executed in the microcomputer of the present embodiment;

FIG. 15 is an explanatory diagram showing a table of logical operation instructions to be executed by the microcomputer of the present embodiment;

FIG. 16 is an explanatory diagram showing a table of one half of arithmetic operation instructions to be executed by the microcomputer of the present embodiment;

FIG. 17 is an explanatory diagram showing a table of the remaining half of arithmetic operation instructions to be executed by the microcomputer of the present embodiment;

FIG. 18 is an explanatory diagram showing a table of instructions to be executed by the microcomputer of the present embodiment;

FIG. 19 is an explanatory diagram showing a table of branching Instructions to be executed by the microcomputer of the present embodiment;

FIG. 20 is an explanatory diagram showing a table of one half of system control instructions to be executed by the microcomputer of the present embodiment;

FIG. 21 is an explanatory diagram showing a table of the remaining half of system control instructions to be executed by the microcomputer of the present embodiment;

FIG. 22 is a diagram for explaining the description types of FIGS. 13 to 21;

FIG. 23 is an explanatory diagram showing a table of addressing modes in the mnemonic designations shown in FIGS. 13 to 21;

FIG. 28 is a diagram for explaining the structure of a register of an example as a programmer's model;

FIG. 30 is a diagram for explaining one principle example of the coded division processing in case of negative÷negative;

FIG. 31 is a diagram for explaining one principle example of the coded division processing in case of negative÷positive;

FIG. 32 is a diagram for explaining one principle example of the coded division processing in case of positive÷positive;

FIG. 33 is an explanatory view showing in a general form the entirety of the basic promises or processing procedures of the coded division according to the present invention;

FIG. 34(A) is a diagram for explaining the manner of a pre-correction of a dividend, and FIG. 34(B) is a diagram for explaining a prediction of the code of a quotient;

FIG. 35 is a diagram for explaining one example of the pre-correction of a negative dividend;

FIG. 36 is a diagram for explaining an example of the expression of a partial remainder after the pre-correction of subtracting 1 from the negative dividend;

FIG. 37(A) is a diagram for explaining one example how to extract an addition/subtraction command in the coded dividing procedure, and FIG. 37(B) is a diagram for explaining one example how to extract a quotient bit;

FIG. 38 is a diagram for explaining one example how to correct the quotient and the remainder;

FIG. 39 is a diagram for explaining a specific processing procedure for the pre-correction and the dividing processing in a coded division of −8÷−3;

FIG. 40 is a diagram for explaining a specific processing procedure of a post-processing continued from the processing of FIG. 39;

FIG. 41 is a diagram for explaining a specific processing procedure for the pre-correction and the dividing processing in a coded division of −8÷3;

FIG. 42 is a diagram for explaining a specific processing procedure of a post-processing continued from the processing of FIG. 41:

FIG. 43 is a diagram for explaining a specific processing procedure for the pre-correction and the dividing processing in a coded division of −9÷3;

FIG. 44 is a diagram for explaining a specific processing procedure of a post-processing continued from the processing of FIG. 43;

Figure 45:
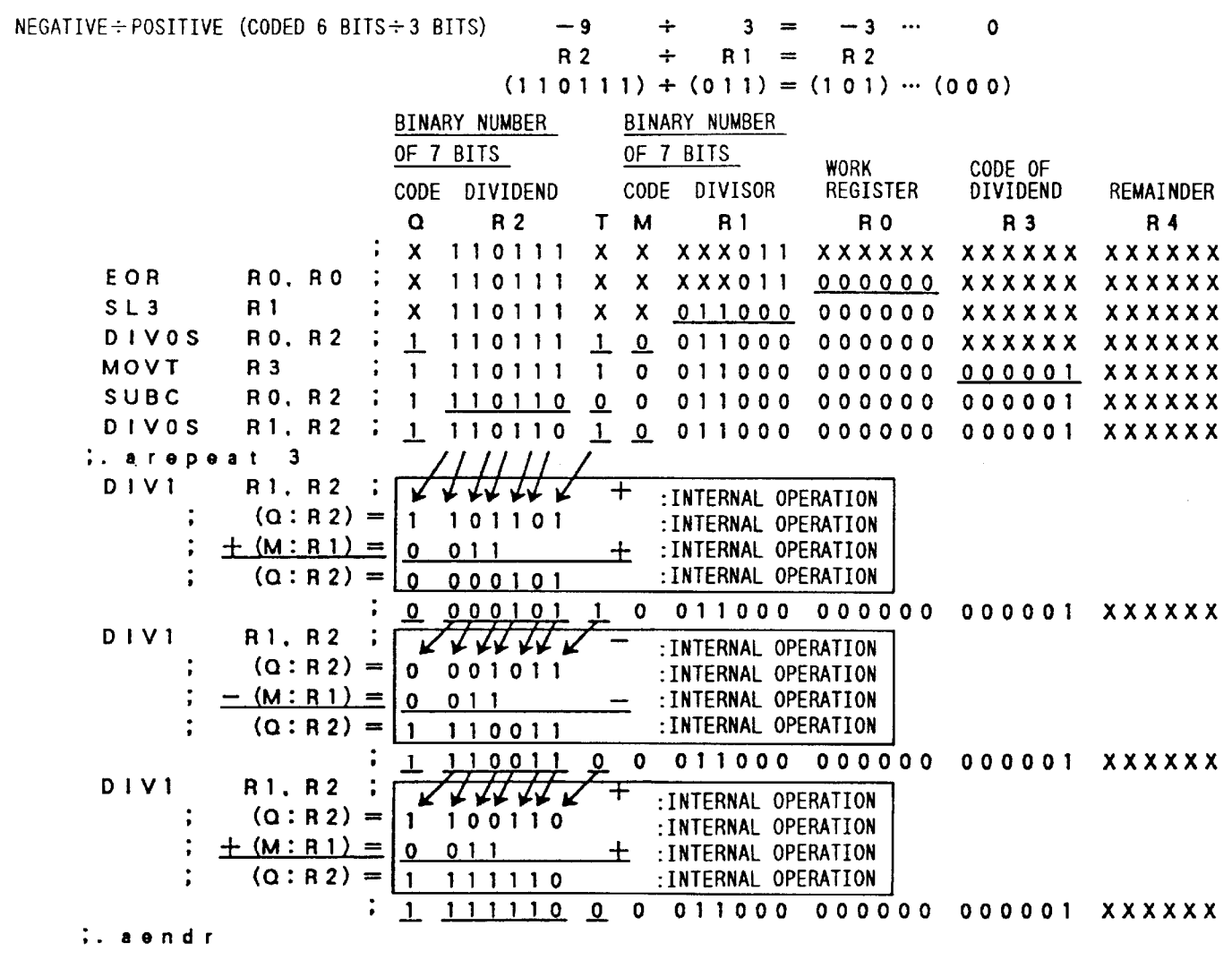

FIG. 45 is a diagram for explaining a specific processing procedure for the pre-correction and the dividing processing in a coded division of −9÷3;

FIG. 46 is a diagram for explaining a specific processing procedure of a post-processing continued from the processing of FIG. 45;

FIG. 47 is a diagram for explaining a specific processing procedure for the pre-correction and the dividing processing in a coded division of 8÷3;

FIG. 48 is a diagram for explaining a specific processing procedure of a post-processing continued from the processing of FIG. 47;

FIG. 49 is a diagram for explaining a specific processing procedure for the pre-correction and the dividing processing in a coded division of 8÷−3;

FIG. 50 is a diagram for explaining a specific processing procedure of a post-processing continued from the processing of FIG. 49;

FIGS. 52(A)–(D) is a logical circuit diagram showing one example of an arithmetic logical operation circuit, an operation circuit and an operation control circuit shown in FIG. 51;

FIG. 53 is a detailed diagram for explaining one example of an instruction description for the coded division;

FIG. 75(A) is a diagram for explaining the state of a register corresponding to the operations of FIG. 54, FIG. 75(B) is a diagram for explaining the state of a register corresponding to the operations of FIG. 55, and FIG. 75(C) is a diagram for explaining the state of a register corresponding to the operations of FIG. 56;

FIG. 80(O) is a diagram for explaining the state of a register corresponding to the operations of FIG. 69, FIG. 80(P) is a diagram for explaining the state of a register corresponding to the operations of FIG. 70, and FIG. 80(Q) is a diagram for explaining the state of a register corresponding to the operations of FIG. 71;

FIG. 83(A) is a flow chart showing the detail of the division 1 of FIG. 82, and

FIG. 83(B) is a flow chart showing the processing of a division step;

FIG. 86 is a diagram for explaining one example of an instruction description for a coded division of 8 bits÷8 bits;

FIG. 87 is a diagram for explaining one example of an instruction description for a coded division of 64 bits÷32 bits;

FIG. 88 is a diagram for explaining one example of an instruction description for a coded division of 32 bits÷32 bits;

FIG. 89 is a diagram for explaining one example of an instruction description for a coded division of 16 bits÷16 bits:

FIG. 90 is a diagram for explaining one example of an instruction description for a coded division of 16 bits÷8 bits; and FIG. 91 is a diagram for explaining one example of an instruction description for a coded division of 32 bits÷16 bits.

DESCRIPTION OF THE PREFERRED EMBODIMENTS

The present invention will be described in the following in connection with the embodiments thereof in the order of items which are broadly itemized into: a microcomputer adopting an instruction format of fixed length having a smaller bit number than that of the maximum data word length; and coded divisions to be executed by such microcomputer. The contents of the former will be described under Items [1] to [17] whereas the contents of the latter will be described under Items [18] to [24].

[1] Application System of Microcomputer

Figure 1:
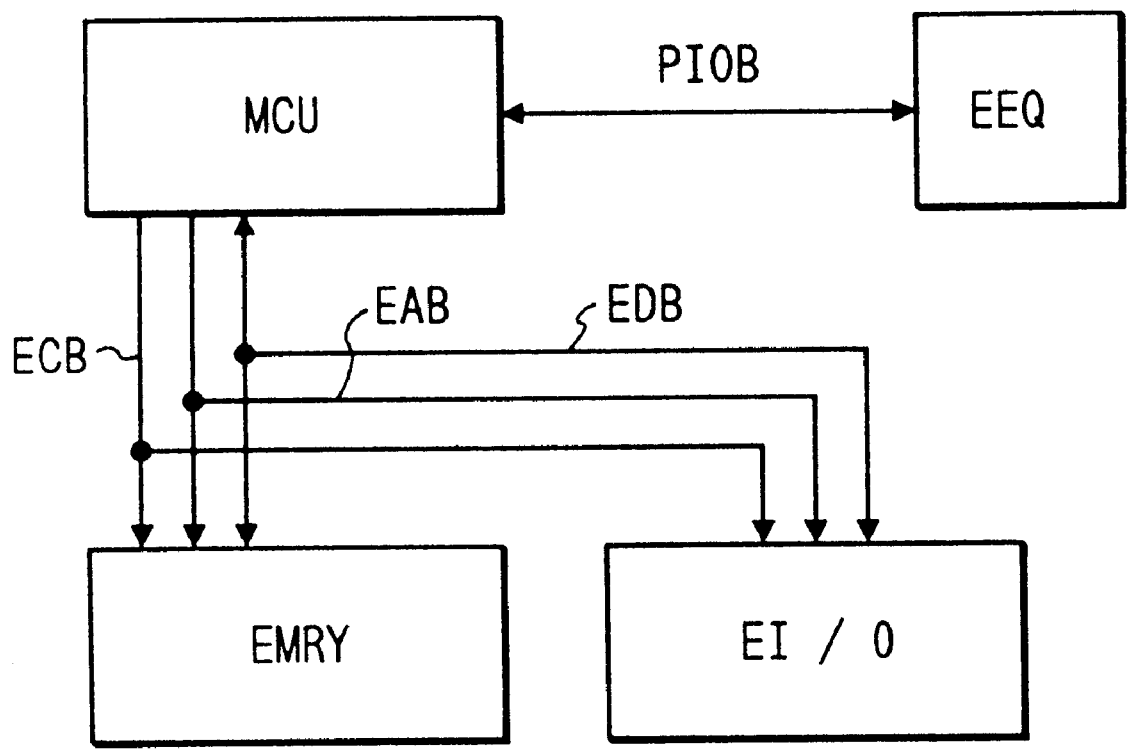
FIG. 1 is a block diagram showing one example of a system making use of a microcomputer MCU according to one embodiment of the present invention.

FIG. 1 shows one example of a system which makes use of a microcomputer MCU according to one embodiment of the present invention. This microcomputer MCU is coupled through an external control bus ECB, an external data bus EDB and an external address bus EAB to an external memory EMRY and an external input/output block EI/O defined by the user and is further connected with a port input/output bus PIOB to an external equipment EEQ. This external equipment EEQ is a predetermined device to package the microcomputer system.

[2] Block Structure of Microcomputer

Figure 2:
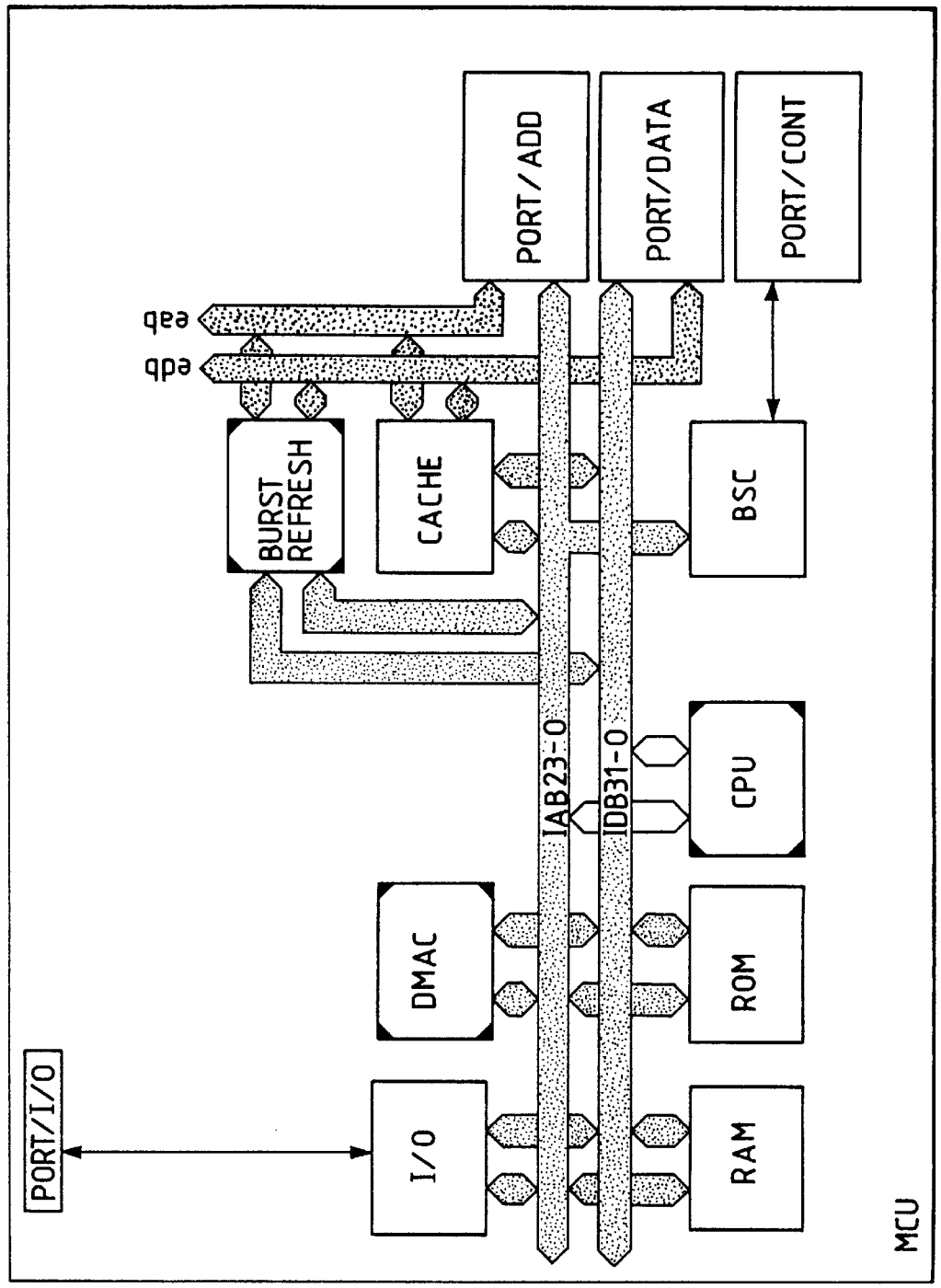
FIG. 2 is a block diagram showing a microcomputer according to one embodiment of the present invention.

FIG. 2 shows the microcomputer MCU according to one embodiment of the present invention. The microcomputer MCU, as shown, is packaged in a single semiconductor substrate such as a silicon substrate by the well-known semiconductor integrated circuit manufacture technology. Reference letters CPU appearing in the Figure designates a central processing unit for controlling the microcomputer MCU in its entirety. Letters Port/I/O designate an input/output port to be used for the central processing unit CPU to input/output a signal, to drive an external display device and to inspect the state of an external switch. The central processing unit CPU inputs/outputs by reading/writing a register assigned to a certain address. Letters Port/Cont designate a port for an input/output of the data bus. Letters Port/Address designate a port for an input/output of the address bus. Letters I/O designate such a peripheral device on the chip of the microcomputer MCU as includes a serial communication interface, a timer and so on. Letters DMAC designate a direct memory access (DMA) controller. A ROM (Read Only Memory) is an instruction memory packaged on-chip and stores the instructions (i.e., operation programs) of the central processing unit CPU and a constant table. A RAM (Random Access Memory) is a memory packaged on-chip and is used as the working area of the central processing unit CPU or a primary storage area for data. Letters BSC designate a bus state controller for controlling the bus access to the inside and outside of the microcomputer MCU. Letters CACHE designate a cache memory, i.e., a storage device for latching an instruction, which is anticipated to be most frequently used by recognizing the access pattern of an instruction of the central processing unit CPU, to reduce the frequency for accessing to an application program or the like from an external memory having a low access rate, thereby to accelerate the processing. Letters BURST/REFRESH designate a burst/refresh device for burst control of a continuous data transfer and for refresh control of a dynamic random access memory (DRAM) and is applied to a high-speed page mode access, when the DRAM is used as an external memory, and to a refreshing of the DRAM. Letters edb designate an internal data bus coupled through a port Port/Data to the external data EDB, and letters eab designate an internal address bus coupled through a port Port/Add to the external address bus EAB. These two internal buses are not coupled to the central processing unit CPU. On the other hand, characters IDB31-0 designate internal data buses of 32 bits, and IAB23-0 designate internal address buses of 24 bits. These two internal buses are coupled to the central processing unit CPU.

This central processing unit CPU instruction from the instruction memory ROM or the cache memory CACHE so that the data issued from the data memory RAM or the external memory EMRY are subjected to a predetermined processing in accordance with the given instruction.

[3] Pin Arrangement of Package of Microcomputer

Figure 3:
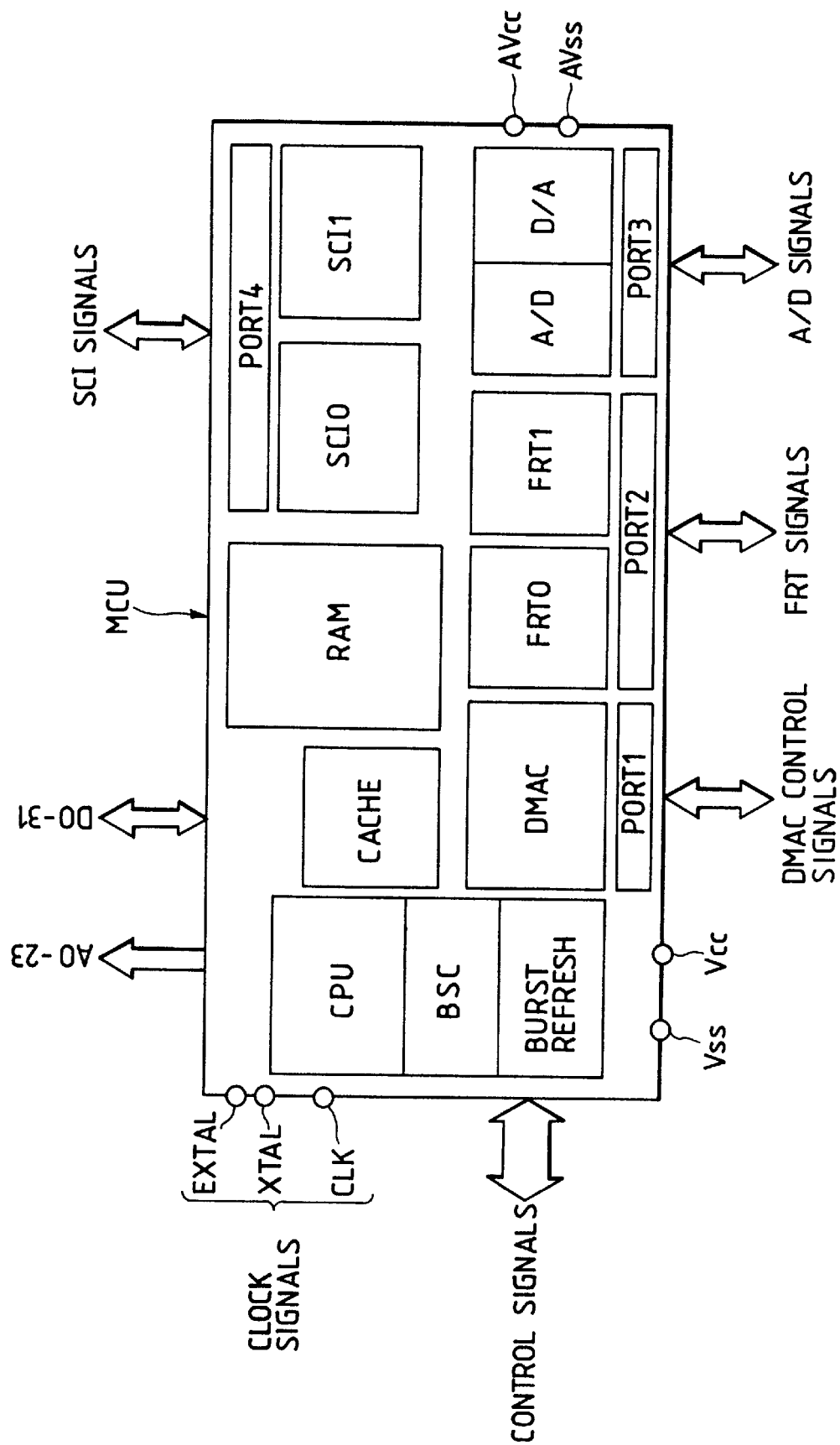
FIG. 3 is a diagram for conceptionally explaining a pin arrangement for a package of a microcomputer according to the present embodiment.

FIG. 3 conceptionally shows a pin arrangement of the package of the aforementioned microcomputer MCU. In the same Figure, free running timers FRT0 and FRT1, an analog/digital converter A/D, a digital/analog converter D/A, and serial communication interfaces SCI0 and SCI1 exemplify the peripheral circuit I/O of FIG. 2, and corresponding ports PORT1 to PORT4 shown in FIG. 3 are input/output ports corresponding to individual peripheral devices and accordingly to the port Port/I/O of FIG. 2. The microcomputer MCU is filled in a QFP type package of 112 pins. Address buses (A0-23) of 24 bits are connected with the aforementioned address bus EAB, and data buses (D0-31) of 32 bits are connected with the aforementioned data bus EDB. These buses A0-23 and D0-31 are used when the central processing unit CPU, the direct memory access controller DMAC or the burst/refresh control block BURST/REFRESH accesses the external memory EMRY. Clock signals are those for specifying the basic timing of the instant when the inside of the microcomputer MCU and its external systems operate synchronously. If a not-shown quartz oscillator is coupled to terminals EXTAL and XTAL, for example, it resonates to oscillate with an electric circuit in the chip of the microcomputer MCU. This chip detects the oscillating voltage to generate internally synchronizing clocks φ 1 and φ 2, as will be described hereinafter. These clocks φ 1 and φ 2 are non-overlap clock signals which have neither of their high periods overlapped, although not especially limited thereto. At the same time, the microcomputer MCU outputs a clock signal having a waveform and a phase substantially identical to those of the signal φ 1 from its terminal CLK so as to synchronize its external system and the inside of the LSI. The control signal includes: an operation mode setting signal and an interruption inputting signal such as a reset signal (RES) or a standby signal (STBY); a data bus control signal such as a read strobe (RD) or a write strobe (WRHH); or a DRAM refresh control or bus arbitration signal. Letters Vss and Vcc designate a ground terminal and a power supply terminal. The port PORT1 inputs/outputs two channels of the control signal DMAC concerning the direct memory access controller DMAC. The port PORT2 inputs/outputs the FRT signal for controlling and reading the free running timers FRT0 and FRT1 from the outside of the microcomputer MCU. The port PORT3 inputs/outputs the analog signals which are fed to the analog/digital converter A/D and the digital/analog converter D/A. Reference potentials of the analog/digital converter A/D and the digital/analog converter D/A are fed from terminals AVcc and AVss. The port PORT4 inputs/outputs the serial communication signals which belong to three clock, data transmission and data reception systems for two channels.

[4] Instruction Word Length and Data Word Length

Figure 4:
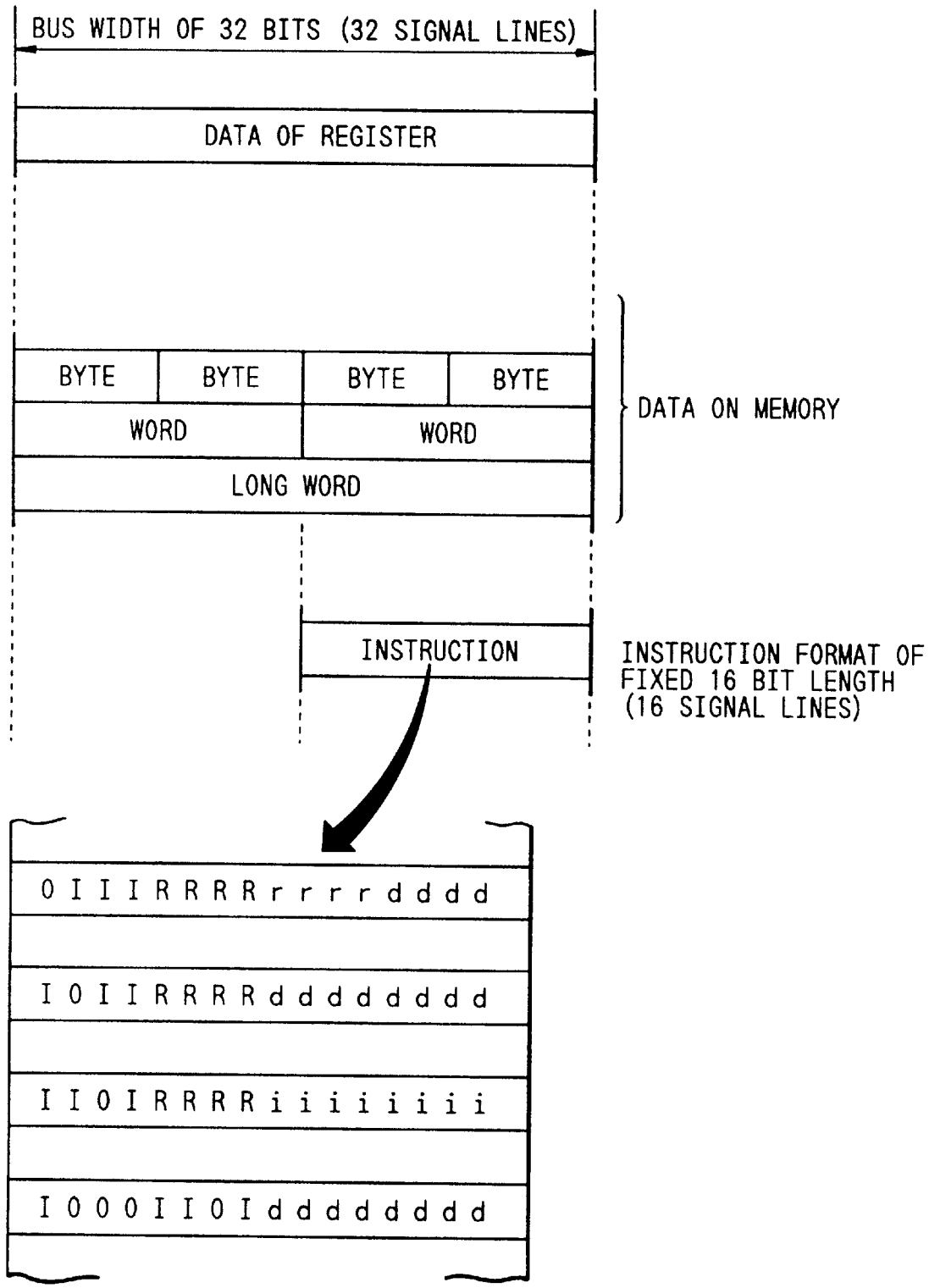
FIG. 4 is an explanatory diagram showing one example of the relation between the data word length and the instruction word length to the bus width in the microcomputer according to the present embodiment.

FIG. 4 shows one example of the relation of the data word length and the instruction word length to a bus width (i.e., the number of signal lines composing a bus) in the microcomputer MCU of the present embodiment. This microcomputer MCU has an architecture of RISC type and an instruction format of fixed length. The buses such as internal data buses IDB31-0, through which data and instructions are transferred, are given 32 bits (corresponding to 32 signal lines). At this time, the bit number of later-described various registers is 32 bits. The data on a memory are arranged at the units of byte (of 8 bits), word (of 16 bits) and long word (of 32 bits) in a memory area having a width of 32 bits. Addresses are assigned at the byte unit to the memory. As a result: the byte data are accessed at the unit of n addresses (n: an integer); the word data are accessed at the unit of 2n addresses; and the long word data are accessed at the unit of 4n addresses. Other memory accesses are deemed to belong to an address error. On the other hand, instructions are formatted into an instruction format having a fixed length of 16 bits (corresponding to 16 signal lines). In short, an instruction of fixed length is composed of bits of the n-th power of 2, and the relation of $m \geq n$ holds, if the number of signal lines composing the bus width is the m-th power of 2.

In FIG. 4 showing several examples of the aforementioned instruction format of fixed length of 16 bits: four bits of "rrrr" designate an assigned field of a source register; four bits of "RRRR" designate an assigned field of a destination register; bits of "d - - - dd" designate a displacement; and bits "ii-i" designate an immediate data. In an instruction format of 16 bits, the destination register assigned field RRRR falls at the eighth bit from the fourth bit with reference to the lefthand side of the format, and the source register assigned field rrrr falls at the twelfth bit from the ninth bit. The lefthand four bits of the instruction format are assigned to at least an operation code assigned field. The instruction system of the microcomputer MCU allows the destination register assigned field RRRR to be used as a portion of the operation code assigned field and the source register assigned field rrrr to be used as a portion of the displacement or immediate data.

Thanks to adoption of the instruction format of fixed length of 16 bits for the data word length of 32 bits, where the instruction boundary resides can be decided before the end of a preceding instruction like the RISC machine of the prior art having the instruction format of fixed length of 32 bits, thereby to warrant the advantage such as simplification of the instruction decoding process. In addition, the program capacity can be made smaller than that of the case in which the instruction format of fixed length of 32 bits is adopted. In the RISC architecture intended to accelerate the execution of instructions by reducing the number of kinds of instructions, there is a tendency that undefined operation codes increase in an instruction set. If the instruction length is reduced at this time to one half of the prior art, the efficiency of using the program memory can be improved. Thanks to the reduced instruction word length, as compared with the data word length, the substantially useless bit array can be made less than that of the case, in which the two word lengths are equalized, so that the efficiency of using the program memory can be enhanced. As a result, the efficiency of using the memory for storing the program can be improved to keep an application field, which uses a memory having a limited capacity on the board or a program memory packaged on-chip in the processor, away from problems such as shortage in the storage capacity of the program memory at the time of constructing the system or unavoidably large scale of the memory. Thus, the system cost can be reduced.

Since, moreover, the instruction format of fixed length of 16 bits has one half of the data word length and bus width of 32 bits, an instruction misalignment to the program memory such that an instruction of single format is arranged across the boundary of the memory (or word) occurs less frequently than the case, in which the instruction word length is shortened by setting the instruction word length to a fragmentary bit number (e.g., bit number other than a power of 2) with respect to the bus width or data word length.

[5] Instruction Control System of CPU

Figure 5:
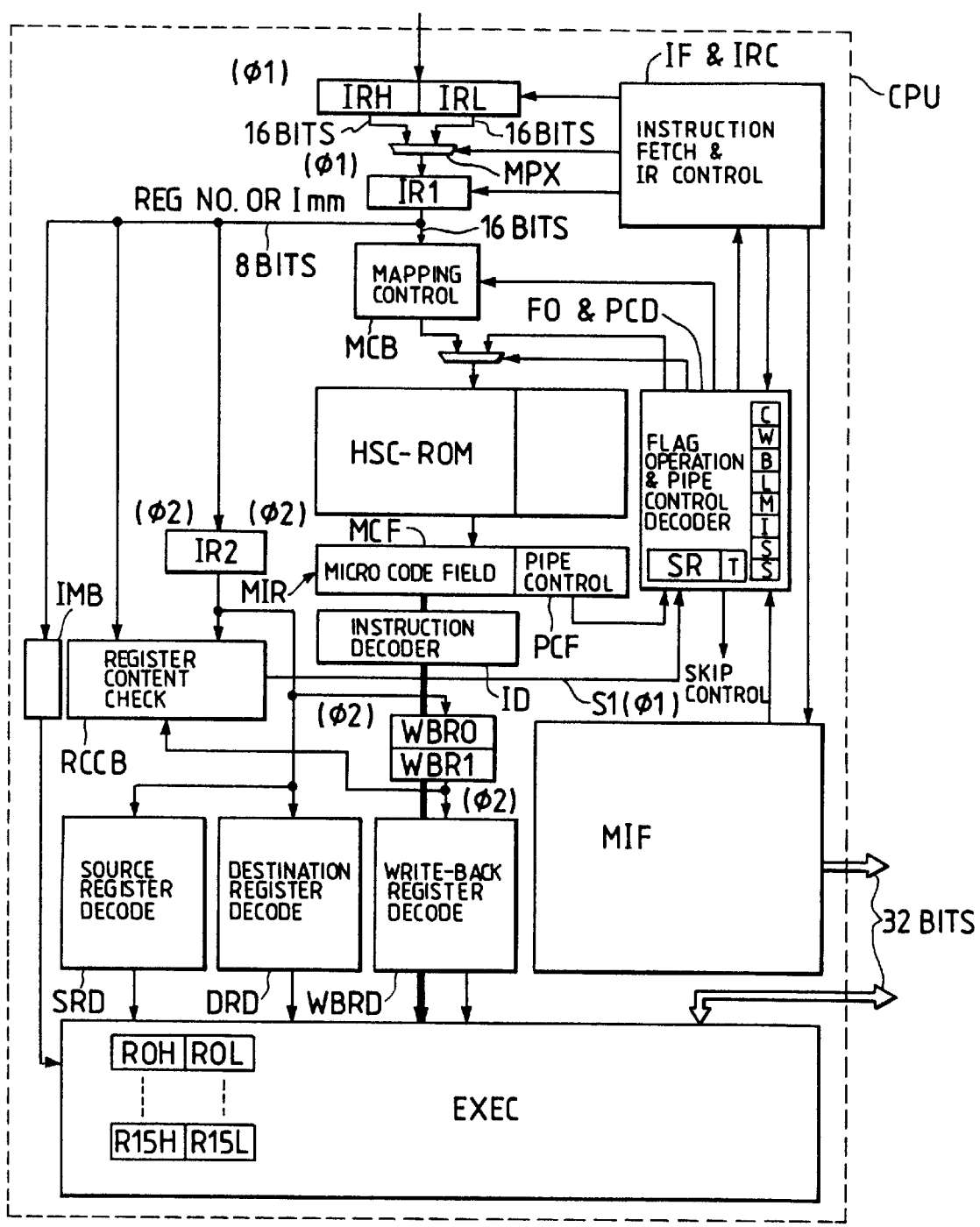
FIG. 5 is a block diagram showing one example an internal block of a central processing unit, especially its instruction control system included in the microcomputer of the present embodiment.

FIG. 5 shows one example of the internal block, i.e., its instruction control system of the aforementioned central processing unit CPU. Letters IRH and IRL designate individual instruction buffers (i.e., instruction queues) of 16 bits for latching instructions of fixed length of 16 bits one by one. These registers IRH and IRL are individually loaded with the instructions in one instruction fetch cycle. This is because the instructions are transferred at the unit of 32 bits through the internal data buses IDB31-0. These instructions are loaded in the instruction register IR1 through a multiplexer MPX. The Instruction register IR1 has 16 bits. This instruction register IR1 latches the instruction which is present at the instruction decode stage. In the instruction register IR1, with reference to the lefthand end indicated as "RRRR" in accordance with the instruction format of fixed length of 16 bits, the fifth to eighth bits are caused to belong to the destination register field, and the ninth to twelfth bits indicated as "rrrr" are caused to belong to the source register field. These fields are fixed in the instruction field. At this time, as has been described hereinbefore, the source register field never fails to be used for selecting the source operand, and the destination register field never fails to be used for selecting the second source operand or destination operand. Each register field may mean a portion of the operation code or the number of a register. Whether or not the contents of the register assigned fields RRRR and rrrr are pieces of information for selecting a register is determined at the left end of the aforementioned instruction format of fixed length by the contents of the 1st to 4th bit operations codes. Nevertheless, the values of the register fields RRRR and rrrr are inputted to and decoded by a source register decoder SRD and a destination register decoder DRD through the instruction register IR2.

The decoded results by the aforementioned source register decoder SRD and destination register decoder DRD are used to decide which of the general purpose registers R0H and R0L, - - -, and R15H and R15L contained in an execution unit for arithmetic operations is to be selected. On the other hand, the values of the register fields RRRR and rrrr outputted from the aforementioned instruction register IR2 are fed through temporary latches WBR0 and WBR1 to a write back register decoder WBRD so that the arithmetic results obtained by the instruction executions are written for selecting the general purpose registers in accordance with the decoded results. Moreover, the values of the register fields RRRR and rrrr, i.e., the register numbers latched in the aforementioned temporary latch WBR1 and being used are fed to a register content check block RCCB so that they are compared with the outputs of the instruction registers IR1 and IR2 to find out an even (or register conflict), in which each instruction, e.g., a subsequent instruction accesses a common register when the instructions sequentially fetched are executed in the pipe-line manner. The register conflict is fed to a flag operation & pipe control decoder FO&PCD in response to the signal S1. If the signal S1 thus asserted is fed to the flag operation & pipe control decoder FO&PCD, skip controls are executed in accordance with the number of instruction execution cycles being done, to cancel or delay the execution cycles of the instructions using the conflicting registers. In short, when the flag operation & pipe control decoder FO&PCD outputs the control signal Skip, the decoding of the instruction to be subsequently executed is delayed in the source register decoder SRD and the destination register decoder DRD. As a result, the execution cycle of a succeeding instruction is started at a timing after the writing of the conflicting registers is ended by executing the preceding instruction.

The instruction latched by the aforementioned instruction register IR1 is fed to a mapping control block MCB to index the addresses of a high-speed control read only memory (i.e., Hardware Sequence ROM) HSC-ROM. This mapping control block MCB has a role to calculate the entry address of a proper high-speed control read only memory MHSC-ROM in accordance with the content. The high-speed control read only memory HSC-ROM has its output composed of two portions: a micro code field MCF and a pipe control field PCF, which are latched by a hardware sequence control instruction register HIR such as a micro instruction register. The former in the micro instruction field feeds a control signal to the execution unit EXEC through a shallow decode logic, i.e., an instruction decoder ID. The latter establishes the sequence of an instruction having two or more cycles through the flag operation & pipe control decoder FO&PCD or controls the pipe line. The flag operation & pipe control decoder FO&PCD has eight flags C, W, B, L, M, I, S and S for controlling the pipe lines. Moreover, this flag operation & pipe control decoder FO&PCD has a status register SR which has a true bit T (as will be shortly referred to as "T bit") used for condition branching. This T bit is set to the truth or false of the arithmetic result of selected conditions described in the instruction, as will be described hereinafter.

The content of the aforementioned instruction register IR1 is transferred before an arithmetic execution phase (EX) to the instruction register IR2 so that whether or not a conflict is caused between instructions in the pipe line state of later memory access phase (MA) and write back phase (WB) is checked through the aforementioned register content check block RCCB, and this result is outputted as the signal S1. What is stored at this time in the instruction register IR2 is the value of the register field. The values of the register fields RRRR and rrrr latched in the instruction registers IR1 and IR2, as has been described hereinbefore, are fed to the aforementioned source register decoder SRD, destination register decoder DRD and write back register decoder WBRD. These source register decoder SRD, destination register decoder DRD and write back register decoder WBRD generates a selection signal for selecting one pair of the sixteen general purpose registers R0H and R0L, - - - , and R15H and R15L and feeds it to the execution unit EXEC.

The memory interface MIF detects whether or not the central processing unit CPU has to access a memory and whether the memory is of the read or write type, and feeds a signal necessary for accessing the memory. On the other hand, an instruction fetch & instruction register control block IF&IRC has a function to determine whether or not an instruction fetch from a memory is necessary and when the contents of the instruction registers IRH and IRL are to be updated, and to output a necessary signal. The function of this instruction fetch & instruction register control block IF&IRC is to output a predetermined control signal with reference to the state of the pipe line, the state of the memory and the state of the instruction queues (IRH and IRL) thereby to control the instruction queue or the instruction fetch. What features the present embodiment is that the instruction fetch is carried out at the unit of 32 bits so that it contains two instructions having an instruction length of 16 bits. This makes it unnecessary to fetch again the instruction, which has been fetched simultaneously as the preceding instruction is fetched, in another phase. These events are totally judged to control when the instruction fetch is to be executed. The instruction fetch & instruction register control block IF&IRC is constructed as an finite state machine, and a detailed description of the structure of this machine will be omitted because the structure per se is well known in the art.

Incidentally, letters IMB appearing in FIG. 5 designate a buffer for sending immediate data contained in an instruction to the execution unit EXEC. Moreover, the instruction queues IRH and IRL and the latch timing of the instruction register IR1 are synchronized with the aforementioned clock signal φ1. The latch timings of the instruction register IR2, the micro instruction register MIR and the registers WBR0 and WBR1 and the output timing of the signal S1 by the aforementioned register content check block RCCB are synchronized with the aforementioned clock signal φ2.

Since the data bus width is 32 bits whereas the fixed length instruction is 16 bits, there are provided two instruction buffers IRH and IRL. Despite of this provision, however, the number instruction buffers is determined depending upon how many fixed length instructions can be transferred within the data bus width, for example: four instruction buffers in case of a fixed length instruction of 8 bits; and eight instruction buffers in case of a fixed length instruction of 4 bits.

[6] Execution Unit of CPU

Figure 6:
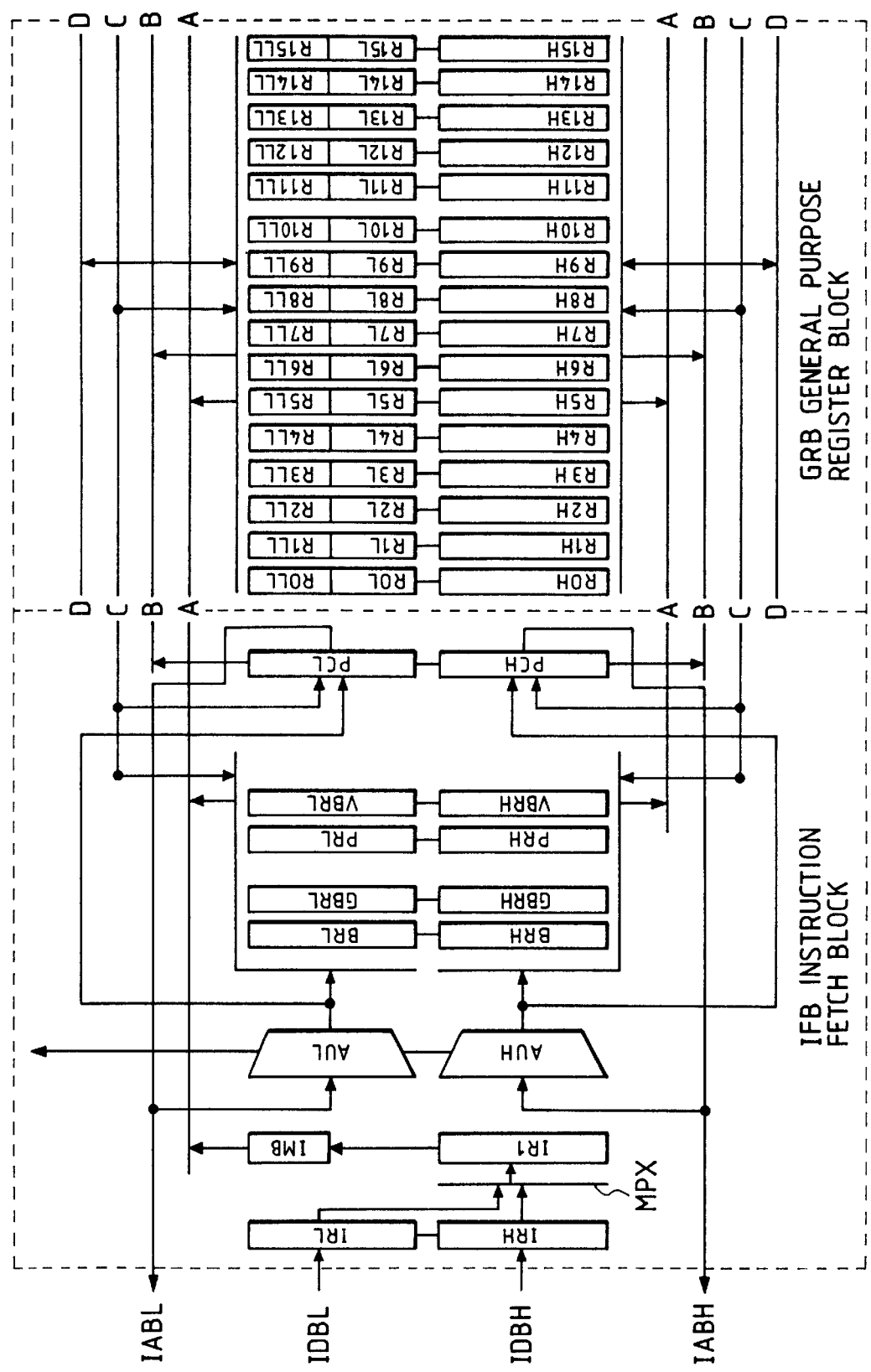
FIG. 6 is a block diagram showing the structure of one half of an execution unit of the central processing unit.
Figure 7:
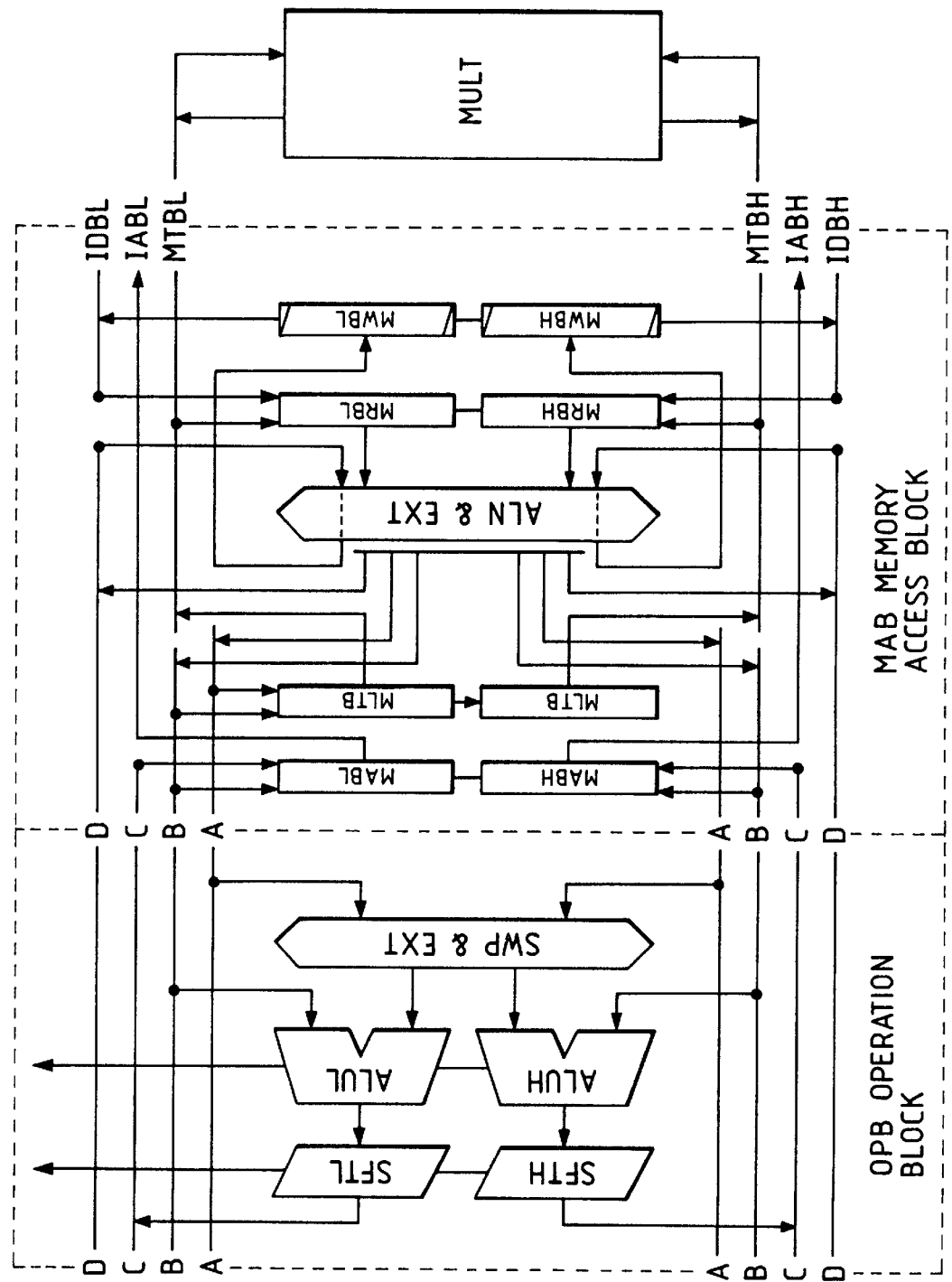
FIG. 7 is a block diagram showing the structure of the remaining half of the execution unit of the central processing unit.

FIGS. 6 and 7 show one example of the execution unit EXEC of the central processing unit CPU. In the two Figures, buses indicated at A, B, C and D are commonly connected. The execution unit EXEC includes: an instruction fetch block IFB and a general purpose block GRB for fetching an instruction and updating a program counter; an operation block OPB for addition/subtraction and shift operations; and memory access block MAB and a multiplication block MULT for accessing a memory and aligning data. These individual blocks are coupled to one another through the four data buses A, B, C and D having a width of 32 bits.

The aforementioned instruction buffers (or instruction queues) IRH and IRL, multiplexer MPX and instruction register IR1 forming part of the aforementioned instruction fetch block IFB are shown in the block structure of FIG. 5 separately of the execution unit EXEC but may be contained in the execution unit EXEC, as shown in FIG. 6. An immediate buffer IMB is a logic for cutting and bit-shift, if necessary, immediate data. Letters PCII and PCL designate program counters for latching addresses for fetching an instruction. An arithmetic unit high AUH and an arithmetic unit low AUL are adders capable of performing an addition of 32 bits for updating the program counters. A procedure address register high PRH and a procedure address register low PRL are procedure address registers for latching return addresses for a function call. A vector base register high VBRH and a vector base register low VBRL are used as storage areas of an interrupt vector area for latching the base addresses. A global base register high GBRH and a global base register low GBRL are used as storage registers for the base address of the I/O. A break register high BRH and a break register low BRL are used as storage registers for return destination addresses from the break routine.

The aforementioned general purpose register block GRB includes sixteen general purpose registers of 32 bit length, as indicated at R0H and R0L to R15H and R15L. In the aforementioned operation block OPB, a shifter high SFTH and a shifter low SFTL are hardware for bit shifts and rotations. An arithmetic logic unit high and an arithmetic logic unit low are operators for arithmetic logical operations. Letters SWP&EXT designate a hardware for executing a swap instruction, a code (or sign) extension or a zero extension. An aligner ALN is a hardware for aligning the data which are accessed in byte or word from a memory or I/O. A memory read buffer high MRBH and a memory read buffer low MRBL are temporary registers for latching the data which are read from a memory. A memory write buffer high MWBH and a memory write buffer low MWBL are temporary registers for latching data to be written in a memory. A memory address buffer high MABH and a memory address buffer low MABL are temporary registers for latching addresses at the time of a memory access. A MULT buffer MLTB is a temporary register for transferring a multiplier and a multiplicant to the multiplication block MULT.

The connection relations of the inside and outside of the central processing unit CPU through the buses are as follows. Specifically, letters MTBL and MTBH are bilateral special. purpose buses for connecting the multiplication block MULT. In FIGS. 6 and 7, letters IDBH and IDBL correspond to the data buses IDB31-0 of FIG. 2, and letters IABH and IABL correspond to the address buses IAB23-0 of FIG. 2. The values of the aforementioned program counters PCH and PCL are outputted to the address buses IABH and IABL, and the instruction buffers IRH and IRL fetch the data from the data buses IDBH and IDBL so that the outputs of the temporary registers MWBH and MWBL are fed to the data buses IDBH and IDBL. The temporary registers MRBH and MRBL input the data from the data buses IDBH and IDBL and the special purpose buses MTBH and MTBL. The address informations latched by the temporary registers MABH and MABL are outputted to address buses IABH and IABL. The multiplying temporary register MLTB has its output fed to the special purpose buses MTBH and MTBL.

[7] Pipe Line Stage by CPU

Figure 8:
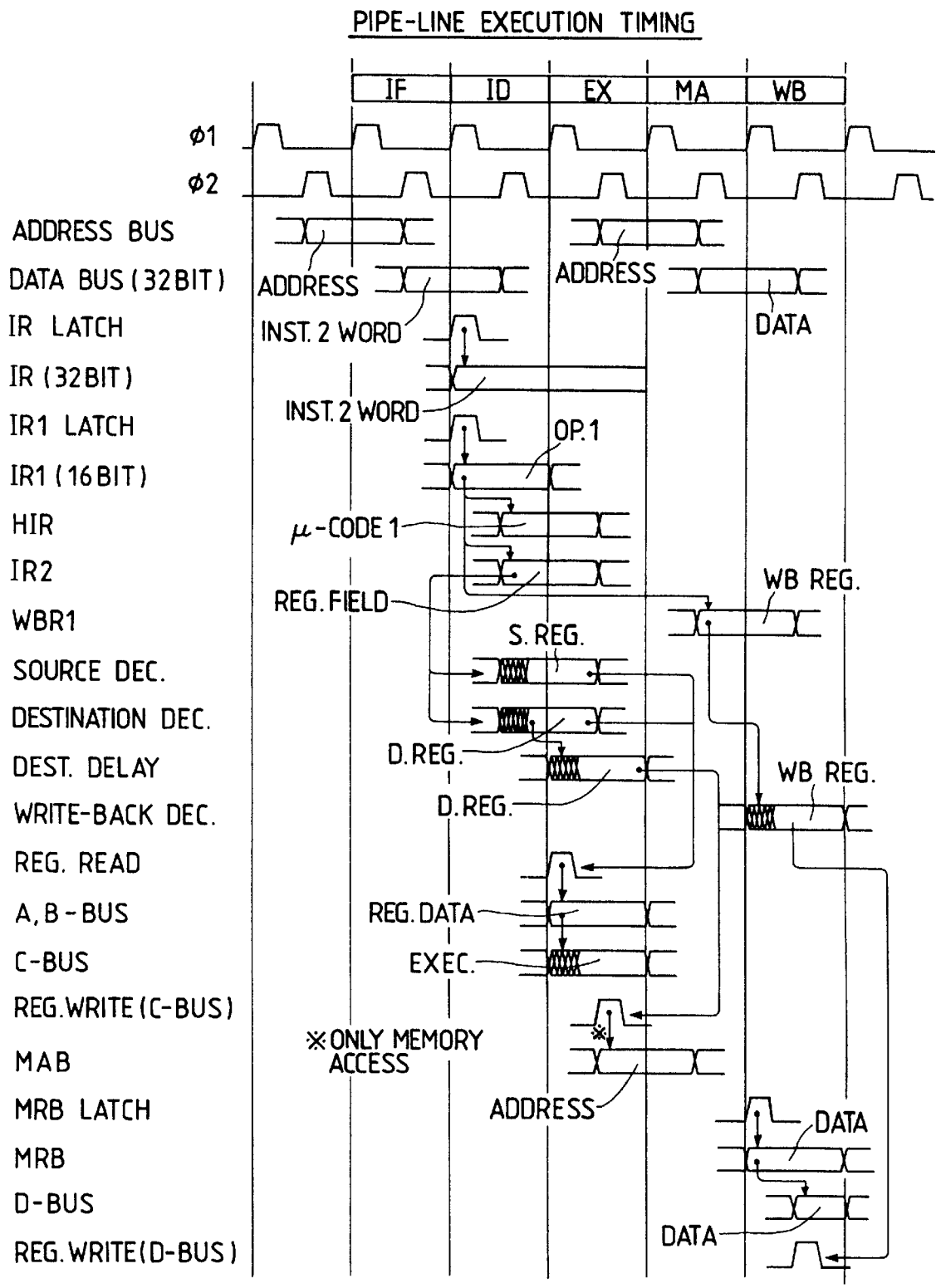
FIG. 8 is a diagram for explaining one example of a stage of a pipe-line processing by the central processing unit.

FIG. 8 shows one example of a stage of a pipe line processing by the central processing unit CPU.

This central processing unit CPU has a basic pipe line structure of five stages having the following basic phases:

IF: Instruction Fetch;
ID: Instruction Decode;
Ex: Execute;
MA: Memory Access; and
WB: Write-Back.

In FIG. 8 showing one example of the execution content of each pipe stage, the Address Bus correspond to the address buses IAB23-0 of FIG. 2, and the Data Bus correspond to the IDB31-0 of the same. Letters IR of FIG. 8 correspond to the instruction buffers IRH and IRL of FIGS. 6 and 5. In FIG. 8, letters A-Bus, B-Bus, C-Bus and D-Bus are the A bus, B bus, C bus and D bus of FIG. 7, respectively. Likewise, letters MAB and MRB of FIG. 8 are the MABH, MABL, MRBH and MRBL of FIG. 7.

[8] Pipe Line Sequence in Register Conflicting State

Figure 9:
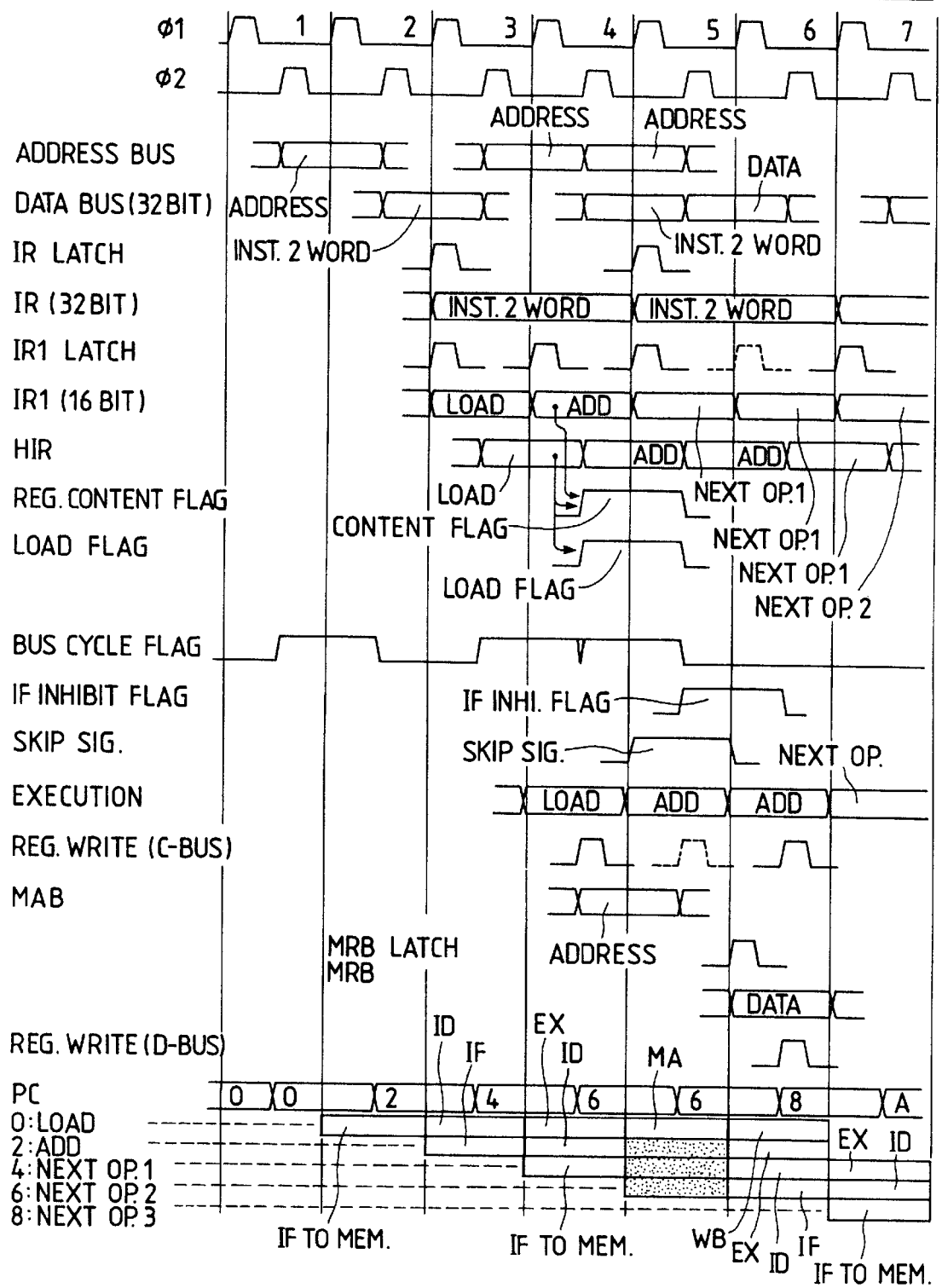
FIG. 9 is a diagram for explaining one example of a pipe-line sequence in a register conflicting state.

The pipe line sequence in the aforementioned register conflicting state will be described with reference to FIG. 9. First of all, the meanings of signals shown in the same Figure will be described in the following. The waveforms of the aforementioned nonoverlap two-phase clock signals φ 1 and φ 2 acting as operation reference clock signals are shown at the top of FIG. 9. One cycle is defined as a period starting from the rise of the clock signal φ 1 and ending the next rise of the signal φ 1. Subsequently, the states of an address bus and a data bus are shown. Next letters IRLatch designate a latch signal of an instruction buffer (IR(32 bits) or IRH and IRL). The IRLatch presents an input latch signal waveform of the IR1 register. The IR1 (16 bits) latches the instruction which is present at an instruction decode stage. The aforementioned hardware sequence control instruction register HIR is a register for latching a partially decoded micro code, a sequence information or a pipe line control information. Letters Reg. Content Flag appearing in FIG. 9 designate a flag indicating it necessary to check the conflict between an LOAD instruction and an instruction using the execution unit EXEC. This conflict is checked in a 4th cycle to set a Content Flag (or C flag). At the same time, there is set a LOAD Flag (or L flag) in to load an operand to load an operand. Likewise, there is set in the 4th cycle a Bus Cycle Flag (or B flag) indicating a bus operation necessary. This flag indicates whether or not the bus cycle is being executed. An instruction fetch inhibit flag (i.e., IF Inhibit Flag: I Flag) is one indicating that an instruction fetch is interrupted and replaced by a data access. A skip signal (i.e., Skip Sig.) is a flag meaning that a processing to be executed in the execution unit EXEC in that cycle is canceled. The Execution indicates a processing to be executed in the execution unit EXEC. The Reg. Write is a signal to be written in a register. In response to the Reg. Write in the ordinary operation, the destination register, as instructed, latches through the C-Bus. At the time of executing the LOAD instruction and the MULT instruction, the destination register, as instructed, latches through the D-Bus. In this meaning, the signal Reg. Write is shown as divided those for the C-Bus and the D-Bus in the timing chart so that the writing operation is executed in preference of the C-Bus if the two signals Reg. Write for the C-Bus and D-Bus conflict in the same register. In short, only the write from the C-Bus is executed. The signal written in the 5th cycle, as indicated in dotted lines, indicates the write in the register which is inhibited by the Skip Sig. The MAB means a memory address bus for outputting an address when a data access is executed. The MRB Latch meaning a memory read buffer is a signal for latching data. The PC indicates the value of a program counter.

FIG. 9 is a timing chart exemplifying the sequences between LOAD instructions (LOAD @R1, R2) and ADD instructions (ADD R2,R3). The register R2 for the LOAD instruction to latch the data and the register R2 for the ADD instruction to use are so common that the value of the register R2 is used for the operations between its value determined if the instruction execution is performed in the ordinary pipe line flow. In this example, what timing the pipe line control is to be executed at is shown over seven cycles when the uses of the registers R2 conflict. The lowermost column indicates the situations of execution of the pipe line. Since the register R2 of the destination of the LOAD instruction and the source register R2 of the ADD instruction conflict, a stall (or delay) occurs at the 5th cycle, as shadowed. For this stall, it becomes necessary at first to detect whether or not the register conflicting state takes place and to recognize how many cycle the execution cycle (EX) is to be delayed for avoiding the register conflict. The former detection is carried by asserting the signal S1 outputted by the aforementioned register content check block RCCB for comparing the register selecting information contained in the preceding instruction outputted by the aforementioned register WBR1 and the register selecting information (e.g., the information contained in the ADD instruction for selecting the register R2 according to this example) contained in the succeeding instruction. The latter recognition can be achieved from the decoded result of the operation code. Since the number of the execution cycle (EX) of the LOAD instruction is one in the shown example, the stall occurs only in the 5th cycle.

Figure 10:
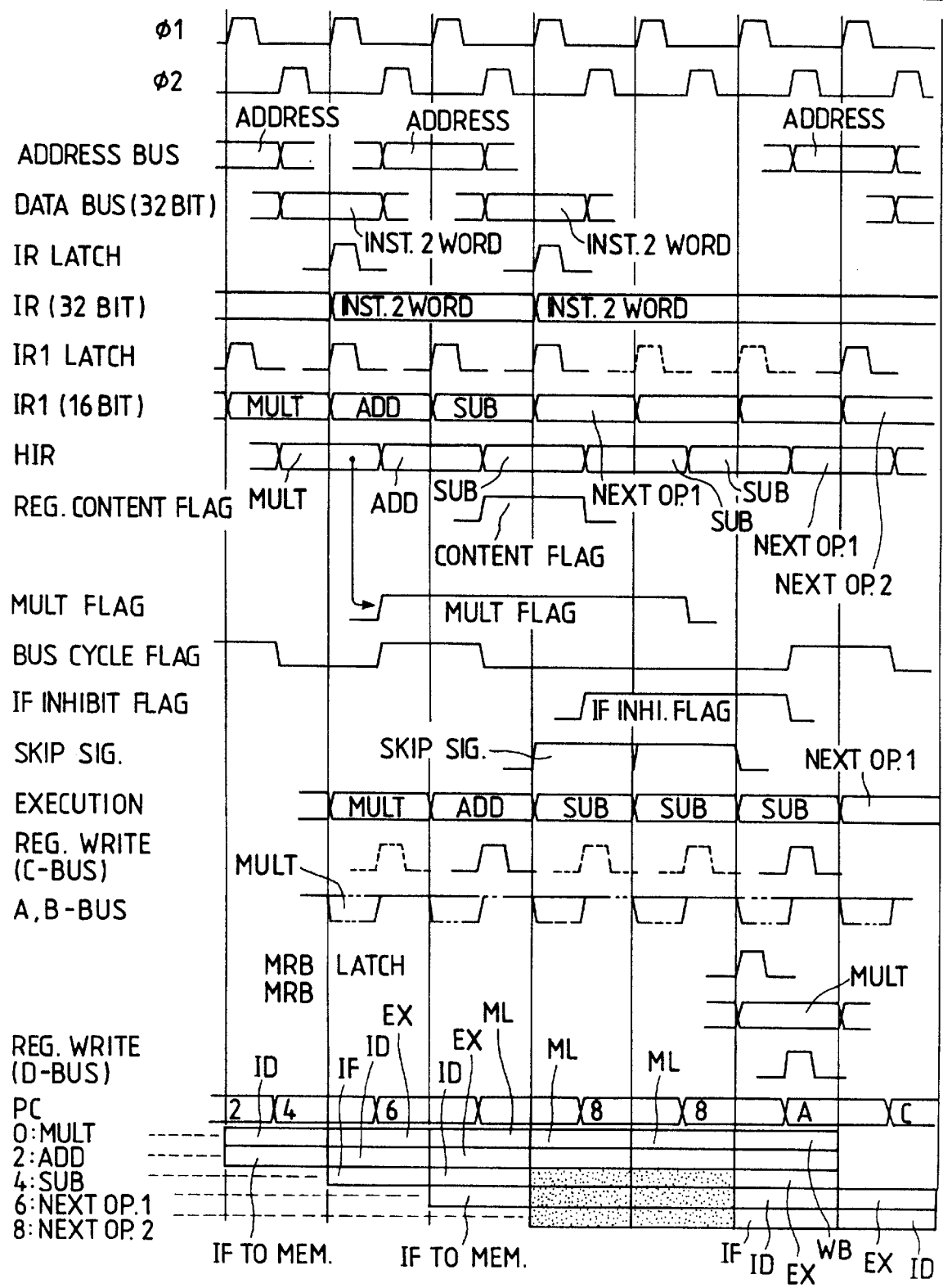
FIG. 10 is a diagram for explaining another example of a pipe-line sequence in a register conflicting state.

FIG. 10 shows another example of the pipe line sequence in the register conflicting state. FIG. 10 is a timing chart exemplifying the sequences among the MULT instructions (MUL R1, R2) as multiplying instructions, the ADD instructions (ADD R4, R3) and the SUB instructions (SUB R3, R2). The register R2 for the MUL instruction to latch the data and the register R2 to be used by the SUB instructions are common. Unless the register conflicting state is reflected upon the pipe line sequences, it occurs that the register R2 is used for another operation before its value is determined if the instruction is executed. In the present example, what timing the control of the pipe line is executed at in case of such conflict of register uses is shown over seven cycles. The format of expression of the present Figure is similar to that of FIG. 9 and illustrates the executions of multiplications in four cycles, although not detailed. The MULT instructions are executed in four stages EX, ML, ML and ML. The multiplier can execute the multiplications for latching the result of 16b*16bin 32b in the four cycles. These calculations can be executed by determining the partial product of 16b*4b and their cumulative sum for each cycle. In case of this example, the SUB instruction is fetched in the register R1 with a delay of 2 cycles from the MULT instruction, and the execution cycle (EX) of the SUB instruction is delayed by two cycles because the MULT instruction are multiplied in the four cycles EX, ML, ML and ML.

[9] Pipe Line Sequence at Memory Access Conflicting Time

Figure 11:
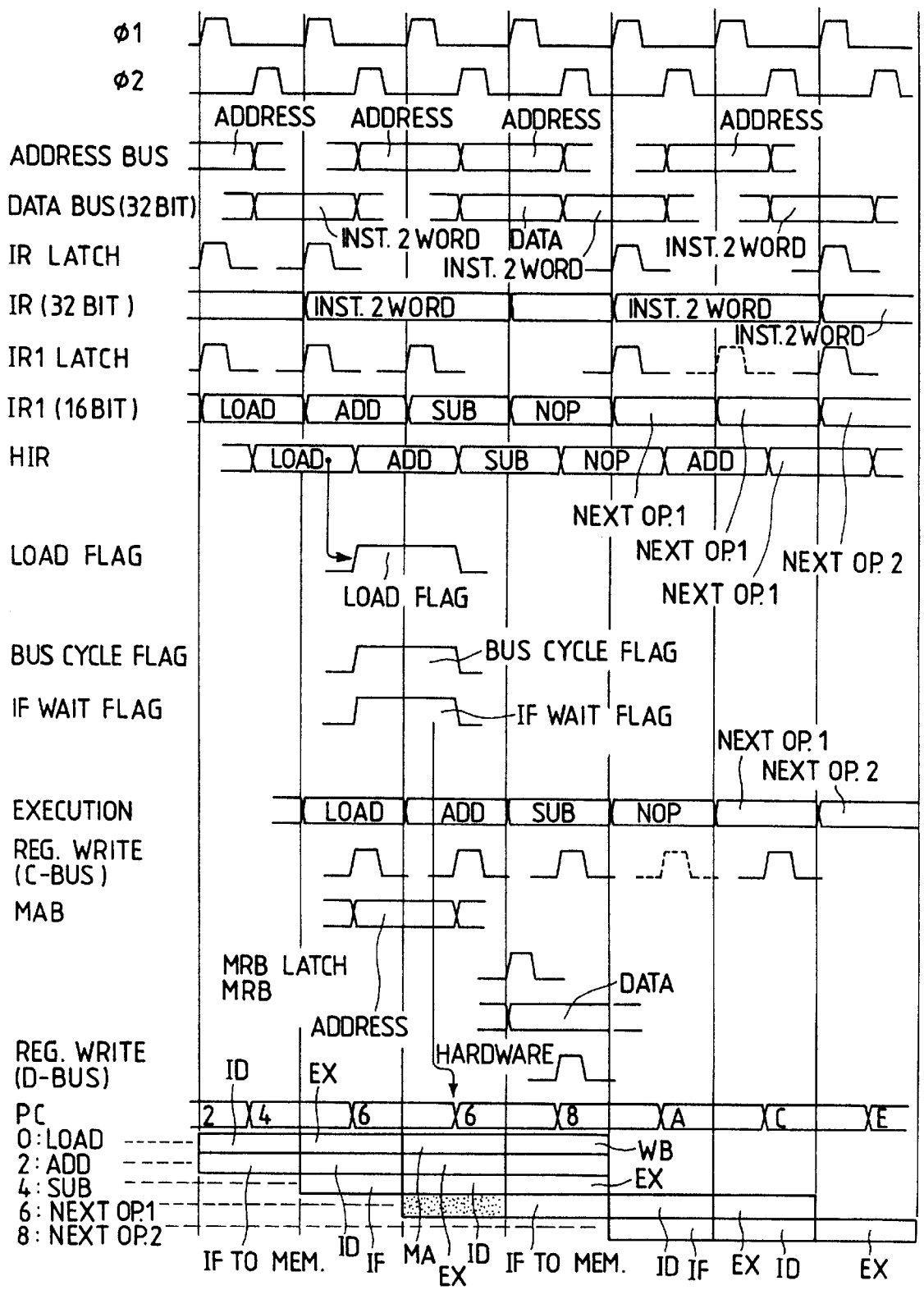
FIG. 11 is a diagram for explaining one example of a pipe control sequence in case a data fetch and an instruction fetch conflict.

FIG. 11 shows a pipe control sequence exemplifying the case, in which a data fetch from a memory and an instruction fetch conflict. In this case, the data fetch is preferred so that the instruction execution schedule containing a conflicting instruction fetch is shifted in its entirety. For this control, the instruction fetch wait flag (IF Wait Flag) is set to delay the start of the instruction fetch cycle while the load flag (LOAD Flag) and the bus cycle flag (Bus Cycle Flag) are conflicting.

[10] Sequence of Instruction Execution of Plural Cycles

FIG. 12 is a timing chart showing one example when a plurality of cycle instructions are executed. Here will be explained by way of example an instruction "AND.B #imm, @R1" or a kind of AND instructions (i.e., logical product). This is an instruction for calculating the logical product between the 8 bit data of a memory selected relative to the register R1 and the 8 bit immediate data. This AND.B instruction is a plurality cycle instructions to be executed in response to the macro instruction 1, the micro instruction 1 and the micro instruction 2. The aforementioned macro instruction 1 is an instruction for fetching a byte operand from the area of a memory, which is selected according to the content of the register R1. The aforementioned micro instruction 1 is an instruction for taking an AND of the aforementioned byte operand and the immediate data. The aforementioned micro instruction 2 is an instruction for writing the byte operand in the area of a memory, which is selected according to the content of the register R1.

The execution content of the aforementioned AND.B instruction is described in the C language:

```
ANDM(int i)/*AND.B#imm:8, @R1*/
{
    long temp;
    temp=(long)Read_Byte(R[1]);
    temp&=(long)i;
    Write_Byte(R[1], temp);
    PC+=2;
}.
```

With reference to this description, there are idle cycles between the ID (Instruction Decode) stage and the EX (Execution) stage of the micro instruction 1 and between the μ-IF (Micro Instruction Fetch) stage and the ID stage of the micro instruction 2. This is because the operand fetched at the MA (Memory Access) stage of the macro instruction 1 has to be used at the EX (Execution) stage of the micro instruction 1.

[11] Instruction Assignment of CPU

The instructions to be assigned to the central processing unit CPU are: data transfer instructions shown in FIGS. 13 and 14; logical operation instructions shown in FIG. 15; arithmetic operation instructions shown in FIGS. 16 and 17; shift instructions shown in FIG. 18; branch instructions shown in FIG. 19; and system control instructions shown in FIGS. 20 and 21. FIG. 22 explains the description formats of FIGS. 13 to 21. According to these formats, the items of the instructions in FIGS. 13 to 21 are mnemonically indicated. The addressing modes in this mnemonic indications are tabulated in FIG. 23. As apparent from the various instruction codes, all of the integer calculations, branching methods and control instructions of the general purpose register system can be selected even In the 65,536 combinations which can be expressed in the instruction format of fixed length of 16 bits. The decoding can be realized with less logical expressions by devising the bit assignments to group instructions of similar functions. An instruction array having the operation code starting from "1111" is wholly reserved so that calculations of single or double accuracy can be selected in conformity with the IEEE floating point standards.

[12] Displacement Length of Branch Instruction

Figure 24:
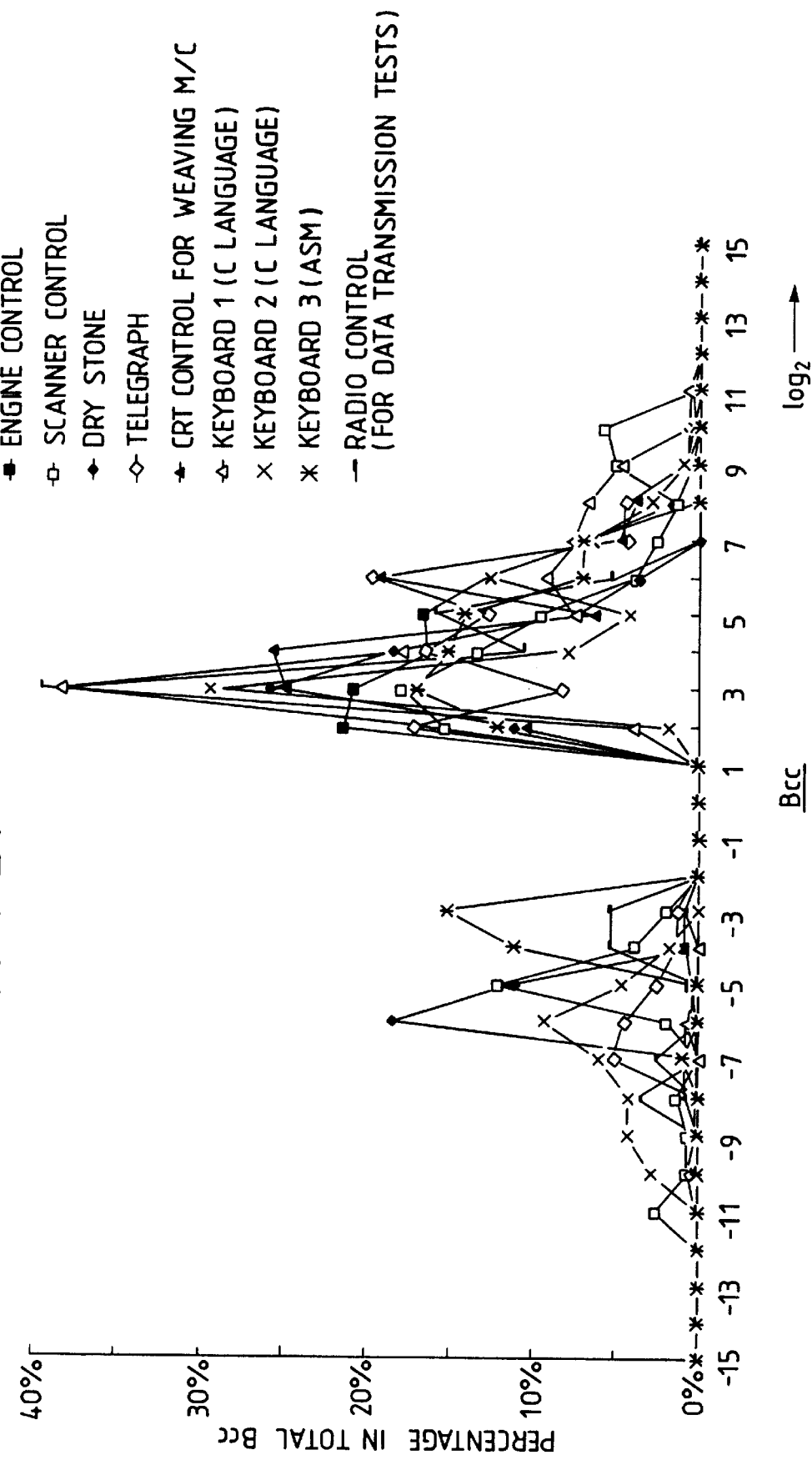
FIG. 24 is an explanatory diagram showing one example of the relations between the displacement lengths of branch instructions and the appearance frequency of instructions having the displacement lengths.
Figure 25:
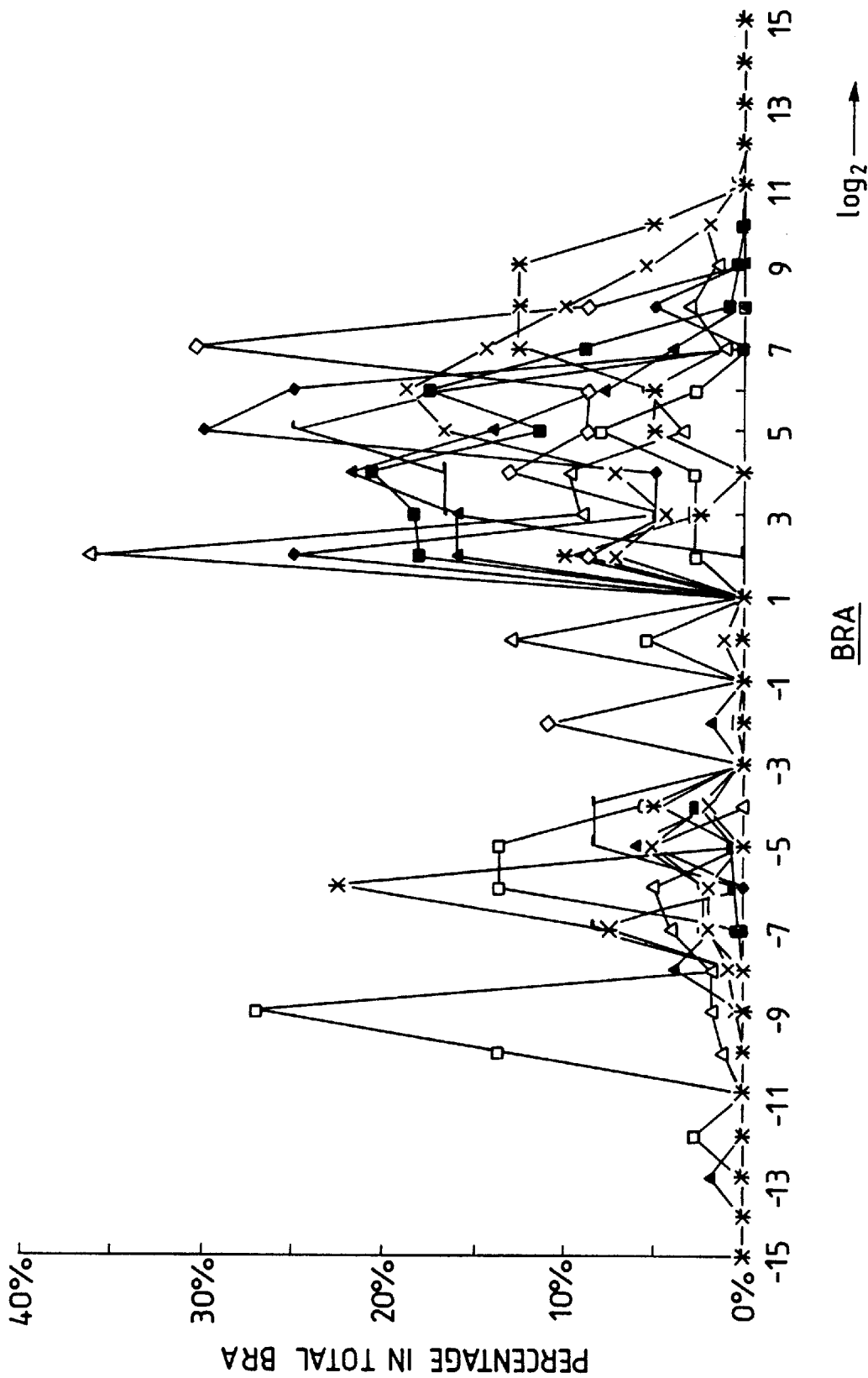
FIG. 25 is an explanatory diagram showing one example of the relations between the displacement lengths of branch always instructions and the appearance frequency of instructions having the displacement lengths.
Figure 26:
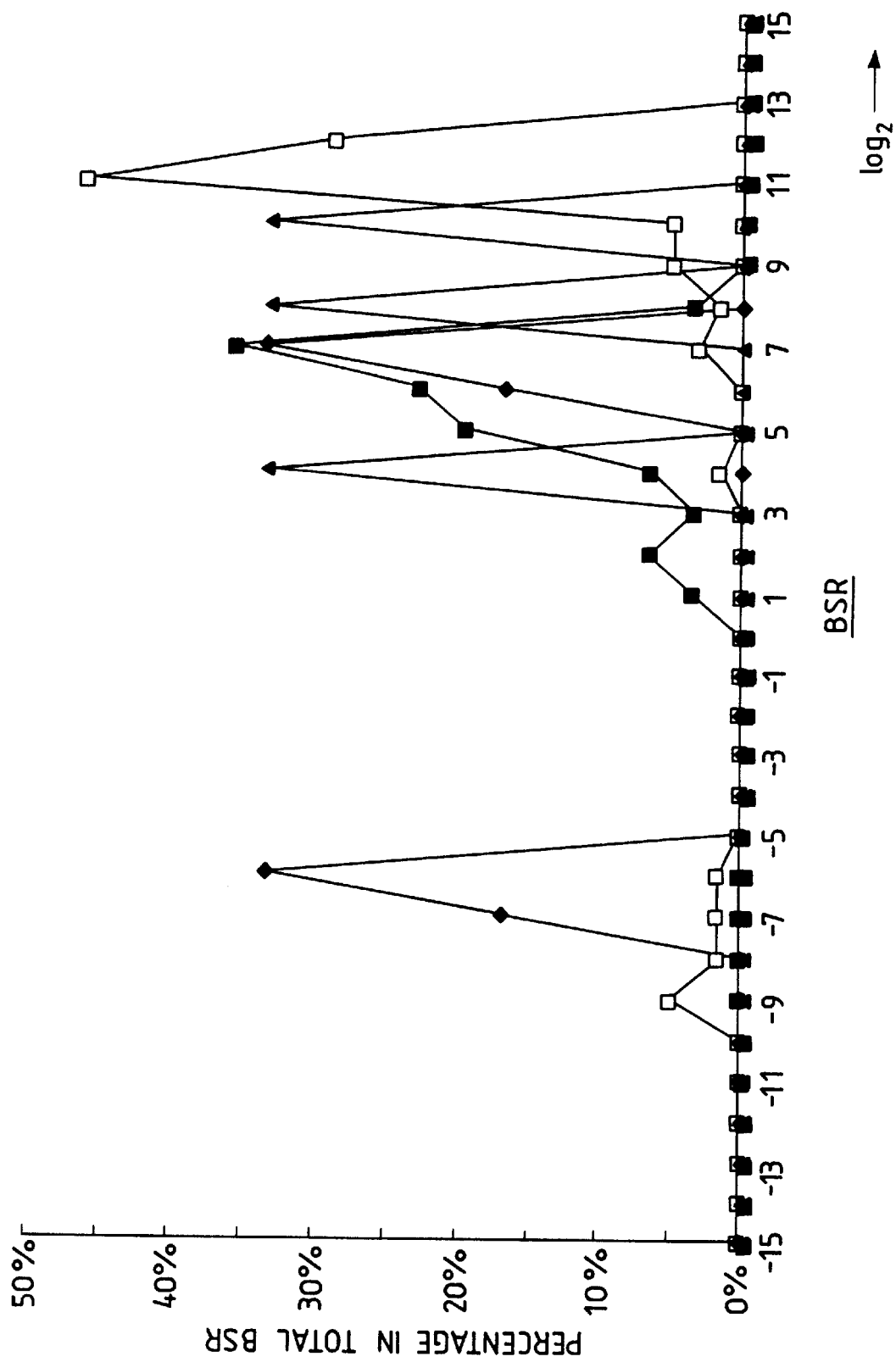
FIG. 26 is an explanatory diagram showing one example of the relations between the displacement lengths of subroutine call instructions and the appearance frequency of instructions having the displacement lengths.
Figure 27:
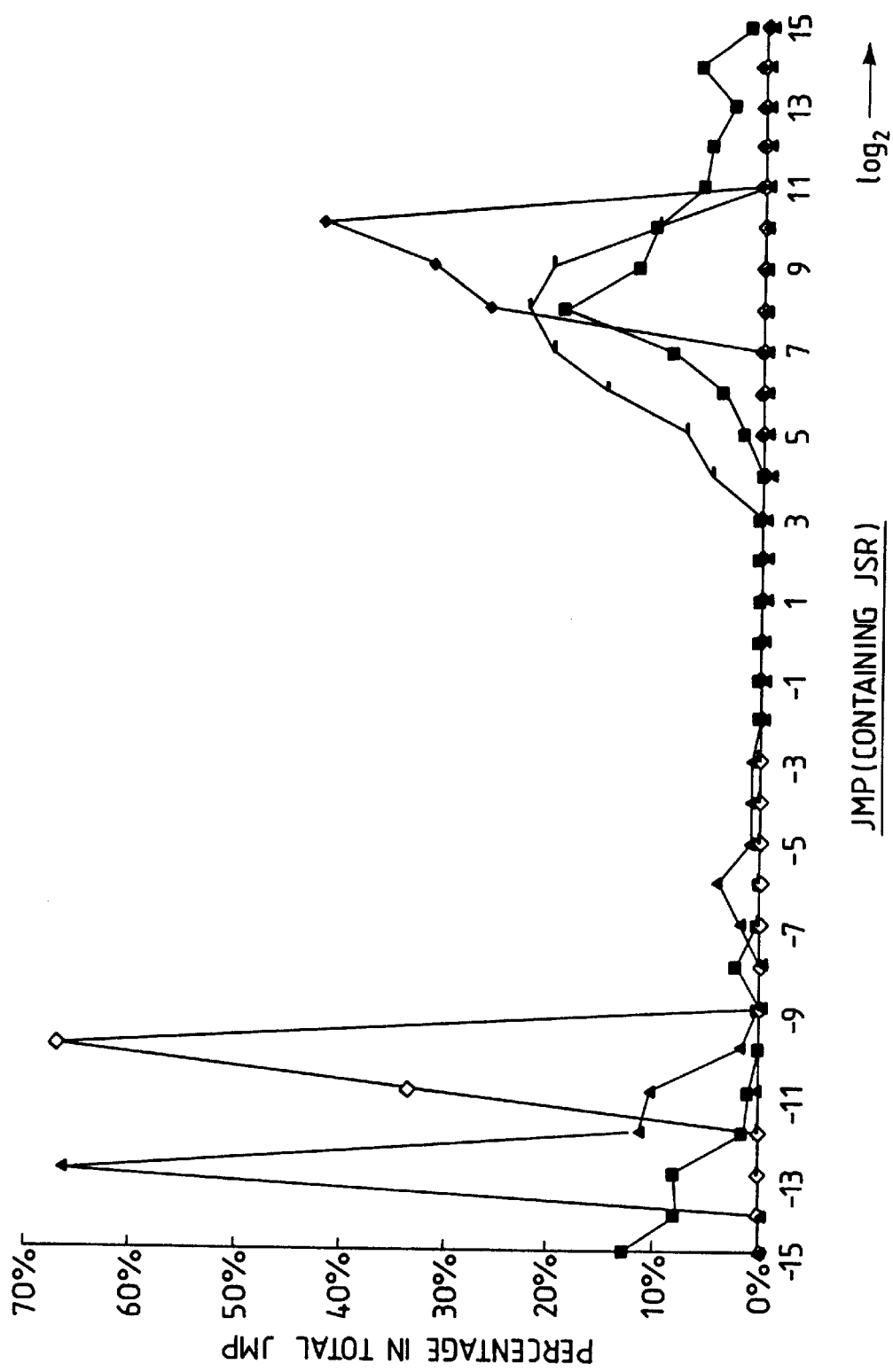
FIG. 27 is an explanatory diagram showing one example of the relations between the displacement lengths of jump instructions or jump subroutine instructions and the appearance frequency of instructions having the displacement lengths.

FIGS. 24, 25, 26 and 27 plot the relations between the displacement lengths of branch instructions and instructions in various programs extracted as samples and the appearance frequencies of the instructions having those displacement lengths. FIGS. 24 and 25 relate to conditional branch instructions (i.e., branch instructions) and unconditional branch instructions (i.e., branch always instructions); FIG. 26 relates to subroutine call instructions; and FIG. 27 relates to jump instructions or jump subroutine instructions. Here, the "branch" is to select one of numerous instruction sets which can be selected in the execution of a computer program. The "jump" means a departure from the implicit or specific execution order of instructions, which is actually done in the execution of the computer program. The "displacement" is used to select a jumped address. For the more bit number of the displacement length, therefore, the farther address can be jumped to.

The frequency distributions of the displacement in response to the branch instructions, as shown in FIGS. 24 to 26, are the data which were obtained by analyzing the various programs of Microcomputer H8/500 of Hitachi, Ltd. These Figures illustrate the distributions of the displacement values of the individual kinds of the branch instructions used. The abscissa indicates the log 2 values of the used displacement values. At the righthand of the origin 0, the log 2 {i.e., displacement} is expressed by a positive integer (1, 3, 5, 7, - - - ) in case the displacement value is positive. At the lefthand, the -log 2 {i.e., -displacement} is expressed by a negative number for a displacement having a negative value. The ordinate indicates the appearance frequency at the unit of %. The data were sampled for nine different programs.

As could be apparent from FIGS. 24 and 25, the branch instructions and the branch always instructions having the higher appearance frequencies are distributed the closer to the center so that the distribution can be substantially covered with a displacement of 8 bits. It could also be found that the distribution of the subroutine call instructions of FIG. 26 can be wholly covered with a displacement field of 12 to 13 bits although it is considerably wide. In case of the jump instructions or jump subroutine instructions shown in FIG. 27, moreover, the value of the abscissa takes such a displacement as is defined to mean the difference between the address, at which the jump instruction is present, and the address of the jump destination. It could be found that the jump destination is also far.

In the microcomputer MCU of the present embodiment, the displacement of the conditional branch instructions is fixed at 8 bits, and the displacement of the subroutine branch instructions and the unconditional branch instructions is fixed at 12 bits so that those instructions are confined in the instruction format of fixed length of 16 bits. In the various branch instructions shown in FIG. 19, for example: the individual instructions BC, BT and BF are made to belong to the conditional branch instructions; the instruction BSR in the same Figure is made to belong to the subroutine branch instructions; and the instruction BRA is made to belong to the unconditional branch instructions. The detailed contents of the individual instructions should be referred to the description items of instructions, as follows.

In the modular programming method for preparing a program as a set of relatively small subroutines (or functions), the conditional branch instructions will jump within the functions. Since most functions have a size as large as several hundreds bytes, the distribution can be substantially covered with the displacement of 8 bits. On the other hand, the subroutine branch has a tendency to jump to the outside of a function itself, i.e., to a far place so that it requires a displacement of a larger bit number than that of the condition branch instruction. The unconditional branch may be used for calling another function at the last of functions so as to accelerate the program. Since it seems advantageous that the unconditional branch be handled similarly to the subroutine branch condition, the bit number of the displacement is equalized to that of the subroutine branch. Thus, the fixed assignment of the proper displacement length according to the kind of the branch instruction contributes to realization of the instruction format of fixed length of 16 bits without any substantial trouble.

[13] Processing of Immediate Data

In case the instruction format of 16 bit fixed length is adopted, it is not practical to limit all the immediate values to 16 bits or less in view of the fact that the data word length is 32 bits. In the present embodiment, a method of using the value of a register such as the program counter PC and the relative address is adopted so as to select the immediate values of 16 bits or more within one instruction format.

The instructions for the immediate processing are exemplified by the load instructions shown in FIG. 13, such as MOV.W@ (disp, PC)Rn or MOV.L@ (disp, PC)Rn. These instructions are those for storing the immediate data in the general purpose register Rn. If the data are words/long words, there are referred to the data in a table stored in the address which is specified by adding the displacement to the program counter PC. If the data are words, the displacement is shifted leftward by 1 bit to 9 bits so that the relative distance from the table is changed from −256 to +254 bytes. The program counter PC is the head address which is behind the present instruction by two instructions. This makes it necessary to arrange the word data at the boundary of 2 bytes. If the data are the long words, the displacement is shifted leftward by 2 bits to 10 bits so that the relative distance from the operand is changed from −512 to +508 bytes. The program counter PC is the head address which is behind the present instruction by two instructions, but its less significant 2 bits are corrected to B and 00. This makes it necessary to arrange the long word data at the boundary of 4 bytes.

[14] Implicit Register Selection

The implicit register selection is said to select a general purpose register fixed as an operand notwithstanding that no register selecting field is present in an instruction. The general purpose register, as specified herein, is used for determining a memory address, for example, or for storing the data fetched from a memory. The instruction for this implicit register selection can be exemplified by the MOV @ (disp, R1)R0 or MOV R0, @ (disp, R1), as shown in FIG. 14. As is apparent from the codes correspond instruction instruction in the same Figure, the instruction contains only the operation code and the displacement dddddddd of 8 bits but not the register selecting field. This displacement is used for determining a memory address together with the value of the implicitly selected register R1. Thanks to this implicit register selection, even in an instruction requiring the value of the register and the displacement, the instruction word length can be restricted within 16 bits without any reduction in the bit number required as the displacement.

[15] Functionally Composite Instruction

The functionally composite instruction can be exemplified by a bit operation instruction such as AND.B #imm, @R1 shown in FIG. 15. This instruction is one composed of three instructions for taking a logical product (i.e., AND operation) between the 8 bit data of a memory selected relative to the register R1 selected implicitly like before and the immediate data of 8 bits to execute the reading of the memory, the AND operation and the write return of the result of the AND operation in said memory. The operation of this kind appears highly frequently in controlling the packaged devices, and the adoption of such functionally composite instruction in the instruction format of 16 bit fixed length contributes to an improvement in the code efficiently.

[16]Truth/False Setting Instruction for Selected Condition

An Instruction for setting the truth/false of the arithmetic result for a selected condition can be exemplified by eight kinds of CMP instructions shown in FIG. 16, for example. These are instructions for comparing operands to set the comparison result to the T (True) bit of the aforementioned status register SR. For example, the instructions as designated at COMP/EQ, Rm and RnFF compare whether or not the values of the registers Rm and Rn are equal, and set the T bit to 1, if YES, but clear the same to 0. By assigning the T bit to the status register so that the operation of setting the truth/false for the compared result to the T bit may be executed in response to one instruction of the instruction format of 16 bit fixed length, the next instruction such as the aforementioned conditional branch instruction BT for the operation based on the resultant truth/false may refer directly to the T bit. Thus, the description of the condition necessary for the arithmetic result according to the preceding instruction need not be made in said BT instruction itself so that the area of the displacement necessary for the BT instruction can be accordingly enlarged in the limited instruction format of fixed length. As a result, this structure contributes to realization of the instruction format of 16 bit fixed length.

[17] List of Instructions

The featuring ones of the instructions of having the formats of 16 bit fixed length have been representatively described hereinbefore. In order to clarify the whole aspect of the instruction format of 16 bit fixed length, all the instructions of the microcomputer of the present embodiment will be further described sequentially in the alphabetical order. The descriptions of the individual instructions include the names of instructions, the formats (wherein "imm" and "disp" designate numerical values or symbols) expressed by the input formats of the assembler, the notes for using the instructions, the descriptions of the operations expressed by the C language, the operation examples (indicating the states before and after the instruction executions) exemplified assembler-mnemonically, and the codes. Before the descriptions of the individual instructions, here will be described the register structures as the programmer's models to be noted when a program is to be executed, with reference to FIG. 28. The registers as the programmer's models are exemplified not only by the aforementioned general purpose registers R0 (i.e., R0H, R0L) to R15 (i.e., R15H, R15L) but also by control registers such as a status register SR, a procedure register PR (i.e., PRH, PRL), a global base register GBR (BGRH, GBRL), a program counter PC (PCH, PCL), a vector base register VBR (VBRH, VBRL) or a break register BR (BRH, BRL). In the example of FIG. 28: the register R0 is an accumulator; the register R1 is an index register; and the register R15 is a stack pointer. In the status register SR of FIG. 28: the M/Q bit is referred to in the DIV instruction: the I bit is a mask bit: the sign "-" is a reserved bit; the D bit is referred to in the PASS instruction; the C bit is one reflecting on the carry/borrow/overflow/underflow/shift-out; and the T bit is one expressing the truth (1) and the false (0), as has been described hereinbefore.

The descriptions of the operations, whose contents are indicated in C, assume the use of the following resources, although not especially limitative thereto:
unsigned char Read_Byte (unsigned long Addr);
unsigned short Read_Word (unsigned long Addr);
unsigned long Read_Long (unsigned long Addr);
The contents of the individual sizes of the address Addr are returned.

The reads of the words other than the address (2n) and the long words other than the address (4n) are detected as address errors.

| | |
|---|---|
| unsigned char Write_Byte | (unsigned long Addr, unsigned long Data); |
| unsigned short Write_Word | (unsigned long Addr, unsigned long Data); |
| unsigned long Write_Long | (unsigned long Addr, unsigned long Data); |

The data Data are written with their individual sizes in the address Addr.

The writes of the words other than the address (2n) and the long words other than the address (4n) are detected as address errors.
Delay_Slot (unsigned long Addr);

The slot instruction of the address (Addr-4) is executed. This means that the execution is shifted for Delay_Slot(4) to the instruction of not the 4th address but the 0-th address. If, moreover, the execution is to be shifted from that function to the following instructions, these are detected as the slot invalid instructions immediately before the execution:

```
BC, BF, BT, BRA, BSR, JMP, JSR, RTS, BRK,
  PASS, RTB, RTE, TRAP
unsigned long R[16];
unsigned long CR[3];
unsigned long PC;
unsigned long BR;
unsigned long VBR;
  Individual Register Bodies
#define SR (CR[0])
#define PR (CR[1])
#define GBR (CR[2])
  Correspondences between Proper Names of
  Registers and Indications of CRn Formats
struct SR0 {
  unsigned long dummy   0:22;
  unsigned long         M0:1;
  unsigned long         Q0:1;
  unsigned long         I0:4;
  unsigned long dummy   2:1;
  unsigned long         D0:1;
  unsigned long         C0:1;
  unsigned long         T0:1;
};
  Definitions of SR Structures
#define M ((*(struct SR0 *)(&CR[0])).M0)
#define Q ((*(struct SR0 *)(&CR[0])).Q0)
```

-continued

```
#define D ((*(struct SR0 *)(&CR[0])).D0)
#define C ((*(struct SR0 *)(&CR[0])).C0)
#define T ((*(struct SR0 *)(&CR[0])).T0)
  Definitions of Bits in SR
#define BRKVEC   0x0000001C
#define PASSVEC  0x00000014
  Definitions of Vector Addresses
#define SHAL() SHLL()
  Definitions of Identical Instructions of
  Different Names
Error (char *er);
```

Error Indicating Function

In addition, it is assumed that the PC indicates the address of 4 bytes (i.e., 2 instructions) before of the instruction being executed. This means that (PC=4;) indicates a shift of execution from the instruction of not the 4th address but the 0th address.

In the example of use described in the assembler mnemonic format, the codes indicate the binary codes.

In the mnemonic: the following expansions are made in codes:

```
r: rrrr
R: RRRR
imm: iiiiiiii
disp: dddd or
      dddddddd or
      dddddddddddd.
  The SS in the MOV instruction code is
  expanded in the following manner in accordance
  with the operand size:
    01 = Byte
    10 = Word
    11 = Long Word.
  ADD (Addition) Instruction
Format:
  ADD Rm, Rn
  ADD #imm, Rn
```

Description

The contents of the general purpose registers Rn and Rm are added, and the result is stored in the Rn. The general purpose register Rn and 8 bit immediate data can be added. The 8 bit immediate data are code-expanded to 32 bits so that they are used with subtractions.

Operation

```
ADD(long m, long n)  /*ADD Rm, Rn */
{
    R[n]+=R[m];
    PC+=2;
ADDI(long i, long n)  /*ADD #imm, Rn */
{
    if ((i&0x80)==0) R[n]+=(0x000000FF & (long)i);
        else R[n]+=(0xFFFFFF00 | (long)i);
    PC+=2;
}
Example of Use:
  ADD  R0,R1;
       before execution  R0=H'7FFFFFFF,R1=H'00000001
       after execution   R1=H'80000000
  ADD  #H'01,R2;
       before execution  R2=H'00000000
       after execution   R2=H'00000001
  ADD  #H'FE,R3;
       before execution  R3=H'00000001
       after execution   R3=H'FFFFFFFF
  Code:       MSB              LSB
```

-continued

```
ADD    r.R      0010RRRRrrrr0000
ADD    #imm,R   0101RRRRiiiiiiii
```

ADDC (Addition with Carry) Instruction

Format
    ADDC Rm, Rn

Description
The contents of the general purpose registers Rn and Rm and the C bit are added, and the result is stored in the Rn. According to the arithmetic result, the carry reflects upon the C bit.

Operation

```
ADDC(long m, long n)   /*ADDC Rm, Rn */
{
        unsigned long temp;
        temp=R[n];
        R[n]+=(R[m]+C);
        if (temp>R[n]) C=1; else C=0;
        PC+=2;
{
Example of Use:
    ADDC   R0,R1;
           before execution    C=1,R0=H'00000001,
                               R1=H'00000001
           after execution     C=0,R1=H'00000003
    ADDC   R2,R3;
           before execution    C=0,R2=H'00000002,
                               R3=H'FFFFFFFF
           after execution     C=1,R3=H'00000001
    ADDC   R4,R5;
           before execution    C=1,R4=H'00000001,
                               R5=H'FFFFFFFF
           after execution     C=1,R5=H'00000001
Codes:         MSB             LSB
    ADDC   r.R      0010RRRRrrrr0010
```

ADDC (Addition with Saturation) Instruction

Format
    ADDS Rm, Rn

Description
The contents of the general purpose registers Rn and Rm are added, and the result is stored in the Rn. Even if an overflow occurs, the result is limited to a range of H'7FFFFFFF to H'8000000.

At this time, the C bit is set.

Operation

```
ADDS(long m, long n)   /*ADDS Rm, Rn */
{
        long dest,src,ans;
        if ((long)R[n]>=0) dest=0; else dest=1;
        if ((long)R[m]>=0) src=0; else src=1;
        src+=dest;
        R[n]+=R[m];
        if ((long)R[n]>=0) ans=0; else ans=1;
        ans+=dest;
        if (ans==1) {
          if (src==0) {R[n]=0x7FFFFFFF; C=1;};
          else C=0;
          if (src==2) {R[n]=0x80000000; C=1;};
          else C=0;
        }
        else C=0;
        PC+=2;
}
Example of Use:
    ADDS   R0,R1;
           before execution    R0=H'00000001,R1=H'7FFFFFFE,
                               C=0
           after execution     R1=H'7FFFFFFF,C=0
```

```
    ADDS   R0,R1;
           before execution    R0=H'00000002,R1=H'7FFFFFFE,
                               C=0
           after execution     R1=H'7FFFFFFF,C=1
Code:          MSB             LSB
    ADDS   r.R      0010RRRRrrrr0011
```

ADDV (Addition with Overflow) Instruction

Format:
    ADDV Rm, Rn

Description:
The contents of the general purpose registers Rn and Rm are added, and the result is stored in the Rn. If an overflow occurs, the C bit is set.

Operation:

```
ADDV(long m, long n)   /*ADDV Rm, Rn */
{
        long dest,src,ans;
        if ((long)R[n]>=0) dest=0; else dest=1;
        if ((long)R[m]>=0) src=0; else src=1;
        src+=dest;
        R[n]+=R[m];
        if ((long)R[n]>=0) ans=0; else ans=1;
        ans+=dest;
        if (src==0 || src==2)   {if (ans==1) C=1;
                                 else C=0;}
             else C=0;
        PC+=2;
}
Example of Use:
    ADDV   R0,R1;
           before execution    R0=H'00000001,R1=H'7FFFFFFE,
                               C=0
           after execution     R1=H'7FFFFFFF,C=0
    ADDV   R0,R1;
           before execution    R0=H'00000002,R1=H'7FFFFFFE,
                               C=0
           after execution     R1=H'80000000,C=1
Code:          MSB             LSB
    ADDV   r.R      0010RRRRrrrr0001
```

AND (Logical Product) Instruction

Format:
    AND Rm, Rn
    AND #imm, R0
    AND.B #imm, @R1

Description
The logical product of the general purpose registers Rn and Rm are added, and the result is stored in the Rn. A special type can be taken from either the logical product between the general purpose register R0 and the zero-expanded 8 bit immediate data or the 8 bit memory relative to the R1 and the 8 bit Immediate data.

Note
In the AND #imm, R0, the more significant 24 bits of the R0 are always cleared as a result of the operation.

Operation

```
AND(long m, long n)   /*AND Rm, Rn */
{
        R[n]&=R[m];
        PC+=2;
}
ANDI(long i)   /*AND #imm, R0 */
{
        R[0]&=(0x000000FF & (long)i);
        PC+=2;
}
ANDM(long i)   /*AND.B #imm,@R1 */
{
        long temp;
        temp=(long)Read_Byte(R[1]);
        temp&=(0xFFFFFF00 | (long)i);
        Write_Byte(R[1],temp);
        PC+=2;
}
```

Example of Use:
```
    AND  R0,R1;
         before execution   R0=H'AAAAAAAA,R'55555555
         after execution    R1=H'00000000
    AND  #H'0F,R0;
         before execution   R0=H'FFFFFFFF
         after execution    R0=H'0000000F
    AND.B #H'80,@R1;
         before execution   @R1=H'A5
         after execution    @R1=H'80
Code:         MSB                      LSB
    AND   r,R          0001RRRRrrrr1001
    AND   #imm,R0      10001001iiiiiiii
    AND.B #imm,@R1     10000001iiiiiiii
BC/BF/BT (Conditional Branch) Instruction
Format:
    BC    disp
    BF    disp
    BT    disp
```

Description

This instruction is a conditional branch one referring to a T/C bit. For T=1, the BT is branched, but the BF executes a next instruction. For T=0, on the contrary, the BF is branched, but the BT executes a next instruction. The BC is branched for C=1 but executes a next instruction for C=0. The destination of branch is an address, in which the displacement is added to the PC. This PC is the leading address of the instruction which is behind the present instruction by two instructions. Since the displacement is shifted leftward by 1 bit to have 9 bits, the relative distance from the branch destination ranges from −256 to +254. If the branch destination fails to be reached, this is coped with by the combination with the BRA instruction or the JMP instruction.

Operation

```
BC(long d)  /*BC disp */
{
    long disp;
    if ((d&0x80)==0) disp=(0x000000FF & (long)d);
        else disp=(0xFFFFFF00 | (long)d);
    if (C==1) PC=PC+(disp<<1)+4;
        else PC+=2;
}
BF(long d)  /*BF disp */
{
    long disp;
    if ((d&0x80)==0) disp=(0x000000FF & (long)d);
        else disp=(0xFFFFFF00 | (long)d);
    if (T==0) PC=PC+(disp<<1)+4;
        else PC+=2;
}
BT(long d)  /*BT disp */
{
    long disp;
    if ((d&0x80)==0) disp=(0x000000FF & (long)d);
        else disp=(0xFFFFFF00 | (long)d);
    if (T==1) PC=PC+(disp<<1)+4;
        else PC+=2;
}
Example of Use:
    CLRT;             always T = 0
    BT  TRGET_T;      no branch because T = 0
    BF  TRGET_F;      branch to TRGET_F because T = 0
    NOP;
    NOP;              position of PC used in BF instruction
                      for calculation of branch destination
                      address
    TRGET_F;          branch destination of BF instruction
Code:        MSB                       LSB
    BC   disp     11001100dddddddd
    BF   disp     11001010dddddddd
    BT   disp     11001000dddddddd
```

BRA (Unconditional Branch) Instruction
Format:
    BRA    disp

Description

This is an unconditional delay branch instruction. The branch destination is located at the address which is the addition of the displacement to the PC. This PC is the leading address which is behind the present instruction by two instructions. Since the displacement is shifted leftward by 1 bit to 13 bits, its relative distance from the branch destination ranges from −4096 to +4094. If the branch destination fails to be reached, a change has to be made to the JMP instruction. At this time, the branch destination address has to be transferred to the register in response to the MOV instruction.

Note

Because of the delay branch instruction, the instruction immediately after the present instruction is executed prior to the branch. No interruption is accepted between the present instruction and the instruction immediately after. This instruction immediately after is recognized as an invalid one if it is a branch instruction.

Operation

```
BRA(long d)   /*BRA disp */
{
    unsigned long temp;
    long disp;
    if ((d&0x800)==0) disp=(0x00000FFF & d);
        else disp=(0xFFFFF000 | d);
    temp=PC;
    PC=PC+(disp<<1)+4;
    Delay_Slot(temp+2);
}
Example of Use:
    BRA    TRGET;     branch to TRGET
    ADD    R0,R1;     to be executed before branch
    NOP;              position of PC used for calcula-
                      tion of branch destination
                      address in response to BRA in-
                      struction
    TRGET;            branch instruction of BRA in-
                      struction
Code:        MSB                       LSB
    BRA  disp     1010dddddddddddd
```
BRK (Software Break) Instruction
Format:
    BRK Description A break exceptional process is started. Specifically, after an acknowledge signal is returned to an external device, the PC is relieved to the BR to make a branch to a break interrupt routine in accordance with a predetermined vector. The PC is the leading address of the present instruction. The content of the VBR is independent of the calculation of a vector address. The VBR is combined with the RTB and is used in a break routine call.

Note

The present instruction will not accept an interruption. The BR is used together with a hardware break caused by a break terminal. Hence, any break redemand during the breaking should be avoided. The PC but not the SR is protected by the BR. The SR has to be relieved, if necessary, to a register or memory in response to the STC instruction.

Operation

```
BRK()   /*BRK*/
{
    BR=PC-4;
    PC=Read_Long(BRKVEC)+4;
}
Example of Use:
    CMP/EQ  R0,R1;
    BT      _TRUE;   break for R0≠ R1
    BRK;             return destination from break routine
    - - - -
    BREAK:           entrance to break routine
    MOV     R0,R0;
    RTB;             return to above BRK instruction
Code:           MSB                    LSB
    BRK             0000000000000000
BSR (Procedure Call) Instruction
Format:
    BSR     disp
```

Description

This makes a branch to a selected address procedure. The content of the PC is relieved to the PR and is branched to the address which is the addition of the displacement to the PC. This PC is the leading address which is behind the present instruction by two instructions. Since the displacement is shifted leftward by 1 bit to 13 bits, its relative distance from the branch destination ranges from −4096 to +4094. If the branch destination fails to be reached, a change has to be made to the JSR instruction. At this time, the branch destination address has to be transferred to the register in response to the MOV instruction. The JSR instruction is combined with the RTS and is used for a procedure call.

Note

Because of the delay branch instruction, the instruction immediately after the present instruction is executed prior to the branch. No interruption is accepted between the present instruction and the instruction immediately after. This instruction immediately after is recognized as an invalid one if it is a branch instruction.

Operation

```
BSR(long d)   /*BSR disp */
{
    long disp;
    if ((d&0x800)==0) disp=(0x00000FFF & d);
        else disp=(0xFFFFF000 | d);
    PR=PC;
    PC=PC+(disp<<1)+4;
    Delay_Slot(PR+2);
}
Example of Use:
    BSR     TRGET;   branch to TRGET
    MOV     R3,R4;   to be executed before branch
    ADD     R0,R1;   position of PC to be used for cal-
                     culation of branch address in re-
                     sponse to BSR instruction
    TRGET;           entrance of procedure
    MOV     R2,R3;
    RTS;             return to above ADD instruction
    MOV     #1,R0;   to be executed before branch
Code:           MSB                    LSB
    BSR     disp            1110dddddddddddd
CLRC (C Bit Clear) Instruction
Format:
    CLRC
```

Description

The C bit of the SR is cleared.

Operation

```
CLRC()  /*CLRC*/
{
    C=0;
    PC+=2;
}
Example of Use:
    CLRC;
                     before execution C=1
                     after execution C=0
Code:           MSB                    LSB
    CLRC            0000000000101001
CLRT(T Bit Clear) Instruction
Format:
    CLRT
```

Description

The T bit of the SR is cleared.

Operation

```
CLRT()  /*CLRT*/
{
    T=0;
    PC+=2;
}
Example of Use:
    CLRT;
                     before execution T=1
                     after execution T=0
Code:           MSB                    LSB
    CLRT            0000000000101000
CMP/cond (Operand Compare) Instruction
Format:
    CMP/cond    Rm,Rn
```

Description

The general purpose registers Rn and Rm are compared. If the result reveals that a selected condition (cond) holds, the T bit of the SR is set. If NO, the T bit is cleared. The content of the Rn is unchanged. Eight conditions can be selected. For the two conditions of the PZ and the PL, the Rn and 0 are compared.

| Mnemonic | Description |
| --- | --- |
| CMP/EQ Rm,Rn | T=1 for Rn=Rm |
| CMP/GE Rm,Rn | T=1 for coded values Rn≧ Rm |
| CMP/GT Rm,Rn | T=1 for coded values Rn> Rm |
| CMP/HI Rm,Rn | T=1 for uncoded values Rn> Rm |
| CMP/HS Rm,Rn | T=1 for uncoded values Rn≧ Rm |
| CMP/PL Rn | T=1 for Rn> 0 |
| CMP/PZ Rn | T=1 for Rn≧ 0 |
| CMP/STR Rm,Rn | T=1 if any byte is equal |

Operation

```
CMPEQ(long m, long n)   /*CMP_EQ Rm,Rn */
{
    if (R[n]==R[m]) T=1; else T=0;
    PC+=2;
}
CMPGE(long m, long n)   /*CMP_GE Rm,Rn */
{
    if ((long)R[n]>=(long)R[m]) T=1; else T=0;
    PC+=2;
}
CMPGT(long m, long n)   /*CMP_GT Rm,Rn */
{
```

-continued

```
            if ((long)R[n]>(long)R[m]) T=1; else T=0;
            PC+=2;
    }
    CMPHI(long m, long n)   /*CMP_HI Rm,Rn */
    {
            if ((unsigned long)R[n]>
                (unsigned long)R[m]) T=1;
            else T=0;
            PC+=2;
    }
    CMPHS(long m, long n)   /* CMP_HS Rm,Rn */
    {
            if((unsigned long) R[n]>=
                (unsigned long) R[m])T=1;
            else T=0;
            PC+=2;
    }
    CMPPL(long n)   /* CMP_PL Rn */
    {
            if ((long)R[n]>0) T=1; else T=0;
            PC+=2;
    }
    CMPPZ(long n)   /* CMP_PZ Rn */
    {
            if ((long)R[n]>=0) T=1; else T=0;
            PC+=2;
    }
    CMPSTR(long m, long n)   /* CMP_STR Rm,Rn */
    {
            unsigned long temp;
            long HH,HL,LH,LL;
            temp=R[n]^R[m];
            HH=(temp&0xFF000000)>>12;
            HL=(temp&0x00FF0000)>>8;
            LH=(temp&0x0000FF00)>>4;
            LL=temp&0x000000FF;
            HH=HH&&HL&&LH&&LL;
            if (HH==0) T=1; else T=0;
            PC+=2;
    }
Example of Use:
    CMP/GE       R0,R1;    R0=H'7FFFFFFF, R1=H'80000000
    BT           TRGET_T;  no branch because T=0
    CMP/HS       R0,R1;    R0=H'7FFFFFFF, R1=H'80000000
    BT           TRGET_T;  branch because T=1
    CMP/SRT      R2,R3;    R2="ABCD", R3="XYCZ"
    BT           TRGET_T;  branch because T=1
    Code:             MSB            LSB
    CMP/EQ       r,R    0001RRRRrrrr0000
    CMP/GE       r,R    0001RRRRrrrr0011
    CMP/GT       r,R    0001RRRRrrrr0111
    CMP/HI       r,R    0001RRRRrrrr0110
    CMP/HS       r,R    0001RRRRrrrr0010
    CMP/PL       R      0100RRRR00011101
    CMP/PZ       R      0100RRRR00011001
    CMP/STR      r,R    0010RRRRrrrr1100
    DIVOS/DIVOU/DIV1(Step Division) Instruction
Format:
    DIV1    Rm,Rn
    DIVOS   Rm,Rn
    DIVOU
```

Description The content of 32 bits of the general purpose register Rn is subjected to one-step division with the content of the Rm. The DIVOS is an initialization instruction for a coded division to store the MSB of the dividend (Rn) in the Q bit, the MSB of the divisor (Rm) in the M bit, and the EOR of the M bit and the Q bit in the C bit. The DIVOU is an initialization instruction for a uncoded division to clear M/Q/C bits to zero. A quotient is obtained by repeating the DIV1 (in combination with the ROTCL, if necessary) by the number of times of the bit number of the divisor. In this repetition, an intermediate result is latched in M/Q/C bits of the assigned register and the SR. The arithmetic result is not warranted if the procedures are unnecessarily rewritten by a software. The sequence of the division can be referred to the following examples of use. The zero division, the detection of the overflow and the arithmetic of the remainder are not prepared.

Operation

```
DIVOU()  /*DIVOU*/
{
        M=Q=C=0;
        PC+=2
}
DIVOS(long m, long n)   /*DIVOS Rm,Rn*/
{
        if ((R[n] & 0x80000000)==0) Q=0;
        else Q=1;
        if ((R[m] & 0x80000000)==0) M=0;
        else M=1;
        C=!(M==Q);
        PC+=2
}
DIV1(long m, long n)   /*DIV1 Rm,Rn*/
{
        unsigned long tmp0;
        unsigned char  old_q, tmp1;
        old_q=0;
        Q=(unsigned char)((0x80000000 & R[n])!=0);
        R[n]<<=1;
        R[n]| =(unsigned long)C;
        switch (old_q){
        case 0:
          switch (M){
          case 0:
            tmp0=R[n];
            R[n]-=R[m];
            tmp1=(R[n]>tmp0);
            switch (Q){
            case 0:
              Q=tmp1;
              break;
            case 1:
              Q=(unsigned char)(tmp1==0);
              break;
            }
            break;
          case 1:
            tmp0=R[n];
            R[n]+=R[m];
            tmp1=(R[n]<tmp0);
            switch (Q){
            case 0:
              Q=(unsigned char)(tmp1==0);
              break;
            case 1:
              Q=tmp1;
              break;
            }
            break;
          }
          break;
        case 1:
          switch(M){
          case 0:
            tmp0=R[n];
            R[n]+=R[m];
            tmp1=(R[n]<tmp0);
            switch (Q){
            case 0:
              Q=tmp1;
              break;
            case 1:
              Q=(unsigned char)(tmp1==0);
              break;
            }
            break;
          case 1;
            tmp0=R[n];
            R[n]-=R[m];
            tmp1=(R[n]>tmp0);
            switch (Q){
            case 0:
              Q=(unsigned char)(tmp1==0);
```

```
              break;
          case 1:
              Q=tmp1;
              break;
          }
          break;
      }
      break;
  }
  C=(Q==M);
  PC+=2;
}
```

Example 1 of Use:
R1(32bits)÷R0(16bits)=R1(16bits): no code

| | | |
|---|---|---|
| SL16 | | R0; more significant 16 bits set to divisor, less significant 16 bits set to 0 |
| TEST | R0,R0; | zero division check |
| BT | ZERO_DIV; | |
| CMP/HS | R0,R1; | overflow check |
| BT | OVER_DIV; | |
| DIVOU | | ; initialization of flag |
| .arepeat | 16; | |
| DIV1 | R0,R1; | repeat 16 times |
| .aendr | ; | |
| ROTCL | R1; | |
| EXTU.W | R1,R1; | R1=quotient |

Example 2 of Use:
R1: R2(64bits)÷R0(32bits)=R2(32bits): no code

| | | |
|---|---|---|
| TEST | R0,R0; | zero division check |
| BT | ZERO_DIV; | |
| CMP/HS | R0,R1; | overflow check |
| BT | OVER_DIV; | |
| DIVOU | | ; initialization of flag |
| .arepeat | 32; | |
| ROTCL | R2; | repeat 32 times |
| DIV1 | R0,R1; | |
| .aendr | ; | |
| ROTCL | R2; | R2=quotient |

Example 3 of Use:
R1(16bits)÷R0(16bits)=R1(16bits): with codes

| | | |
|---|---|---|
| SL16 | | R0; more significant 16 bits set to divisor, less significant 16 bits set to 0 |
| EXTS.W | R1,R1; | dividend is code-extended to 32 bits |
| EOR | R2,R2; | R2=0 |
| MOV | R1,R3; | |
| ROTCL | R3; | |
| SUBC | R2,R1; | -1 for negative dividend |
| DIVOS | R0,R1; | initialization of flag |
| .arepeat | 16; | |
| DIV1 | R0,R1; | repeat 16 times |
| .aendr | ; | |
| EXTS.W | R1,R1; | R1=quotient (expressed in complement of 1) |
| ROTCL | R1; | |
| ADDC | R2,R1; | MSB of quotient, if 1, is incremented by +1 and converted into expression in complement of 2 |
| EXTS.W | R1,R1; | R1=quotient (expressed in complement of 2) |

Example 4 of Use:
R2(32bits)÷R0(32bits)=R2(32bits): with codes

| | | |
|---|---|---|
| EOR | R3,R3; | |
| MOV | R2,R4; | |
| ROTCL | R4; | |
| SUBC | R1,R1; | dividend is code-expanded to 64 bits (R1:R2) |
| SUBC | R3,R2; | -1 for negative dividend |
| DIVOS | R0,R1; | initialization of flag |
| .arepeat | 32; | |
| ROTCL | R2; | repeat 32 times |
| DIV1 | R0,R1; | |
| .aendr | ; | |
| ROTCL | R2; | R2=quotient (expressed in complement of 1) |
| ADDC | R3,R2; | MSB of quotient, if 1, is incremented by +1 and con- verted into expression in complement of 2 ; R2=quotient (expressed in complement of 2) |

Code:
| | | MSB LSB |
|---|---|---|
| DIV1 | r,R | 0001RRRRrrrr1100 |
| DIVOS | r,R | 0001RRRRrrrr1101 |
| DIVOU | | 0000000000101010 |

EOR (Exclusive OR) Instruction
Format:
| | |
|---|---|
| EOR | Rm, Rn |
| EOR | #imm, R0 |
| EOR.B | #imm, @R1 |

Description

An exclusive OR is taken between the content of the general purpose register Rn and the Rm, and the result is latched in the Rn. A special form can be exemplified by either an exclusive OR between the general register R0 and the zero-extended 8 bit immediate data or an exclusive OR between an 8 bit memory and an 8 bit immediate data relative to the R1.

Operation

```
EOR(long m, long n)    /* EOR Rm,Rn */
{
    R[n] =R[m];
    PC+=2;
}
EORI(long i)    /* EOR #imm,R0 */
{
    R[0]^=(0x000000FF & (long)i);
    PC+=2;
}
EORM(long i)    /* EOR.B #imm,@R1 */
{
    long temp;
    temp(long)Read_Byte(R[1]);
    temp =(0x000000FF & (long)i);
    Write_Byte(R[1], temp);
    PC+=2;
}
```

Example of Use:
| | | |
|---|---|---|
| EOR | R0,R1; | |
| | before execution | R0=H'AAAAAAAA,R1=H'55555555 |
| | after execution | R1=H'FFFFFFFF |
| EOR | #H'F0,R0; | |
| | before execution | R0=H'FFFFFFFF |
| | after execution | R0=H'FFFFFF0F |
| EOR.B | #H'A5,@R1; | |
| | before execution | @R1=H'A5 |
| | after execution | @R1=H'00 |

Code:
| | | MSB LSB |
|---|---|---|
| EOR | r,R | 0001RRRRrrrr1010 |
| EOR | #imm,R0 | 10001010iiiiiiii |
| EOR.B | #imm,@R1 | 10000010iiiiiiii |

EXTS (Code Extension) Instruction
Format:
| | |
|---|---|
| EXTS.B | Rm,Rn |
| EXTS.W | Rm,Rn |

Description

The content of the general purpose register Rm is code-extended, and the result is latched in the Rn. In case of byte assignment, the content of the bit 7 of the Rm is copied from the bit 8 to the bit 31. In case of word assignment, the content of the bit 15 of the Rm is copied from the bit 16 to the bit 31.

Operation

```
EXTSB(long m, long n)   /*EXTS.B Rm,Rn */
{
        R[n]=R[m];
        if ((R[m]&0x00000080)==0) R[n]&=0x000000FF;
            else R[n] | =0xFFFFFF00;
        PC+=2;
}
EXTSW(long m, long n)   /*EXTS.W Rm,Rn */
{
        R[n]=R[m];
        if ((R[m]&0x00008000)==0) R[n]&=0x0000FFFF;
            else R[n] | =0xFFFF0000;
        PC+=2;
}
Example of Use:
    EXTS.B    R0,R1;
        before execution    R0=H'00000080
        after execution     R1=H'FFFFFF80
    EXTS.W    R0,R1;
        before execution    R0=H'00008000
        after execution     R1=H'FFFF8000
Code:            MSB                  LSB
    EXTS.B    r,R    0110RRRRrrrr0010
    EXTS.W    r,R    0110RRRRrrrr0011
EXTU (Zero Extension) Instruction
Format:
    EXTU.B    Rm,Rn
    EXTU.W    Rm,Rn
```

Description

The content of the general purpose register Rm is zero-extended, and the result is latched in the Rn. In case of byte assignment, the value 0 is inserted into the bits 8 to 31 of the Rn. In case of word assignment, the value 0 is inserted into the bits 16 to 31.

Operation

```
EXTUB(long m, long n)   /*EXTU.B Rm,Rn */
{
        R[n]=R[m];
        R[n]&=0x000000FF;
        PC+=2;
}
EXTUW(long m, long n)   /*EXTU.W Rm,Rn */
{
        R[n]=R[m];
        R[n]&=0x0000FFFF;
        PC+=2;
}
Example of Use:
    EXTU.B    R0,R1;
        before execution    R0=H'FFFFFF80
        after execution     R1=H'00000080
    EXTU.W    R0,R1;
        before execution    R0=H'FFFF8000
        after execution     R1=H'00008000
Code:            MSB                  LSB
    EXTU.B    r,R    0110RRRRrrrr0000
    EXTU.W    r,R    0110RRRRrrrr0001
JMP (Unconditional Jump) Instruction
Format:
    JMP       @Rn
```

Description

A delay branch is unconditionally made to an assigned address. The branch destination is the address which is expressed with the 32 bit data of the content of the general purpose register Rn.

Note

An instruction immediately after the present instruction is executed prior to the branch because of a delay branch instruction. No interruption is accepted between the present instruction and the instruction immediately after. This after instruction is recognized as an invalid one if it is a branch instruction.

Operation

```
JMP(long n)   /* JMP @Rn */
{
        unsigned long temp;
        temp=PC;
        PC=R[n]+4;
        Delay_Slot(temp+2);
}
Example of Use:
            .align 4
    JMP_TABLE:  .data.1 TRGET;           Jump table
                MOV JMP_TABLE,R0;        address of R0=TRGET
                JMP @R0;                 branch to TRGET
                MOV R0,R1;               executed before branch
    - - - - - - - - - - - -
    TRGET:      ADD  #1,R1;              branch destination
Code:           MSB                      LSB
    JMP @R           0100RRRR00001010
JSR (Procedure Call) Instruction
Format:
    JSR @Rn
```

Description

A branch is made to a procedure of an assigned address. The content of the PC is resumed to the PR, and the content of the general purpose register Rn is branched to the address which is expressed with 32 bit data. The PC is a leading address which is behind the present instruction by two instructions. The PC is combined with the RTS and is used for the procedure call.

Note

An instruction immediately after the present instruction is executed prior to the branch because of a delay branch instruction. No interruption is accepted between the present instruction and the instruction immediately after. This after instruction is recognized as an invalid one if it is a branch instruction.

Operation

```
JSR(long n)   /* JSR @Rn */
{
        PR=PC;
        PC=R[n]+4;
        Delay_Slot(PR+2);
}
Example of Use:
            .align 4
    JSR_TABLE:  .data.1 TRGET;           jump table
                MOV JSR_TABLE,R0;        address of R0=TRGET
                JSR  @R0;                branch to TRGET
                EOR  R1,R1;              executed before branch
                ADD  R0,R1;              return destination
                                         from procedure
    - - - - - - - - - - - -
    TRGET:      NOP;                     entrance of procedure
                MOV R2, R3;
                RTS;                     return to the above
                                         ADD instruction
                MOV #70,R1;              executed before branch
Code:           MSB                      LSB
    JMP @R           0100RRRR00001011
LDC (CR Transfer) Instruction
Format:
    LDC    Rm, CRn
    LDC.L  @Rm+, CRn
```

Description

A source operand is latched in the control register CRn.

Note

No interruption is accepted by the present instruction.

Operation

```
LDC(long m, long n)   /* LDC Rm,CRn */
{
        switch (n) {
           case 0:    SR=R[m]; PC+=2; break;
           case 1:    PR=R[m]; PC+=2; break;
           case 2:    GBR=R[m]; PC+=2; break;
           default:   Error("Illegal CR number.");
                      break;
        }
}
LDCM(long m, long n)   /* LDC.L @Rm,CRn */
{
        switch (n) {
           case 0:    SR=Read_Long(R[m]); R[m]+=4;
                      PC+=2; break;
           case 1:    PR=Read_Long(R[m]); R[m]+=4;
                      PC+=2; break;
           case 2:    GBR=Read_Long(R[m]); R[m]+=4;
                      PC+=2; break;
           default:   Error("Illegal CR number.");
                      break;
        }
}
Example of Use:
    LDC    R0,SR;
           before execution   R0=H'FFFFFFFF,SR=H'00000000
           after execution    SR=H'000003F7
    LDC.L  @R15+,PR;
           before execution   R15=H'10000000
           after execution    R15=H'10000004, PR=@H'10000000
Code:            MSB                LSB
    LDC    R,cr               0100RRRRrrrr0010
    LDC.L  @R+,cr             0100RRRRrrrr0001
LDBR (BR Transfer) Instruction
Format:
    LDBR
```

Description

The content of the general purpose register R0 is latched in the control register BR.

Note

No interruption is accepted by the present instruction.

Operation

```
LDBR()   /* LDBR */
{
        BR=R[0];
        PC+=2;
}
Example of Use:
    LDBR
           before execution:   R0=H'12345878,BR=H'00000000
           after execution:    BR=H'12345678
Code:            MSB                LSB
    LDBR               0000000000100001
LDVR (VBR Transfer) Instruction
Format:
    LDVR
```

Description

The content of the general purpose register R0 is latched in the control register VBR.

Note

No interruption is accepted by the present instruction.

Operation

```
LDVR()   /* LDVR */
{
        VBR=R[0];
        PC+=2;
}
```

```
Example of Use:
    LDVR;
           before execution:   R0=H'FFFFFFFF,VBR=H'00000000
           after execution:    VBR=H'FFFFFFFF
Code:            MSB                LSB
    LDVR               0000000000001011
MOV (Immediate Data Transfer) Instruction
Format:
    MOV     #imm,Rn
    MOV.W   @(disp,PC),Rn
    MOV.L   @(disp,PC),Rn
```

Description

Immediate data are latched in the general purpose register Rn. The data are code-expanded to 32 bits. If the data are a word/long word, reference is made to the data in the table, which are latched by adding the displacement to the PC. If the data are a word, the displacement is shifted leftward by 1 bit to 9 bits so that the relative distance from the table is −256 to +254 bytes. The PC Is the leading address which is behind the present instruction by two instructions. This makes it necessary to arrange the word data in the boundary of 2 bytes. If the data are a long word, the displacement is shifted leftward by 2 bits to 10 bits, the relative distance from the operand is −512 to +508 bytes. The PC is the leading address, which is behind the present instruction by two instructions, and its less significant two bits are corrected to B, 00. This makes it necessary to arrange the long word data in the boundary of 4 bytes.

Note

The table is not automatically skipped so that it is interpreted as an instruction without any countermeasure. In order to avoid this, the table has to be arranged either at the head of a module or after the unconditional branch instruction. If, however, the table is carelessly arranged immediately after the BSR/JSR/TRAP, a simple return will conflicts with the table. When the present instruction is arranged immediately after the delay branch instruction, the PC is the leading address +2 of the branch destination. The table access of the present instruction is a target of the instruction cache.

Operation

```
MOVI(long i, long n)   /* MOV #imm,Rn */
{
        if ((i&0x80)==0) R[n]=(0x000000FF & (long)i);
           else R[n]=(0xFFFFFF00 | (long)i);
        PC+=2;
}
MOVWI(long d, long n)   /* MOV.W @(disp,PC),Rn */
{
        long disp;
        if ((d&0x80)==0) disp=(0x000000FF & (long)d);
           else disp=(0xFFFFFF00 | (long)d);
        R[n]=(long) Read_Word(PC+(disp<<1));
        if ((R[n]&0x8000)==0) R[n]&=0x0000FFFF;
           else R[n] | =0xFFFF0000;
        PC+=2
}
MOVLI(long d, long n)   /* MOV.L @(disp,PC),Rn */
{
        long disp;
        if ((d&0x80)==0) disp=(0x000000FF & (long)d);
           else disp=(0xFFFFFF00 | (long)d);
        R[n]=Read_Long((PC&0xFFFFFFFC)+(disp<<2));
        PC+=2
}
Example of Use:
    Address
    1000       MOV     #H'80,R1;     R1=H'FFFFFF80
```

-continued

| 1002 | MOV.W | IMM+4,R2; | R2=H'FFFF9ABC |
| 1004 | MOV.L | IMM,R3; | R3=H'12345678 |
| 1006 | NOP; | | position of PC used for address calculations in response to MOV.W instruction |
| 1008 | ADD | #1,R0; | position of PC used for address calculations in response to MOV.L instruction |
| | .align 4; | | |
| 100C | IMM: | .data.1 | H'12345678 |
| 1010 | | .data.w | H'9ABC |
| Code: | | MSB | LSB |
| MOV | #imm,R | | 1101RRRRiiiiiiii |
| MOV.W | @(disp,PC)R | | 1001RRRRdddddddd |
| MOV.L | @(disp,PC)R | | 1011RRRRdddddddd |

MOV (Stack Data Transfer) Instruction
Format:
MOV.L   @(disp,Rm), Rn
MOV.L   Rm, @(disp,Rn)

Description

The source operand is transferred to the destination. The memory operand is present in the stack fame so that the data size is limited to the long word. Hence, the displacement is shifted leftward by 2 bits to 6 bits so that bytes of −32 to +28 can be assigned. If the memory operand fails to be reached, the ordinary MOV instruction is used. However, restrictions arise to fix the register to be used.

Operation

```
            MOVL4(long m, long d, long n)
                    /* MOV.L @(disp,Rm),Rn */
            }
            long disp;
            if ((d&0x8)==0) disp=(0x0000000F & (long)d);
                    else disp=(0xFFFFFFF0 | (long)d);
                    R[n]=Read_Long(R[m]+(disp<<2));
                    PC+=2;
            }
            MOVS4(long m, long d, long n)
                    /* MOV.L Rm,@(disp,Rn) */
            {
            long disp;
            if ((d&0x8)==0) disp=(0x0000000F & (long)d);
                    else disp=(0xFFFFFFF0 | (long)d);
                    Write_Long(R[n]+(disp<<2),R[m]);
                    PC+=2;
            }
            Example of Use:
                MOV.L     @(2,R0),R1;
                          before execution   @(R0+8)=H'12345670
                          after execution    R1=@H'12345670
                MOV.L     R0,@(−1,R1);
                          before execution   R0=H'FFFF7F80
                          after execution    @(R1−4)=H'FFFF7F80
                Code:              MSB              LSB
                MOV.L     @(disp,r),R       0111RRRRrrrrdddd
                MOV.L     r,@(disp,R)       0011RRRRrrrrdddd
```

MOV(I/O Data Transfer) Instruction
Format:
MOV      @(disp,GBR),R0
MOV      R0,@(disp,GBR)

Description

The source operand is transferred to the destination. The data size of the memory operand can be assigned within the range of the byte/word/long word. The base address of the I/O is set to the GBR. If the data of the I/O is the byte size, the displacement has 8 bits so that it can be assigned to a range of −128 to +127 bytes. In case of the word size, the displacement is shifted leftward by 1 bit to 9 bits so that it can be assigned to a range of −256 to +254 bytes. In case of the long word size, the displacement is shifted leftward by 2 bits to 10 bits so that it can be assigned within a range of −512 to +508 bytes. If the memory operand failed to be reached, the ordinary MOV instruction is used. If the source operand is a memory, the loaded data are code-extended to 32 bits and are latched in the register.

Note

For the loading, the destination register is fixed to R0. Hence, the reference to the R0 is caused, if desired in response to an instruction immediate after, to wait for the end of the execution of the load instruction. The optimization is required, as will correspond in the following items ①  and ②, by changing the sequence of the orders:

| MOV.B | @(12,GBR),R0 | | | MOV.B | @(12,GBR),R0 |
| AND | #80,R0 →② | ①→ | | ADD | #20,R1 |
| ADD | #20,R1 →① | ②→ | | AND | #80,R0 |

Operation

```
            MOVBLG(long d)    /* MOV.B @(disp,GBR),R0 */
            {
                    long disp;
                    if ((d&0x80)==0) disp=(0x000000FF & (long)d);
                         else disp=(0xFFFFFF00 | (long)d);
                    R[0]=(long) Read_Byte(GBR+disp);
                    if ((R[0]&0x80)==0) R[0]&=0x000000FF;
                         else R[0]| =0xFFFFFF00;
                    PC+=2;
            }
            MOVWLG(long d)    /* MOV.W @(disp,GBR),R0 */
            {
                    long disp;
                    if ((d&0x80)==0) disp=(0x000000FF & (long)d);
                         else disp=(0xFFFFFF00 | (long) d);
                    R[0]=(long)Read_Word(GBR+(disp<<1));
                    if ((R[0]&0x8000)==0) R[0]&=0x0000FFFF;
                         else R[0]1=0xFFFF0000;
                    PC+=2;
            }
            MOVLLG(long d)    /* MOV.L @(disp,GBR),R0 */
            {
                    long disp;
                    if((d&0x80)==0) disp=(0x000000FF & (long)d);
                         else disp=(0xFFFFFF00 | (long)d);
                    R[0]=Read_Long(GBR+(disp<<2));
                    PC+=2;
            }
            MOVBSG(long d)    /* MOV.B R0,@(disp,GBR) */
            {
                    long disp;
                    if ((d&0x80)==0) disp=(0x000000FF & (long)d);
                         else disp=(0xFFFFFF00 | (long)d);
                    Write_Byte(GBR+disp, R[0]);
                    PC+=2
            }
            MOVWSG(long d)    /* MOV.W R0,@(disp,GBR) */
            {
                    long disp;
                    if ((d&0x80)==0) disp=(0x000000FF & (long)d);
                         else disp=(0xFFFFFF00 | (long)d);
                    Write_Word(GBR+(disp<<1),R[0]);
                    PC+=2;
            }
            MOVLSG(long d)    /* MOV.L R0,@(disp,GBR) */
            {
                    long disp;
                    if ((d&0x80)==0) disp=(0x000000FF & (long)d);
                         else disp=(0xFFFFFF00 | (long)d);
                    Write_Word(GBR+(disp<<2),R[0]);
                    PC+=2;
            }
            Example of Use:
                MOV.L     @(2,GBR),R0;
                          before execution   @(GBR+8)=H'12345670
                          after execution    R0=@H'12345670
                MOV.B     R0,@(−1,GBR);
                          before execution   R0=H'FFFF7F80
```

```
                after execution    @(GBR-1)=H'FFFF7F80
        Code:                MSB                      LSB
        MOV   @(disp,GBR),R0   110011SSdddddddd
        MOV   R0,@(disp,GBR)   100011SSdddddddd
                          Size:
             01 = byte; 10 = Word; 11 = Long Word
        MOV (Transfer) Instruction
        Format:
        MOV   Rm, Rn
        MOV   @Rm, Rn
        MOV   Rm, @Rn
        MOV   @Rm+, Rn
        MOV   Rm, @-Rn
        MOV   @(disp,R1), R0
        MOV   R0, @(disp,R1)
        MOV   @(Rm,R1), Rn
        MOV   Rm, @(Rn,R1)
```

Description

The source operand is transferred to the destination. If the operand is a memory, the data size to be transferred can If the source operand is a memory, the loaded data are code-extended to 32 bits and are latched in a register. If the data of a memory has a byte size in the @ (disp,R1) mode, the displacement has 8 bits so that it can be assigned to a range of −128 to +127 bytes. In case of the word size, the displacement is shifted leftward by 1 bit to 9 bits so that It can be assigned to a range of −256 to +254 bytes. In case of the long word size, the displacement is shifted leftward by 2 bits to 10 bits so that it can be assigned within a range of −512 to +508 bytes.

Note

In the @ (disp,R1) mode, the other operand is fixed in the R0. Hence, in case of the load instruction, like the I/O data transfer instruction, the optimization can be effected, as will correspond in the following items ① and ②, by changing the sequence of the orders:

```
     MOV.B  @(12,R1),R0              MOV.B  @(12,R1),R0
     AND    #80,R0  →②    ①→  ADD    #20,R1
     ADD    #20,R1  →①    ②→  AND    #80,R0
```

Operation

```
MOV(long m, long n)    /* MOV Rm,Rn */
{
        R[n]=R[m];
        PC+=2;
}
MOVBL(long m, long n)    /* MOV.B @Rm,Rn */
{
        R[n]=(long)Read_Byte(R[m]);
        if ((R[n]&0x80)==0) R[n]&=0x000000FF;
           else R[n]|=0xFFFFFF00;
        PC+=2;
}
MOVWL(long m, long n)    /* MOV.W @Rm,Rn */
{
        R[n]=(long)Read_Word(R[m]);
        if ((R[n]&0x8000)==0) R[n]&=0x0000FFFF;
           else R[n]|=0xFFFF0000;
        PC+=2;
}
MOVLL(long m, long n)    /* MOV.L @Rm,Rn */
{
        R[n]=Read_Long(R[m]);
        PC+=2;
}
MOVBS(long m, long n)    /* MOV.B Rm,@Rn */
{
        Write_Byte(R[n],R[m]);
        PC+=2;
}
MOVWS(long m, long n)    /* MOV.W Rm,@Rn */
{
        Write_Word(R[n],R[m]);
        PC+=2;
}
MOVLS(long m, long n)    /* MOV.L Rm,@Rn */
{
        Write_Long(R[n],R[m]);
        PC+=2;
}
MOVBP(long m, long n)    /* MOV.B @Rm+,Rn */
{
        R[n]=(long)Read_Byte(R[m]);
        if ((R[n]&0x80)==0) R[n]&=0x000000FF;
           else R[n]|=0xFFFFFF00;
        if (n!=m) R[m]+=1;
        PC+=2;
}
MOVWP(long m, long n)    /* MOV.W @Rm+,Rn */
{
        R[n]=(long)Read_Word(R[m]);
        if ((R[n]&0x8000)==0) R[n]&=0x0000FFFF;
           else R[n]|=0xFFFF0000;
        if (n!=m) R[m]+=2;
        PC+=2;
}
MOVLP(long m, long n)    /* MOV.L @Rm+,Rn */
{
        R[n]=(long)Read_Long(R[m]);
        if (n!=m) R[m]+=4;
        PC+=2;
}
MOVBM(long m, long n)    /* MOV.B Rm,@-Rn */
{
        Write_Byte(R[n]-1,R[m]);
        R[n]-=1;
        PC+=2;
}
MOVWM(long m, long n)    /* MOV.W Rm,@-Rn */
{
        Write_Word(R[n]-2,R[m]);
        R[n]-=2;
        PC+=2;
}
MOVLM(long m, long n)    /* MOV.L Rm,@-Rn */
{
        Write_Long(R[n]-4,R[m]);
        R[n]-=4;
        PC+=2;
}
MOVBL8(long d)    /* MOV.B @(disp,R1),R0 */
{
        long disp;
        if ((d&0x80)==0) disp=(0x000000FF & (long)d);
           else disp=(0xFFFFFF00| (long)d);
        R[0]=(long)Read_Byte(R[1]+disp);
        if ((R[0]&0x80)==0) R[0]&=0x000000FF;
           else R[0]|=0xFFFFFF00;
        PC+=2;
}
MOVWL8(long d)    /* MOV.W @(disp,R1),R0 */
{
        long disp;
        if ((d&0x80)==0) disp=(0x000000FF&(long)d);
           else disp=(0xFFFFFF00| (long)d);
        R[0]=(long)Read_Word(R[1]+disp<<1);
        if ((R[0]&0x8000)==0) R[0]&=0x0000FFFF;
           else R[0]|=0xFFFF0000;
        PC+=2;
}
MOVLL8(long d)    /* MOV.L @(disp,R1),R0 */
{
        long disp;
        if ((d&0x80)==0) disp=(0x000000FF & (long)d);
           else disp=(0xFFFFFF00| (long)d);
        R[0]=Read_Long(R[1]+disp<<2);
        PC+=2;
```

```
}
MOVBS8(long d)   /* MOV.B R0,@(disp,R1) */
{
        long disp;
        if ((d&0x80)==0) disp=(0x000000FF & (long)d);
            else disp=(0xFFFFFF00| (long)d);
        Write_Byte(R[1]+disp,R[0]);
        PC+=2;
}
MOVWS8(long d)   /* MOV.W R0,@(disp,R1) */
{
        long disp;
        if ((d&0x80)==0) disp=(0x000000FF & (long)d);
            else disp=(0xFFFFFF00| (long)d);
        Write_Word(R[1]+(disp<<1),R[0]);
        PC+=2;
}
MOVLS8(long d)   /* MOV.L R0,@(disp,R1) */
{
        long disp;
        if ((d&0x80)==0) disp=(0x000000FF & (long)d);
            else disp=(0xFFFFFF00| (long)d);
        Write_Long(R[1]+(disp<<2),R[0]);
        PC+=2;
}
MOVBL1(long m, long n)   /* MOV.B @(Rm,R1),Rn */
{
        R[n]=(long)Read_Byte(R[m]+R[1]);
        if ((R[n]&0x80)==0) R[n]&=0x000000FF;
            else R[n]| =0xFFFFFF00;
        PC+=2;
}
MOVWL1(long m, long n)   /* MOV.W @(Rm,R1),Rn */
{
        R[n]=(long)Read_Word(R[m]+R[1]);
        if ((R[n]&0x8000)==0) R[n]&=0x0000FFFF;
            else R[n]| =0xFFFF0000;
        PC+=2;
}
MOVLL1(long m, long n)   /* MOV.L @(Rm,R1),Rn */
{
        R[n]=Read_Long(R[m]+R[1]);
        PC+=2;
}
MOVBS1(long m, long n)   /* MOV.B Rm,@(Rn,R1) */
{
        Write_Byte(R[n]+R[1],R[m]);
        PC+=2;
}
MOVWS1(long m, long n)   /* MOV.W Rm,@(Rn,R1) */
{
        Write_Word(R[n]+R[1],R[m]);
        PC+=2;
}
MOVLS1(long m, long n)   /* MOV.L Rm,@(Rn,R1) */
{
        Write_Long(R[n]+R[1],R[m]);
        PC+=2;
}
Example of Use:
    MOV            R0,R1;
                before execution R0=H'FFFFFFFF,R1=H'00000000
                after execution  R1=H'FFFFFFFF
    MOV.B          @R0,R1;
                before execution @R0=H'80,R1=H'00000000
                after execution  R1=H'FFFFFF80
    MOV.W          R0,@R1;
                before execution R0=H'FFFF7F80
                after execution  @R1=H'7F80
    MOV.L          @R0+,R1;
                before execution R0=H'12345670
                after execution  R0=H'12345674 ,R1=@H'12345670
    MOV.W          R0,@-R1;
                before execution R0=H'AAAAAAAA,R1=H'FFFF7F80
                after execution  R1=H'FFFF7F7E,@R1=H'AAAA
    MOV.W          @(R2,R1),R0;
                before execution R2=H'00000004,R1=H'10000000
                after execution  R0=@H'10000004
    MOV.W          @(H'04,R1),R0;
                before execution R1=H'10000000
```

```
                after execution  R0=@H'10000004
Code:              MSB                          LSB
    MOV            r,R         0110RRRRrrrr1000
    MOV            @r,R        0110RRRRrrrr10SS
    MOV            r,@R        0010RRRRrrrr10SS
    MOV            @r+,R       0110RRRRrrrr11SS
    MOV            r,@-R       0010RRRRrrrr11SS
    MOV            @(r,R1),R   0000RRRRrrrr01SS
    MOV            r,@(R,R1)   0000RRRRrrrr11SS
    MOV            @(disp,R1),R0  110001SSdddddddd
    MOV            R0,@(disp,R1)  100001SSdddddddd
        Here, SS: size, 01=Byte
                        10=Word
                        11=Long Word
MOVA (Valid Address Data Transfer) Instruction
Format:
    MOVA    @(disp,PC),R1
```

Description

The valid address of the source operand is latched in the general purpose register R1. Since the displacement is shifted leftward by 2 bits to 10 bits, the relative distance from the operand ranges from −512 to +508 bytes. The PC is the leading address behind the present instruction by two instructions and has its less significant 2 bits corrected to B'00. Hence, the source operand has to be arranged in the boundary of 4 bytes.

Note

When the present instruction is arranged immediately behind the delay branch instruction, the PC becomes the leading address +2 of the branch destination.

Operation

```
    MOVA(long d)   /* MOVA @(disp,PC),R1 */
    {
            long disp;
            if ((d&0x80)==0) disp=(0x000000FF & (long)d);
                else disp=(0xFFFFFF00| (long)d);
            R[1]=(PC&0xFFFFFFFC)+(disp<<2);
            PC+=2;
    }
Example of Use:
    Address          .align    4
    1000    STR:     .sdata    "XYZP12"
    1006             MOVA      STR,R1;
        address of STR → R1
    1008             MOV.B     @R1,R0;
        R0="X" ← position after correction of less
                  significant 2 bits of PC
    100A             ADD       R4,R5;
        intrinsic position of PC at the time of
        calculation of address of MOVA instruction
    - - - - - - - - -
    2002             BRA       TRGET;
        delay branch instruction
    2004             MOVA      @(-2,PC),R1;
        address of TRGET → R1
    2006             NOP;
        address to be intrinsically latched in R1
Code:              MSB                          LSB
    MOVA    @(disp,PC),R1  11001011dddddddd
MULS (Coded Multiplication) Instruction
Format:
    MULS    Rm,Rn
```

Description

The content of the general purpose register Rn and the Rm are multiplied in 16 bits, and the result of 32 bits is latched in the Rn. The calculation is accomplished in the coded arithmetic operation.

Operation

```
MULS(long m, long n)   /* MULS Rm,Rn */
{
        R[n]=((long)(short)R[n]*(long)(short)R[m]);
        PC+=2;
}
Example of Use:
    MULS    R0,R1;
        before execution    R0=H'FFFFFFFE,R1=H'00005555
        after execution     R1=H'FFFF5556
Code:            MSB                    LSB
    MULS   r,R        0001RRRRrrrr1111
    MULU (Uncoded Multiplication) Instruction
Format:
    MULU   Rm,Rn
```

Description

The content of the general purpose register Rn and the Rm are multiplied In 16 bits, and the result of 32 bits is latched in the Rn. The calculation is accomplished in the uncoded arithmetic operation.

Operation

```
MULU(long m, long n)   /* MULU Rm,Rn */
{
R[n]= ((unsigned long)(unsigned short)R[n]*
      (unsigned long)(unsigned short)R[m]);
      PC+=2;
}
Example of Use:
    MULU    R0,R1;
        before execution    R0=R'00000002,R1=H'FFFFAAAA
        after execution     R1=H'00015554
Code:            MSB                    LSB
    MULU   r,R        0001RRRRrrrr1110
    NEG (Code Negation) Instruction
Format:
    NEG    Rm,Rn
```

Description

A complement of 2 is taken from the content of the general purpose register Rm, and the result is latched in the Rn. The Rm is subtracted from 0, and the result is latched in the Rn.

Operation

```
NEG(long m, long n)    /* NEG Rm,Rn */
{
        R[n]=0-R[m];
        PC+=2;
}
Example of Use:
    NEG     R0,R1;
        before execution    R0=H'00000001
        after execution     R1=H'FFFFFFFF
Code:            MSB                    LSB
    NEG    r,R        0110RRRRrrrr0110
    NEGC (Code Negation with Carry) Instruction
Format:
    NEGC   Rm,Rn
```

Description

The content of the general purpose register Rm and the C bit are subtracted from 0, and the result is latched in the Rn. The borrow is reflected on the C bit in accordance with the arithmetic result.

Operation

```
NEGC(long m, long n)   /* NEGC Rm,Rn */
{
        unsigned long temp;
        temp=R[n];
        R[n]=0-R[m]-C;
        if (temp<R[n]) C=1; else C=0;
        PC+=2;
}
Example of Use:
    NEGC    R0,R1;
        before execution    R0=H'00000001,C=0
        after execution     R1=H'FFFFFFFF,C=1
    NEGC    R2,R3;
        before execution    R2=H'00000000,C=1
        after execution     R3=H'FFFFFFFF,C=1
Code             MSB                    LSB
    NEGC   r,R        0110RRRRrrrr0111
    NOP (No Operation) Instruction
Format:
    NOP
```

Description

Only the increment of the PC is performed, and the execution is shifted to a subsequent instruction.

Operation

```
NOP()  /* NOP */
{
        PC+=2;
}
Example of Use:
    NOP;
            passage of one cycle period
Code:            MSB                    LSB
    NOP                 0000000000000010
    NOT (Logical Negation) Instruction
Format:
    NOT    Rm,Rn
```

Description

A complement of 1 is taken from the content of the general register Rm, and the result is latched in the Rn.

Operation

```
NOT(long m, long n)    /* NOT Rm,Rn */
{
        R[n]=~R[m];
        PC+=2;
}
Example of Use:
    NOT     R0,R1;
        before execution    R0=H'AAAAAAAA
        after execution     R1=H'55555555
Code:            MSB                    LSB
    NOT    r,R        0110RRRRrrrr1100
    OR (Logical Sum) Instruction
Format:
    OR     Rm,Rn
    OR     #imm,R0
    OR.B   #imm,@R1
```

Description

A logical sum is taken between the content of the general purpose register Rn and the Rm, and the result is latched in the Rn. It is also taken as a special form to take a logical sum between the general purpose register R0 and the zero-extended 8 bit immediate data or a logical sum between an 8 bit memory and an 8 bit immediate data in relation to the R1.

47

Operation

```
OR(long m, long n)   /* OR Rm,Rn */
{
        R[n]| =R[m];
        PC+=2;
}
ORI(long i)   /* OR #imm,R0 */
{
        R[0]| =(0x000000FF & (long)i);
        PC+=2;
}
ORM(long i)   /* OR.B #imm,@R1 */
{
        long temp;
        temp=(long)Read_Byte(R[1]);
        Temp| =(0x000000FF & (long)i);
        Write_Byte(R[1],temp);
        PC+=2;
}
Example of Use:
    OR      R0,R1;
            before execution    R0=H'AAAA5555,R1=H'55550000
            after execution     R1=H'FFFF5555
    OR      #H'F0,R0;
            before execution    R0=H'00000008
            after execution     R0=H'000000F8
    OR.B    #H'50,@R1;
            before execution    @R1=H'A5
            after execution     @R1=H'F5
    Code:               MSB             LSB
    OR      r,R             0001RRRRrrrr1011
    OR      #imm,R0         10001011iiiiiiii
    OR.B    #imm,@R1        10000011iiiiiiii
    PASS (Pass Confirmation) Instruction
Format:
    PASS    #imm
```

Description

This is a conditional software interruption instruction referring to the D bit. A debug interruption is issued for D=1. For D=0, on the contrary, only the increment of the PC is performed. If the debug interruption occur, the PC and the SR are released to the stack, and a branch is made to the address which is indicated with the content of a predetermined vector address. The PC is a leading address of an instruction subsequent to the present instruction. At the time of preparing a program, the present instruction is buried in the head of the routine so that the passage can be confirmed, if necessary, with the debug interruption by setting D=1. The routine to be debugged can be decided by referring to the imm code in a debug interruption routine defined in advance. The imm code is a byte data having an address which is set by decrementing the PC on the stack by (-1).

Note

The present instruction is recognized, if arranged just behind the branch instruction, as an invalid instruction irrespective of the value of the D bit.

Operation

```
PASS()   /* PASS #imm */
{
        if (D==1) PC=Read_Long(VBR+PASSVEC)+4;
            else PC+=2;
}
Example of Use:
    _TASK1  .equ    H'01
    ----------
            LDC     SR,R0
            OR.B    #H'04,R0
            STC     R0,SR;
                after execution D=1
    ----------
```

48

```
    TASK1   PASS    #_TASK1;
                branch to _PASS because D=1
            SUB     #1,R5;
                return destination of debug routine
    ----------
    _PASS   MOV.L   @R15,R1;
                entrance of debug routine
            ADD     #-1,R1;
                R1=(PC on stack) - 1
            MOV.B   @R1,R0;
                R0=#_TASK1
            RTE;
                return to the SUB instruction
            NOP;
                executed prior to RTE
    Code:           MSB             LSB
    PASS    #imm    11001001iiiiiiii
    ROTL/ROTR (Rotate) Instruction
Format:
    ROTL    Rn
    ROTR    Rn
```

Description

The content of the general purpose register Rn is rotated clockwise or counterclockwise by 1 bit and the result is latched in the Rn. The bits thus rotated to go outside of the operand are transferred to the C bit.

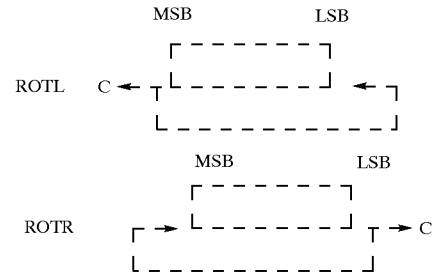

Operation

```
ROTL(long n)   /* ROTL Rn */
{
        if ((R[n]&80000000)==0) C=0; else C=1;
        R[n]<<=1;
        if (C==1) R[n]| =0x00000001; else
R[n]&=0xFFFFFFFE;
        PC+=2;
}
ROTR(long n)   /* ROTR Rn */
{
        if ((R[n]&0x00000001)==0) C=0; else C=1;
        R[n]>>=1;
        if (C==1) R[n]| =0x80000000; else
R[n]&=0x7FFFFFFF;
        PC+=2;
}
Example of Use:
    ROTL    R0;
            before execution    R0=H'80000000,C=0
            after execution     R0=H'00000001,C=1
    ROTR    R0;
            before execution    R0=H'00000001,C=0
            after execution     R0=H'80000000,C=1
    Code:           MSB             LSB
    ROTL    R       0100RRRR00101001
    ROTR    R       0100RRRR00101000
```

-continued

ROTCL/ROTCR (Rotate with Carry Bit)
Instruction
Format:
   ROTCL   Rn        ROTCR  Rn Description The content of the general purpose register Rn is rotated clockwise or counterclockwise by 1 bit with the C bit, and the result is latched in the Rn. The bits thus rotated to go outside of the operand are transferred to the C bit.

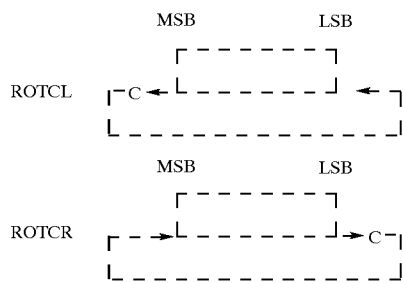

Operation

```
ROTCL(long n)   /* ROTCL Rn */
{
        long temp;
        if ((R[n]&0x80000000)==0) temp=0;
            else temp=1;
        R[n]<<=1;
        if (C==1) R[n]|| =0x00000001;
            else R[n]&=0xFFFFFFFE;
        if (temp==1) C=1; else C=0;
        PC+=2;
}
ROTCR(long n)   /* ROTCR Rn */
{
        long temp;
        if ((R[n]&0x00000001)==0) temp=0;
            else temp=1;
        R[n]>>=1;
        if (C==1) R[n]|| =0x80000000;
            else R[n]&=0x7FFFFFFF;
        if (temp==1) C=1; else C=0;
        PC+=2;
}
Example of Use:
    ROTCL    R0;
             before execution    R0=H'80000000,C=0
             after execution     R0=H'00000000,C=1
    ROTCR    R0;
             before execution    R0=H'00000001,C=1
             after execution     R0=H'80000000,C=1
    Code:    MSB                              LSB
    ROTCL    R         0100RRRR00101011
    ROTCR    R         0100RRRR00101010
    RTB (Return from Break) Instruction
Format:
    RTB
```

Description

A return is made from the brake exception processing routine. Specifically, after the PC has been returned from the BR, an acknowledge signal is returned to an external device, and the processing is continued from the address indicated by the returned PC.

Note

The acceptance of an interruption between the present instruction and the branch destination instruction can be controlled with an RTBMSK signal. With this RTBMSK being inputted, an external interruption such as NMI/IRQ is not accepted. (An address error or the like is accepted.)

Operation

```
RTB()    /* RTB */
{
        PC=BR+4;
}
Example of Use:
    MOV      R0,R9;
    ADD      #-1,R1;
             branch destination of RTB
             (PC released to BR)
    TEST     R1,R1;
    - - - - - - -
    NOP;
    RTB;
             ADD never fails to be executed if RTBMSK is
             inputted. Otherwise, an interruption is ac-
             cepted, and the ADD is not executed.
    Code:           MSB                       LSB
    RTB                    0000000000000001
    RTE (Return from Exceptional Processing)
    Instruction
Format:
    RTE
```

Description

A return is made from the interruption routine. Specifically, the PC and the SR are returned from the stack. The processing is continued from the address indicated by the returned PC.

Note

Because of the delay branch instruction, an instruction immediately after the present instruction is executed before the branch. No interruption between the present instruction and the instruction immediately after. If the latter instruction is a branch one, it is recognized as an invalid instruction. It is necessary that the instruction should not be continuously arranged immediately after a load instruction to the R15. Reference will be erroneously made to the old R15 before the loading. The order of instructions has to be changed in a manner to correspond to the following items ② and ②:

```
MOV      #0,R0       →①  ②→   MOV.L    @R15+,R15
MOV.L    @R15+,R15   →②  ①→   MOV      #0,R0
RTE                                RTE
ADD      #8,R15                    ADD      #8,R15
```

Operation

```
RTE()    /* RTE */
{
        unsigned long temp;
        temp=PC;
        PC=Read_Long(R[15])+4;
        R[15]+=4;
        SR=Read_Long(R[15]);
        R[15]+=4;
        Delay_Slot(temp+2);
}
Example of Use:
    RTE;
             return to basic routine
    ADD      #8,R15;
             executed prior to the branch
    Code:           MSB                       LSB
    RTE                    0000000000010000
```

RTS (Return from Procedure) Instruction
Format:
RTS

Description

A return is made from the procedure. Specifically, the PC is returned from the PR. The processing is continued from the address indicated by the returned PC. With this instruction, a return can be made to the call origin from the procedure which was called by the BSR and JSR instruction.

Note

Because of the delay branch instruction, an instruction immediately after the present instruction is executed prior to the branch. No interruption is accepted between the present instruction and the instruction immediately after. This instruction is recognized, if a branch one, as an invalid instruction.

Operation

```
RTS()   /* RTS */
{
        unsigned long temp;
        temp=PC;
        PC=PR+4;
        Delay_Slot(temp+2);
}
Example of Use:
    TABEL:  .data.1   TRGET;
            jump table
            MOV.L  TABLE,R3;
            address of R3=TRGET
            JSR    @R3;
            branch to TRGET
            NOP;
            executed before the branch
            ADD    R0,R1;
            return destination from the address
            procedure latched by the PR
            - - - - - - -
            - - - - - - -
    TRGET:  MOV    R1,R0;
            entrance of procedure
            RTS;
            content of PC-> PC
            MOV    #12,R0;
            executed before branch
Code:       MSB                        LSB
RTS                    0000000000010001
SETC (C Bit Set) Instruction
Format:
SETC
```

Description

The C bit of the SR is set.

Operation

```
SETC()   /* SETC */
{
        C=1:
        PC+=2;
}
Example of Use:
    SETC;
            before execution    C=0
            after execution     C=1
Code:       MSB                        LSB
SETC                   0000000000011001
SETT (T Bit Set) Instruction
Format:
SETT
```

Description

The T bit of the SR is set.

Operation

```
SETT()   /* SETT */
{
        T=1;
        PC+=2;
}
Example of Use:
    SETT;
            before execution    T=0
            after execution     T=1
Code:       MSB                        LSB
SETT                   0000000000011000
SHAL/SHAR (Arithmetic Shift) Instruction
Format:
SHAL    Rn
SHAR    Rn
```

Description

The content of the general purpose register is arithmetically shifted to the right/left by 1 bit, and the result is latched in the Rn. The bits shifted to the outside of the operand are transferred to the C bit.

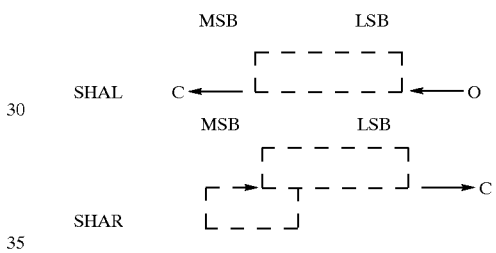

Operation

```
SHAL(long n)   /* Same as SHLL */
SHAR(long n)   /* SHAR Rn */
{
        long temp;
        if ((R[n]&0x00000001)==0) C=0; else; C=1
        if ((R[n]&0x80000000)==0) temp=0; else temp=1;
        R[N]>>=1;
        if (temp==1) R[n] =0x80000000;
            else (R[n]&=0x7FFFFFFF);
        PC+=2;
}
Example of Use:
    SHAL    R0;
            before execution    R0=H'80000001,C=0
            after execution     R0=H'00000002,C=1
    SHAR    R0;
            before execution    R0=H'80000001,C=0
            after execution     R0=H'C0000000,C=1
Code:       MSB                                   LSB
SHAL    R          0100RRRR00011011
SHAR    R          0100RRRR00011000
SHLL/SHLR (Logical Shift) Instruction
Format:
SHLL    Rn
SHLR    Rn
```

Description

The content of the general purpose register Rn is logically shifted to the right/left by 1 bit, and the result is latched in the Rn. The bits shifted to the outside of the operand are transferred to the C bit.

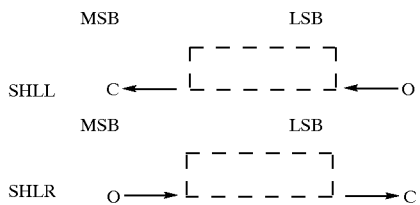

Operation

```
SHLL(long n)  /* SHLL Rn  (Same as SHAL) */
{
        if ((R[n]&0x80000000)==0) C=0; else C=1;
        R[n]<<=1;
        PC+=2;
}
SHLR(long n)  /* SHLR Rn */
{
        if ((R[n]&0x00000001)==0) C=0; else C=1;
        R[n]<<=1;
        R[n]&=0x7FFFFFFF;
        PC+=2;
}
Example of Use:
    SHLL    R0;
            before execution    R0=H'80000001,C=0
            after execution     R0=H'00000002,C=1
    SHLR    R0;
            before execution    R0=H'80000001,C=0
            after execution     R0=H'40000000,C=1
Code:           MSB                         LSB
    SHLL    R       0100RRRR00011011
    SHLR    R       0100RRRR00011010
SLn/SRn (Multi-Bit Shift) Instruction
Format:
    SL2     Rn
    SR2     Rn
    SL8     Rn
    SR8     Rn
    SL16    Rn
    SR16    Rn
```

Description

The content of the general purpose register Rn is logically shifted to the right/left by 2/8/16 bits, and the results are latched in the Rn. The bits shifted to the outside of the operand are disposed.

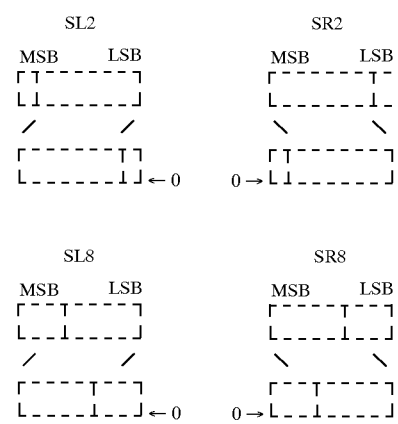

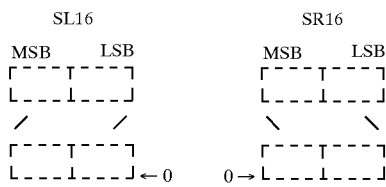

Operation

```
SL2(long n)   /* SL2 Rn */
{
        R[n]<<=2;
        PC+=2;
}
SR2(long n)   /* SR2 Rn */
{
        R[n]>>=2;
        R[n]&=0x3FFFFFFF;
PC+=2;
}
SL8(long n)   /* SL8 Rn */
{
        R[n]<<=8;
        PC+=2;
}
SR8(long n)   /* SR8 Rn */
{
        R[n]>>=8;
        R[n]&==0x00FFFFFF;
        PC+=2;
}
SL16(long n)  /* SR16 Rn */
{
        R[n]<<=16;
        PC+=2;
}
SR16(long n)  /* SR16 Rn */
{
        R[n]>>=16;
        R[n]&=0x0000FFFF;
        PC+=2;
}
Example of Use:
    SL2     R0;
            before execution    R0=H'12345678
            after execution     R0=H'48D159E0
    SR2     R0;
            before execution    R0=H'12345678
            after execution     R0=H'048D159E
    SL8     R0;
            before execution    R0=H'12345678
            after execution     R0=H'34567800
    SR8     R0;
            before execution    R0=H'12345678
            after execution     R0=H'00123456
    SL16    R0;
            before execution    R0=H'12345678
            after execution     R0=H'56780000
    SR16    R0;
            before execution    R0=H'12345678
            after execution     R0=H'00001234
Code:           MSB                         LSB
    SL2     R       0100RRRR00001111
    SR2     R       0100RRRR00001110
    SL8     R       0100RRRR00011111
    SR8     R       0100RRRR00011110
    SL16    R       0100RRRR00101111
    SR16    R       0100RRRR00101110
SLP (Sleep) Instruction
Format:
    SLP
```

Description

The CPU is set to a low power consumption mode.

In this low power consumption mode, the the CPU has its internal status retained to stop execution of the immediately after instruction and to await a demand for interruption. If the demand is issued, the CPU goes out of the low power consumption mode to start an exceptional processing. Specifically, the SR and the PC are released to the stack, and a branch is made to an interruption routine in accordance with a predetermined vector. The PC is the leading address of the instruction immediately after the present instruction.

Operation

```
SLP()    /* SLP */
{
        PC-=2;
        Error("Sleep Mode.");
}
Example of Use:
    SLP;
        transition to a low power consumption mode
Code:       MSB                      LSB
    SLP             0000000000001000
STC (CR Transfer) Instruction
Format:
    STC      CRm,Rn
    STC.L    CRm,@-Rn
Description:
    The control register CRm is assigned to the
    destination.
Note:
    No interruption is accepted by the present in-
    struction.
Operation:
    STC(long m, long n)    /* STC CRm,Rn */
    {
        switch (m) {
            case 0:   R[n]=SR; PC+=2; break;
            case 1:   R[n]=PR; PC+=2; break;
            case 2:   R[n]=GBR; PC+=2; break;
            default:  Error("Illegal CR number."); break;
        }
    }
    STCM(long m, long n)    /* STC.L CRm,@-Rn */
    {
        switch (m) {
            case 0:   R[n]-=4; Write_long(R[n],SR);
                      PC+=2; break;
            case 1:   R[n]-=4; Write_long(R[n],PR);
                      PC+=2; break;
            case 2:   R[n]-=4; Write_long(R[n],GBR);
                      PC+=2; break;
            default:  Error("Illegal CR number."); break;
        }
    }
Example of Use:
    STC      SR,R0;
        before execution    R0=H'FFFFFFFF,SR=H'00000000
        after execution     R0=H'00000000
    STC.L    PR,@-R15;
        before execution    R15=H'10000004
        after execution     R15=H'00000000,@R15=PR
Code:       MSB                      LSB
    STC      cr,R        0000RRRRrrrr0011
    STC.L    cr,@-R      0100RRRRrrrr0000
STBR (BR Transfer) Instruction
Format:
    STBR
```

Description

The content of the control register BR is latched in the general purpose register R0.

Note

No interruption is accepted by the present instruction.

Operation

```
STBR()   /* STBR */
{
        R[0]=BR;
        PC+=2;
}
Example of Use:
    STBR;
        before execution    R0=H'FFFFFFFF,BR=H'12345678
        after execution     R0=H'12345678
Code:       MSB                      LSB
    STBR            0000000000100000
STVR (VBR Transfer) Instruction
Format:
    STVR
```

Description

The content of the control register VBR is latched in the general purpose register R0.

Note

No interruption is accepted by the present instruction.

Operation

```
STVR()   /* STVR */
{
        R[0]=VBR;
        PC+=2;
}
Example of Use:
    STVR;
        before execution    R0=H'FFFFFFFF,VBR=H'00000000
        after execution     R0=H'00000000
Code:       MSB                      LSB
    STVR            0000000000001010
SUB (Subtraction) Instruction
Format:
    SUB      Rm,Rn
```

Description

The Rm is subtracted from the content of the general purpose register, and the result is latched in the Rn. The subtraction with the immediate data is replaced by ADD #imm,Rn.

Operation

```
SUB(long m,long n)   /* SUB Rm,Rn */
{
        R[n]-=R[m];
        PC+=2;
}
Example of Use:
    SUB      R0,R1;
        before execution    R0=H'00000001,R1=H'800000000
        after execution     R1=H'7FFFFFFF
Code:       MSB                      LSB
    SUB      r,R         0010RRRRrrrr0100
SUBC (Subtraction with Carry) Instruction
Format:
    SUBC     Rm,Rn
```

Description

The Rm and the C bit are subtracted from the content of the general purpose register Rn, and the result is latched in the Rn. The borrow is reflected upon the C bit in accordance with the arithmetic result.

Operation

```
SUBC(long m, long n)   /* SUBC Rm,Rn */
{
        unsigned long temp;
        temp=R[n];
        R[n]-=(R[m]+C);
        if (temp<R[n]) C=1; else C=0;
        PC+=2;
}
Example of Use:
   SUBC    R0,R1;
           before execution    C=1,R0=H'00000001,
                               R1=H'00000001
           after execution     C=1,R1=H'FFFFFFFF
   SUBC    R2,R3;
           before execution    C=0,R2=H'00000002,
                               R3=H'00000001
           after execution     C=1,R3=H'FFFFFFFF
Code:              MSB                     LSB
   SUBC    r,R          0010RRRRrrrr0110
SUBS (Subtraction with Saturation Function)
Instruction
Format:
   SUBS    Rm,Rn
```

Description

The Rm is subtracted from the content of the general purpose register Rn, and the result is latched in the Rn. Even if an underflow should occur, the result is restricted within a range of H'7FFFFFFF to H'80000000. At this time, the C bit is set.

Operation

```
SUBS(long m, long n)   /* SUBS Rm,Rn */
{
        long dest,src,ans;
        if ((long)R[n]>=0) dest=0; else dest=1;
        if ((long)R[m]>=0) src=0; else src=1;
        src+=dest;
        R[n]-=R[m];
        if ((long)R[n]>=0) ans=0; else ans=1;
        ans+=dest;
        if ((src==1)&&(ans==1)) {
            if (dest==0) { R[n]=0x7FFFFFFF; C=1; }
            else C=0;
            if (dest==1) { R[n]=0x80000000; C=1; }
            else C=0;
        }
        else C=0;
        PC+=2
}
Example of Use:
   SUBS    R0,R1;
           before execution    R0=H'00000001,R1=H'80000001
           after execution     R1=H'80000000,C=0
   SUBS    R2,R3;
           before execution    R2=H'00000002,R3=H'80000001
           after execution     R3=H'80000000,C=1
Code:              MSB                     LSB
   SUBS    r,R          0010RRRRrrrr0111
SUBV (Subtraction with Underflow) Instruction
Format:
   SUBV    Rm,Rn
```

Description

The Rm is subtracted from the content of the general purpose register Rn, and the result is latched in the Rn. If an underflow occurs, the C bit is set.

Operation

```
SUBV(long m, long n)   /* SUBV Rm,Rn */
{
        long dest,src,ans;
        if ((long)R[n]>=0) dest=0; else dest=1;
        if ((long)R[m]>=0) src=0; else src=1;
        src+=dest;
        R[n]-=R[m];
        if ((long)R[n]>=0) ans=0; else ans=1;
        ans+=dest;
        if (src==1) { if (ans==1) C=1; else C=0; }
        else C=0;
        PC+=2;
}
Example of Use:
   SUBV    R0,R1;
           before execution    R0=H'00000002,R1=H'80000001
           after execution     R1=H'7FFFFFFF,C=1
   SUBV    R2,R3;
           before execution    R2=H'FFFFFFFE,R3=H'7FFFFFFE
           after execution     R3=H'80000000,C=1
Code:              MSB                     LSB
   SUBV    r,R          0010RRRRrrrr0101
SWAP (Swapping) Instruction
Format:
   SWAP.B    Rm,Rn
   SWAP.W    Rm,Rn
```

Description

The more and less significant bits of the content of the general purpose register Rm are interchanged, and the result is latched in the Rn. If the bytes are assigned, the eight bits 0 to 7 of the Rm and the eight bits 8 to 15 are interchanged. If latched in the Rn, the more significant 16 bits of the Rm are transferred as they are to the more significant 16 bits of the Rn. If the words are assigned, the 16 bits 0 to 15 and the 16 bits of 16 to 31 of the Rm are interchanged.

Operation

```
SWAP.B(long m,long n)   /* SWAP.B Rm.Rn */
{
        unsigned long temp0,temp1;
        temp0=R[m]&0xffff0000;
        temp1=(R[m]&0x000000ff)<<8;
        R[n]=(R[m]&0x0000ff00)>>8;
        R[n]=R[n]| temp1| temp0;
        PC+=2;
}
SWAP.W(long m,long n)   /* SWAP.W Rm,Rn */
{
        unsigned long temp;
        temp=R[m]>>8;
        R[n]=R[m]<<8;
        R[n] =temp;
        PC+=2;
}
Example of Use:
   SWAP.B    R0,R1;
             before execution    R0=H'12345678
             after execution     R1=H'12347856
   SWAP.W    R0,R1;
             before execution    R0=H'12345678
             after execution     R1=H'56781234
Code:              MSB                     LSB
   SWAP.B    r,R          0110RRRRrrrr0100
   SWAP.W    r,R          0110RRRRrrrr0101
TAS (Read/Modify/Write) Instruction
Format:
   TAS.B     @Rn
```

Description

The content of the general purpose register Rn is used as an address, and T=1 if the byte data indicated by the address is zero but otherwise T=0. After this, the bit 7 is set to 1 and written. In this meanwhile, the bus priority is not released.

Operation

```
TAS(long n)   /* TAS.B @Rn */
{
        long temp;
        temp=(long)Read_Byte(R[n]);   /* Bus Lock enable */
        if (temp==0) T=1; else T=0;
        temp| =0x00000080;
        Write_Byte(R[n],temp);        /* Bus Lock disable */
        PC+=2;
}
Example of Use:
    _LOOP   TAS.B  @R7;
            R7=1000
    BF      _LOOP;
            looped till 1,000 addresses becomes zero
Code:              MSB                      LSB
    TAS.B  @R         0100RRRR00001000
TEST (Test) Instruction
Format:
    TEST    Rm,Rn
    TEST    #imm,R0
    TEST.B  #imm,@R1
```

Description

An AND is taken between the content of the general purpose register Rn and the Rm, and the T bit is set if the result is zero. The T bit is cleared if the result is not zero. The content of the Rn is not changed. As a special form, there can be taken either an AND between the general purpose register R0 and the zero-extended 8 bit immediate data or an AND between the 8 bit memory in relation to the R1 and the 8 bit immediate data. The content of the memory is not changed.

Operation

```
TEST(long m, long n)   /* TEST Rm,Rn */
{
        if ((R[n]&R[m])==0) T=1; else T=0;
        PC+=2;
}
TESTI(long i)   /* TEST #imm,R0 */
{
        long temp;
        temp=R[0]&(0x000000FF & (long)i);
        if (temp==0) T=1; else T=0;
        PC+=2;
}
TESTM(long i)   /*TEST.B #imm,@R1 */
{
        long temp;
        temp=(long)Read_Byte(R[1]);
        temp&=(0x000000FF & (long)i);
        if (temp==0) T=1; else T=0,
        PC+=2;
}
Example of Use:
    TEST    R0,R0;
            before execution  R0=H'00000000
            after execution   T=1
    TEST    #H'80,R0;
            before execution  R0=H'FFFFFF7F
            after execution   T=1
    TEST.B  #H'A5,@R1;
            before execution  @R1=H'A5
            after execution   T=0
Code:              MSB                      LSB
    TEST   r,R         0001RRRRrrrr1000
    TEST   #imm,R0     10001000iiiiiiii
    TEST.B #imm,@R1    10000000iiiiiiii
TRAP (Software Trap) Instruction
Format:
    TRAP   #imm
```

Description

The trap exceptional processing is started. Specifically, the PC and the SR are released to the stack and branched to the address indicated with the content of the selected vector. This vector is the memory address itself, which is determined by shifting the immediate data leftward by 2 bits for the code extension. The PC is the leading address which is behind the present instruction by two instructions. The PC is combined with the RTE for a system call.

Note

The instruction immediately after the present instruction is executed prior to the branching because of a delay branch. No interruption is accepted between the present Instruction and the subsequent instruction. This subsequent instruction is recognized as an invalid one if it is a branch instruction. The subsequent instruction has to be arranged not consecutively just after the load instruction from the memory to the R15. The old R15 before the loading is erroneously referred to. The order change of instructions has to be accomplished to correspond to the following ① and ②:

```
MOV     #0,R0         →①   ②→  MOV.L   @R15+,R15
MOV.L   @R15+,R15     →②   ①→  MOV     #0,R0
TRAP    #15                      TRAP    #15
```

Operation

```
TRAP(long i)   /* TRAP #imm */
{
        unsigned long temp;
        long imm;
        if ((i&0x80)==0) imm=(0x000000FF & i);
            else imm=(0xFFFFFF00| i);
        temp=PC;
        R[15]-=4;
        Write_Long(R[15],SR);
        R[15]-=4;
        Write_Long(R[15],PC);
        PC=Read_Long(VBR+(imm<<2))+4;
        Delay_Slot(temp+2);
}
Example of Use: Address
    0010        .data.1    10000000;
    - - - - - -
                TRAP    #H'10;
                        branch to address of the content of
                        H'10 address
                ADD     R1,R7;
                        executed prior to the branching
                TEST    #0,R0;
                        return destination of the trap routine
    - - - - - -
    10000000    MOV     R0,R0;
                        entrance of the trap routine
    10000002    RTE;
                        return to the TEST instruction
    10000004    NOP;
                        executed prior to the RTE
Code:              MSB                      LSB
    TRAP   #imm        11000011iiiiiiii
XTRCT (Extract) Instruction
Format:
    XTRCT  Rm,Rn
```

Description

The central 32 bits are extracted from the content of 64 bits linking the general purpose registers Rm and Rn, and the result is latched in the Rn.

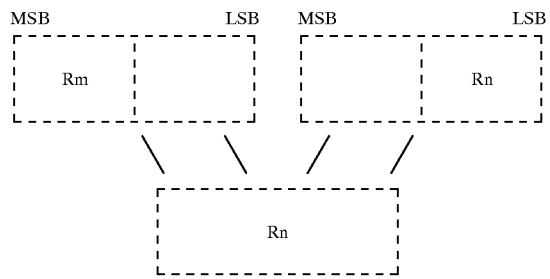

Operation

```
XTRCT(long m, long n)   /* XTRCT Rm,Rn */
{
        unsigned long temp;
        temp=(R[m]<<16)&0xFFFF0000;
        R[n]=(R[n]>>16)&0x0000FFFF;
        R[n]| =R[m];
        PC+=2;
}
Example of Use:
    XTRCT    R0,R1;
            before execution   R0=H'01234567,R1=H'89ABCDEF
            after execution    R1=H'456789AB
    Code:            MSB                LSB
    XTRCT  r,R         0010RRRRrrrr1000
```

Next, embodiments of the coded divisions to be executed by using the microcomputer or the like thus far described will be described in the following.

[18] Principle of Pre-Processing of Dividend in Coded Division

Figure 29:
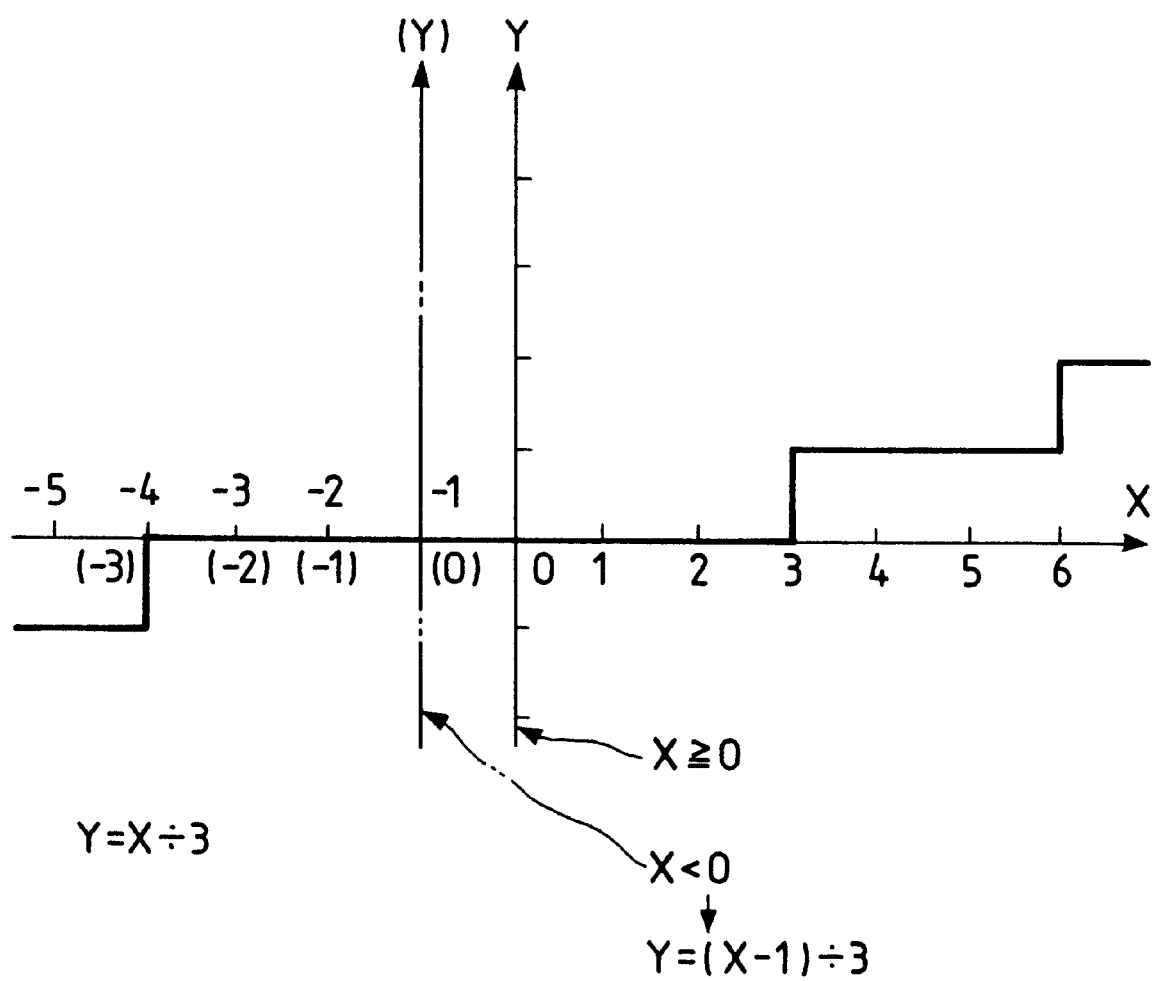
FIG. 29 is a conceptional diagram showing the principle of a preliminary processing for a dividend in a coded division according to the present invention.

FIG. 29 conceptionally shows the principle of a pre-processing of a dividend in a coded division according to the present embodiment. In the coded division expressed by Y (Quotient)=X (Dividend)÷3 (Divisor), for example, the value (X−1), i.e., the difference obtained by subtracting 1 from the dividend X is used as a dividend if the dividend is negative. Conceptionally, the division is processed in the state, in which the coordinate of the quotient Y is shifted leftward by 1, as shown in the same Figure. Thus, it is needless unlike the prior art to decide whether or not the partial remainder is zero, at each time in the course of the operation for determining the quotient and to provide a hardware for the decision. When an accurate rest is to be determined, the rest determined at last is corrected.

[19] Processing Procedure of Principle Example of Coded Division

FIG. 30 shows the processing procedure of a principle example of the coded division in case the dividend is negative. In the same Figure, the division of −9÷−3 is an example. The number "−9" is expressed by "110111" in a complement of 2, and the number "−3" is expressed by "101". Since the dividend is negative, the value "110110" obtained by subtracting 1 from −9 is used as the dividend. The code of the quotient is determined (*1) from the exclusive OR of the code "1" of the dividend and the code "1" of the divisor. The first calculation of the partial remainder is executed by adding or subtracting the dividend "110110" and the value "1101" extended from the code bit of the divisor to the more significant side (i.e., to the left), while the digits of the code bits are equalized. The calculation is the subtraction, if the exclusive OR of the two code bits are 0, and the addition if the exclusive OR is 1 (*2). The subtraction is executed in case of this example. As a result, the first partial remainder "000010" is obtained. The quotient corresponding to the first partial remainder is given (*3) by the inverted logical value of the exclusive OR between the most significant bit of the partial remainder and the code bit of the divisor. Likewise, the quotient bits are sequentially determined. In case an accurate rest is necessary, the value 1 is added to the final remainder in accordance with this example. In case the division is executed while leaving the dividend at the value "110111" as it is, as shown at the lower side in the same Figure, a correct quotient bit is not determined as its because all the bits of the remainder are set to "0". Therefore, whether or not all the bits of the partial remainder is "0" is decided each time the partial remainder is calculated. If YES, the logical value of the quotient bit has to be inverted. Incidentally, FIG. 31 shows one example of a coded division in case of negative÷positive, and FIG. 32 shows individual examples of the coded divisions in cases of positive÷positive and positive÷negative.

[20] Whole Processing Procedure of Coded Division

FIG. 33 is a general format showing the entirety of the basic assumptions or processing procedures of a coded division according to the present embodiment, which seem to have been schematically understood from the description thus far made.

(1) A correction is made for a dividend. Specifically, the value 1 is subtracted from the dividend, as shown in FIG. 34(A), if the dividend is negative. This processing could be individually executed by examining the code of the dividend, but the method of extracting the code bit of the dividend to subtract the code bit from the dividend is adopted in the present embodiment. In other words, the operation of subtracting the code bit or the MSB of the dividend is adopted as a pre-processing of the division. Since the MSB of the dividend is 1 if the dividend is negative, the value 1 is subtracted from the dividend. Since the dividend has a MSB of 0 if positive, it is left as it is. Thus, by adopting the processing of subtracting the MSB from the dividend having the MSB, the division program can be prepared without considering whether the dividend is positive or negative. Since, moreover, such decision is not required, the division processing is speeded up, and still the better the division itself can be executed by using a common circuit notwithstanding whether the dividend is positive or negative.

Here, the value to be subtracted from the dividend is understood to have the weight of the LSB of the dividend. The bit position or digit of the dividend, from which the aforementioned value "1" is to be subtracted, is the least significant bit (LSB) of the dividend. The reason why we dare to make such description is to consider the case, in which the dividend has a fixed point, as has been described hereinbefore. Moreover, noting that the code bit is 1 if the dividend is negative and 0 if positive, it is the subtraction of 1 from the negative dividend if the code bit (i.e., the MSB) of the dividend) is subtracted from the dividend having the code bit. This could be deemed as a transformation from the negative integer expressed in the complement of 2 into the complement of 1. Thus, the pre-processing for the dividend can be executed without considering whether the dividend is positive or negative. FIG. 35 shows the state of transformation, in which the value 1 is subtracted from a negative integer of 4 bits. Since extra 1 bit is necessary for transforming the minimum of the complement of 2 of a finite bit number into a complement of 1, a 1 bit extension is executed if necessary. Since the partial remainder may be positive, on the other hand, the aforementioned transformation for the negative integer is extended all over the integer to introduce an expression of a new integer. An expression shown in FIG. 36 is adopted within a range of a coded integer of 4 bits, for example. Incidentally, if an arbitrary integer is expressed by ZZ in the expression, in which the value 1 is subtracted from that number, the expression ZZ, which has been subjected to a transformation of subtracting 1 from the integer using a complement of 2, can be deemed as identical to the complement of 1 so that it can be expressed by a number 0 or more, which is smaller by 1 than the intrinsic value. At this time, the code bit of 0 is 1 as in a negative number.

(2) The code of a quotient is determined from a dividend and a divisor, as shown in FIG. 34(B). Specifically, the code of the quotient is predicted from the exclusive OR between the code of the dividend and the code of the divisor.

(3) Quotient bits are made while determining the partial remainders sequentially. The addition and subtraction commands for determining the partial remainder are determined in accordance with FIG. 37(A). Specifically, if the exclusive OR between the code Q of the partial remainder (or dividend) and the code M of the divisor is 0, the subtraction is commanded to subtract the divisor schematically from the partial remainder (or dividend). If the exclusive OR between the code Q of the partial remainder (or dividend) and the code M of the divisor is 1, the addition is commanded to add the divisor schematically to the partial remainder (or dividend). The quotient bit is obtained, as shown in FIG. 37(B), by inverting the result of the exclusive OR between the code bit of the partial remainder after the aforementioned subtraction or addition and the code bit of the divisor.

Here will be described in more detail the method of calculating the quotient bit. The summed contents of the quotient bit calculating method are classified into the following a), b), c) and d), as shown in FIG. 37(B):

a) Case of A÷B (A≧0, B>0, A and B: complements of 2)

As Is well known in the art, the quotient bit is set to 1, if the code bit of the partial remainder is 0, and to 0 if the code bit of the partial remainder is 1.

b) Case of A÷B (A≧0, B<0, A and B: complements of 2)

Since the quotient is negative, how to make the quotient bit is inverted from the case of (a). In short, the quotient bit is set to 0, if the code bit of the partial remainder is 0, and to 1 if the code bit of the partial remainder is 1. The quotient is a complement of 1. The quotient is finally transformed into a complement of 2, as will be described in a later-described item <4>, if all the quotient bits are determined.

c) Case of A÷B (A<0, B<0, A and B: complements of 2)

The weight 1 of the LSB of the dividend is subtracted in advance from the dividend having the LSB. Negative expressions of the dividend and the present embodiment are complements of 1, and the positive expression is smaller than the intrinsic value by the weight 1 of the LSB. The code bit MSB is set to 1, if less than 0, and to 0 if more than 0. Since the quotient is positive, the quotient bit is set to 1, if the code bit MSB of the present embodiment is 1, and to 0 if the code bit MSB of the present embodiment is 0.

d) Case of A÷B (A<0, B>0, A and B: complements of 2)

The weight 1 of the LSB of the dividend is subtracted in advance from the dividend having the LSB. Negative expressions of the dividend and the present embodiment are complements of 1, and the positive expression is smaller than the intrinsic value by the weight 1 of the LSB. The code bit MSB is set to 1, if less than 0, and to 0 if more than 0. Since the quotient is negative, how to make the quotient bit is inverted from that of the case (c). The quotient bit is set to 1, if the code bit MSB of the present embodiment is 1, and to 0 if the code bit MSB of the present embodiment is 0. The quotient is finally transformed into a complement of 2, as will be described in a later-described item <4>, if all the quotient bits are determined.

<4> The quotient obtained in the aforementioned Item <3> may not always be an accurate value due to its code. This is because the quotient is a complement of 1 when its code determined in the aforementioned item <2> is 1. As a result, the final quotient is determined in accordance with the code of the aforementioned quotient and the quotient bit. Since the quotient is expressed, if negative (wherein the code bit of the quotient is 1), by a complement of 1, as shown in FIG. 38, a correction is executed by adding 1 to the quotient obtained in the item <3> to transform it into a complement of 2. Thus, a correct quotient is determined. Moreover, a remainder correction for the final present embodiment is executed, as shown in FIG. 38.

[21] Specific Examples of Coded Division

Figure 39:
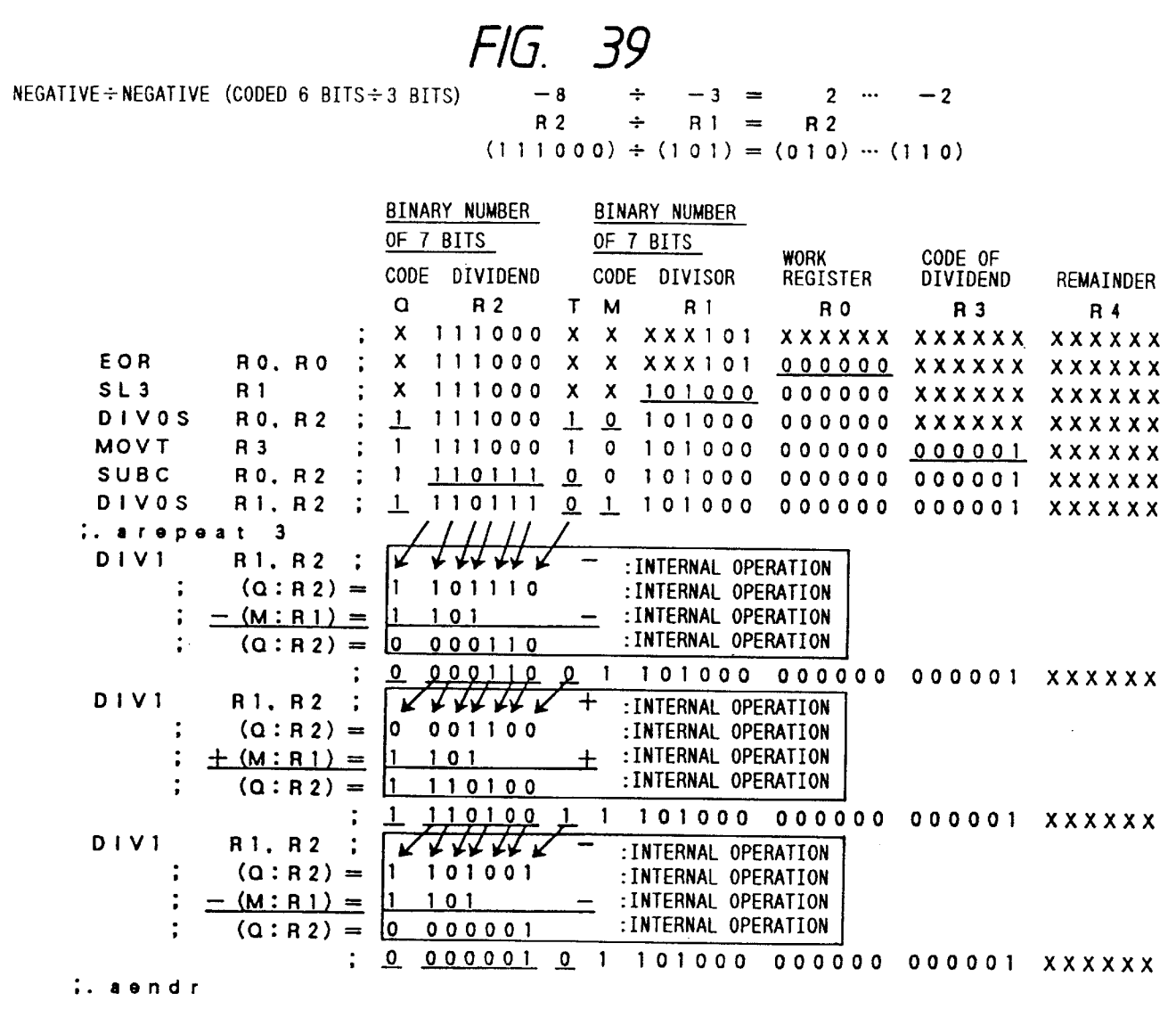

FIGS. 39 and 40 show a specific example of the processing which adopts the aforementioned basic procedures of the coded division. The shown example is directed to a coded division of −8÷−3, which will be described as using a general purpose register of 6 bits so as to facilitate their understanding. FIG. 40 shows the processing to be executed subsequent to the final processing shown in FIG. 39, and the descriptions in the column direction are made identical to those of FIG. 39. In these Figures, characters R0 to R4 designate individual general purpose registers of 6 bits, and letters Q, M and T designate bit flags in the control registers or status registers. Of these: the letter Q designates the bits for latching the codes of the dividends or partial remainders; the letter M designates the bits for latching the codes of the divisors; and the letter T designates the bits for latching the quotient bits or carries. At the lefthand ends of the Figures, there are described the instruction codes and the operands, and the contents of the general purpose registers and the bit flags are shown in the corresponding columns. In the descriptions indicating the contents of the general purpose registers and the bit flags, the underlined contents mean that they are updated by executing the corresponding instructions. Letter X designates the bits having their values unfixed. Under this item, the processing of the coded division will be sequentially described, and examples of the symbols to be used in the description will be enumerated in the following: ←: to latch;

MSB (Rn): the MSB (Most Significant Bit) of the register Rn;

LSB (Rn): the LSB (Least Significant Bit) of the register Rn;

: operator indicating an exclusive OR;

Rn<<=1: a leftward shift of the value of the register Rn by 1 bit;

Rn>>=1: a rightward shift of the value of the register Rn by 1 bit;

(Q:Rn): a binary number of 7 bits made by adding the Q bit to the MSB of the register Rn;

(M:Rn): a binary number of 7 bits made by adding the M bit to the MSB of the register Rn;

~: an operator indicating a negation (bit inversion);

Clockwise Rotation of (Rn:T): that the value of the register Rn is shifted rightward while shifting the T bit in the MSB of the register Rn to latch the LSB of the shifted-out value in the T bit; and Counterclockwise Rotation of (Rn:T): that the value of the register Rn is shifted leftward while shifting the T bit in the LSB of the register Rn to latch the MSB of the shifted-out value in the T bit.

(1) EOR R0,R0

R0←0: the values of the register R0 are wholly set to 0.

(2) SL3 R1 the less significant 3 bits (divisor) of the register R1 are shifted leftward to more significant 3 bits.

(3) DIVOS R0,R2

Q←MSB (R2), M←MSB(R0)=0, T←QM=Q0=Q. Hence, the codes of the dividends are latched in the T bits.

(4) MOVT R3

R3←T. The codes of the dividends are latched in the LSB (R3). These codes are required for determining the rests.

(5) SUBC R0,R2

R2←(R2-T). The complement of 2 is transformed into a complement of 1. This is equivalent to that the value 1 is subtracted from the dividend latched in the R2, if the dividend is negative. As a matter of fact, this processing is to subtract the value of the code bit MSB of a dividend from the dividend. Hence, it is needless to detect whether the dividend is positive or negative, so that a common instruction can be executed in either case. In other words, there is eliminated the processing flow, in which a branching is made to subtract 1 if the dividend is negative.

(6) DIVOS R1,R2

Q←MSB(R2): the code of the dividend is obtained in the Q bit;

M←MSB(R1): the code of the divisor is obtained in the M bit;

T←QM: the code of the quotient is obtained.

(7) DIV1 R1,R2

The instruction DIV1 R1,R2 between ".arepeat 3" and ".aendr" is repeated three times.

In each execution cycle of the instruction DIV1:

a subtraction Instruction is issued for QM=0. and an addition instruction is issued for QM=1;

the Q bit is obtained by Q←MSB(R2); the dividend of the R2 is shifted leftward by 1 bit by R2<<=1; and the T bit (the code of the quotient at this time) is latched in the LSB of the R2 by LSB(R2)←T;

the operation is executed according to the addition/subtraction commands by (Q:R2)←(Q:R2)±(M:R1); and the quotient bit is latched in the T bit by T←~(QM).

By executing the instruction DIVI three times: code of the last partial remainder is introduced into the Q bit; the least significant bit of the quotient is introduced into the T bit; the last partial remainder is introduced into the more significant 3 bits of the R2; and the quotient is introduced into the less significant 3 bits of the same. The code of the quotient obtained in the T bit by the (6) DIVOS R1,R2 is introduced into the less significant 3rd bit.

(8) MOV R2,R4

The R2 is copied to the R4. This is to determined the rest by making use of the R4.

(9) EXTS.W R2,R2

The less significant 3rd bit is code-extended to the more significant 3 bits. This code indicates the code of the quotient.

(10) ROTCL R2

The (R2:T) is rotated counterclockwise. Specifically, the value of the register R2 is shifted leftward while shifting the T bit in the LSB of the register R2 to latch the MSB of the shifted-out value in the T bit. As a result, the quotient is latched in the less significant 3 bits of the R2, and the code of the quotient is latched in the T bit.

(11) ADDC R0,R2

A complement of 1 is transformed into a complement of 2 by R2←R2+T. Specifically, immediately before execution of this instruction, the quotient is latched by the R2, and its code is latched in the T bit. As a result, the complement of 1 is transformed, if latched by the R2, into the complement of 2 by adding the value of the T bit to the value of the R2. Since T=0 when the quotient is negative, the value of the R2 is transformed from the complement of 1 to the complement of 2 by adding the T. Thus, a correct quotient is determined.

(12) DIVOS R0,R4

The MSB (the code of the rest) of the R4 is latched in the Q bit by Q←MSB(R4);

The MSB of the R0 (=0) is latched in the M bit by M←MSB(R0); and the exclusive OR between the Q bit and the M bit, i.e., the Q bit (the code of the rest) is latched in the T bit by T←Q M=Q0=Q, so that the code of the rest is obtained at the T bit.

(13) MOVT R0

The code of the rest before correction, which is latched in the T bit, is latched in the LSB of the R0 by R0←T. This is used to correct the rest.

(14) EOR R3,R0

The result of the exclusive OR between the code of the dividend and the code of the rest before correction is latched in the LSB of the R0 by R0←R3R0.

(15) ROTCR R0

By the clockwise rotation of (R0:T), the value of the register R0 is shifted rightward while shifting the T bit in the MSB of the register R0 to latch the LSB of the shifted-out value in the T bit. As a result, the result of the exclusive OR between the code of the dividend and the code of the rest before correction is introduced into the T bit.

(16) BF L1

If the value of the T bit is 0, a branching is made to the label L1. No correction of the rest is necessary because the codes of the dividend and the rest are identical for T=0.

(17) DIVOS R1,R4

The code of the rest before correction is latched in the Q bit by Q←MSB(R4);

The code of the divisor is latched in the M bit by M←MSB(R1); and

The result of the exclusive OR between the Q bit and the M bit is latched in the T bit by T←QM.

(18) ROTCR R4

By the clockwise of (R4:T), a processing is executed for negating the leftward shift of the following DIV1 instruction.

(19) DIV1 R1,R4

A subtraction command is issued for QM=0, and an addition command is issued for QM=1;

The Q bit is obtained by Q←MSB(R4); the value of the R4 is shifted leftward by 1 bit by R4<<=1; and the T bit (having the result of the exclusive OR between the code of the divisor and the code of the rest before correction at this time) is latched in the LSB of the R4 by LSB(R4)←T;

The 7 bits summed of the M bit and the value of the R1 are added to or subtracted from the 7 bits summed of the Q bit and the value of the R4 by (Q:R4)←(Q:R4)±(M:R1) in accordance with the decision result for the aforementioned addition/subtraction, and the result is latched in the Q bit and the R4; and The value inverted from the result of that exclusive OR is latched in the T bit by T←~(QM).

(20) SR3 R4

The more significant 3 bits (corresponding to the rest) of the R4 are shifted rightward to the less significant 3 bits of the R4.

(21) ADD R3,R4

The R3 latches the code of the dividend. The R4 latches the rest before correction. Since the code of a dividend is subtracted from the dividend by the aforementioned instruction (5) of SUBC R0,R2, the correct rest is obtained at the less significant 3 bits of the R4 by adding the R3 to the R4, that is, by transforming the rest, if a complement of 1, into a complement of 2.

(22) EXTS.W R4,R4

The more significant side of the R4 for latching the corrected rest in the less significant 3 bits is code-extended to determine the final rest with the total 6 bits.

Here in the foregoing descriptions of FIGS. 39 and 40,in the repetition of three times of the DIV1 instruction, both the quotient and the rest are latched in the R2, and the value of this R2 is shifted leftward (R2<<=1) bit by bit at each time of execution of the DIV1 instruction. If, in this regard, it is necessary as in the operation method of the prior art to decide whether or not all the bits of the partial remainder are 0, in case the dividend is negative, the decision has to be executed relatively complicatedly by changing at each time the digit position of the partial remainder to be decided in the R2. In the operation method, therefore, in which whether or not all the bits of the partial remainder are 0 has to be decided as in the prior art in case the dividend is negative, the decision need not be executed by changing the digit position of the partial remainder at each time if the quotient and the rest are latched in different registers. In this modification, on the contrary, the number of transfer instructions to be executed for latching the quotient and the rest in the different registers is increased. Since, in case of the present embodiment, it is needless to decide at each time whether or not all the bits of the partial remainder are 0, the number of instructions to be executed can be reduced by latching both the quotient and the rest in the R2, to facilitate the speed-up of the processing of the coded division.

Incidentally: FIGS. 41 and 42 show a specific example of the processing of a coded division of −8÷3; FIGS. 43 and 44 show a specific example of the processing of a coded division of −9÷−3; FIGS. 45 and 46 show a specific example of the processing of a coded division of −9÷3; FIGS. 47 and 48 show a specific example of the processing of a coded division of 8÷3; and FIGS. 49 and 50 show a specific example of the processing of a coded division of 8÷−3. These contents are different from those of FIGS. 39 and 40 in the values of the dividend and the divisor, and their detailed description will be omitted.

[22] Operation Unit for Coded Division

Figure 51:
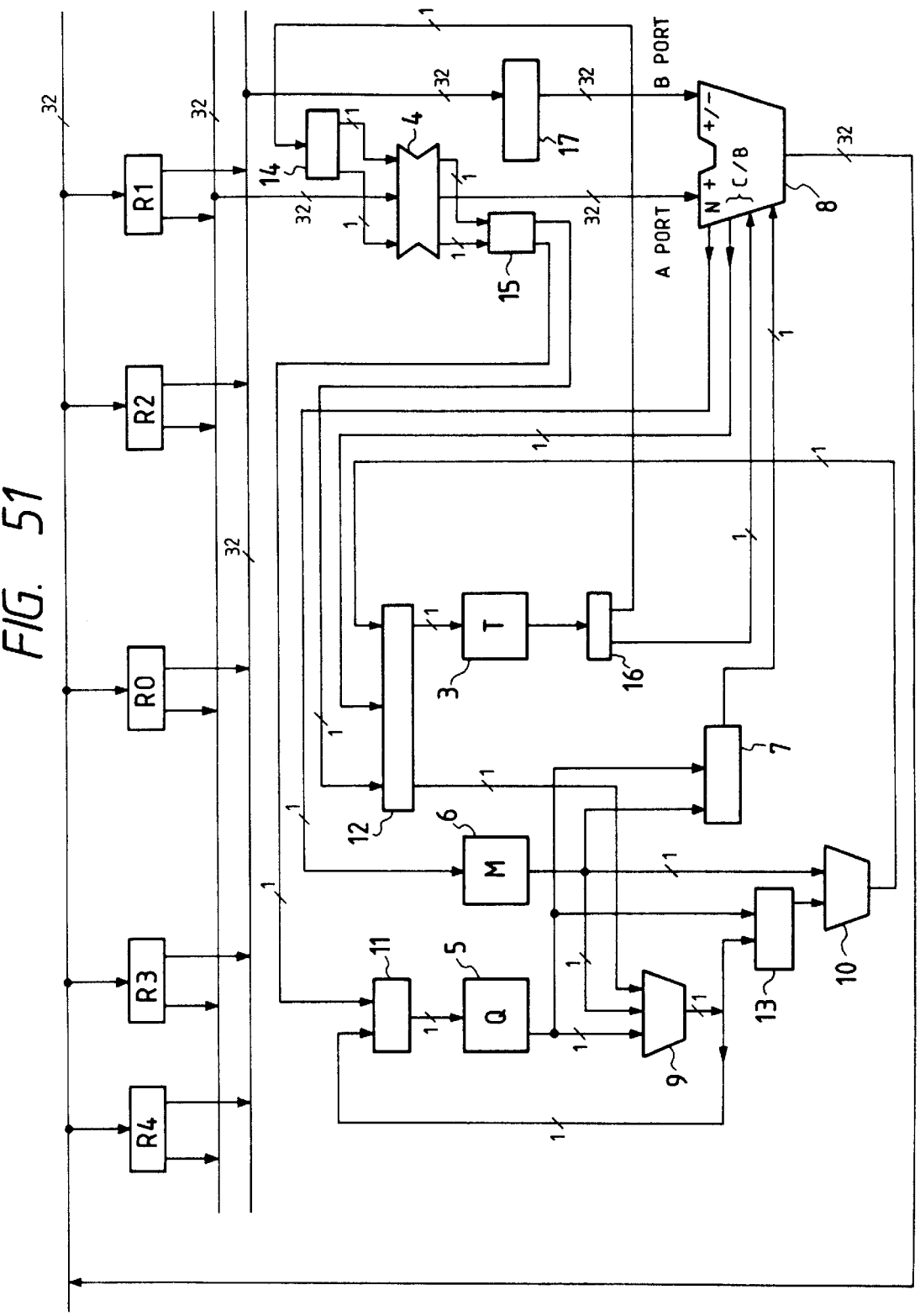
FIG. 51 is a block diagram showing one embodiment of an operation unit for a coded division.

FIG. 51 shows one embodiment of the operation unit capable of executing the aforementioned coded division. This operation unit can be grasped as a different expression which is so modified from the general purpose register block GRB and the operation block OPB shown in FIGS. 6 and 7 as to facilitate the explanation of the coded division. In FIG. 51, the operation unit is represented by five general purpose registers R0 to R4. The register R2 is used to latch a dividend or partial remainder, and the register R1 is used to latch a divisor. Numeral 3 designates a control bit register (i.e., third control bit latch means) for latching the code bit of a quotient or a quotient bit temporarily. This control bit register 3 will be shortly referred to the "T bit" in the following. Numeral 4 designates a shifter which is made responsive to the command of a shift control signal to shift in the aforementioned T bit to the less significant bit or the most significant bit through a selector circuit 14 and to shift out the most significant bit or the least significant bit to a selector circuit 15. In response to the command of a shift control signal, moreover, this shifter logically shifts either the more significant 16 bits of a 32 bit input to the less significant 16 bits or the less significant 16 bits to the more significant 16 bits, and outputs it. Numeral 5 designates a control bit register (i.e., first control bit latch means) for playing the role of a bit which is added to a higher bit than the most significant bit of the dividend or partial remainder. This control bit register will be shortly referred to as the "Q bit". Numeral 6 designates a control bit register (i.e., second control bit latch means) for playing the role of a bit which is added to a higher bit than the most significant bit of the divisor. This control bit register 6 will be shortly referred to as the "M bit" . Numeral 7 designates an operation control circuit for instructing an addition/subtraction to an arithmetic logical operation circuit 8. This numeral 8 designates an arithmetic logical operation circuit of 32 bits. This arithmetic logical operation circuit 8 can add or subtract the input of a B port to or from the input of an A port in accordance with the command of the operation control circuit 7 and can output the result to a bus linked to the dividend register R2 or the like, and executes an arithmetic logical operation with carry or borrow flags. The arithmetic logical operation circuit 8 is further enabled not only to output the input MSB (Most Significant Bit) of the B port to the M bit but also to execute operations such as an addition, a subtraction with carry, an addition with carry, an exclusive OR (EOR) or a logical AND. Numeral 9 designates an operation circuit for adding or subtracting the value of the control bit register 6 to or from the value of the control bit register 5 together with the carry or borrow of the arithmetic logical operation circuit 8. Numeral 10 designates can calculate the negation between the result of the operation circuit 9 and the exclusive OR of the control bit register to output the result to the selector circuit 12 and can calculate the exclusive OR between the value of the control bit register 5 and the value of the control bit register 6 to output the result to the selector circuit 12. Numeral 11 designates a selector circuit for selecting the input of the control bit register 5 and for selecting either of the output from the shifter through the selector circuit 15 or the output from the operation circuit 9. The numeral 12 designates the selector circuit for selecting any of the carry or borrow of the arithmetic logical operation circuit 8, the operation result of the operation circuit 10 and the output of the selector circuit 15 to output the selected one to the control bit register 3 or the operation circuit 9. Numeral 13 designates a selector circuit for selecting and outputting either of the selector circuit 11 for selecting the input to the control bit register 5 and the selector circuit 13 for selecting the input to the operation circuit 9. Numeral 16 designates a selector circuit for feeding the output of the control register 3 to the arithmetic logical operation circuit 8 or the selector circuit 14. Numeral 17 designates a code extension circuit which has its input connected with the B port of the arithmetic logical operation circuit 8. This code extension circuit 17 can execute a zero extension, too.

FIG. 52(A) shows one example of the arithmetic logical operation circuit 8, the operation circuit 9, the operation circuit 10 and the operation control circuit 7, which are shown in FIG. 51. The operation control circuit 7 is constructed, as shown at (b) of the same Figure, to include a two-input type exclusive OR circuit and an exclusive OR circuit having two inputs for the output of the former and a control signal. The operation circuit 7 outputs the output of the former exclusive OR circuit as it is, if the control signal is 0, and negates (inverts) and outputs the output of the former exclusive OR circuit if the control signal is 1. The operation control circuit 10 is constructed, as shown at (d) in FIG. 52, to include a two-input type exclusive OR circuit and an exclusive OR circuit having two inputs for the output of the former and a control signal. The operation circuit 10 outputs the output of the former exclusive OR circuit as it is, if the control signal is 0, and negates (inverts) and outputs the output of the former exclusive OR circuit if the control signal is 1. As shown at (a) In FIG. 52, the arithmetic logical operation circuit 8 is equipped with full adders of 32 bits, as its logics for additions and subtractions are representatively shown. Characters B00 to B31 designate B port inputs; characters A00 to A31 designate A port inputs; characters C/B designate carry/borrow; and letters SUB designate the output of the operation control circuit.

[23] Examples of Operation of Operation Unit for Coded Division

FIG. 53 shows one example of an instruction array for a coded division. The description shown in the same Figure is to determine the quotient and the remainder (or rest) by executing a coded division of 32 bits÷16 bits using the circuit shown in FIG. 51. In this division, the dividend of coded 32 bits is latched by the register R2, and the divisor of coded 16 bits is latched in the register R1, as expressed in the following:

R2÷R1=R2 - - - R4.

The quotient is latched in the register R2, and the remainder is latched in the register R4.

FIGS. 54 to 74 show the operations of the circuit of FIG. 51 sequentially when the instructions of FIG. 53 are sequentially executed, and FIGS. 75 to 81 likewise show the operations sequentially while stressing the states of the registers. With reference to these Figures, the operations of the operation units will be described sequentially at the unit of instruction for the coded division. Incidentally, in the following description, it is assumed that the 32 bit data are divided by the 16 bit data, as has been described hereinbefore. It is also assumed that the dividend and the divisor are given as complements of 2 having code bits as their most significant bits and that the quotient is also given as a complement of 2. In this description, the detection of the overflow of the quotient is not executed. In case the dividend is the negative minimum of the complement of 2, the processing procedure is different from the intended algorithm. In this case, the overflow never fails to occur so that the quotient is not warranted. The detection of the overflow is executed, if necessary, in advance. As the prerequisite for executing the instruction array of FIG. 53, the 16 bit coded divisor is latched in the register R1, and the dividend is latched in the register R2. The registers are used as the working registers. The quotient is latched in the register R2.

(1) EOR R0,R0

Figure 54:
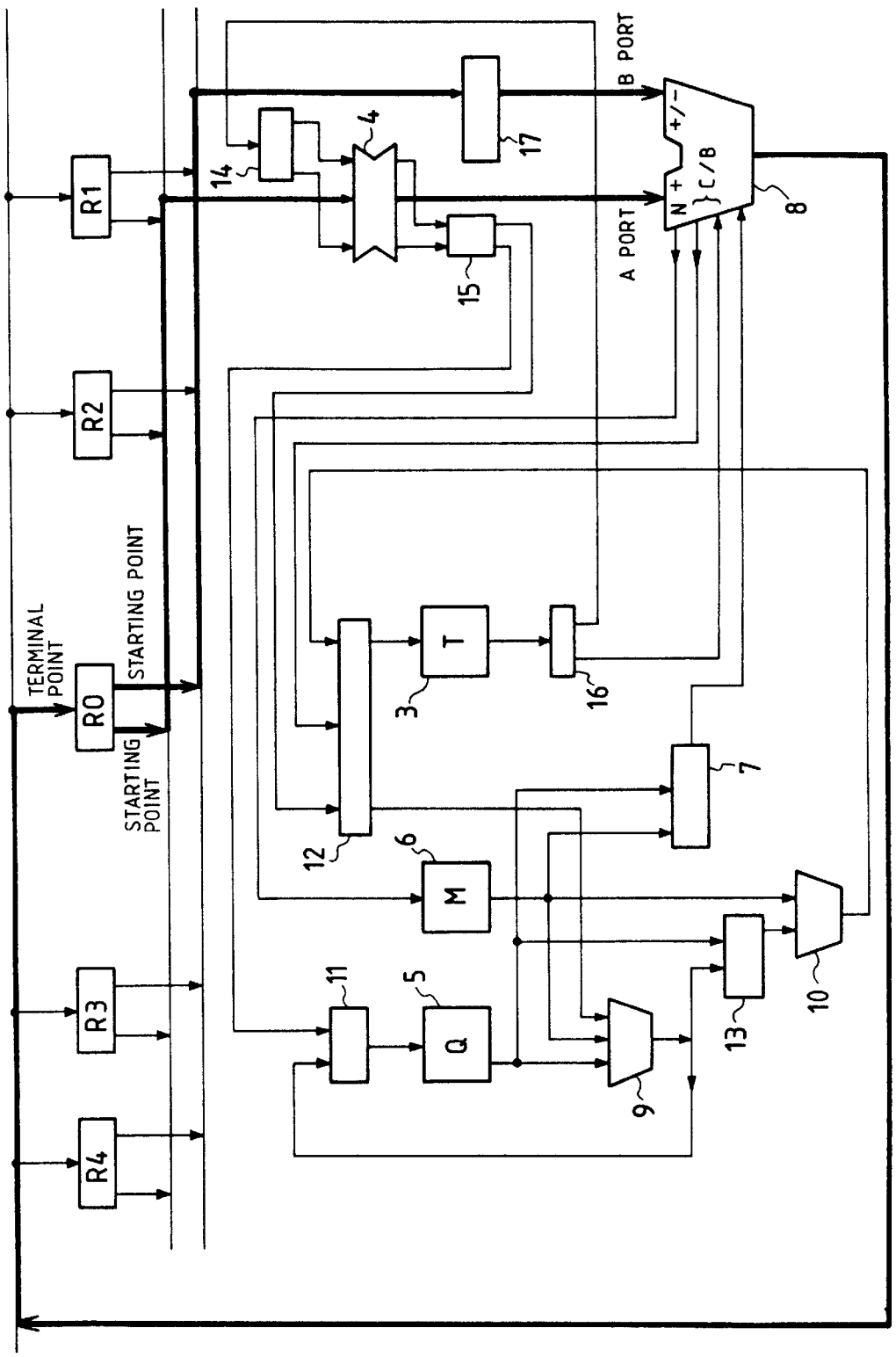
FIG. 54 is a diagram for explaining the operations of the circuits of FIG. 51 for executing the instruction EOR RO,RO of FIG. 53.

As shown in FIGS. 54 and 75, the working register R0 has its value set to 0 by executing this instruction. This instruction is not necessary if the value of the R0 is already 0. In FIG. 54, the shifter 4 and the code extension circuit 17 are not operated to output the input therethrough. The arithmetic logical operation circuit 8 takes an exclusive OR between the A port input and the B port input bit by bit. Thus, all the bits of the value of the register R0 is set to 0.

(2) SL16 R1

Figure 55:
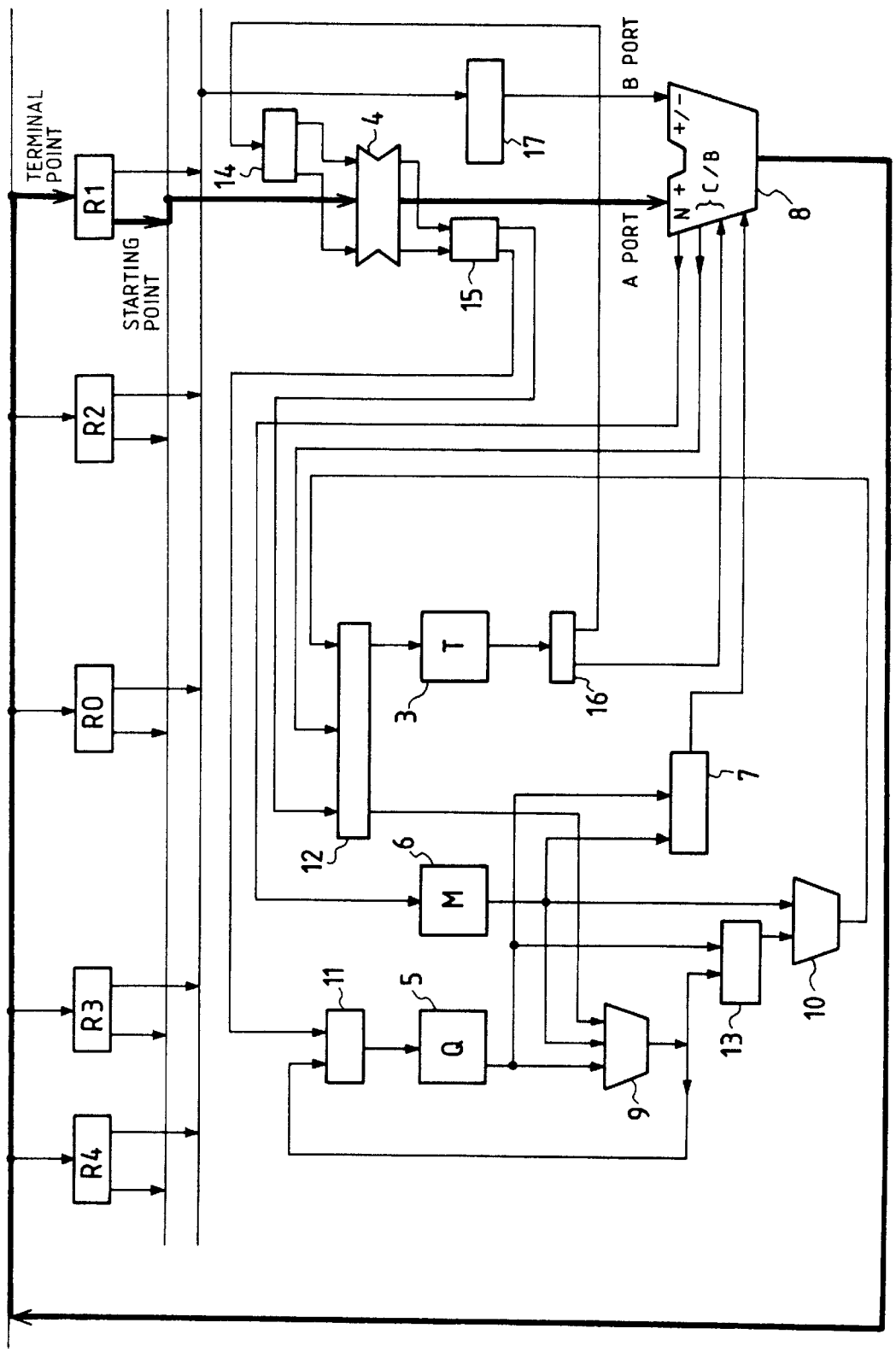
FIG. 55 is a diagram for explaining the operations of the circuits of FIG. 51 for executing the instruction SL16 R1 of FIG. 53.

As shown in FIGS. 55 and 75, by executing this instruction, the divisor latched in the divisor register R1 is shifted (leftward) to a bit more significant by 16 bits, and the value 0 is shifted in the less significant 16 bits. The leftward shift of 16 bits is executed by the shifter 4. The arithmetic logical operation circuit 8 outputs the A port input therethrough.

(3) DIVOS R0,R2

Figure 56:
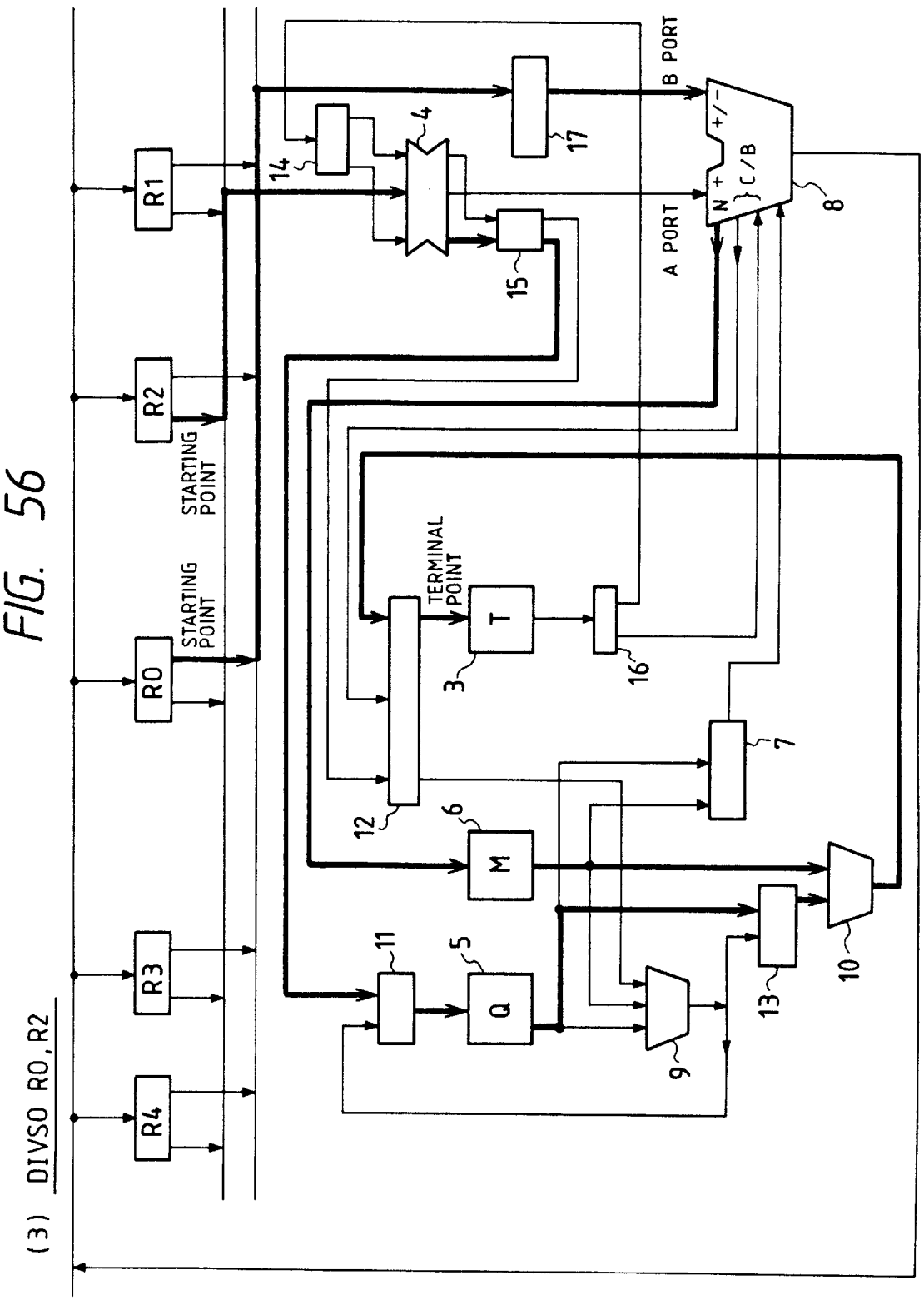
FIG. 56 is a diagram for explaining the operations of the circuits of FIG. 51 for executing the instruction DIVOS R0,R2 of FIG. 53.

In response to this instruction, as shown in FIGS. 56 and 75: the MSB of the register R2 is latched in the Q bit; the MSB of the register R0 is latched in the M bit; and the exclusive OR between the Q bit and the M bit is latched in the T bit. Since the value of the register R0 is set to 0 at this time, the T bit latches the MSB of the dividend latched by the register R2. In this processing, the shifter 4 feeds the input MSB to the selector circuit 15. The code extension circuit 17 outputs the input therethrough. The arithmetic logical operation circuit 8 outputs the MSB of the B port input. The operation of the exclusive OR between the Q bit and the M bit is executed by the operation circuit 10.

(4) MOVT R3

Figure 57:
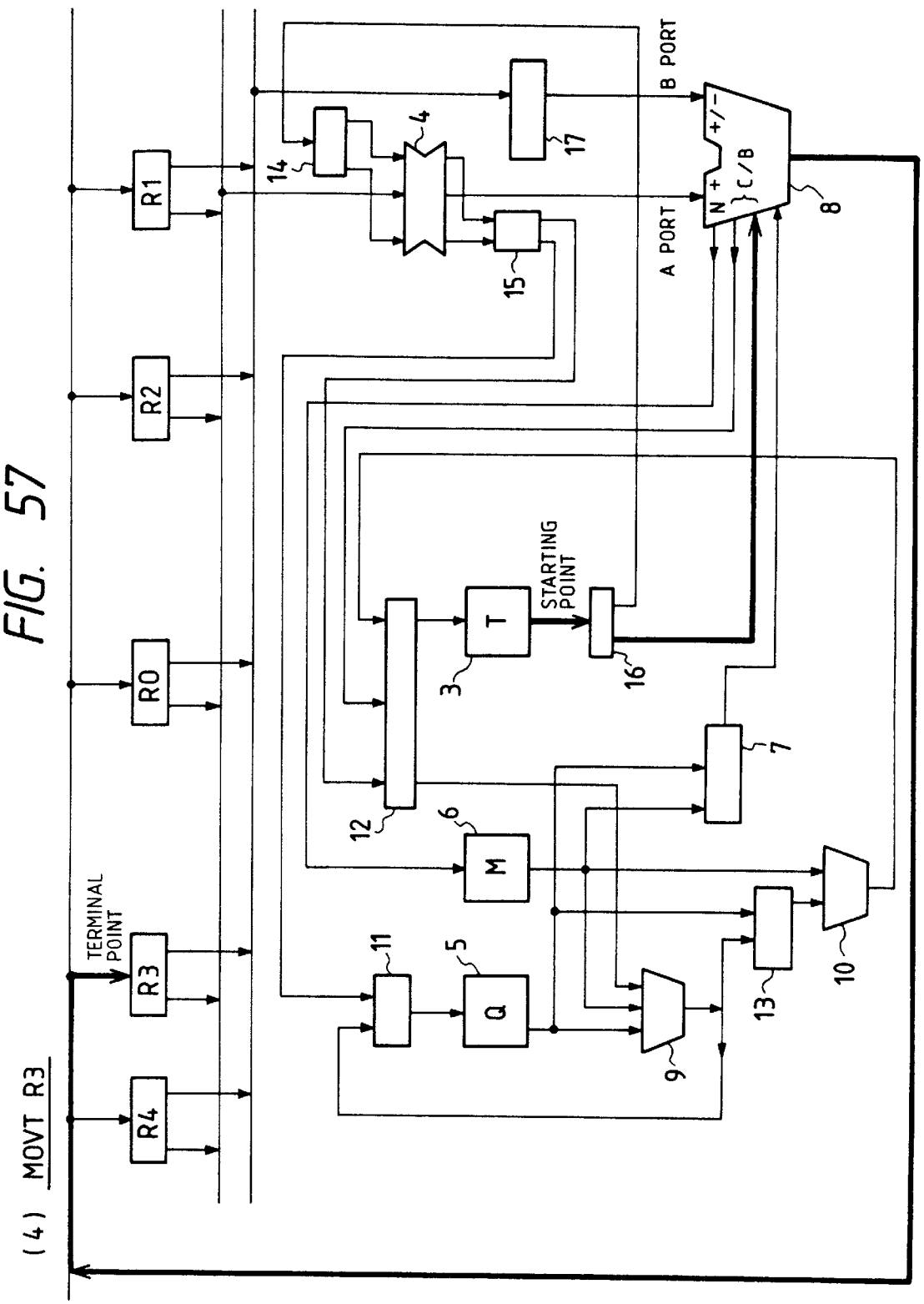
FIG. 57 is a diagram for explaining the operations of the circuits of FIG. 51 for executing the instruction MOVT R3 of FIG. 53.
Figure 76A:
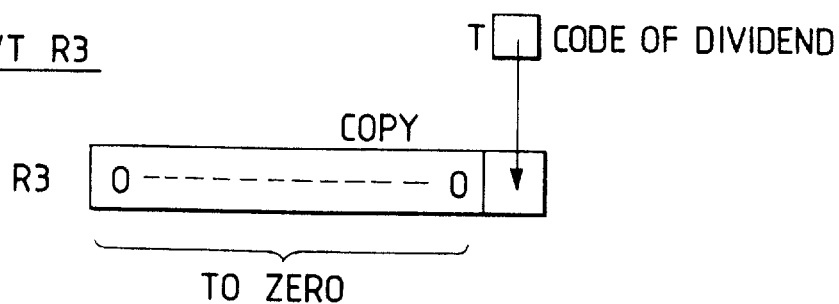
FIG. 76(D) is a diagram for explaining the state of a register corresponding to the operations of FIG. 57.
FIG. 76(E) is a diagram for explaining the state of a register corresponding to the operations of FIG. 58.
FIG. 76(F) is a diagram for explaining the state of a register corresponding to the operations of FIG. 59.
Figure 76B:
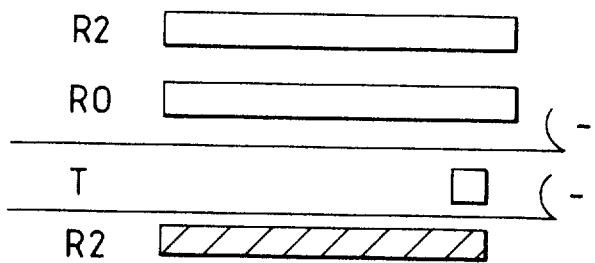
Figure 76C:
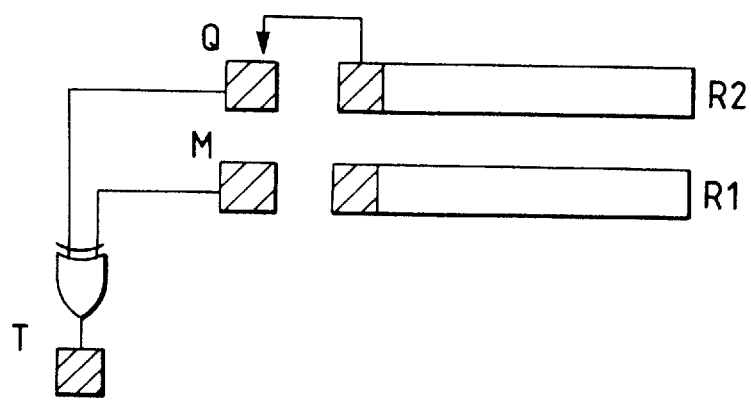

In response to this instruction, as shown in FIGS. 57 and 76, the value of the T bit, i.e., the code of the dividend is latched in the register R3. This is because the code bit of the dividend is stored for determining the rest. In this processing, the arithmetic logical operation circuit 8 adds the value of the T bit to the bit array of 32 bits of each bit 0 and outputs it.

(5) SUBC R0,R2

Figure 58:
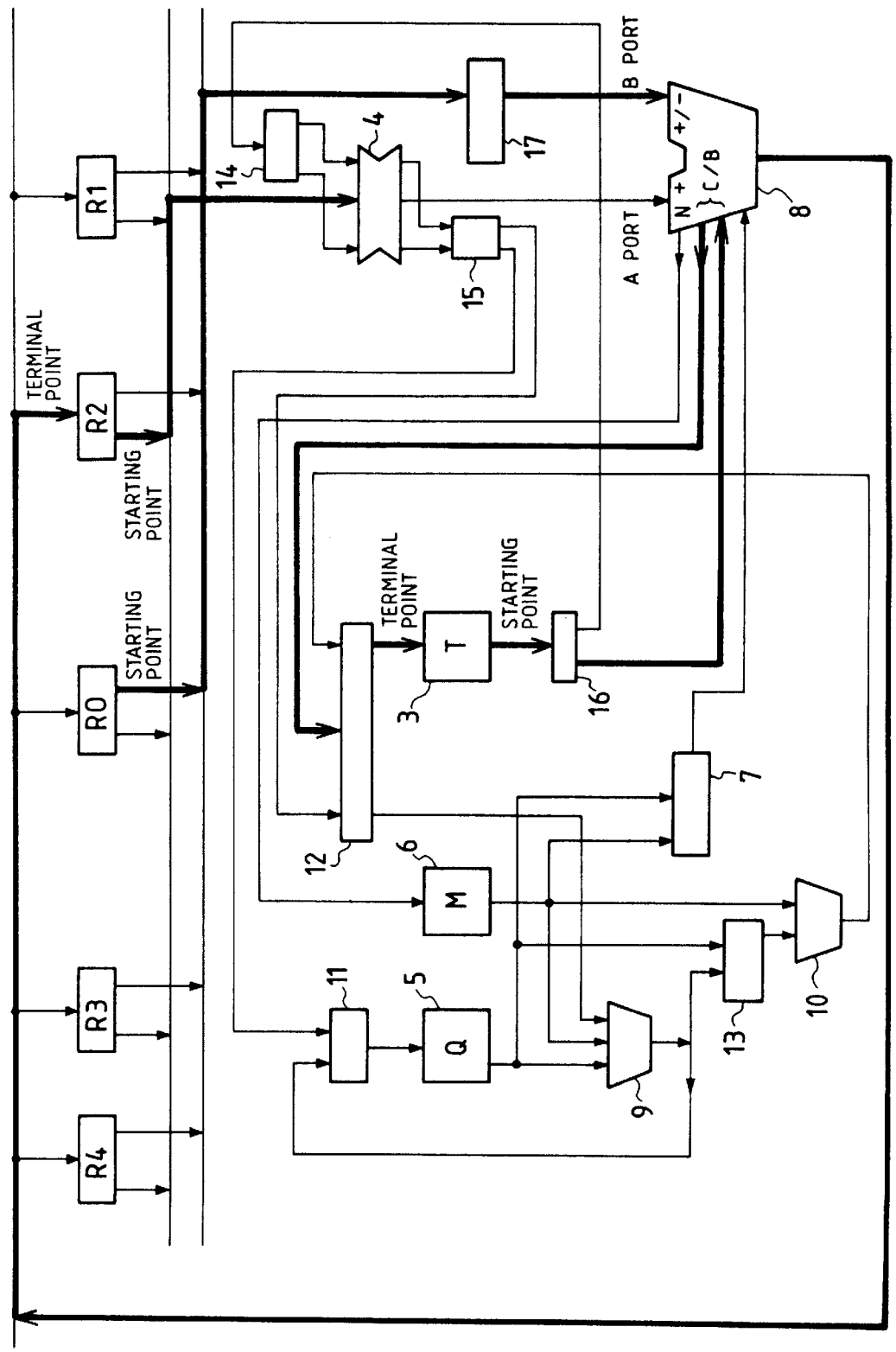
FIG. 58 is a diagram for explaining the operations of the circuits of FIG. 51 for executing the instruction SUBC R0,R2 of FIG. 53.

In response to this instruction, as shown in FIGS. 58 and 76, the register R0 is subtracted with carry from the register R2. The T bit is the carry bit. Since the register R0 is 0, the complement of 2 is transformed into that of 1 by subtracting the T bit (i.e., the code bit of the dividend) from the register R2. In this processing, the shifter 4 and the code extension circuit 17 output their inputs therethrough. The arithmetic logic operation circuit 8 subtracts the B port input and the C/B input from the A port input and outputs the subtraction result and the C/B. In other words, the R0 is subtracted with carry from the dividend register R2 in response to the SUBC instruction. The carry is recognized as identical to the control bit register 3. Since the R0 has the value of 0, the value of the control bit register 3 is subtracted from the dividend register R2. Thus, the processing of subtracting the value of the code bit of a dividend from the dividend is ended. As a result of this processing, the dividend is left as it is, if it is 0 or more, and is expressed by the complement of 1 if it is negative. FIG. 35 shows an example exemplifying how the expression of the dividend is changed by the correction, if the dividend is negative and of 4 bits. If the aforementioned correction is applied to the minimum "1000" of the coded complement of 2 of 4 bits, the expression requires 5 bits such as "10111". Since, in the present embodiment, the dividend is expressed by a coded complement of 2 of 32 bits, the expression requires 33 bits if the aforementioned correction is applied to the minimum of the coded complement of 2 of 32 bits. Although the expression can be made with the 33 bits having the control bit register 3 as the most significant bit, the present embodiment does not go so far. This is because the case of an overflow may be detected and precluded in advance, although the overflow never fails to occur to make it impossible to obtain a correct quotient if the dividend is the minimum of the coded complement of 2 of 32 bits.

(6) DIVOS R1,R2

Figure 59:
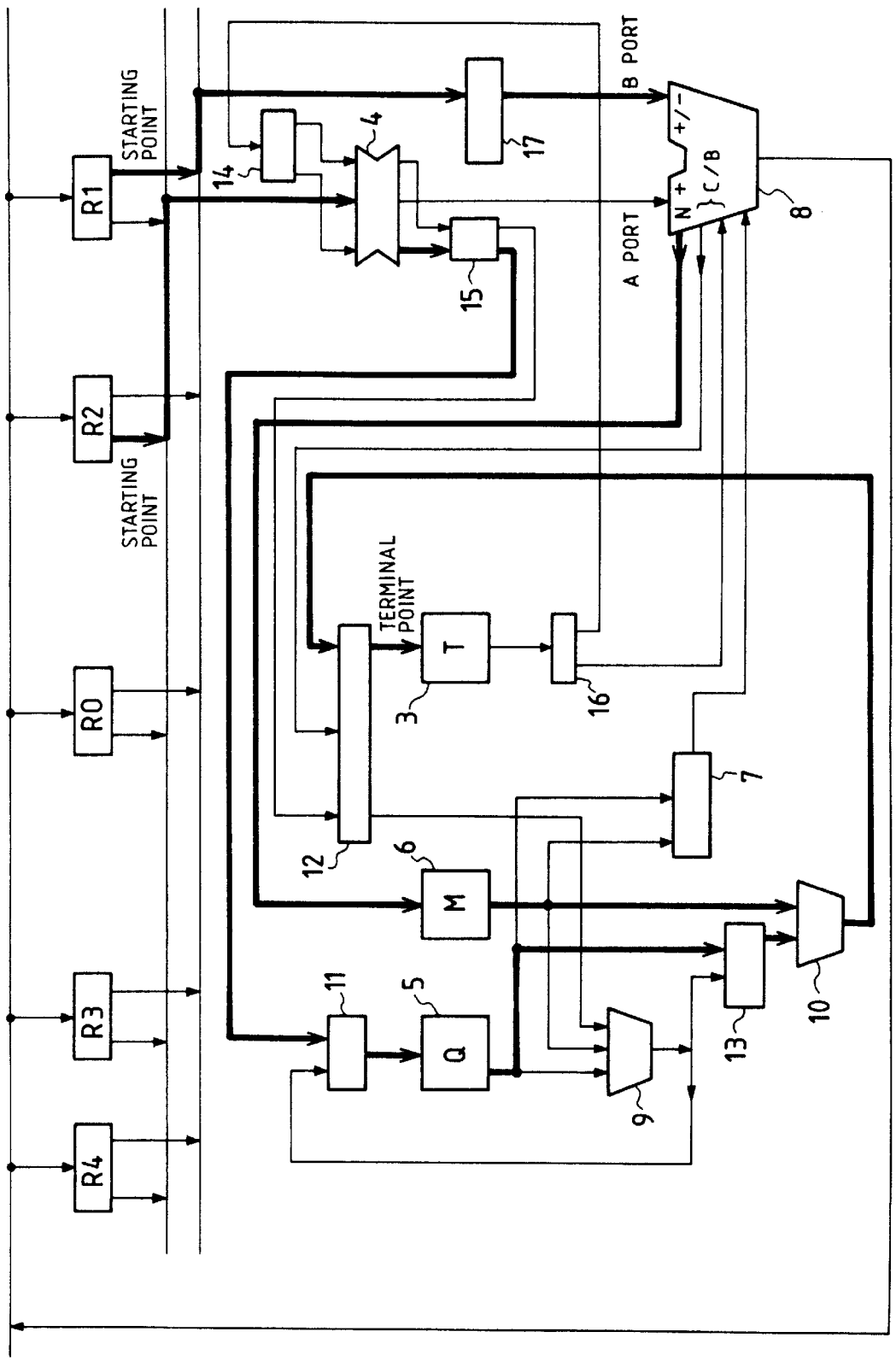
FIG. 59 is a diagram for explaining the operations of the circuits of FIG. 51 for executing the instruction DIVOS R1,R2 of FIG. 53.

In response to this instruction, as shown in FIGS. 59 and 76: the MSB (code bit) of the dividend latched in the register R2 is latched in the Q bit; the MSB (code bit) of the divisor latched in the register R1 is latched in the M bit; and an exclusive OR between the Q bit and the M bit is taken and latched as the code of the quotient in the T bit. This operation is warranted if no overflow is caused by the execution of the instruction SUBC R0,R2 preceding by one. At this time, the shifter 4 outputs the MSB of the 32 bit input. The code extension circuit 17 outputs its input therethrough. The arithmetic logical operation circuit 8 outputs the MSB of the B port input. The exclusive OR operation is executed by the operation circuit 10. In response to this DIVOS instruction, the three control bit registers are initialized. The first operand of the DIVOS instruction is set with the divisor register R1, and the second operand is set with the R2, i.e., the dividend register R2. The DIVOS instruction inputs the first operand to the arithmetic logical operation circuit 8 to latch the MSB of the first operand in the control bit register 6. In parallel with this processing, the DIVOS instruction causes the shifter 4 to shift out the MSB of the second operand and to latch it in the control bit register 5 through the selector circuit 15 and the selector circuit 11. The values of the control bit register 5 and the control bit register 6 are latched even after the end of the DIVOS instruction. The value of the control bit register 5 is inputted through the selector circuit 13 ton the operation circuit 10. The value of the control bit register 6 is inputted to the operation circuit 10. This operation circuit 10 calculates the aforementioned two input exclusive ORs and latch the result in the control bit register 3 through the selector circuit 12. The value of the control bit register 3 is latched even after the end of the DIVOS instruction. The R1 of the first operand and the R2 of the second operand are not rewritten.

This DIVOS instruction causes the code bit of the dividend to be latched in the control bit register 5, the code bit of the divisor to be latched in the control bit register 6, and the exclusive OR of the control bit register 5 and the control bit register 6 to be latched in the control bit register 3. The values of the control bit register 5 and the control bit register 6 are used to decide whether the addition or the subtraction is to be executed to the first step of a subsequent division. The control bit register 6 is used as a code extension unit of the divisor in the subsequent division. The value of the control bit register 3 indicates the code of the quotient. In case this quotient is negative, it is transformed into a complement of 2 once it has been determined as a complement of 1. In case the minimum of a 16 bit coded complement of 2 is the quotient, 17 bits are required for the expression of a complement of 1. It is the value of the control bit register 3 immediately after the end of the present DIVOS instruction that becomes the code bit of the complement of 1 of 17 bits.

In case the dividend takes the minimum of a 32 bit coded complement of 2, the dividend register R2 is given the positive maximum by the aforementioned correction of the subtraction of 1 so that the value of the control bit register 5 immediately after the end of the DIVOS instruction is 0. Since the control bit register 5 intrinsically receives the code bit of the dividend, its value should be 1. In case, therefore, the dividend takes the minimum of the 32 bit coded complement of 2, the control procedure is different from that of the intrinsic intention. As has been noted above, the overflows never fails to occur in case the dividend takes the minimum of the 32 bit coded complement of 2. However, this overflow case may be detected in advance and precluded. In the following, no special consideration is taken into the case, in which the dividend takes the minimum of the 32 bit coded complement of 2.

(7) DIVI R1, R2

Figure 60:
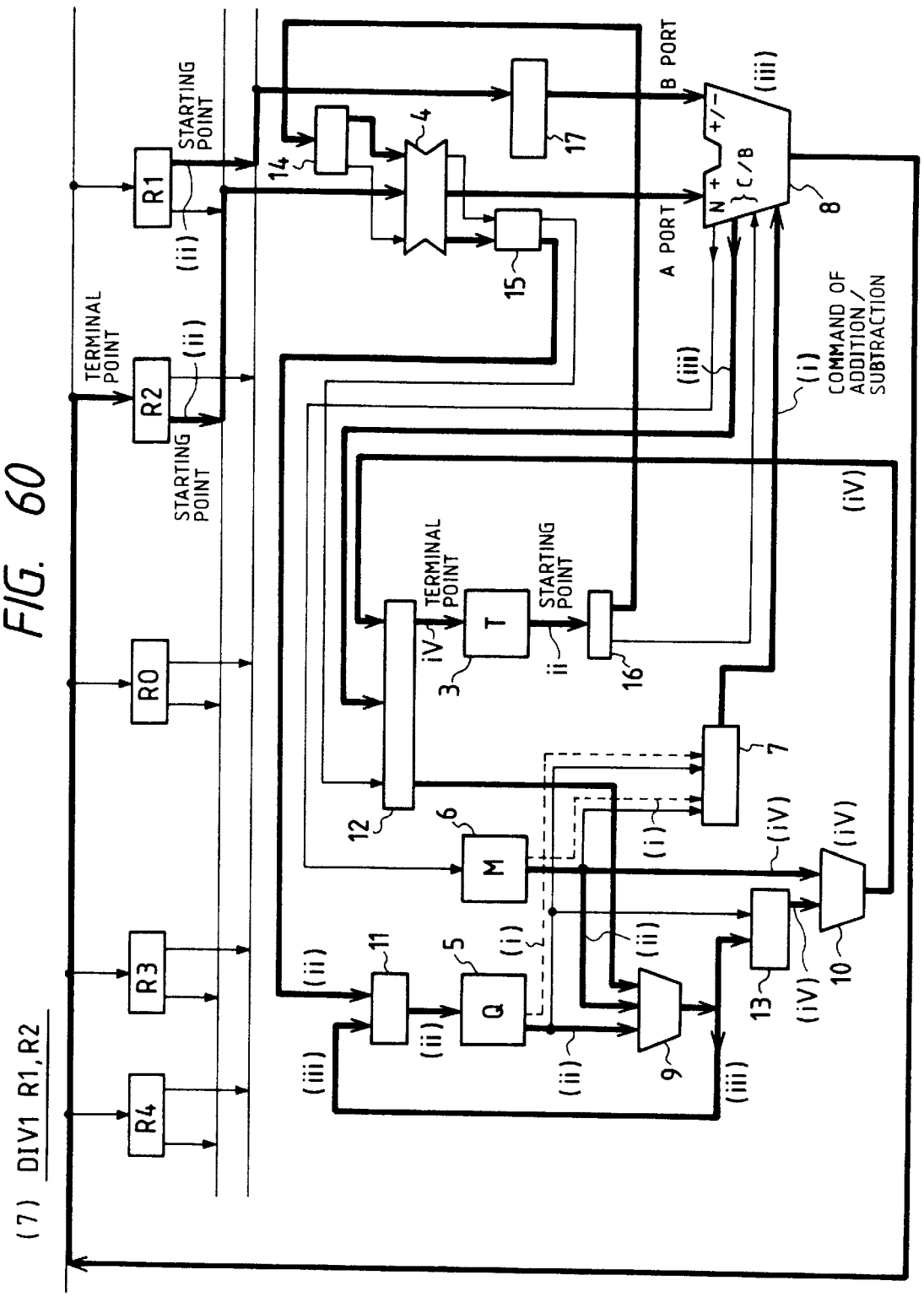
FIG. 60 is a diagram for explaining the operations of the circuits of FIG. 51 for executing the instruction DIV1 R1,R2 of FIG. 53.
Figure 77A:
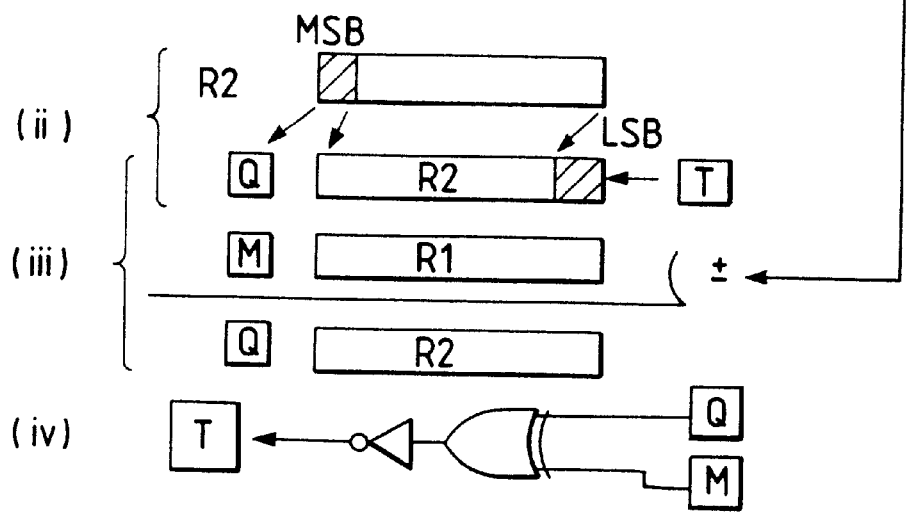
FIG. 77(G) is a diagram for explaining the state of a register corresponding to the operations of FIG. 60.
FIG. 77(H) is a diagram for explaining the state of a register corresponding to the operations of FIG. 62.
Figure 77B:
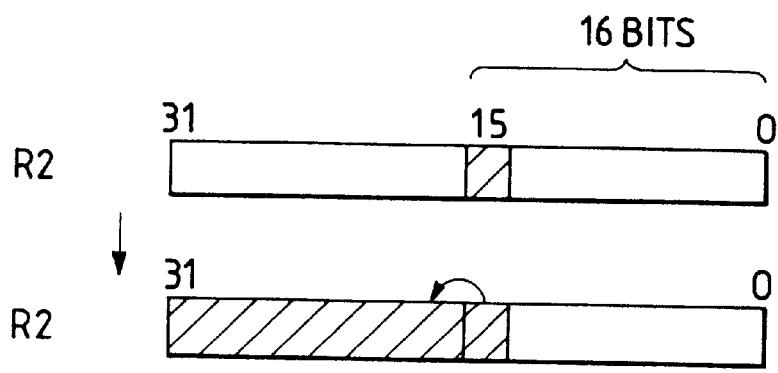

In the description of FIG. 53, the instruction ".arepeat 16" is a micro instruction of an assembler, which means that an instruction between ".arepeat 16" and ".aendr" is extended sixteen times. Thus, the DIV1 instruction is repeated sixteen times to effect the substantial division. The R1 of the first operand of the DIV1 instruction is a divisor register, and the R2 of the second operand of the DIV1 instruction is a dividend register. In FIGS. 60 and 77, the execution of the DIV1 instruction of one time is roughly classified into the processings (i), (ii), (iii) and (iv).

(i) At first, the values of the control bit register 5 and the control bit register 6 are fetched by the operation control circuit 7 to calculate the negation of the exclusive OR between the two inputs. This result is fed to the arithmetic logical operation circuit 8, which latches the value as an operation command. This operation command is directed to a subtraction, if the result of the exclusive OR is 1, and an addition if the result is 0.

(ii) Next, the value of the dividend register R2 is inputted to the shifter 4. The shifter 4 shifts the inputted 32 bits by 1 bit to the more significant bits. Simultaneously with this, the value of the control bit register 3 is shifted in the LSB, and the shifted-out MSB bit is fed through the selector circuit 15 to the selector circuit 11 and latched in the control bit register 5.

(iii) Next, the 33 bits, which are prepared by adding the control bit register to the most significant bit of the divisor register R1, are added to or subtracted from the 33 bits which are prepared by adding the value of the control bit register 5 to the most significant bit of the 32 bit output of the shifter 4. An addition is executed, if the addition command is fed in the processing (i), and a subtraction is executed if the subtraction command is fed in the processing (i). The addition/subtraction between the 32 bit output of the shifter 4 and the value of the divisor register R1 are executed by the arithmetic logical operation circuit 8. As a result, the carry or borrow established by the arithmetic logical operation circuit 8 is fed through the selector circuit 12 to the operation circuit 9. The operation result of the 32 bits obtained by the arithmetic logical operation circuit 8 is latched in the dividend register R2. The addition/subtraction between the control bit register 5 and the control bit register 6 are executed with the carry or borrow, which was established in the arithmetic logical operation circuit 8, by the operation circuit 9. The result of the operation circuit 9 is the code bit of the partial remainder. This code of the partial remainder is fed in one way to the selector circuit 11 and latched in the control bit register 5 and is inputted in the other to the operation circuit 10.

(iv) The operation circuit 10 calculates the negation of the exclusive OR between the code of the partial remainder and the value of the control bit register 6. The result is fed to the selector circuit 12 and is latched in the control bit register 3. The value of the control bit register 3 at this time is the quotient bit.

Immediately after the DIV1 instruction has been repeated sixteen times: the last partial remainder is in the control bit register 5; the least significant bit of the quotient is in the control bit register 3; the last partial remainder is in the more significant 16 bits of the dividend register R2; and the more significant 16 bits of the quotient of 17 bits are in the less significant 16 bits.

(8) MOV R2,R4

Figure 61:
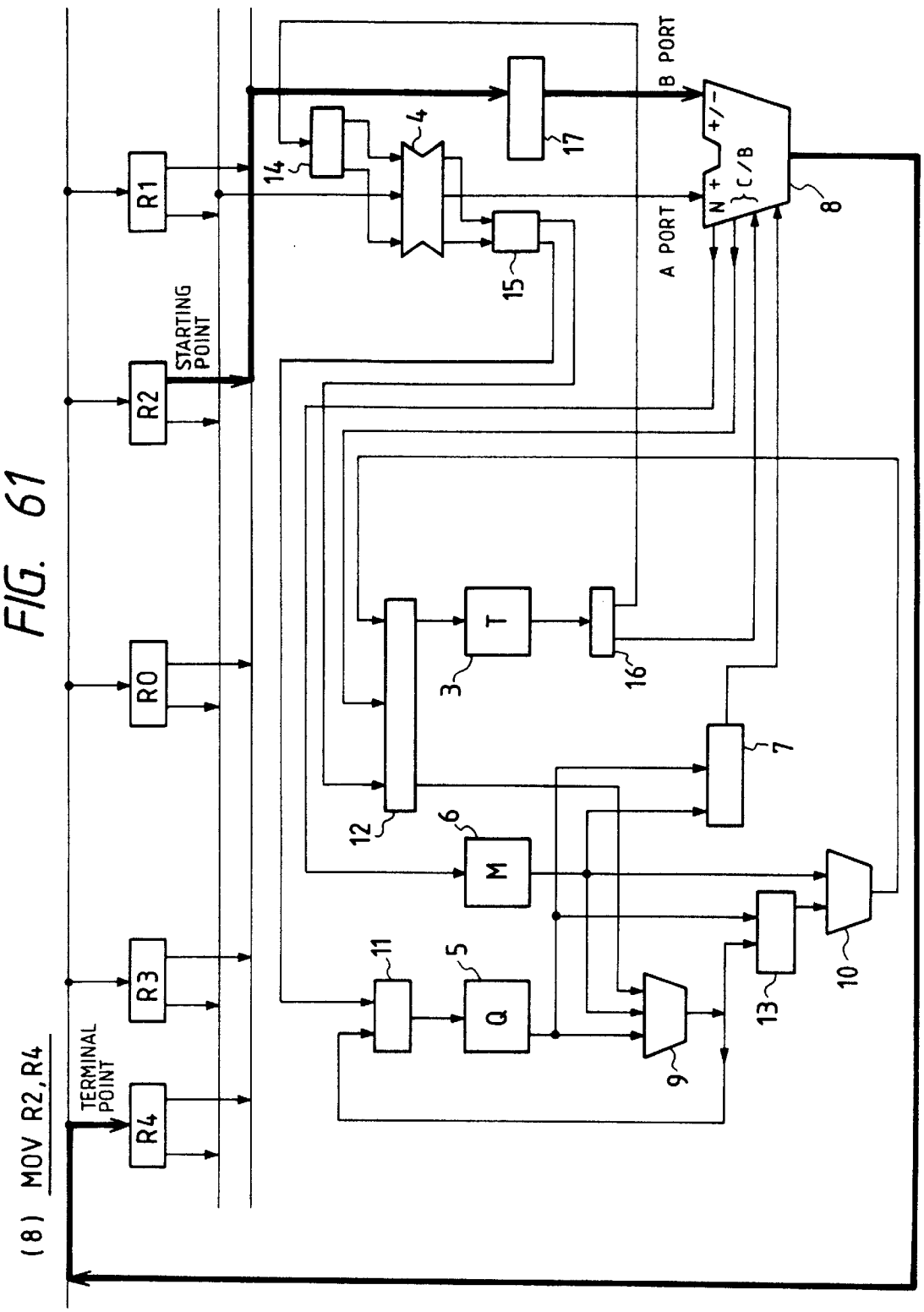
FIG. 61 is a diagram for explaining the operations of the circuits of FIG. 51 for executing the instruction MOV R2,R4 of FIG. 53.

In response to this instruction, as shown in FIG. 61, the value of the register R2 is released to the register R4 so that the last partial remainder latched in the more significant 16 bits of the register R2 may not be broken by the means for determining the quotient.

(9) EXTS.W R2,R2

Figure 62:
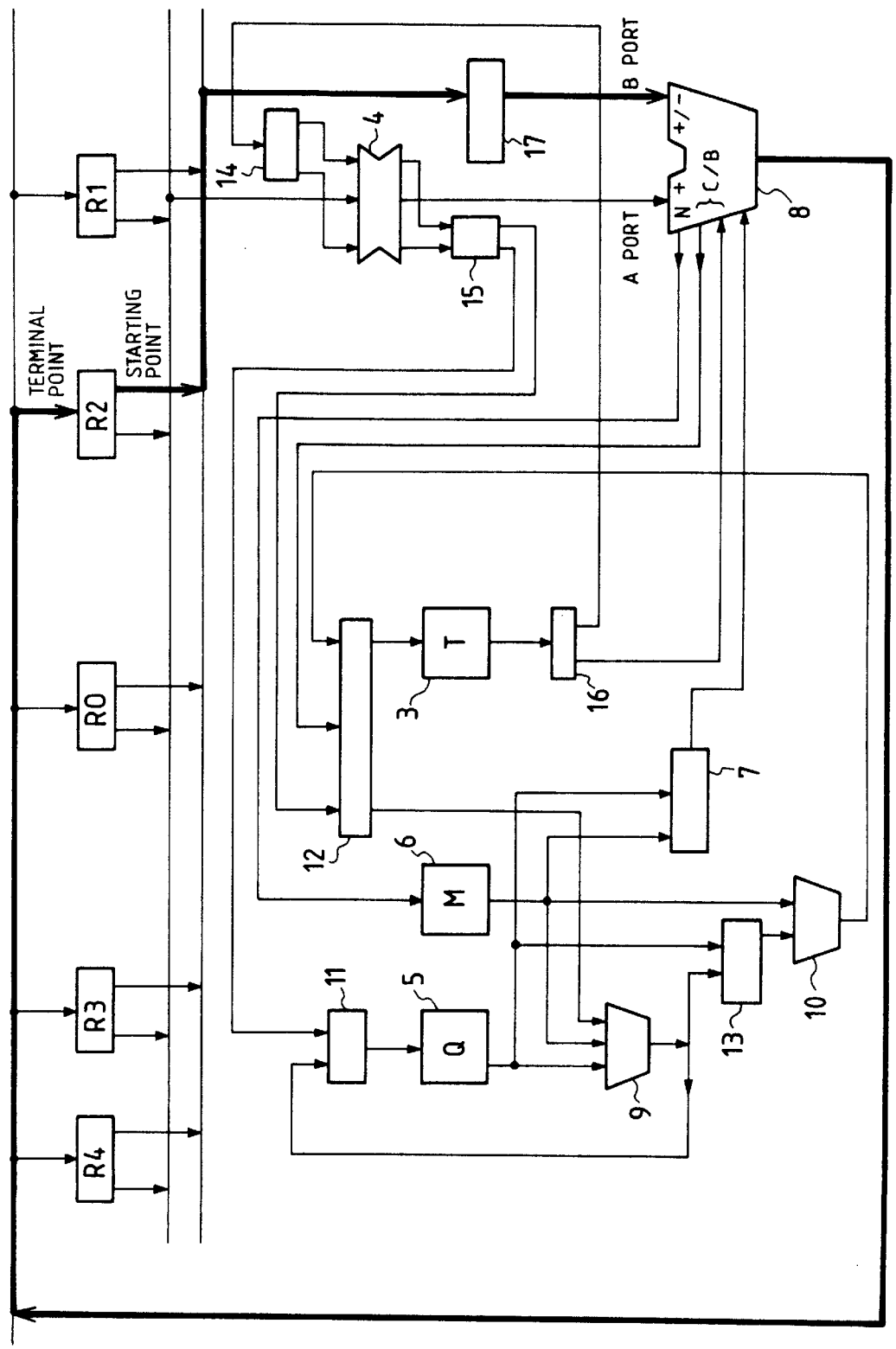
FIG. 62 is a diagram for explaining the operations of the circuits of FIG. 51 for executing the instruction EXTS.W R2,R2 of FIG. 53.

The code of the quotient outputted to the T bit in response to the aforementioned DIVOS instruction is brought to the position of the code bit of the less significant 16 bits of the register R2 by repeating the aforementioned DIV1 instruction by sixteen times. The instruction EXTS.W R2,R2 code-extends the code bit of the less significant 16 bits to the more significant 16 bits, as shown in FIGS. 62 and 77. In this processing, the code extension circuit of FIG. 62 code-extends the less significant 16 bits to 32 bits. Specifically, in response to the EXTX.W instruction, the codes of the less significant 16 bits of the dividend register R2 are extended to the more significant 16 bits. Since the code bit of the quotient determined in the foregoing processing (6) DIVOS R1,R2 is latched in the code bit of the less significant 16 bits of the dividend register R2, this quotient code is extended to the more significant 16 bits.

(10) ROTCL R2

Figure 63:
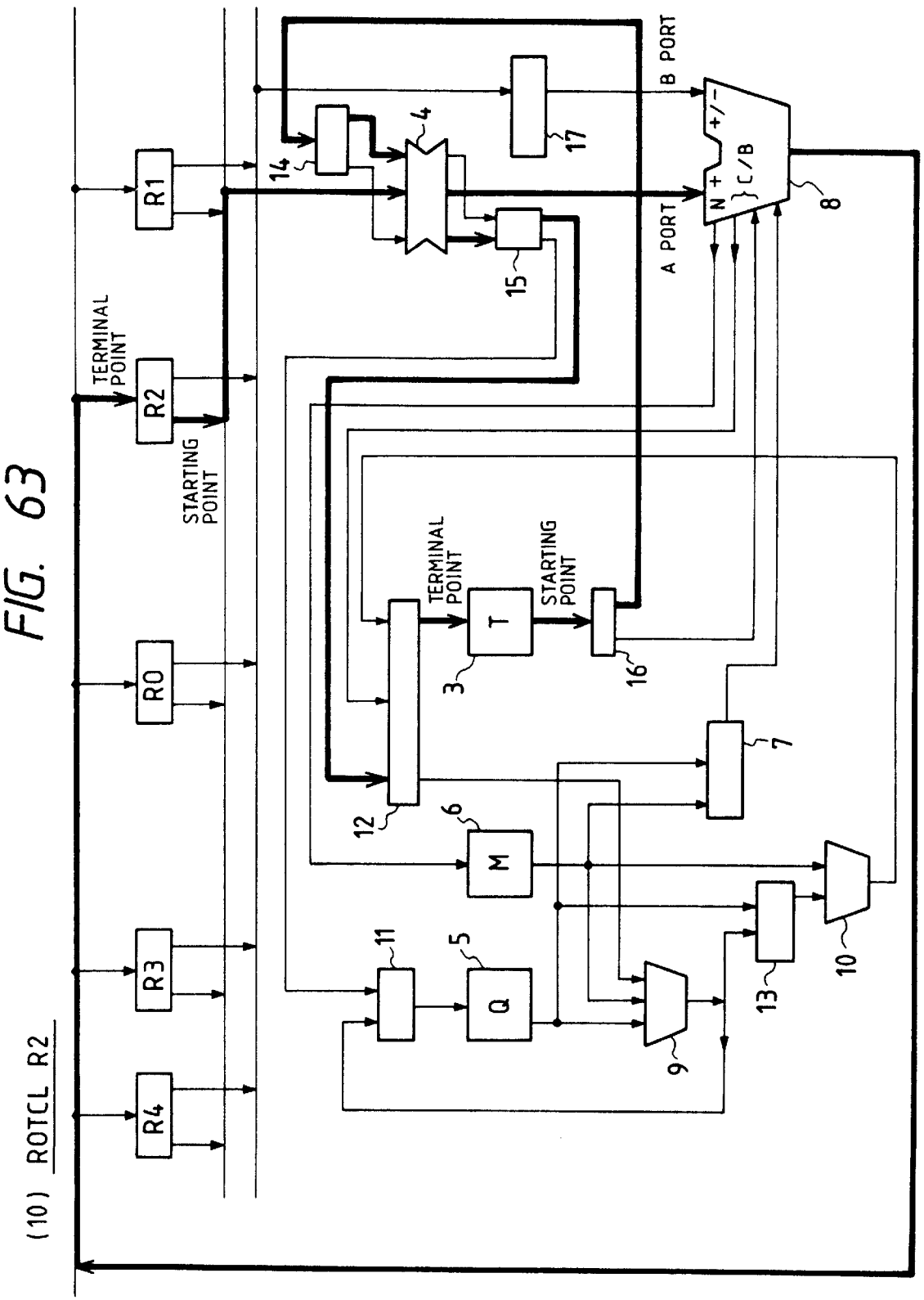
FIG. 63 is a diagram for explaining the operations of the circuits of FIG. 51 for executing the instruction ROTCL R2 of FIG. 53.
Figure 78A:
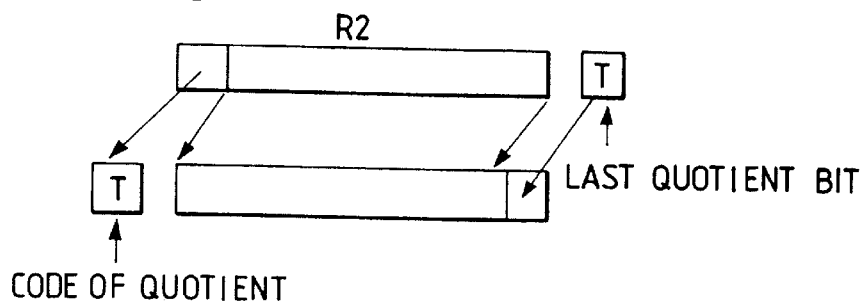
FIG. 78(I) is a diagram for explaining the state of a register corresponding to the operations of FIG. 63.
FIG. 78(J) is a diagram for explaining the state of a register corresponding to the operations of FIG. 64.
FIG. 78(K) is a diagram for explaining the state of a register corresponding to the operations of FIG. 65.
Figure 78B:
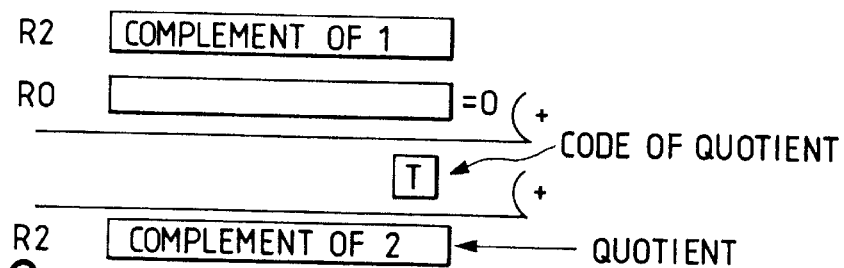
Figure 78C:
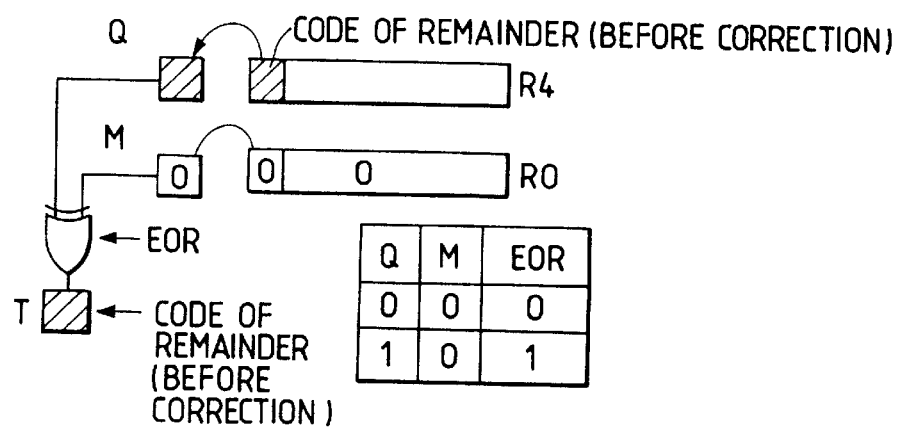

The T bit has the last quotient bit that has been determined at the sixteenth DIV1 instruction. In response to the ROTCL R2, as shown in FIGS. 63 and 78, the shifter 4 is used to shift the T bit in the LSB of the register R2. Simultaneously with this, the value of the register R2 is shifted leftward to output the shifted out MSB (code bit) to the T bit. Specifically, the least significant bit of the quotient latched in the control bit register 3 is shifted in the dividend register R2. The shifted-out code bit is latched in the control bit register 3. At this time, the quotient is latched in the dividend register R2. If the control bit register 3 has the value 0, that is, if the quotient is positive, no correction is necessary. On the contrary, if the control bit register 3 has the value 1, that is, if the quotient is negative, the quotient has to be transformed into a complement of 2 because it is expressed in a complement of 1.

(11) ADDC R0,R2

Figure 64:
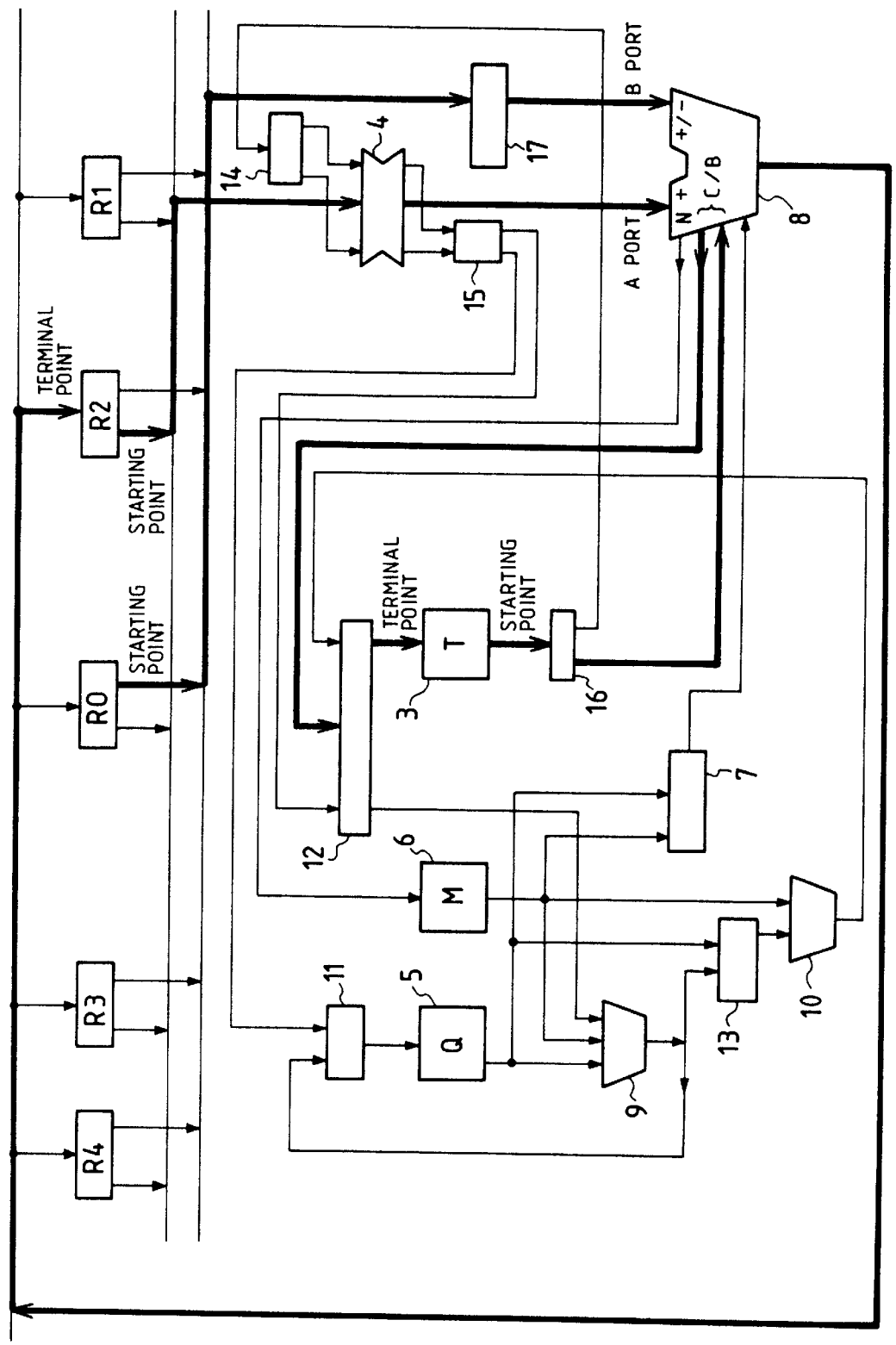
FIG. 64 is a diagram for explaining the operations of the circuits of FIG. 51 for executing the instruction ABDC R0,R2 of FIG. 53.

Immediately before this instruction is executed, the register R2 latches the quotient, and the T bit latches the code of the quotient. In response to this ADDC instruction, as shown in FIGS. 64 and 78, the value of the T bit is added to the value of the register R2 to transform the complement of 1 latched in the register R2 into a complement of 2. Because T=0 if the quotient is positive, the value of the register R2 is not changed even if the T is added. Because T=1 if the quotient is negative, the value of the register R2 is transformed from the complement of 1 into the complement of 2 by adding the T. As a result, a correct quotient is determined. In this processing, the arithmetic logical operation circuit 8 subtracts the B port input from the A port input and further subtracts the T bit (carry/borrow) to latch the borrow in the T bit. In short, the ADDC instruction is an addition instruction with carry. The control bit register 3 is recognized as identical to the carry, and the ADDC instruction adds the register R0 having the value 0 and the control bit register 3 to the dividend register R2. The value of the dividend register R2 is unchanged from that before the execution of the ADDC instruction, if the control bit register 3 has the value 0, but the quotient latched in the dividend register R2 is transformed from the complement of 1 into the complement of 2 if the control bit register 3 has the value 1. As a result, a correct quotient can be obtained.

In FIG. 53, the following instructions DIVOS to EXTS.W of the aforementioned instruction ADDC are necessary for determining the rest.

(12) DIVOS R0,R4

Figure 65:
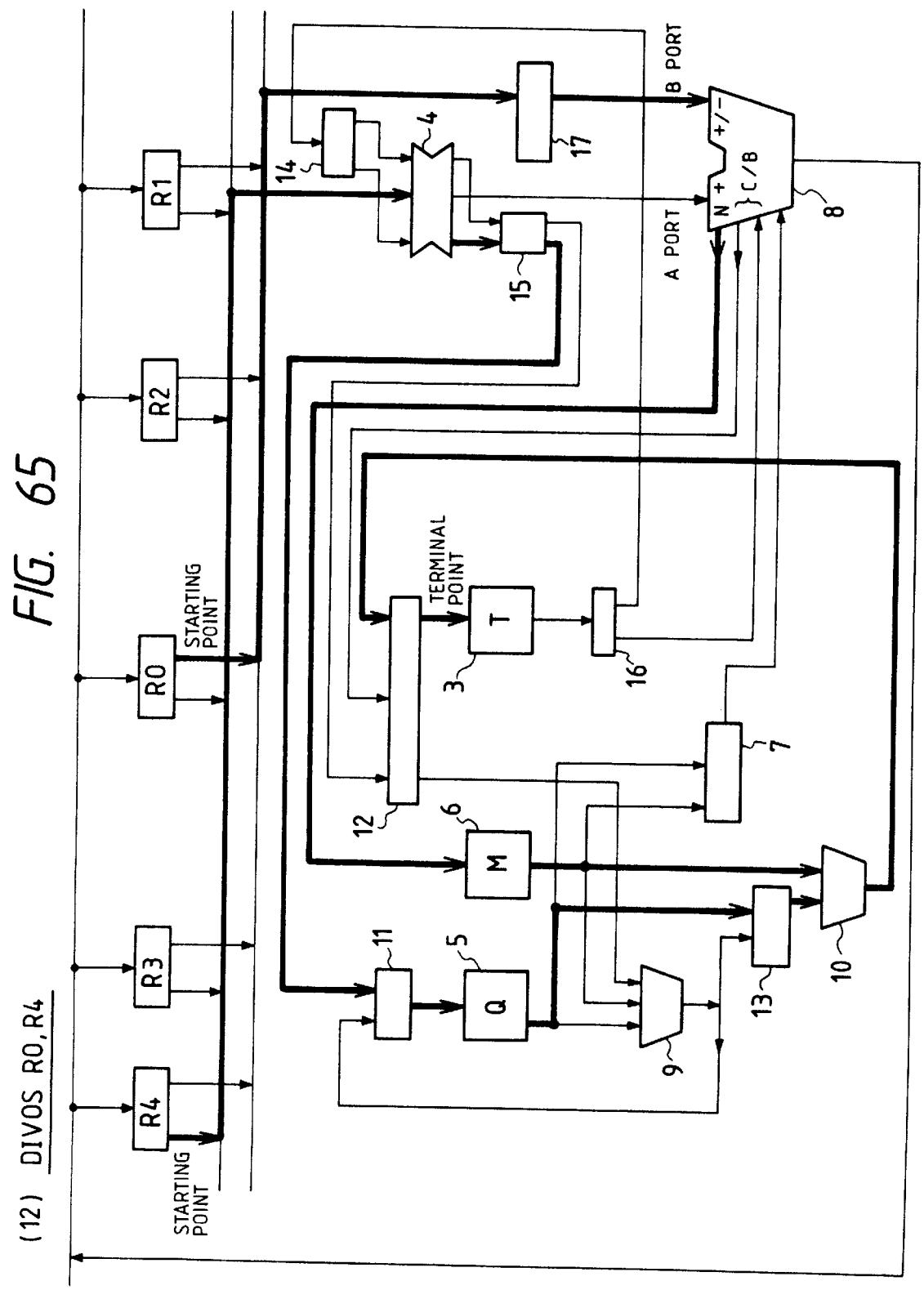
FIG. 65 is a diagram for explaining the operations of the circuits of FIG. 51 for executing the instruction DIVOS R0,R4 of FIG. 53.

This instruction is to latch the MSB (code of the rest) of the register R4 in the T bit. Specifically: the MSB of the register R4 is introduced into the Q bit; the MSB of the register R0 is introduced into the M bit; and the exclusive OR between the Q bit and the M bit is introduced into the T bit, as shown in FIGS. 65 and 78. Since the register R0 has the value 0 at this time, as has been described hereinbefore, the M bit is 0, and the value (code of the rest) of the Q bit is introduced as it is into the T bit. In this processing, the shifter 4 outputs the MSB of the input to the Q bit. The code extension circuit 17 outputs its input therethrough. The arithmetic logical operation circuit 8 outputs the MSB (code bit) of the B port input as the M bit. The operation circuit 10 takes and outputs the exclusive OR of the two inputs.

(13) MOVT R0

Figure 66:
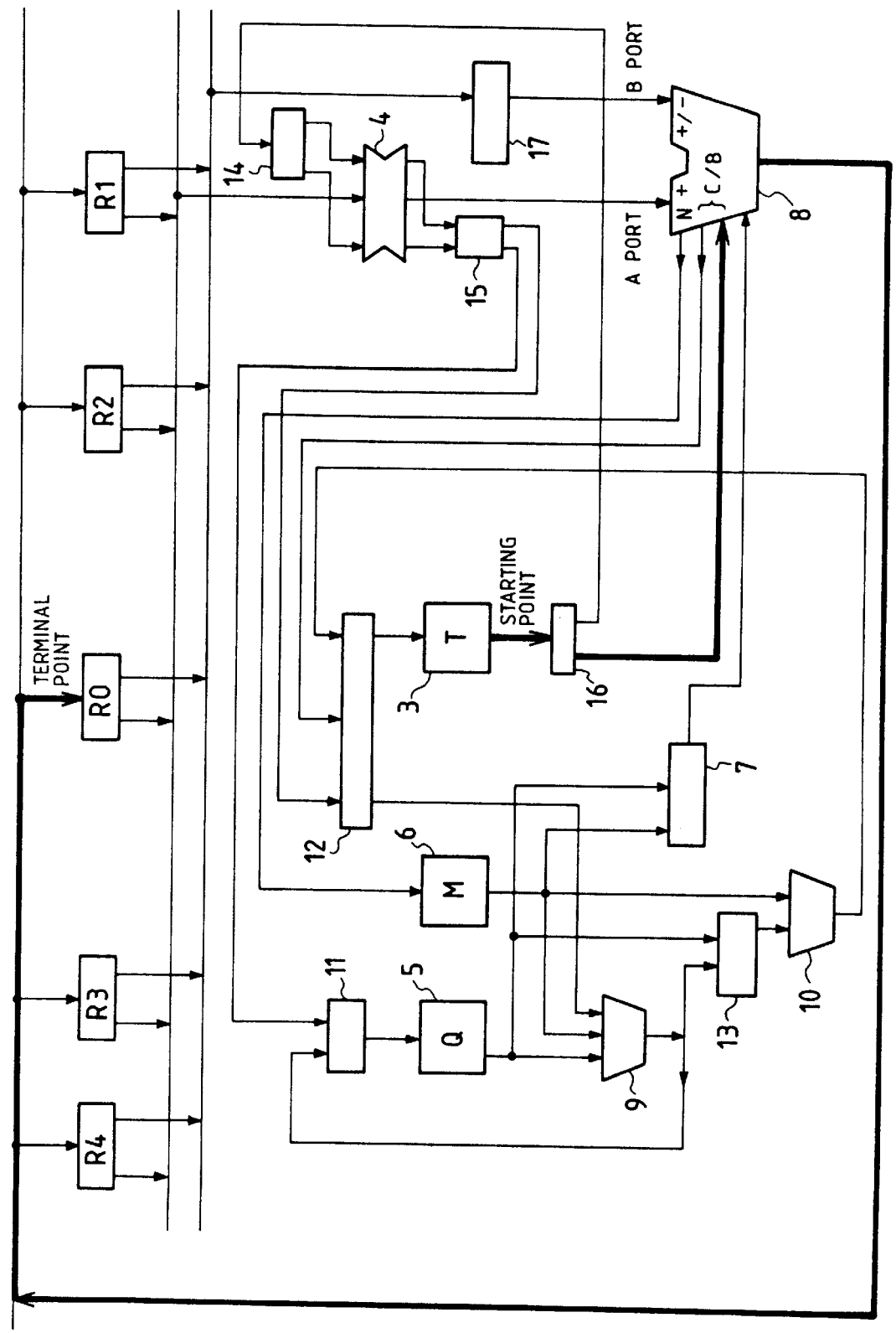
FIG. 66 is a diagram for explaining the operations of the circuits of FIG. 51 for executing the instruction MOVT R0 of FIG. 53.
Figure 79A:
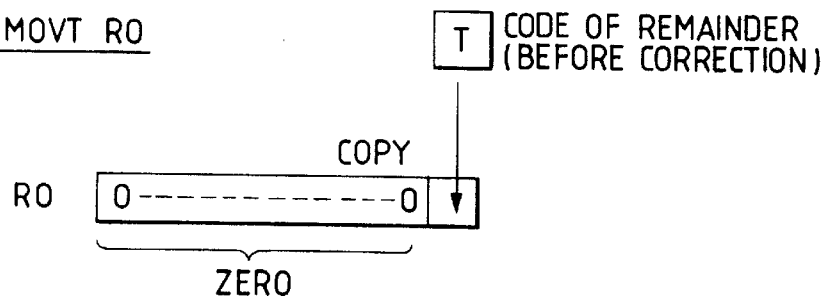
FIG. 79(L) is a diagram for explaining the state of a register corresponding to the operations of FIG. 66.
FIG. 79(M) is a diagram for explaining the state of a register corresponding to the operations of FIG. 67.
FIG. 79(N) is a diagram for explaining the state of a register corresponding to the operations of FIG. 68.
Figure 79B:
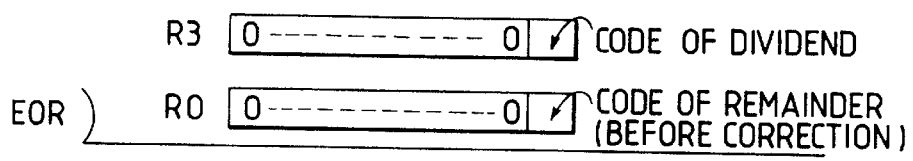
Figure 79C:
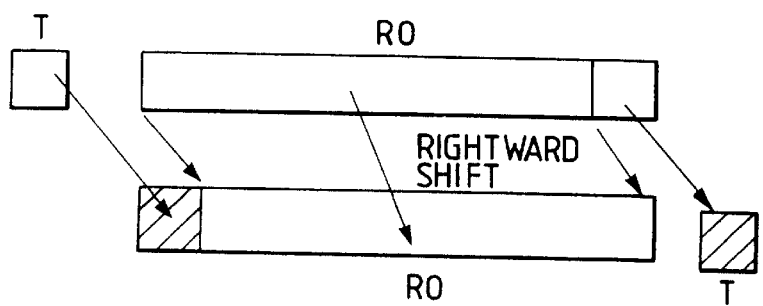

In response to this instruction, as shown in FIGS. 66 and 79, the value (code of the rest before correction) of the T bit is latched in the register R0. In this processing, the arithmetic logical operation circuit 8 adds the value of the T bit to the 32 bit data of all bits and outputs the addition to the register R0.

(14) EOR R3,R0

Figure 67:
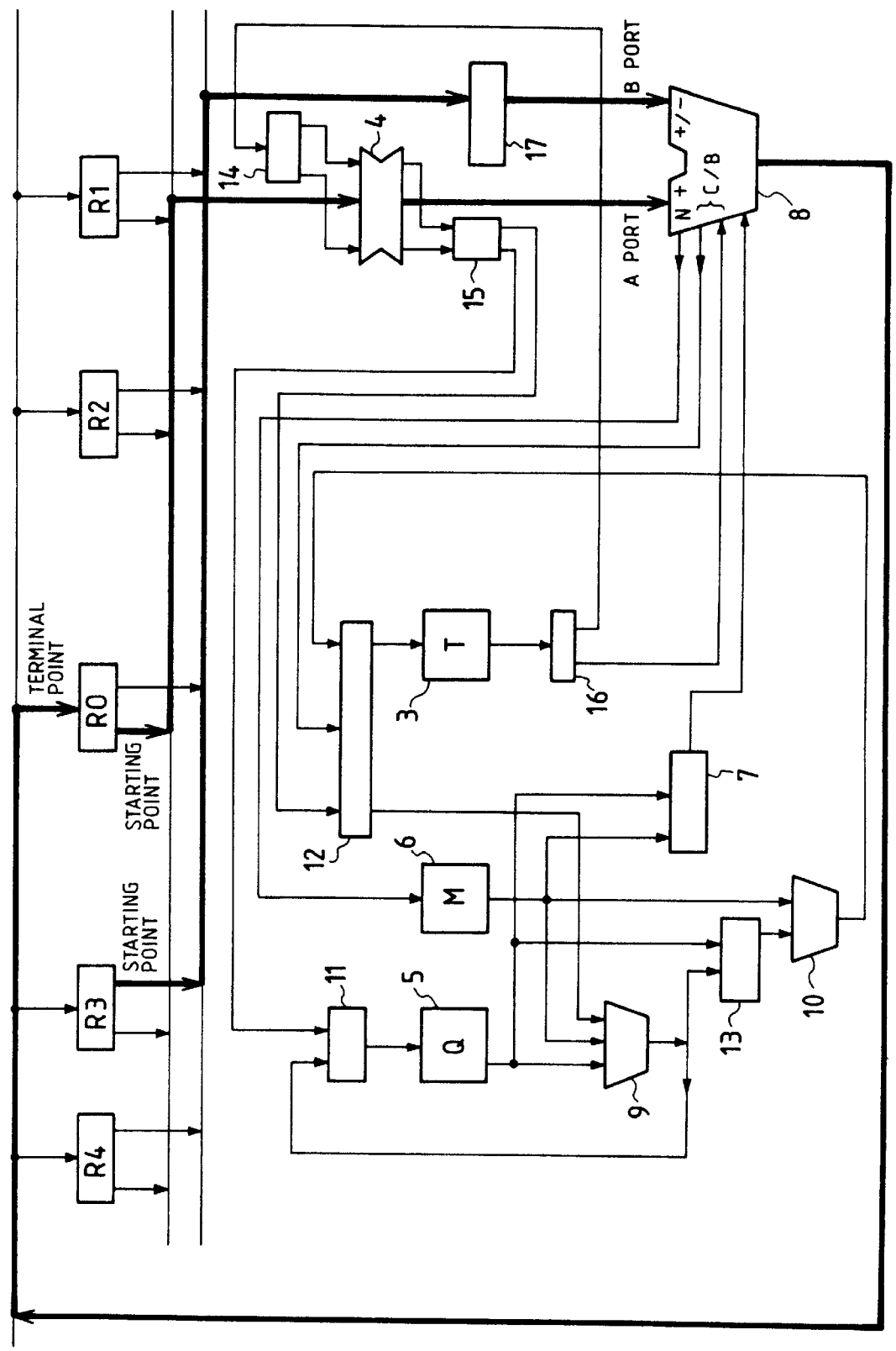
FIG. 67 is a diagram for explaining the operations of the circuits of FIG. 51 for executing the instruction EOR R3,R0 of FIG. 53.

In response to this instruction, as shown in FIGS. 67 and 79, an exclusive OR is taken between the content of the register R3 and the content of the register R0. In this processing, the shifter 4 and the code extension circuit 17 output their inputs therethrough. The arithmetic logical operation circuit 8 takes an exclusive OR for each bit between the A port input and the B port input and outputs it to the register R0.

(15) ROTCR R0

Figure 68:
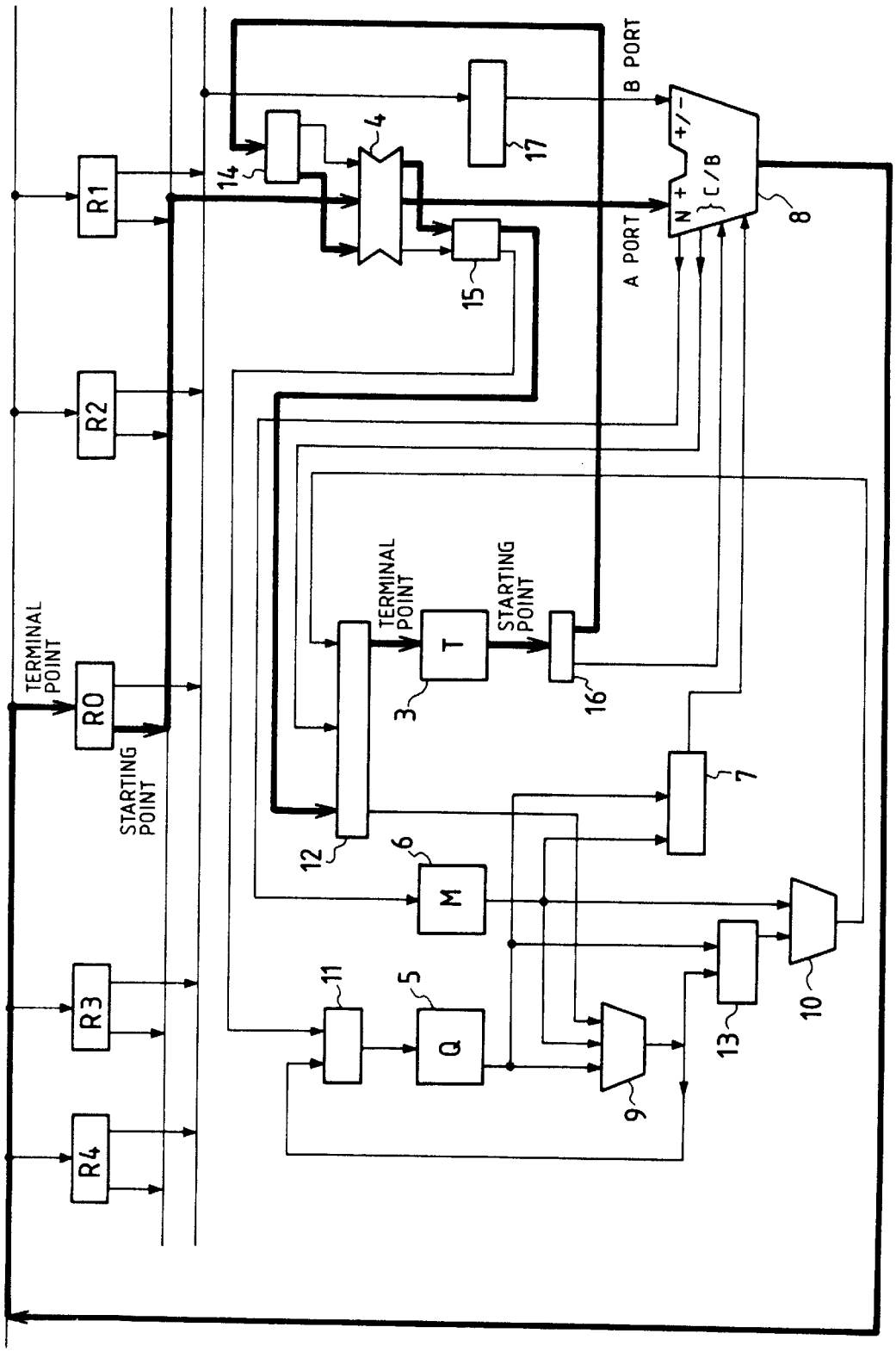
FIG. 68 is a diagram for explaining the operations of the circuits of FIG. 51 for executing the instruction ROTCR R0 of FIG. 53.

In response to the aforementioned instruction EOR, the LSB of the register R0 is set to 1, if the code of the dividend and the code of the rest (before correction) are different, and to 0 if the codes are identical. In response to the instruction ROTCR R0, as shown in FIGS. 68 and 79, the LSB of the register R0 is latched in the T bit. In this processing, the shifter 4 shifts the value of the register R0 left-ward, while shifting the T bit in the MSB, and latches the shifted-out LSB in the T bit. The arithmetic logical operation circuit 8 outputs the A port input therethrough.

(16) BF L1

This instruction instructs that the value of the T bit is branched, if at 0, into an instruction having the label L1, and that the next instruction DIVOS of this BF instruction is executed if the value of the T bit is at 1.

(17) DIVOS R1,R4

Figure 69:
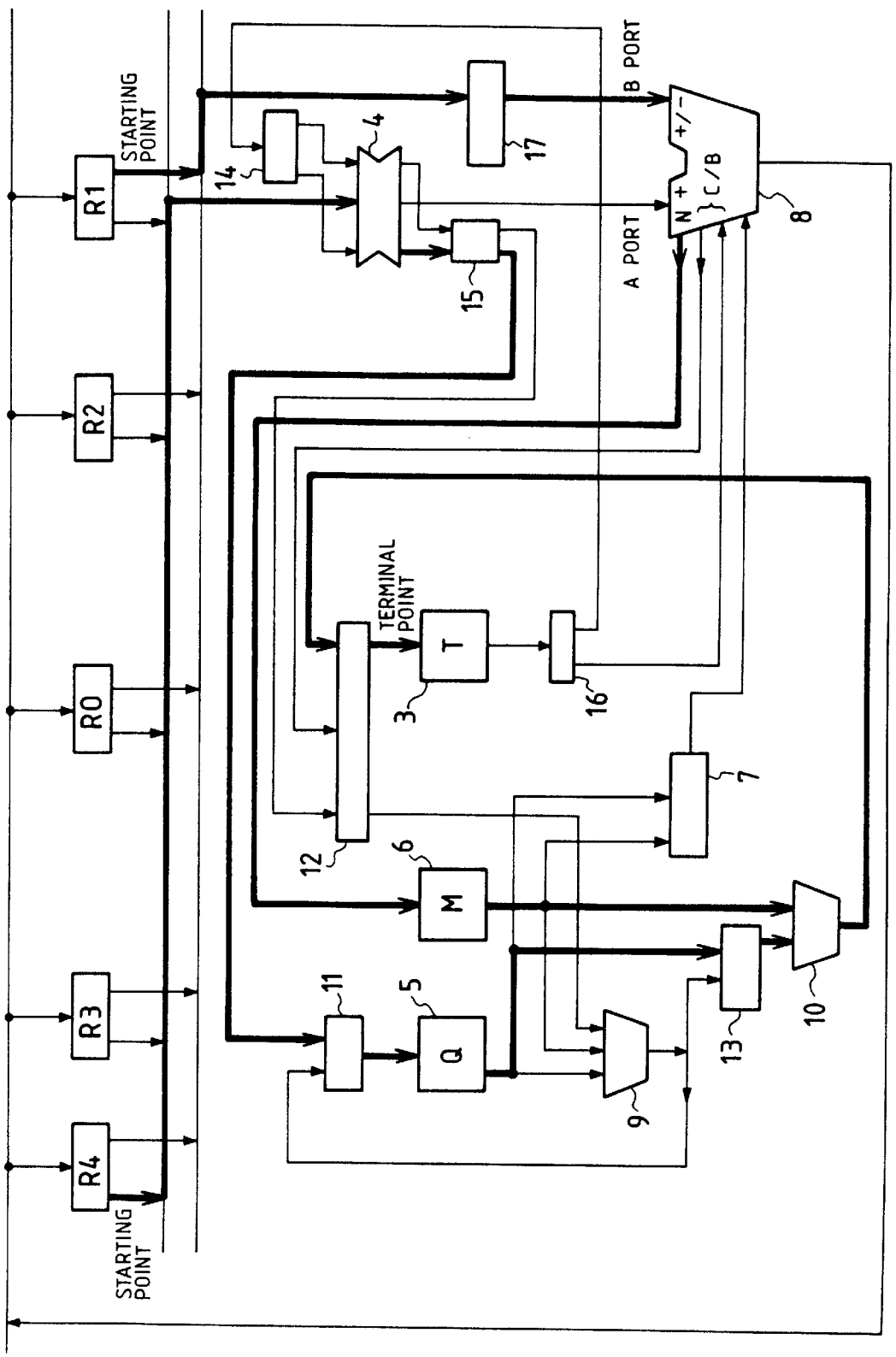
FIG. 69 is a diagram for explaining the operations of the circuits of FIG. 51 for executing the instruction DIVOS R1,R4 of FIG. 53.

This instruction causes the rest to be corrected together with the instruction ROTCR and the instruction DIV1, which are to be executed subsequent to that instruction. At this time, the rest before correction is latched in the more significant 16 bits of the register R4, and the divisor is latched in the more significant 16 bits of the register R1. An addition is executed, if the codes of the two are different, and a subtraction is executed if identical. Thus, in response to said DIVOS instruction, as shown in FIGS. 69 and 80, the code of the rest (before correction) is latched in the Q bit, and the code of the divisor is latched in the M bit so that they may be used for deciding the addition/subtraction in the later-described instruction DIV1. The T bit latches the result of an exclusive OR between the Q bit and the M bit. In this processing, the shifter 4 outputs its input MSB to the Q bit. The code extension circuit 17 outputs its input therethrough. The arithmetic logical operation circuit 8 outputs the MSB Ccode bit) of the B port input. The operation circuit 10 takes and outputs an exclusive OR between the two inputs.

(18) ROTCR R4

Figure 70:
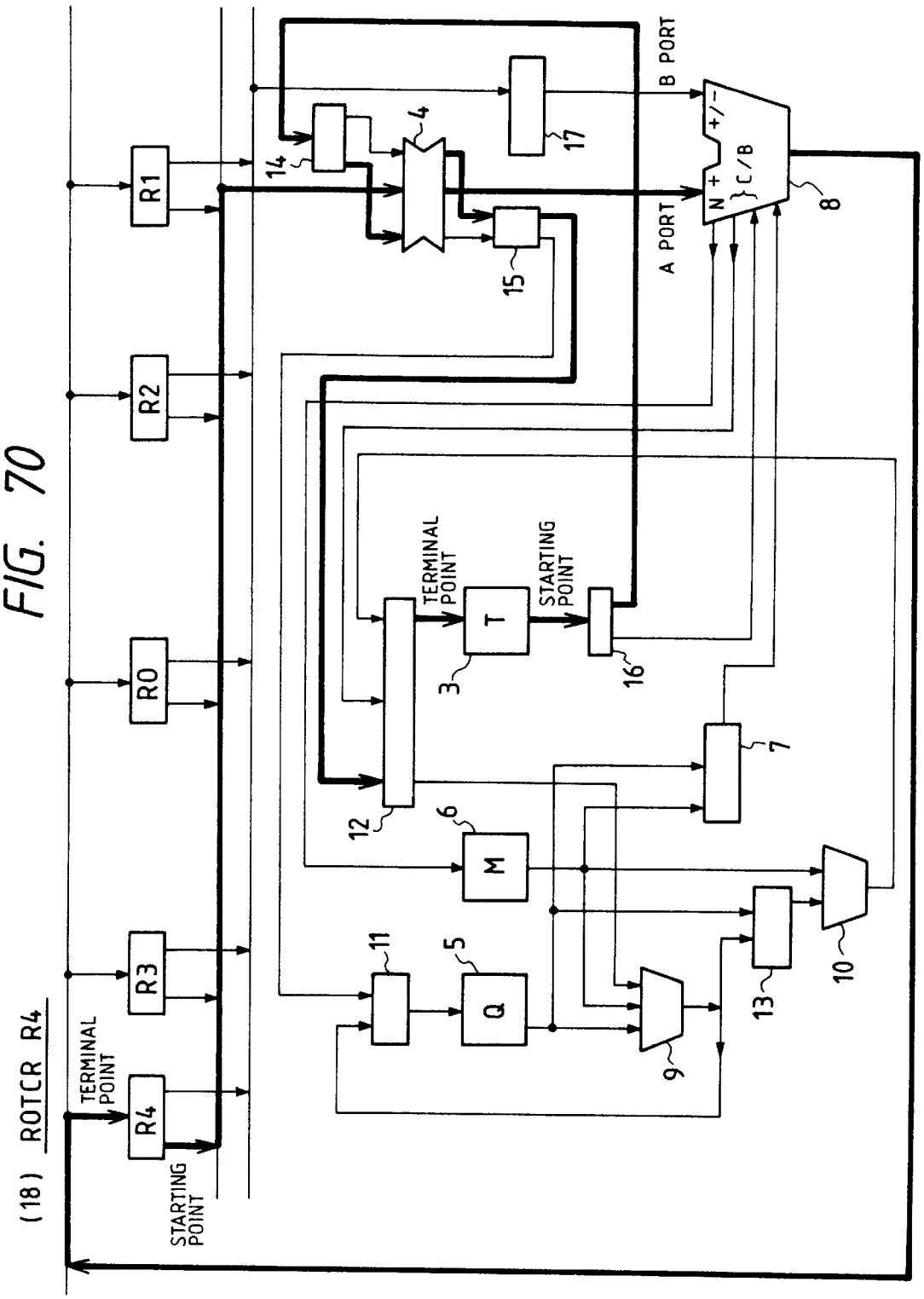
FIG. 70 is a diagram for explaining the operations of the circuits of FIG. 51 for executing the instruction ROTCR R4 of FIG. 53.

In response to the later-described instruction DIV1, for an addition or subtraction after the leftward shift, the value of the register R4 is rotated clockwise to cancel that leftward shift. This state is shown in FIGS. 70 and 80. In this processing, the shift shifts the value of the register R4 rightward while shifting the T bit in the MSB and latches the shifted-out LSB as the T bit. The arithmetic logical operation circuit 8 outputs the A port input therethrough.

(19) DIV1 R1,R4

Figure 71:
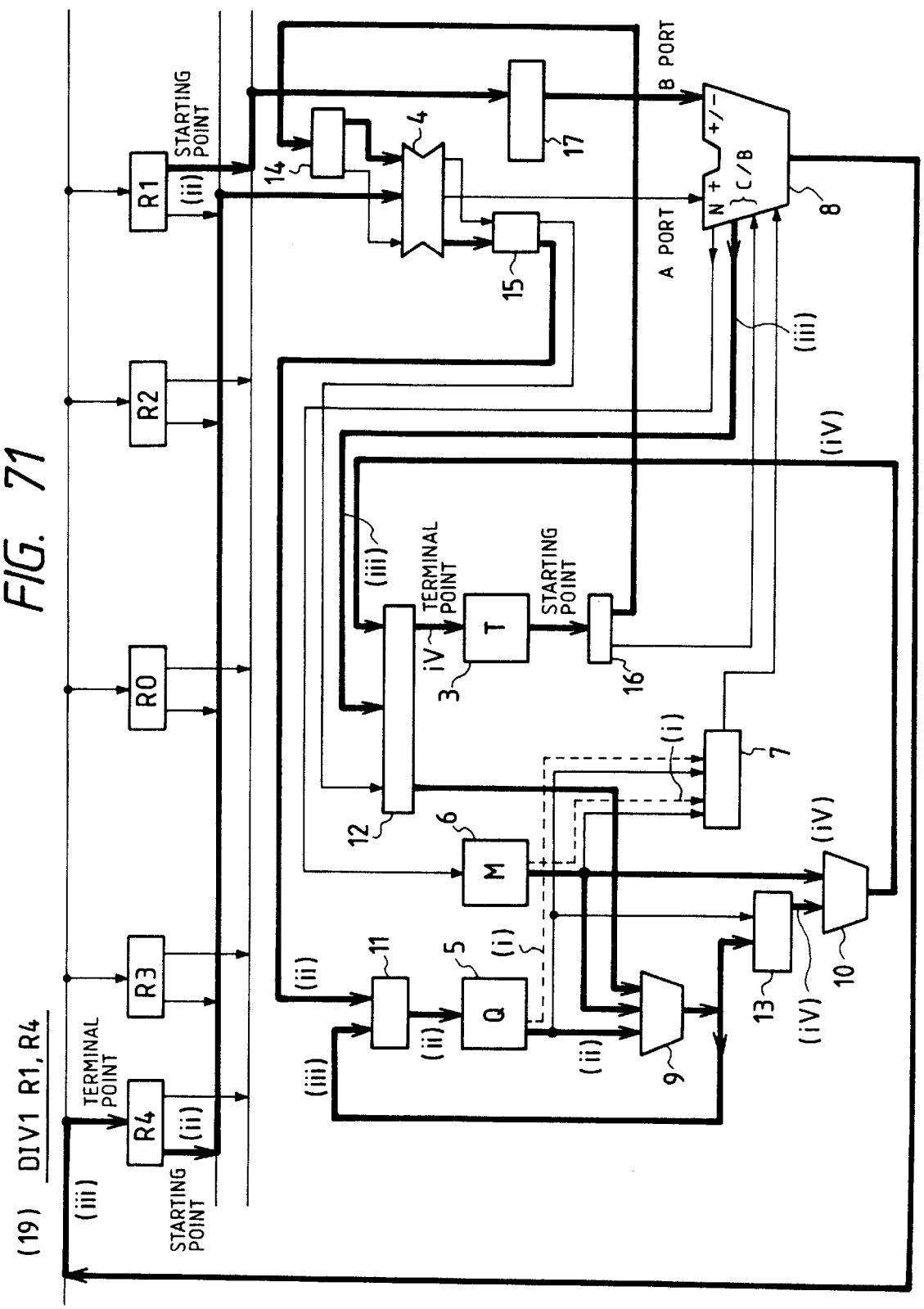
FIG. 71 is a diagram for explaining the operations of the circuits of FIG. 51 for executing the instruction DIV1 R1,R4 of FIG. 53.

This instruction DIV1 is roughly classified into the following processings (i), (ii), (iii) and (iv), as shown in FIGS. 71 and 80.

(i) At first, the Q bit of the control bit register 5 and the M bit of the control bit register 6 are fetched in the arithmetic control circuit 7 to calculate the negation of the exclusive OR of the two inputs. This result is fed to the arithmetic logical operation circuit 8, which latches that value as an operation command. This operation command is a subtraction command, if the result of the aforementioned exclusive OR is 1 (i.e., if the code of the rest before correction and the code of the divisor are identical), and an addition command, if the same is 0 (i.e., if the code of the rest before correction and the rest of the divisor are different).

(ii) Next, the value of the register R4 is inputted to the shifter 4. This shifter 4 shifts the value of the register R4 leftward by 1 bit, while shifting the T bit in the LSB of the value of the register R4, and latches the shifted-out MSB in the Q bit.

(iii) Next, the 33 bits of the addition of the M bit and the value of the register R1 are added to or subtracted from the 33 bits of the addition of the Q bit and the value of the register R4, and the result is latched in the Q bit and the register R4. The addition/subtraction between the output of the shifter 4 and the value of the register R1 are executed by the arithmetic logical operation circuit 8. As a result, the carry or borrow established by the arithmetic logical operation circuit 8 is fed through the selector circuit 12 to the operation circuit 9. This operation circuit 9 inputs that carry/borrow and executes the addition/subtraction of the Q bit and the M bit in accordance with the carry/borrow.

(iv) The operation circuit 10 calculates the negation of the value calculated by the aforementioned operation circuit 9. i.e., an exclusive OR between the Q bit and the M bit. This result is latched through the selector circuit 12 in the T bit.

(20) SR16 R4

Figure 72:
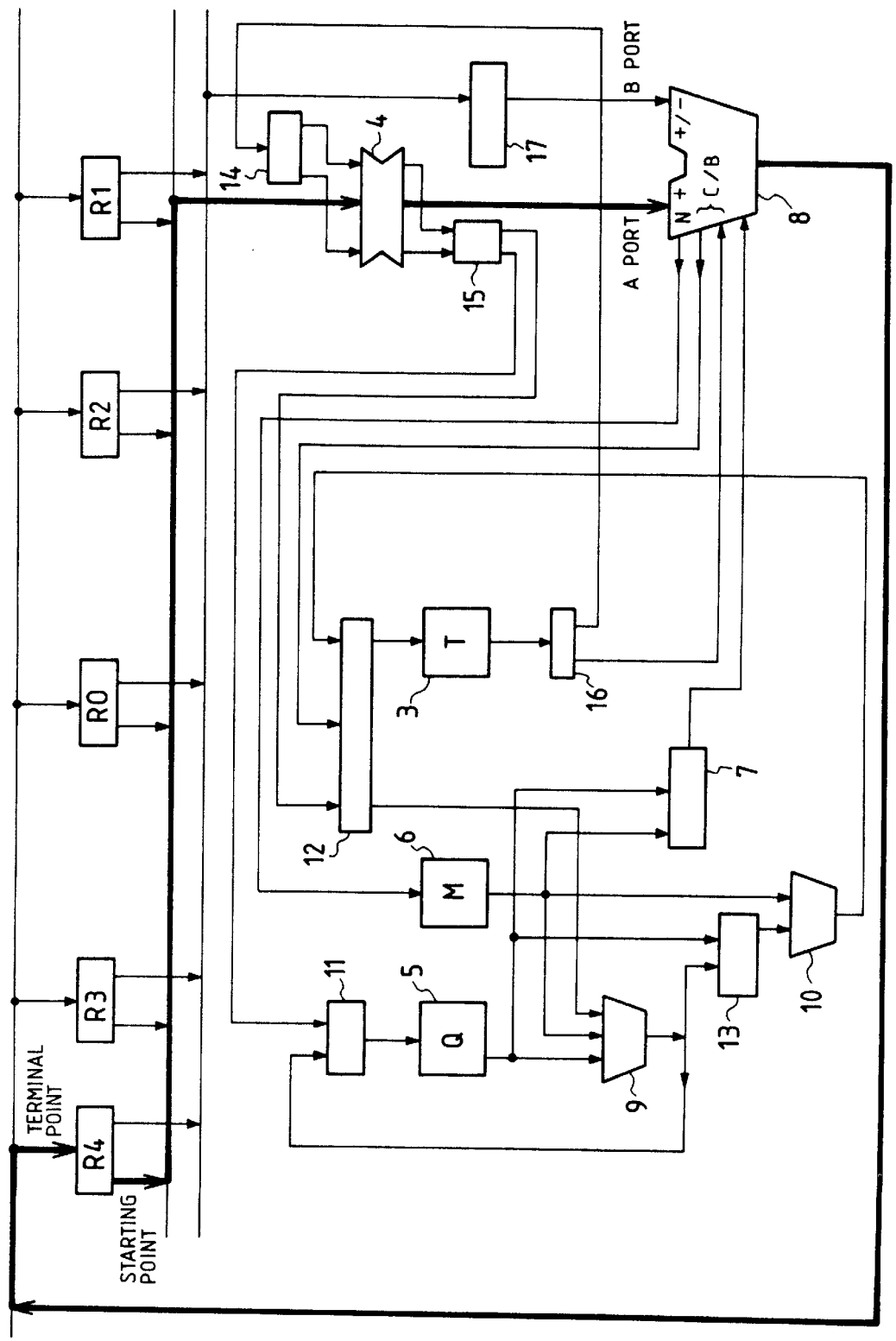
FIG. 72 is a diagram for explaining the operations of the circuits of FIG. 51 for executing the instruction SR16 R4 of FIG. 53.
Figure 73:
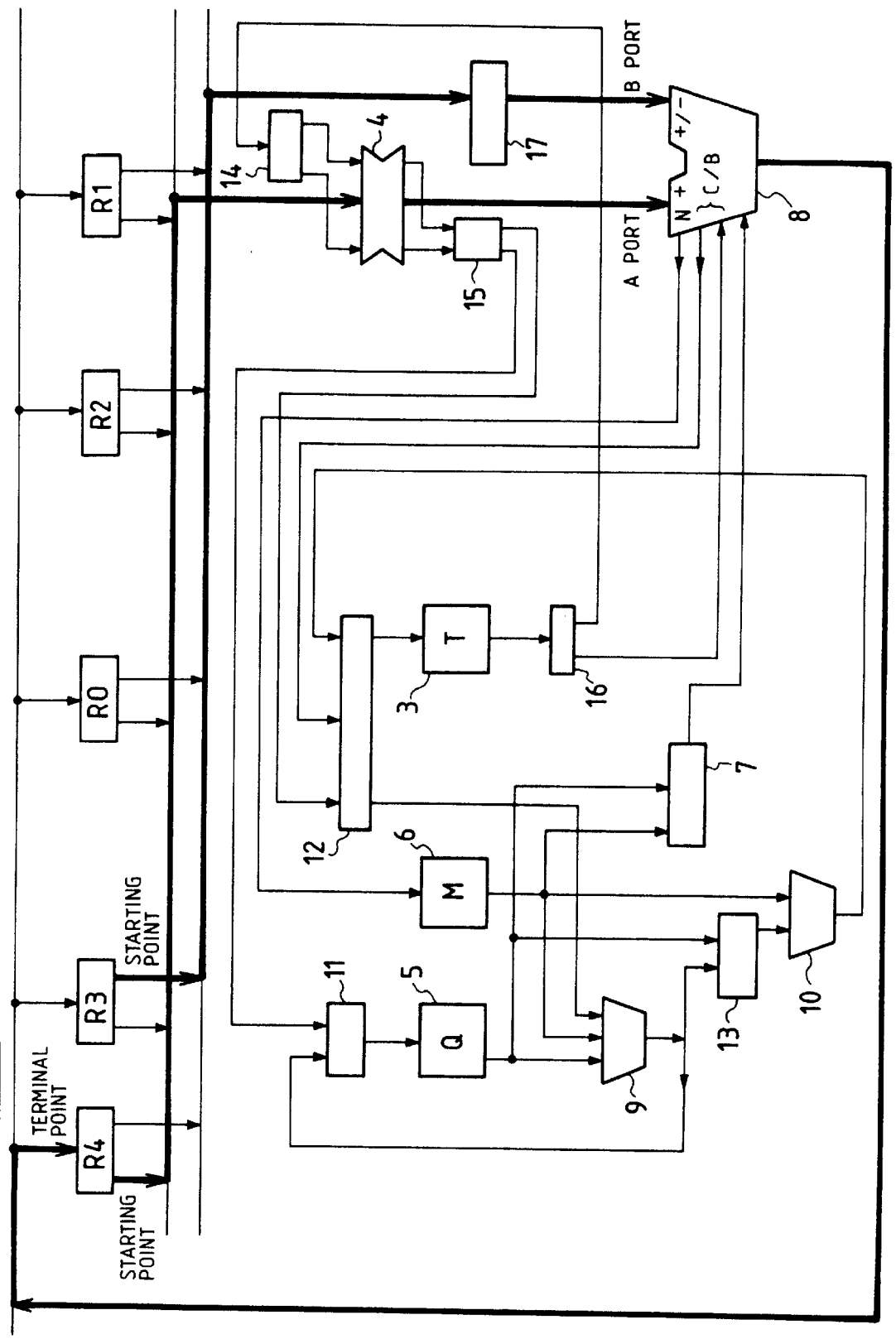
FIG. 73 is a diagram for explaining the operations of the circuits of FIG. 51 for executing the instruction ADD R3,R4 of FIG. 53.
Figure 81A:
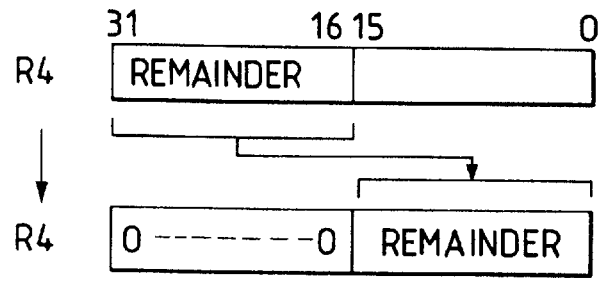
FIG. 81(R) is a diagram for explaining the state of a register corresponding to the operations of FIG. 72.
FIG. 81(S) is a diagram for explaining the state of a register corresponding to the operations of FIG. 73.
FIG. 81(T) is a diagram for explaining the state of a register corresponding to the operations of FIG. 74.
Figure 81B:
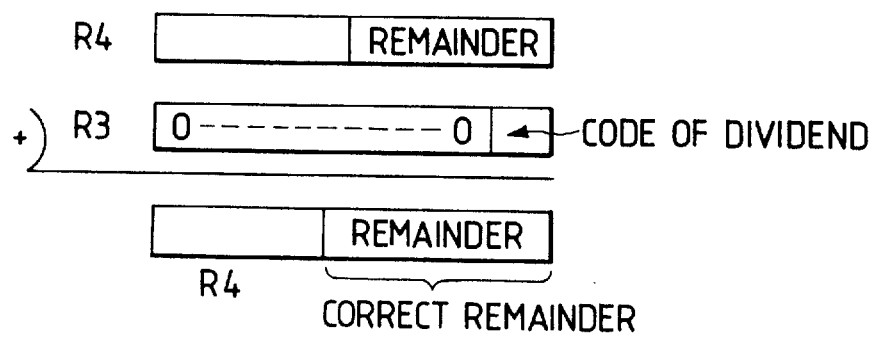
Figure 81C:
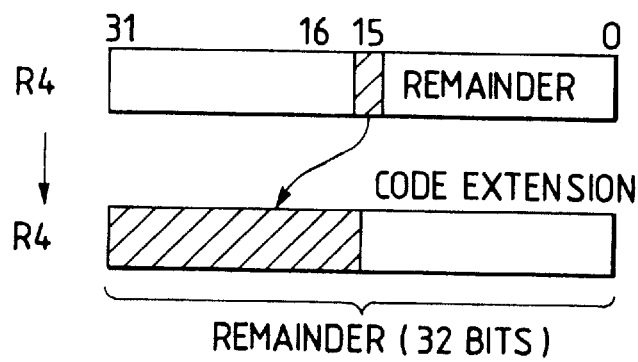

In response to this instruction, as shown in FIGS. 72 and 81, the more significant 16 bits (corresponding to the rest) of the register R4 are shifted rightward to the less significant 16 bits of the register R4. The shift processing is executed by the shifter 4.

(21) ADD R3,R4

The register R3 latches the code of the dividend in response to the aforementioned instruction MOVT R3. Since the code (MSB) of the dividend is subtracted from that dividend in response to the aforementioned instruction (5) SUBC R0,R2, the rest latched in the register R4 may have to be corrected so as to determined the correct rest. In response to the instruction ADD R3,R4, the code (R3) of the dividend is added to the rest before correction. In this processing, s shown in FIGS. 73 and 81, the shifter 4 and the code extension circuit 17 output their individual inputs therethrough. The arithmetic logical operation circuit 8 adds the B port input to the A port input and outputs the addition result and the carry. The addition result is latched in the register R4, and the correct rest is latched in the less significant 16 bits of said register R4.

(22) EXTS.W R4,R4

Figure 74:
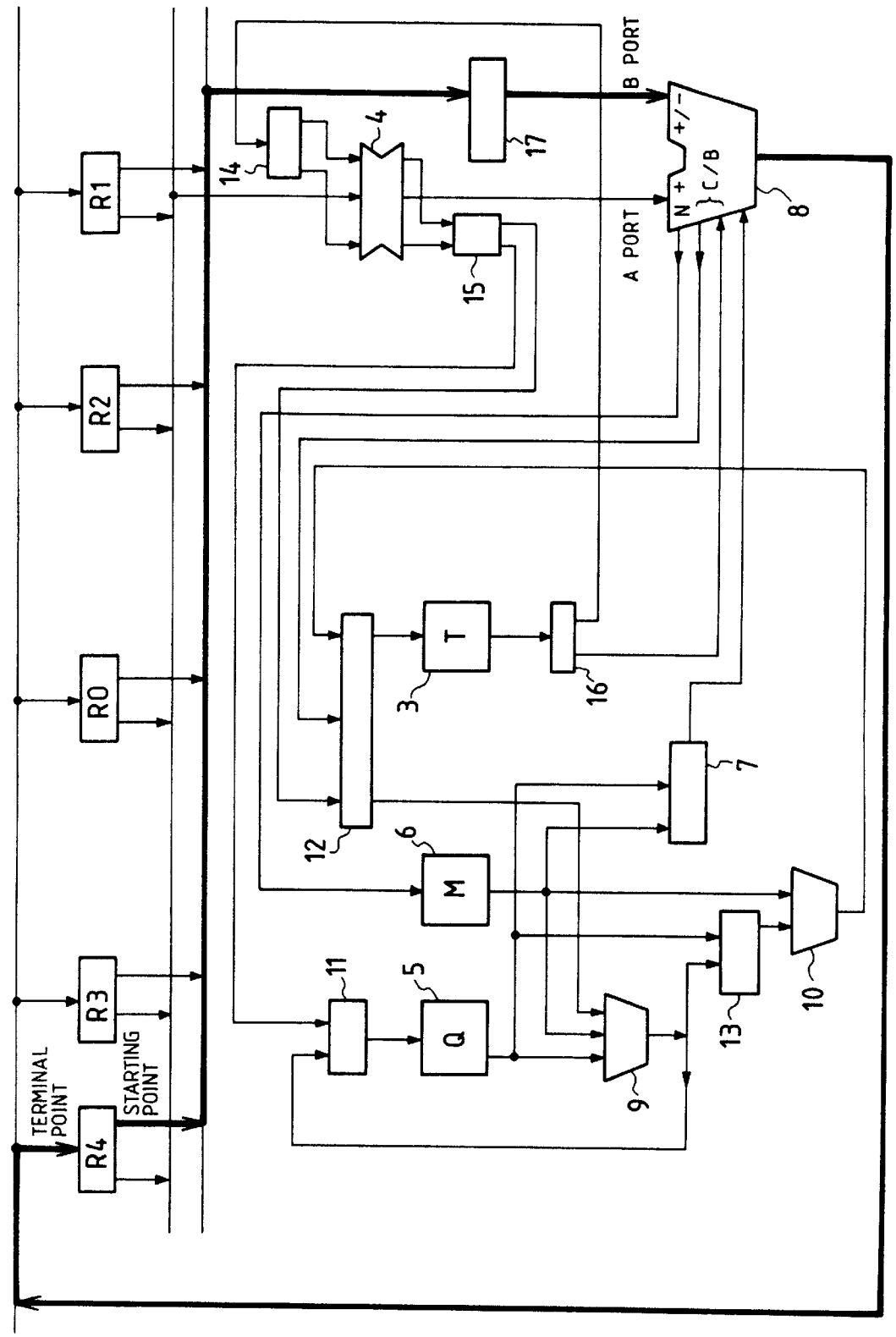
FIG. 74 is a diagram for explaining the operations of the circuits of FIG. 51 for executing the instruction EXTS.W R4,R4 of FIG. 53.

In response to this instruction, as shown in FIGS. 74 and 81, the more significant side of the register R4 having the correct rest latched in the less significant 16 bits is code-extended to determine the final rest of whole 32 bits. In this processing, the code extension circuit 17 extends the code at the 16th bit from the less significant side of the input to the more significant 16 bits. The arithmetic logical operation circuit 8 outputs the B port input therethrough toward the register R4.

Figure 82A:
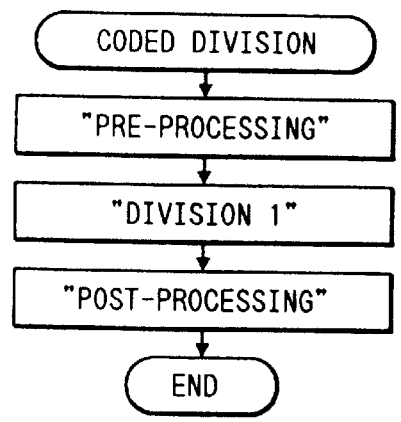
FIG. 82(A) is a flow chart showing the entirety of a coded dividing processing explained in FIGS. 54 to 74.
Figure 82B:
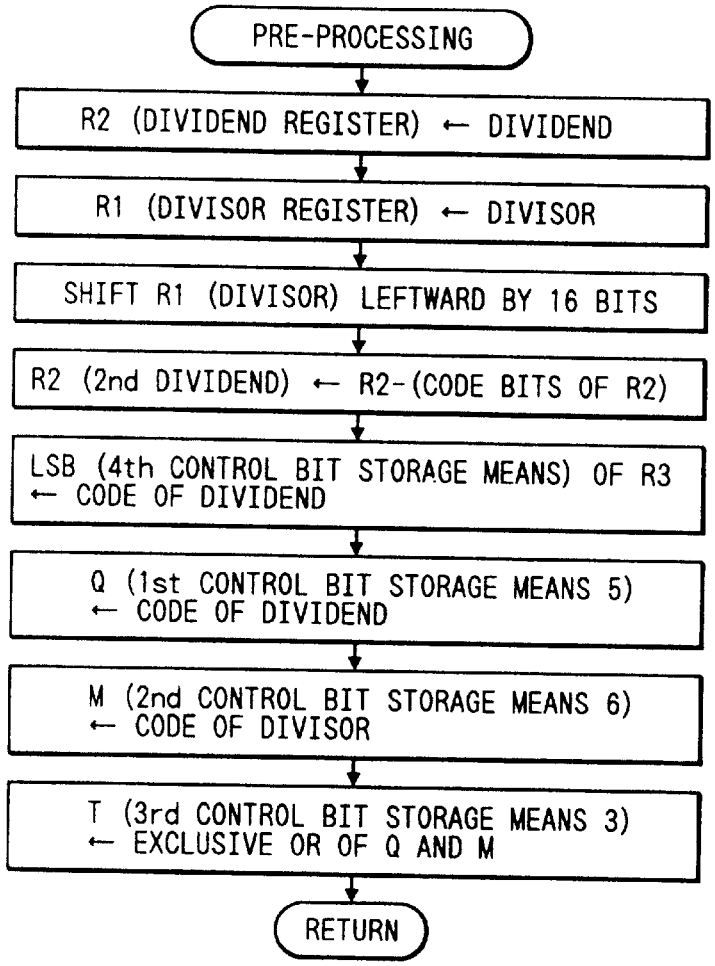
FIG. 82(B) is a flow chart showing a preprocessing of the same.
Figure 84A:
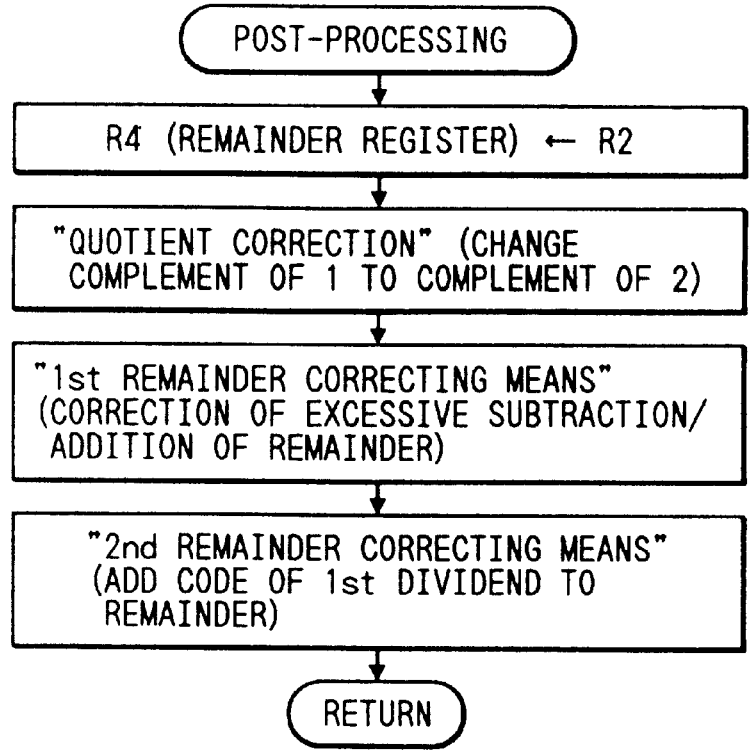
FIG. 84(A) is a flow chart showing the detail of the entirety of the post-processing of FIG. 82.
Figure 84B:
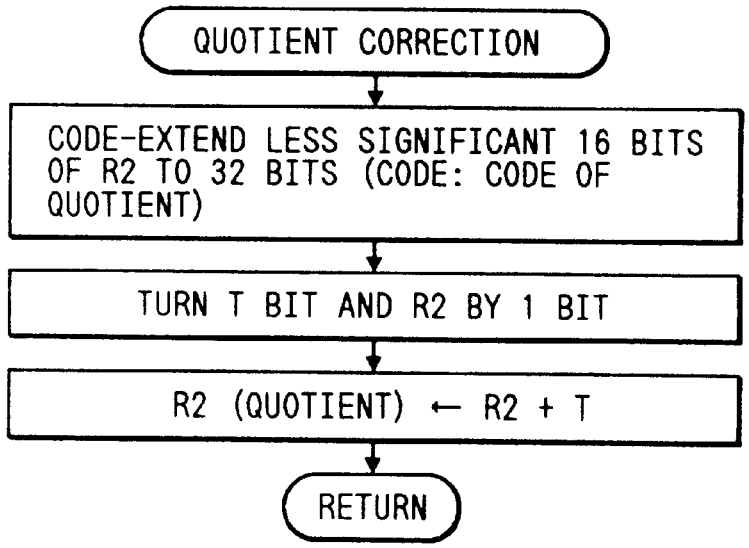
FIG. 84(B) is a flow chart showing the processing of a quotient correction.
Figure 85A:
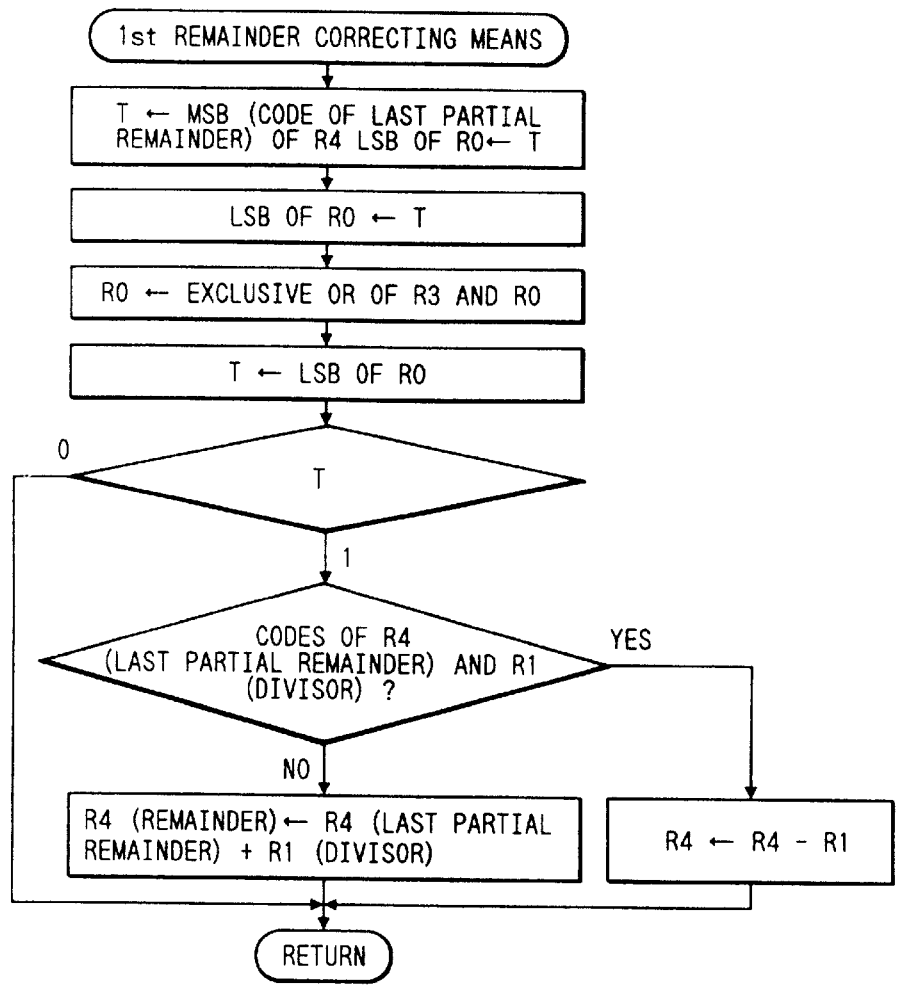
FIG. 85(A) is a flow chart showing the detail of first remainder correcting means of the post-processing of FIG. 84.
Figure 85B:
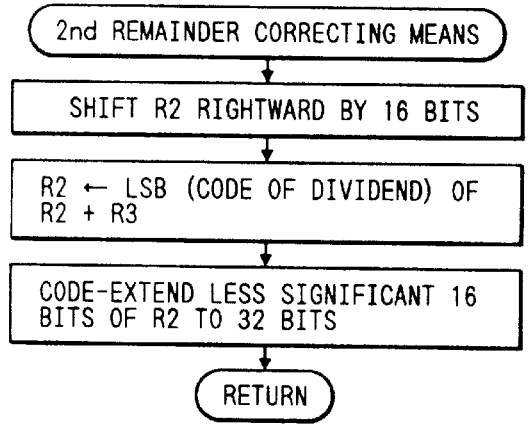
FIG. 85(B) is a flow chart showing the processing of second remainder processing means.

The coded division processing having been described with reference to FIGS. 54 to 74 is roughly classified, if summarized in a flow chart, into the pre-processing, division 1 and post-processing, as shown in FIG. 82(A), and the processing of the aforementioned division 1 is to repeat the division step sixteen times, as shown in FIG. 83(A). The content of the pre-processing is shown in FIG. 82(B); the content of the processing of the division step is shown in FIG. 83(B); and the content of the post-processing is shown in FIG. 85. In this post-processing, there are executed a quotient correction, first partial remainder correction means, and second partial remainder correction means. The processing of the quotient correction is shown in FIG. 84(B): the first partial remainder correction means is shown in FIG. 85(A); and the second partial remainder correction means is shown in FIG. 85(B). The contents of the individual flow charts will be easily understood from the description thus far made, although any further description is not made.

The quotient and the rest are latched in the common register R2 in the example according to the instruction description of FIG. 53 but may be latched in different registers. If the quotient is to be latched in the not-shown register R5, for example, in the description of FIG. 53, the instruction MOV R0,R5 is inserted to the next of the instruction EOR R0,R0, and the instruction ROTCL R5 is inserted before the instruction DIV1 R1,R2 so that these instructions DIV1 R1,R2 and instruction ROTCL are repeated sixteen times. Then: the instruction EXTS.W R2,R2 may be changed into the instruction EXTS.W R5,R5; the next instruction ROTCL R2 may be changed into the instruction ROTCL R5; and the next instruction ADDC R0,R2 may be changed into the instruction ADDC R0,R5.

Incidentally, FIGS. 86 to 91 show other examples of modification of the instruction description for the coded division. These modes omit the description of the correction processing relating to the rest. The SL8 Rn instruction is one for shifting the register Rn leftward by 8 bits. The individual bits of the less significant 8 bits of the Rn after the instruction execution are 0. The EXTS.B Rn,Rm instruction is one for code-extending the less significant 8 bits of the Rn to 32 bits and to latch the 32 bits in the Rm. These contents will be easily understood from the description of the foregoing embodiments although no detailed description is made.

[24] DIVOS/ DIVOU/ DIV1 (Step Division) Instruction

Here will be described the DIVOS instruction used in the foregoing description, and the examples of the operation and use of the DIV1 instruction. The contents to be described share the prerequisites in the aforementioned item [17] List of Instructions. However, these contents are different in detail in the operation examples expressed by the C language from the DIV1 instruction contained in the Item.

Format:
DIV1 Rm,Rn
DIVOS Rm,Rn
DIVOU

Description

The content of 32 bits of the general purpose register Rn is divided at one step with the content of the Rm, and the result of 1 bit is latched in the T bit. The instruction DIVOS is a coded division initialization instruction for latching the MSB of the dividend (Rn) in the Q bit, the MSB of the divisor (Rm) in the M bit, and the EOR of the M bit and the Q bit in the T bit. The DIVOU instruction is a codeless division initialization instruction for clearing the M/Q/T bits to 0. The quotient is obtained by releasing the instruction DIV1 (in combination with the ROTCL, if necessary) by the number of bits of the divisor. During this repetition, an intermediate result is latched in the assigned register and the M/Q/T bits. If these are unnecessarily rewritten by a software, the operation result cannot be warranted. There are not prepared the detection of a zero division and an overflow and the operation of the partial remainder. The division sequence can be referred to the following examples of use.

Operation

```
extern unsigned char Q,M,T;
extern unsigned long PC,R[16]
DIVOU()      /* DIVOU */
{
        M=Q=T=0;
        PC+=2;
}
DIVOS(long m, long n)   /* DIVOS Rm,Rn */
{
        if ((R[n] & 0x80000000)==0) Q=0;
        else Q=1;
        if ((R[m] & 0x80000000)==0) M=0;
        else M=1;
        T=!(M==Q);
        PC+=2;
}
DIV1(long m,long n)   /* DIV1 Rm,Rn */
{
        unsigned long tmp0;
        unsigned char old_q, tmp1;
        old_q=Q;
        Q=(unsigned char)((0x80000000 & R[n])!=0);
        R[n]<<=1;
        R[n]| =(unsigned long)T;
        switch(old_q){
        case 0:
                switch(M){
                case 0:
                        tmp0=R[n];
                        R[n]-=R[m];
                        tmp1=(R[n]>tmp0);
                        switch(Q){
                        case 0:
                                Q=tmp1;
                                break;
                        case 1:
                                Q=(unsigned char)(tmp1==0);
                                break;
                        }
                        break;
                case 1:
                        tmp0=R[n];
                        R[n]+=R[m];
                        tmp1=(R[n]<tmp0);
                        switch(Q){
                        case 0:
                                Q=(unsigned char)(tmp1==0);
                                break;
                        case 1:
                                Q=tmp1;
                                break;
                        }
                        break;
                }
                break;
        case 1:
                switch(M){
                case 0:
                        tmp0=R[n];
                        R[n]+=R[m];
                        tmp1=(R[n]<tmp0);
                        switch(Q){
                        case 0:
                                Q=tmp1;
                                break;
                        case 1:
                                Q=(unsigned char)(tmp1==0);
                                break;
                        }
                        break;
                case 1:
                        tmp0=R[n];
                        R[n]-=R[m];
                        tmp1=(R[n]>tmp0);
                        switch(Q){
                        case 0:
                                Q=(unsigned char)(tmp1==0);
                                break;
                        case 1:
                                Q=tmp1;
                                break;
                        }
                        break;
                }
                break;
        }
        T=(Q==M);
        PC+=2;
}
```

Example 1 of Use:
R1(32bits) ÷ R0(16bits) = R1(16bits): no code

| | | |
|---|---|---|
| SL16 | | R0; divisor is set to the more significant 16 bits, and the less significant 16 bits is set to 0. |
| TEST | | R0,R0; zero division is checked. TEST R0,R0 is an instruction for setting the T bit to 1, if the OR between R0 and R0 is 0, and to 0 if 1. |
| BT | ZERO_DIV; | branches into ZERO_DIV, if T=0. |
| CMP/HS | | R0,R1; overflow is checked. T bit is set to 1 if R0≦R1 without code. |
| BT | OVER_DIV; | |
| DIVOU | ; | initialization of flag |
| .arepeat 16 | ; | |
| DIV1 | | R0,R1; repeat 16 times |
| .aendr | ; | |
| ROTCL | R1; | |
| EXTU.W | | R1,R1; R1=quotient |

Example 2 of Use:
R1:R2(64bits) ÷ R0(32bits) = R2(32bits):no code

| | | |
|---|---|---|
| TEST | | R0,R0; zero division is checked. |
| BT | ZERO_DIV; | |
| CMP/HS | | R0,R1; overflow is checked. |
| BT | OVER_DIV; | |
| DIVOU | ; | initialization of flag |
| .arepeat 32 | ; | |
| ROTCL | R2; | |
| DIV1 | R0,R1; | |
| .aredr | ; | |
| ROTCL | | R2; R2= quotient |

Example 3 of Use:
R1(16bits) ÷ R0(16bits) = R1(16bits): no code

| | | |
|---|---|---|
| SL16 | | R0; divisor is set to the more significant 16 bits, and the less significant 16 bits is set to 0. |
| EXTS.W | | R1,R1; dividend is code-extended to 32 bits. |
| EOR | | R2,R2; R2=0 |
| DIVOS | R2,R1; | |
| SUBC | | R2,R1; decremented by −1 if dividend is negative. |
| DIVOS | | R0,R1; initialization of flag |
| .arepeat 16 | ; | |
| DIV1 | | R0,R1; repeat 16 times |
| .aendr | ; | |
| EXTS.W | | R1,R1; R1=quotient (expression of complement of 1) |
| ROTCL | R1; | |
| ADDC | | R2,R1: incremented by +1, if code bit of MSB of quotient is at 1, and transformed into expression of complement of 2. |
| EXTS.W | | R1,R1: R1= quotient (expression of complement of 2) |

Example 4 of Use:
R2(32bits) ÷ R0(32bits) = R2(32bits): no code

| | | |
|---|---|---|
| EOR | R3,R3; | |
| DIVOS | R3,R2; | |
| SUBC | | R1,R1; dividend is code-extended to 64 bits (R1 : R2) |
| SUBC | | R3,R2; decremented by −1 if dividend is negative. |

| | | |
|---|---|---|
| DIVOS | R0,R1; | initialization of flag |
| .arepeat 32 | ; | |
| ROTCL | R2; | repeat 32 times |
| DIV1 | R0,R1; | |
| .aendr | ; | |
| ROTCL | R2; | R2=quotient (expression of complement of 1) |
| ADDC | R3,R2; | incremented by +1, if code bit MSB of quotient is at 1, and transformed into expression of complement of 2. |
| | ; | R2=quotient (expression of complement of 2) |

Although our invention has been described specifically in connection with the embodiments thereof, it should not be limited thereto but can naturally be modified in various manners without departing from the scope thereof.

For example, the data word length and the bit number of the fixed length instruction format should not be limited to the data word length of 32 bits and the 16 bit fixed length instruction format but can be individually modified by bit numbers of powers of 2. The coded division can also be applied to the 32 bit 3-operand RISC instruction. The control for the coded division can be executed by not only the microprogram method but also a wired logic forming a special purpose operation circuit. If, in the coded division, there is no special instruction such as the aforementioned DIV1 instruction, this situation can be coped with by forming a similar processing into a subroutine in response to another instruction.

Although the description thus far made is directed to the case in which our invention is applied to a microcomputer having a program ROM packaged therein and presenting the field of application backgrounding the invention, the invention should not be limited thereto but can also be applied widely to a microcomputer containing neither the program ROM nor its peripheral circuit. In addition, the foregoing descriptions have been described in case the coded division is applied to the non-recovery method, but they can naturally be applied to the recovery method.

The effects to be obtained by the representatives of the invention disclosed herein will be briefly described in the following.

(1) In a microcomputer adopting the general purpose register method, there is adopted a fixed length instruction format which has a smaller bit number than that of the maximum data word length fed to instruction execution means. As a result, there is achieved an effect that it is possible to provide a microprocessor which has a small program capacity or a high using efficiency of program memory and a low system cost while enjoying the advantage of simplification of such an instruction decoding as exemplified in the RISC machine of the prior art having a fixed length instruction format of 32 bits or the like.

(2) The fixed length instruction format and the maximum data word length are set to a bit number of a power of 2 so that the maximum data word length is 32 bits, for example, the instruction format is fixed to 16 bits. Thus, another effect achieved is that either the instruction or the data can be extended over the ROM/RAM having an identical bit structure while preventing the misalignment of the program on the memory and holding the consistency with the general memory commercially available.

(3) When the aforementioned fixed length instruction format and the aforementioned maximum data word length are to be individually set to the bit numbers of powers of 2, a plurality of instructions efficiently can be efficiently fetched by the use of an internal bus of a bit number equal to that of the maximum data word length, and the bus access number for the instruction fetch can be reduced by prefetching the instructions in a common cycle.

(4) In case the internal bus is shared between the data transfer and the instruction fetch, the pipe control is executed to prefer the data fetch thereby to delay the whole instruction execution schedule including an instruction fetch conflicting with that data fetch, if the data fetch and the instruction fetch for the memory conflict.

(5) A further effect achieved is that the restriction on the bit number of the fixed length instruction format is enabled not to limit the use of immediate data by supporting the instruction containing a description for assigning the immediate data in a data relation for offsetting the value of a displacement relative to the value of a predetermined register.

(6) A further effect achieved is that, even in the fixed length instruction format having a restricted bit number, the displacement necessary for the processing or the bit number of the immediate data can be maximized by supporting an instruction for implicitly assigning a predetermined general purpose register which is fixed as an operand despite of no register assigning field in the instruction.

(7) A further effect achieved is that the displacement necessary for the processing or the bit number of the immediate data can be maximized, even for the fixed length instruction format having a limited bit number, by supporting an instruction containing a description for reflecting the truth or false of the arithmetic result for a specified condition upon a predetermined status flag.

(8) Thanks to these effects, it is possible to solve the various problems accompanying the adoption of the fixed length instruction format having a smaller bit number than that of the data word length. For example: neither the use of immediate data nor the assignment of an absolute address is restricted even if the bit number of the fixed length instruction format is less than that of the data word length; a description such as a necessary displacement can be executed in the fixed length instruction format having a limited bit number; a contribution is made to the prevention of a misalignment of the program arrangement on a memory; that the code efficiency or memory using efficiency is improved better from the standpoint of the content of a supporting instruction.

(9) The conflicting state between the uses of the general purpose registers in response to the instructions before and after the pipe-line execution making use of the general purpose register method, can be simply coped with by detecting the register conflicting state in the general purpose register on the basis of the information of a register assigned area contained in the instruction format and by adopting the pipe-line control means for relatively delaying execution of the subsequent instructions on the basis of the detection result and the instruction execution cycle number.

(10) For a 16 bit fixed length instruction format, the displacement of a condition branching instruction is fixed at 8 bits, and the displacements of a subroutine branching instruction and an unconditional branching instruction are fixed to 12 bits. As a result, a proper branching destination can be assigned according to the kinds of the branching instruction without exerting substantial affections upon the actual operation while the instruction format length being restricted.

(11) In case a dividend is negative, a preliminary processing is executed by subtracting the value "1" having a weight of the LSB of a dividend from the dividend itself so that the division can be executed with the codes unlike the prior art, in which whether or not the partial remainder is 0 is decided at each time. As a result, the division can be executed at a high speed. In other words, effects similar to or better than those of the prior art, in which the division is speeded up by providing a special purpose hardware for deciding whether or not the partial remainder is 0 at a shorter number of steps, can be realized without increasing the scale of the hardware.

(12) In case a division with codes of multiple length (or arbitrary length) is to be executed in the prior art for deciding whether or not the partial remainder is 0 at each time, the decision of partial remainder=0 has to be executed in accordance with the bit number (e.g., 8 bits, 16 bits, 32 bits or 64 bits) of the partial remainder so that the amounts of the software and hardware will increase in proportion to that bit number. In this regard, since the present invention requires no decision of partial remainder=0, the multi-length (or arbitrary length) coded division or the coded decision of arbitrary length and arbitrary accuracy can be easily coped with without increasing the software amount and the hardware amount.

(13) By adopting the operation of subtracting the code bit or the MSB of the dividend as a pre-processing of the division, the division program can be prepared without considering whether the dividend is positive or negative. Since such decision is not required, the dividing speed can be raised, and the division itself can be executed by making use of a common circuit despite whether the dividend is positive or negative.

(14) Since the decision of excess subtraction or addition of the divisor to or from the partial remainder and the calculation of the quotient bit can be executed only from the MSB of the dividend or the partial remainder and the MSB of the divisor, the hardware for the division can be further simplified. Since, moreover, the decision of excess subtraction or addition of the divisor from or to the partial remainder, the decision of the addition/subtraction and the calculation of the quotient bit can be executed only from the MSB of the divided or the partial remainder and the MSB of the divisor, an easy application can also be made to the division of arbitrary length. Since, still moreover, the decision of the addition/subtraction at the division step can be executed only by the MSB, the common division step can be used for the coded and codeless divisions by initializing the division.

(15) When the quotient and rest are to be latched in a single dividend register while being shifted, the decision of partial remainder=0 has to be executed in the prior art by changing the digit positions of the partial remainder to be decided, at each time. On the basis of this fact, the prior art is restricted by the complicated processing and an elongated processing time. However, the present invention is subjected to neither such restriction nor another restriction, in which the transfer instructions to be executed for latching the quotient and the rest in different registers are increased. As a result, the coded division can be further speeded up with ease.

What is claimed is:

1. A CPU capable of processing instructions in an instruction set and formed on a semiconductor chip, comprising:
   said instructions having an instruction length of each of the instructions to be processed by said CPU in said instruction set being of a first bit length;
   an instruction register coupled to an instruction memory storing said instructions to be processed by said CPU in said instruction set, wherein a one instruction fetched in the instruction register has a displacement value;
   decode means being supplied with said one instruction fetched in said instruction register and decoding said one instruction supplied from said instruction register;
   an execution unit performing an operation of data,
      wherein the maximum data word length of said data to be processed by said execution unit is a second bit length;
   a program counter storing an address of said one instruction fetched to said instruction register; and
   wherein data stored in an address which is indicated by adding the address stored in said program counter to the displacement value is provided to said execution unit when the execution unit performs an operation for immediate data having a bit length of greater than said first bit length; and,
   wherein said instruction set has at least one conditional branch instruction and at least one unconditional branch instruction, each of said conditional and said unconditional branch instructions having an area comprising a displacement to designate a jumped address, a bit width of said displacement area of said conditional branch instruction being different than a bit width of said displacement area of said unconditional branch instruction.

2. The CPU according to claim 1, further comprising a plurality of general purpose registers, each of said plurality of general purpose registers being selected by the result of decode of said decode means.

3. The CPU according to claim 2,
   wherein the CPU executes one instruction by performing predetermined stages in order while using at least one general purpose register, and when the CPU executes at least two instructions in sequence, the CPU performs the predetermined stages in a pipeline processing, and
   wherein the CPU further comprises a register conflict check circuit checking a conflict of the general purpose registers which use the pipeline processing.

4. The CPU according to claim 3,
   wherein an instruction in said instruction set has an area for designating two general purpose registers from said plurality of general purpose registers.

5. The CPU according to claim 1 wherein said displacement areas of said conditional and unconditional branch instructions have the bit widths of 8 bits and 12 bits, respectively.

6. A CPU capable of processing instructions in an instruction set and formed on a semiconductor chip, comprising:
   said instructions having an instruction length of each of the instructions to be processed by said CPU in said instruction set being of a first bit length;
   an instruction register coupled to an instruction memory storing said instructions to be processed by said CPU in said instruction set, wherein a one instruction fetched in the instruction register has a displacement value;
   decode means being supplied with said one instruction fetched in said instruction register and decoding said one instruction supplied from said instruction register;
   an execution unit performing an operation of data,
      wherein a maximum data word length of said data to be processed by said execution unit is a second bit length; and
   a program counter storing an address of said instruction fetched to said instruction register,
      wherein data stored in an address which is indicated by adding the address stored in said program counter to the displacement value is provided to said execution unit when the execution unit performs an operation for immediate data having a bit length of greater than said first bit length, wherein said first bit length is 16 bits, said second bit length is 32 bits, and wherein said instruction set has at least one conditional branch instruction and at least one unconditional branch instruction, each of said conditional and said unconditional branch instructions having an area comprising a displacement designating a jumped address, a bit width of said displacement area of said conditional branch instruction being 8 bits and said displacement area of said unconditional branch instruction being 12 bits.

7. The CPU according to claim 6, further comprising, a plurality of general purpose registers, each of said plurality of general purpose registers being selected by the result of decode of said decode means.

8. The CPU according to claim 7, wherein the CPU executes one instruction by performing predetermined stages in order while using at least one general purpose register, and when the CPU executes at least two instructions in sequence, the CPU performs the predetermined stages in a pipeline processing, and wherein the CPU further comprises a register conflict check circuit checking a conflict of the general purpose registers which use the pipeline processing.

9. The CPU according to claim 8, wherein an instruction in said instruction set has an area for designating two general purpose registers from said plurality of general purpose registers.

10. A CPU, capable of processing instructions in an instruction set comprising:

an instruction register fetching an instruction from an instruction memory storing said instructions to be processed by said CPU, wherein each instruction in said instruction set has an instruction length essentially consisting of $2^n$ bits, where n represents a whole number;

a program counter storing an address of an instruction to be fetched to said instruction register; and an execution unit performing an operation of data, each of which contains $2^m$ bits, where m represents a whole number, wherein said instruction length is shorter than the maximum data word length of said data to be processed by said execution unit, and wherein said instruction set has at least one conditional branch instruction and at least one unconditional branch instruction, each of said conditional and said unconditional branch instructions having an area designating a displacement to a jumped address, a bit width of said displacement area of said conditional branch instruction being different from a bit width of said displacement area of said unconditional branch instruction.

11. The CPU according to claim 10, further comprising, decode means being supplied with said instruction fetched in said instruction register and decoding said instruction supplied from said instruction register; and a plurality of general purpose registers, each of said plurality of general purpose registers being selected by the decoding of said decode means.

12. The CPU according to claim 11, wherein the CPU executes one instruction by performing predetermined stages in order while using at least one general purpose register, and when the CPU executes at least two instructions in sequence, the CPU performs the predetermined stages in a pipeline processing, and wherein the CPU further comprises a register conflict check circuit checking a conflict of the general purpose registers being used in the pipeline processing.

13. The CPU according to claim 12, wherein an instruction in said instruction set has an area for designating two general purpose registers from said plurality of general purpose registers.

14. The CPU according to claim 13, wherein the n is 4 and the m is 3 or more.

15. The CPU according to claim 14, wherein said CPU is formed on a semiconductor chip.

16. The CPU according to claim 10 wherein said displacement areas of said conditional and unconditional branch instructions have the bit widths of 8 bits and 12 bits, respectively.

17. A CPU, capable of processing instructions in an instruction set comprising:

an instruction register fetching an instruction from an instruction memory storing said instructions to be processed by said CPU, each instruction in said instruction set having an instruction length of a first bit length;

a program counter storing an address of an instruction to be fetched to said instruction register; and an execution unit performing an operation of data, wherein a load instruction in said instruction set has a displacement, wherein data stored in an address which is indicated by adding an address in said program counter to said displacement is provided to said execution unit when the execution unit performs the load instruction for immediate data having a bit length equal to or greater than said first bit length, wherein said first bit length is shorter than the maximum data word length of said data to be processed by said execution unit, and wherein said instruction set has at least one conditional branch instruction and at least one unconditional branch instruction, each of said conditional and said unconditional branch instructions having an area designating a displacement to a jumped address, a bit width of said displacement of said conditional branch instruction being different from a bit width of said displacement of said unconditional branch instruction.

18. The CPU according to claim 17, further comprising, decode means being supplied with said instruction fetched in said instruction register and decoding said instruction supplied from said instruction register; and a plurality of general purpose registers, each of said plurality of general purpose registers being selected by the result of decode of said decode means.

19. The CPU according to claim 18, wherein the CPU executes one instruction by performing predetermined stages in order while using at least one general purpose register, and when the CPU executes at least two instructions in sequence, the CPU performs the predetermined stages in a pipeline processing, and wherein the CPU further comprises a register conflict check circuit for checking a conflict of the general purpose registers being used in the pipeline processing.

20. The CPU according to claim 19, wherein an instruction in said instruction set has an area for designating two general purpose registers from said plurality of general purpose registers.

21. The CPU according to claim 17 wherein said displacement areas of said conditional and unconditional branch instructions have the bit widths of 8 bits and 12 bits, respectively.

* * * * *